US006958127B1

(12) United States Patent　　(10) Patent No.:　　US 6,958,127 B1
Suzuki et al.　　(45) Date of Patent:　　Oct. 25, 2005

(54) COATED MOLDED ARTICLE, METHOD OF RECYCLING THE SAME AND APPARATUS THEREFOR

(75) Inventors: Yasuhiro Suzuki, Mie (JP); Hidetoshi Oido, Osaka (JP); Keiri Umezawa, Tokyo (JP)

(73) Assignees: Suzuka Fuji Xerox Co., Ltd., Susuka (JP); Tohpe Corporation, Sakai (JP); Kowa Tokyo Co., Ltd., Tokyo (JP)

( * ) Notice: Subject to any disclaimer, the term of this patent is extended or adjusted under 35 U.S.C. 154(b) by 0 days.

(21) Appl. No.: 09/147,129

(22) PCT Filed: Apr. 10, 1997

(86) PCT No.: PCT/JP97/01227

§ 371 (c)(1),
(2), (4) Date: Oct. 14, 1998

(87) PCT Pub. No.: WO97/38838

PCT Pub. Date: Oct. 23, 1997

(30)　　Foreign Application Priority Data

Apr. 14, 1996　(JP) ............................................. 8-116986
Sep. 30, 1996　(JP) ............................................. 8-280366
Mar. 7, 1997　(JP) ............................................. 9-70780

(51) Int. Cl.[7] ........................... B29B 17/00; B32B 7/04
(52) U.S. Cl. ...................... 264/40.1; 264/115; 264/911; 264/916; 264/917; 264/920; 264/921; 427/393.5; 427/400; 428/420; 428/542.8; 521/40
(58) Field of Search ................................ 264/40.1, 115, 264/911, 916–917, 920–921; 427/393.5, 400; 428/420, 542.8; 521/40

(56)　　References Cited

U.S. PATENT DOCUMENTS 3,904,572 A　9/1975　Huang et al.
4,581,259 A　4/1986　Rambaud 5,424,362 A　6/1995　Hwang et al.
5,476,624 A　12/1995　Sato et al.
5,569,713 A　* 10/1996　Lieberman ................... 525/146
6,703,445 B2　* 3/2004　Suzuki ......................... 525/64
6,794,419 B2　* 9/2004　Suzuki ....................... 521/45.5

FOREIGN PATENT DOCUMENTS

EP　　0 475 377 A2　　3/1992
FR　　2 387 272　　11/1978
JP　　54-47771　　4/1979

(Continued)

OTHER PUBLICATIONS

Patent Abstracts of Japan, JP 05–228936, Sep. 7, 1993.
Database WPI, Section Ch, Week 199632, Derwent Publications Ltd., London, GB; Class A14, AN 1996–317078 XP002138976 & JP 08 141491 A (Nagoya Yuka KK), Jun. 4, 1996, paragraph '00111, abstract.
Yasuo Umesawa, "Coating the plastic moldings", Sep. 20, showa 47 (1972), Nikkan Kougyou Shinbunsha, pp. 39–40 (column of vanish consisting of acrylic resin), p 42 (table 3.2), pp. 60–68.
Jul. 22, 2003 Japanese Office Action (3pp.).
Plaver et al; "Recyclability of Flexible Thermoplastic Polyurethane/ABS Automotive Bumper Fascia," SAE International, International Congress and Exposition, Detroit, Michigan, Feb. 25–Mar. 1, 1991.

*Primary Examiner*—Suzanne E. McDowell
(74) *Attorney, Agent, or Firm*—Oblon, Spivak, McClelland, Maier & Neustadt, P.C.

(57)　　ABSTRACT

Coated moldings coated, on surfaces of moldings, with paint constituted of a thermoplastic resin having affinity for a thermoplastic resin used as a main constituent of the moldings. Method and apparatus for recycling the coated moldings are also described in which the coated moldings are crushed by means of a crusher and the crushed moldings are molded in a mold to provide fresh moldings, followed by coating, by means of a coating device, the fresh moldings on surfaces thereof with a paint constituted of a thermoplastic resin having affinity for the thermoplastic resin for the moldings.

54 Claims, 53 Drawing Sheets

FOREIGN PATENT DOCUMENTS

| | | |
|---|---|---|
| JP | 55-140528 | 11/1980 |
| JP | 58-191724 | 11/1983 |
| JP | 60-19522 | 1/1985 |
| JP | 2-39917 | 2/1990 |
| JP | 2039917 | 2/1990 |
| JP | 5-228936 | 9/1993 |
| JP | 6049250 | 9/1993 |
| JP | 6-134757 | 5/1994 |
| JP | 6-166150 | 6/1994 |
| JP | 7-3218 | 1/1995 |
| JP | 7-60819 | 3/1995 |
| JP | 7-241848 | 9/1995 |
| JP | 8-34088 | 2/1996 |
| JP | 8-034088 A | 2/1996 |
| JP | 8-141491 | 6/1996 |
| WO | WO 94/06612 | 3/1994 |

* cited by examiner

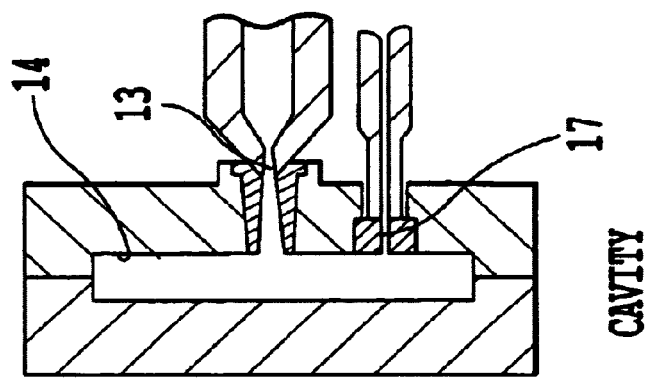
FIG. 2C CAVITY
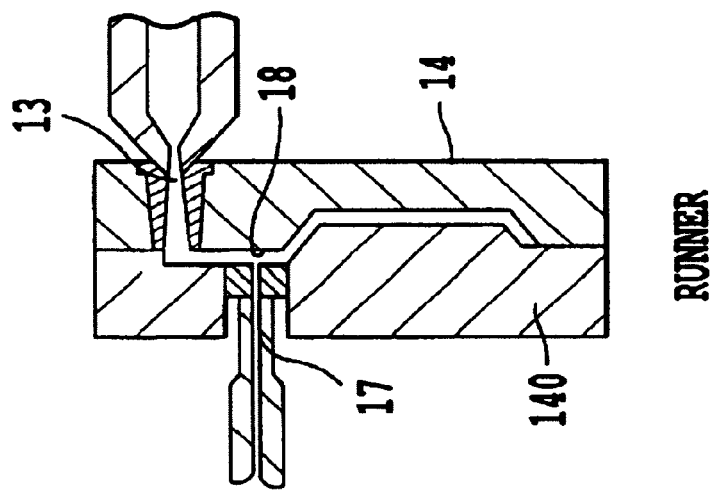
FIG. 2B RUNNER
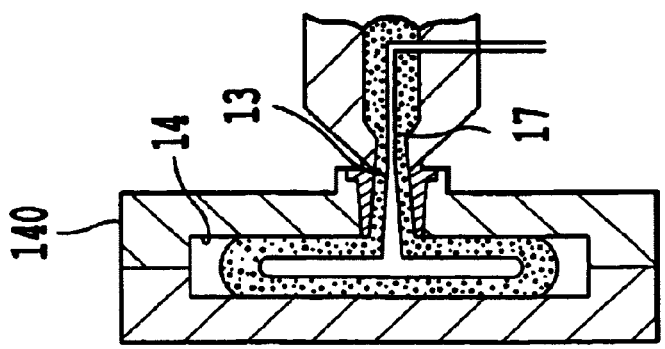
FIG. 2A NOZZLE

PAINT

STYRENE MODIFIED ACRYLIC RESIN

PS RESIN

SBR

DYEING AGENT: $RuO_4 + OsO_4$  ×10,000  1 μm; |—|

(1 μm = 1 cm)

PS RESIN    THERMOSETTING ULETHANE RESIN

DYEING AGENT : RuO₄+OsO₄    ×10.000    1μm : ———

(1μm = 1 cm)

TEST CHART FOR DENSITY MEASUREMENT 0001

DYEING AGENT: OsO₄+RuO₄  ×5,000  2μm: |—|
(2μm=1cm)

PVC RESIN

PEEL, ABSENCE    THERMOPLASTIC ACRYLIC RESIN

DYEING AGENT : RuO₄    ×5,000    2μm : ⊢―⊣
(2μm=1cm)

DYEING AGENT : OsO₄+RuO₄    ×10,000    1 μm : ⊢—⊣
(1 μm = 1 cm)

DYEING AGENT : $OsO_4$  ×10,000  1 μm ; ⊢──┤

(1 μm = 1 cm)

DYEING AGENT : RuO₄   ×10,000   1 μm : ⊢―⊣
(1 μm = 1 cm)

DYEING AGENT : OsO₄   ×10,000   1 μm : ⊢―┤
(1 μm = 1 cm)

PC RESIN

STYRENE MODIFIED ACRYLIC RESIN

DYEING AGENT : OsO₄ + RuO₄   × 20,000   0.5 μm : ⊢—⊣

(0.5 μm = 1 cm)

STYRENE ACRYLIC EMULSION (EMULSION)

PVC RESIN

PEEL, ABSENCE

DYEING AGENT : RuO₄   ×5,000   2μm; ⊢―⊣
(2μm = 1 cm)

FIG. 34
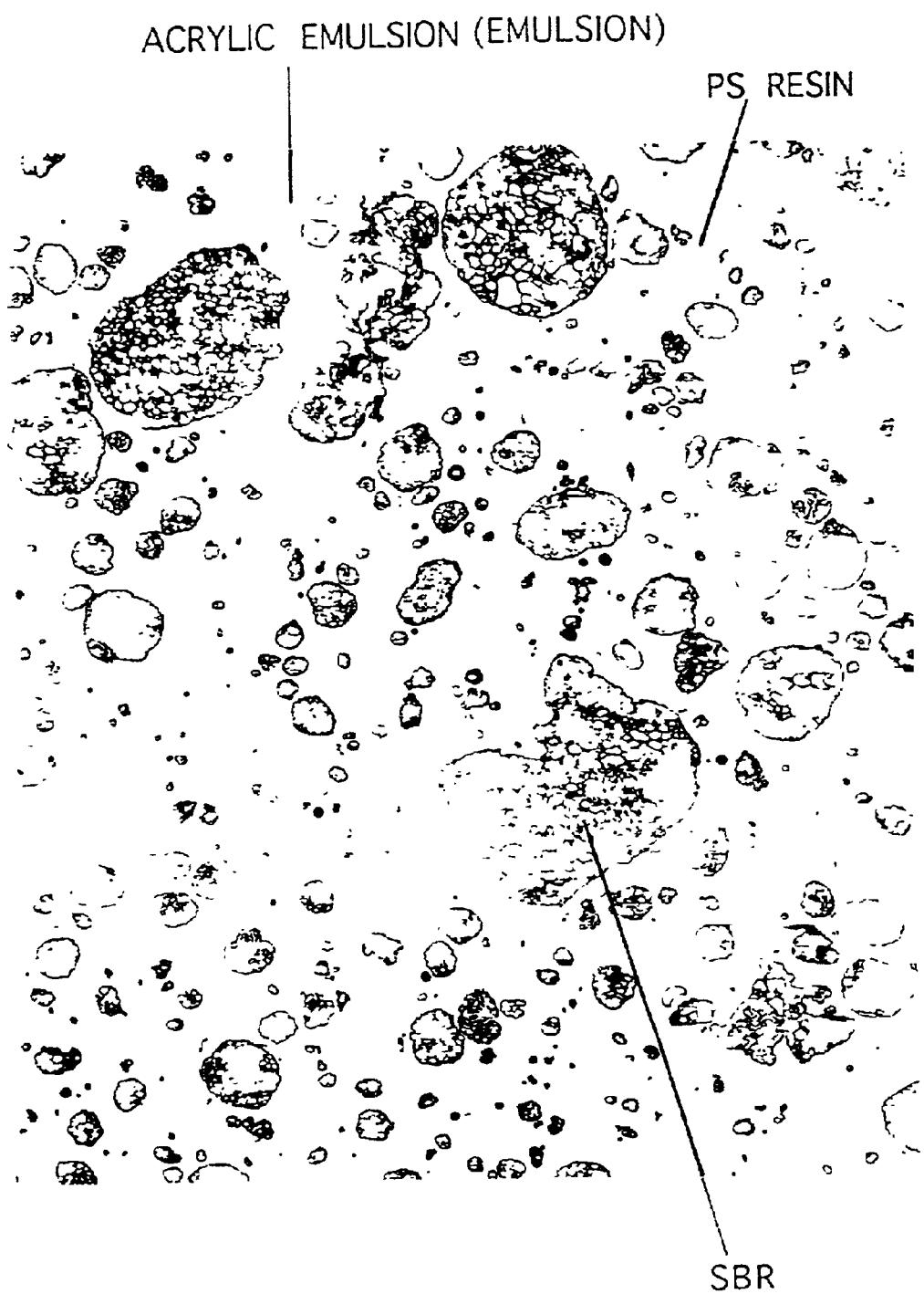

PC RESIN     ACRYLIC EMULSION (EMULSION)

DYEING AGENT : OsO₄ + RuO₄    ×5,000    2μm : ⊢—⊣
(2μm = 1 cm)

DYEING AGENT: OsO₄   ×10,000   1 μm; ⊢―⊣
(1 μm = 1 cm)

THERMOPLASTIC ULETHANE EMULSION (EMULSION)
SBR
PEEL, ABSENCE
PS RESIN

DYEING AGENT : OsO₄  ×10,000  1μm : ⊢―⊣
(1μm=1cm)

×1,000  10μm : ⊢—⊣  (10μm=1cm)

×1.000   10μm: |—| (10μm=1cm)

×1,000   10μm；⊢──⊣ (10μm=1cm)

×1,000   10μm: ⊢──┤ (10μm=1cm)

×5,000  2μm: ⊢─┤ (2μm=1cm)

×5,000  2μm: |—| (2μm=1cm)

PS RESIN
STYRENE MODIFIED ACRYLIC RESIN

DYEING AGENT : RuO₄-OsO₄   ×10,000   1 μm : ⊢—⊣
(1 μm = 1 cm)

DYEING AGENT: $RuO_4 + OsO_4$ ×10,000 1 μm; ⊢⊣

(1 μm = 1 cm)

STYRENE MODIFIED ACRYLIC RESIN — PS RESIN

DYEING AGENT ; $RuO_4 + OsO_4$   ×10,000   1 μm ; |—|

(1 μm = 1 cm)

DYEING AGENT : RuO₄+OsO₄ ×10,000 1 μm : ├───┤
(1 μm = 1 cm)

US 6,958,127 B1

COATED MOLDED ARTICLE, METHOD OF RECYCLING THE SAME AND APPARATUS THEREFOR

TECHNICAL FIELD

This invention relates to coated or painted moldings wherein films, which are coated on molded (shaped) articles mainly composed of thermoplastic resins, are mixed with a thermoplastic resin of the type used as the main component of a molded article to provide a repeatedly moldable thermoplastic resin material, thereby enabling one to recycle it, and also to a method for manufacturing coated or painted moldings, method and apparatus for recycling coated moldings, a paint material for resin moldings, and a method for manufacturing a paint formulation for resin moldings.

TECHNICAL BACKGROUND

Recently, attention has been attracted to recycle technique owing to ecological problems and the like. Many recycling methods using molding processes are known, and most of the moldings obtained by the methods have to be formed, on the surface thereof, with a cover mark, or have to be decorated by some methods. However, all of these methods require a great facility investment and may be, in some cases, difficult in application to products of complicated profiles. Thus, there is no method, which is capable of meeting all requirements in the molding processes.

Re-pelletization is a method of once again reducing to molding materials. Plastic parts collected from the market are classified depending on the types of materials. Thereafter, matters with similar colors are, respectively, collected, followed by washing so as to remove dirt from the surfaces, subjecting to crushers for coarse powdering and to grinding machines for fine powdering, coloring for color re-matching or complementarily, and re-pelletization to obtain a re-pelletized material.

The problem involved in this method is that since the collected moldings are soiled, the washing step is initially required. The washing includes ones using a solvent and water. First, dirt is removed by use of an organic solvent such as an alcohol, and then water is used to completely remove dirt from remaining portions. Pouring water into a device at the stage using a crusher in most cases carries out the water-washing step. A great amount of water is used, involving a great deal of cost (a cost for water). Moreover, the treatment of wastewater entails much cost. If no attention is paid to the wastewater treatment, a new problem of public nuisance (ecological pollution) may be caused.

The collected plastic moldings usually have colors, which are different from one another, and classification is necessary for collecting moldings having the same or similar color. Plastics are faded in color in a long-term use by exposure to light particularly, UV light. Accordingly, if moldings of the same color are collected and merely re-pelletized, their original color is not restored. For the restoration of the original color, color re-matching or complementarily is necessary. This eventually needs a further cost for the color matching.

In the above method, a large-scale investment is necessary for washing machines for satisfactorily removing dirt and devices for color matching or complementarily. If washing or color re-matching or complementarily is insufficient, there arises the problem on foreign matters or mottle or color drift. Thus, the re-pelletization can not solve all the recycling problems in view of the material control and economy.

Among these problems, the problem on washing and the problem of costs involved in the labor for color classification and in the color re-matching or complementarily can be solved by the following surface painting treatment.

The surface painting method is one, which is simple and is highly realistic for recycling. In this method, the plastic parts collected from the market are classified depending on the types of materials, after which they are washed, subjected to crushers for coarse and fine powdering, and re-pelletized to obtain re-pellet materials.

The problem involved in this method is that the collected moldings have colors which are different from one another, and the moldings become dirty and are faded by the action of UV light or the like. If they are crushed and re-pelletized as they are and the resultant re-pelletized material is used for molding, there arise the problems on the mottle•foreign matters.

In order to solve the mottle·foreign matter problems, a cover mark, i.e. a surface paint treatment is necessary. In this connection, however, the paint used for this purpose is made of a material different in type from that of a molding. More particularly, while the materials for moldings are composed of thermoplastic resins, the paints used for the surface painting treatment are mainly made of thermosetting resins such as melamine resins, urethane resins, acrylic resins, epoxy resins and the like. Under these circumstances, it is difficult for recycling to crush and re-pelletize, as they are, moldings, which have been subjected to surface coating without removing the paint film therefrom. This is because the thermoplastic resin, which is a constituent of a molding, and a thermosetting resin used as a constituent of the paint have no affinity for each other.

For this reason, when the paint made of a conventionally employed thermosetting resin is used, the recycling may be feasible by only one time (usually called first cycle or first turn). However, the recycling cannot be performed in a closed loop such as of a second time (a called second cycle or second turn), a third time (called a third cycle or third turn), and the like.

With respect to the treating method of coated moldings, many attempts for reuse of coated thermoplastic resin moldings have been made and proposed in Patent Applications. The methods set out in these applications can be broadly classified into a method of removing a paint film by a physical manner, a method of separation with solvents, a method of hydrolyzing a paint film, and a method wherein a molding is crushed and used as it is.

The method of physically removing a paint film is set forth, for example, in Japanese Laid-open Patent Application No. Hei 2-273207 wherein coated thermoplastic resin moldings are subjected to straight-hydraulic blasting by use of a soft abrasive to separate the paint film therefrom crushed and re-pelletized.

In Japanese Laid-open Patent Application Nos. Hei 6-8245 and 6-8246, there is set out a method wherein coated thermoplastic resin moldings are crushed and melted, followed by separation of the film through a fine mesh screen.

Japanese Laid-open Patent Application No. Hei 6-226742 describes a method wherein a paint film is heated by means of a gas burner to form a thin melt layer beneath the film, and separated by scraping the film off.

Japanese Laid-open Patent Application Nos. Hei 6-328444 to 328446 describes a method of film removal using stretching by rolling.

Japanese Laid-open Patent Application No. Hei 6-328442 sets out a method wherein a paint film is rubbed off by shot blasting, followed by coating again.

As a method of separation with solvents or a method of hydrolyzing a paint film, there are described, for example, in International Laid-open No. WO 93/01232 and Japanese Laid-open Patent Application Nos. Hei 6-55539 and 6-234123, method of hydrolyzing a film with water or a solvent to provide low molecular weight substances, and uniformly dispersing them in a matrix resin.

In Japanese Laid-open Patent Application Nos. Hei 5-228936, 5-337940 and 5-25570, it is stated that after a film is decomposed such as by hot water treatment or alkali contact treatment, moldings are melted, as they are, in a resin along with the film.

As a method of crushing resin moldings attached with a paint film thereon for use, as it is, Japanese Laid-open patent Application No. Hei 6-134757 proposes a method wherein coated resin moldings are crushed and extruded under melt mixing conditions while adding a shear force at a predetermined level or over to cut the film into pieces having a size of 500 $\mu$m or below.

Another method of crushing resin moldings having a paint film thereon is set out in Japanese Laid-open Patent Application No. 7-241848, in which a crushed product of a thermoplastic resin coated with a thermosetting paint is mixed with a thermoplastic matrix resin having a viscosity of 90 poises (g/cm·second) or over at 200° C., and the mixture is mixed and extruded. The paint film is stripped and separated into finer pieces by the shear force exerted in the course of division into the finer pieces, and dispersed in the matrix resin. Although the resultant mixed product can be used, as it is, as a molding material, it may be formulated in a fresh material of a similar type in appropriate amounts.

Japanese Laid-open Patent Application No. 8-34088 pertains to an arrangement including parts of electronic appliances and a sheet member attached thereto, both of which are constituted of thermoplastic resins miscible with each other and in which an adhesive used for the attachment of the sheet member is constituted of a thermoplastic resin miscible with both the parts and the sheet member.

The method set out in the Japanese Laid-open Patent Application No. 2-273207 not only is complicated in steps, but also has to introduce a washing step for abrasives in practice. Thus, the complicated procedure becomes more complicated with poor economy. The abrasive used for the blasting is stuck in the resin molding, with the attendant problem that a difficulty is involved in removing all the particles of the abrasive.

The methods of the Japanese Laid-open Patent Application Nos. Hei 6-8245 and Hei 6-8246 are not only complicated in steps, but also cause the screen to be clogged on several occasions, thus requiring a frequent exchange with fresh ones. Thus, an additional equipment investment is necessary, with poor economy. Moreover, this technique has the problem that the paint film is not actually separated in 100%, and how far the film is separated cannot be readily confirmed by a simple manner. If the film is incorporated in a resin, there arises the problem that physical•chemical characteristics (hereinafter referred to as "material physical properties" of the resin lower.

In the Japanese Laid-open Patent Application No. Hei 6-226742, thermoplastic resins are originated from organic matters and are combustible, with the danger of causing fires in this method. The additional step is necessary, thus being relatively poor in economy.

In the Japanese Laid-open Patent Application Nos. Hei 6-328444 to 328446, the step of removing a paint film is additional, with the need of an additional equipment investment, thus being poor in economy. As for the Japanese Laid-open Patent Application No. Hei 6-328442, where painting is performed again according to the method, very careful attention has to be paid to shot blasting conditions, and otherwise, the underlying layer would become roughened, with the attendant problem that a good painting surface cannot be expected after re-painting.

The Japanese Laid-open Patent Application No. Hei 6-134761 has the problem that the steps of the method are complicated, with poor economy.

The Japanese Laid-open Patent Application No. Hei 6-023748 has the problem on the treatment of waste water and is not good economy. Since the film is separated, decomposed and gasified, there may arise the problem on the treatment of exhaust gases in order to prevent contamination in working environments. If gases obtained by the gasification are inflammable, a measure for fire prevention is necessary.

In the International Laid-open No. WO 93/01232 and the Japanese Laid-open Patent Nos. Hei 6-55539 and 6-234123, the addition of an acid or alkali is necessary. To this end, the waste liquor therefor has to be treated, thus being not economical. The use of an acid or alkali worsens working environments, and such a working environment has to be improved such as by establishing good ventilation. This incurs a new equipment investment.

In the Japanese Laid-open Patent Application Nos. Hei 5-228936, 5-337940 and Hei 5-25570, the incorporation of a thermosetting resin for a paint in a thermoplastic resin of a molding eventually leads to a lowering of physical properties. When molding, coating and pelletizing operations are repeated several times, the amount of a paint film gradually increases along with an increase in ratio of the film, resulting in the lowering of material physical properties.

If, for example, a 15 $\mu$m thick paint film is applied onto a molding having thickness of 3 mm in one painting cycle, the film is incorporated in the thermoplastic resin in an amount of 0.5%. Eventually, the molding obtained after repetition, for example, of five recycles contains 2.5% of the film, calculated as 0.5%×5, i.e. the number of painting cycles or the number of recycles. Where 2.5% of the film is incorporated, it is inevitable that material physical properties lower.

In the Japanese the Japanese Laid-open Patent Application No. Hei 6-134757, it is stated that coated thermoplastic resin moldings are crushed and kneaded under melting conditions while adding not lower than a predetermined shear force thereto, under which physical properties of the material do not lower when the film pieces are incorporated. The incorporation of either a thermosetting resin of the film or a thermoplastic resin having no affinity in the thermoplastic resin for a molding actually leads to the lowering of material physical properties.

During the course of repeating molding, painting and pelletizing cycles several times, the amount and ratio of a film increases, and the material physical properties apparently lower. As illustrate before, if, for example, a 15 $\mu$m thick paint film is applied onto a molding having thickness of 3 mm in one painting cycle, the film is incorporated in the thermoplastic resin in an amount of 0.5%. Eventually, the molding obtained after repetition, for example, of five recycles contains 2.5% of the film, calculated as 0.5%×5, i.e. the number of painting cycles or the number of recycles. Where 2.5% of the film having no affinity for the thermoplastic resin in the molding is incorporated, material physical properties inevitably lower.

Moreover, it is necessary that the film be crushed without separation and mixed under melting conditions while adding thereto a shear force at a predetermined level or over. To this end, a twin-screw extruder having a high shear force is used, and the extrusion has to be performed at revolutions of the screw as high as 450 r.p.m. This is the problem resulting from the fact that the film has no affinity for the thermoplastic resin of moldings.

In the course of division into fine pieces by mixing and extruding the mixture of the crushed product of a thermoplastic resin attached with a thermosetting resin film and a thermoplastic matrix resin having a viscosity of 90 poises (g/cm·second) or over at 200° C. the film is separated, broken and divided into fine pieces by the shear force exerted thereon. The resultant mixed product, in which the fine pieces are dispersed in the matrix resin, is molded. Since the finely divided pieces of the thermosetting film are miscible with the thermoplastic matrix resin, there arises the problem that sufficient strength cannot be obtained.

The sheet member and the adhesive attached on a portion of the parts of the electronic appliance are made of a thermoplastic resin miscible with the material of the parts and the adhesive attached to the sheet member is made of a thermoplastic resin miscible with the parts and the sheet member. Since the sheet member is bonded to the parts via the adhesive, there arises the problems that the attachment of the sheet member on the portion of the parts is limited to not larger than 20% of the total surface area of the parts, and the sheet member cannot be bonded to the entire surface of the parts and recycled.

The present invention contemplates to solve those problems stated hereinabove.

DISCLOSURE OF THE INVENTION

We have paid attention to a first technical concept of the invention that a paint film coated on moldings mainly composed of a thermoplastic resin is made of a thermoplastic resin capable of repeatedly molding after mixing with the thermoplastic resin used as the main component of the moldings. We have also paid attention to a second technical concept of the invention wherein the above-defined film is constituted of a thermoplastic resin showing affinity for the thermoplastic resin used as the main component of the molding.

Further, we have paid attention to a third technical concept of the invention that a molding, which is attached thereon with a film constituted of a thermoplastic resin showing affinity for a thermoplastic resin used as a main component of the molding, is crushed and re-molded, and a paint film constituted of the thermoplastic resin showing the affinity is formed on the re-molding to reproduce coated moldings.

We also have paid attention to a fourth concept of the invention that a thermoplastic resin used as a constituent of moldings to be attached with a paint film thereon, and a thermoplastic resin showing affinity for the first-mentioned thermoplastic resin are dispersed or dissolved with or without use of any solvent, to which addition agents such as pigments, dyes or surface conditioners are added, if necessary, to provide a paint. Based on these technical concepts, we have made further extensive studies and developments, thus arriving at completion of the invention.

The invention has for its object to be able to recycle coated moldings having a paint film thereon.

The invention has for its another object to be able to recycle of coated moldings without lowering of physical properties.

The invention has for its further object to be able to recycle of coated moldings in an easy and inexpensive way without resorting to any specific step.

A coated molding of the present invention (described in claim 1) comprises a molding mainly composed of a thermoplastic resin; and a coating film coated on at least a surface of the molding, in which a resin constituting the coating film and the resin constituting the molding have affinity for each other at least at interfaces therebetween or in a boundary region, and the resin constituting the coating film comprises a thermoplastic resin capable of repeatedly molding by heating and melting after mixing with the thermoplastic resin used as the main constituent of the molding.

It will be noted that the coating film coated on the molding may be a thin film directly attached to the surface of the molding, and includes ones which are formed according to various painting techniques. Alternatively, the film may be of the type wherein after coating a film over the entire surface of a molding, another film is coated or painted on a part of the molding.

The term "affinity" means a property wherein a resin for the coating film and a resin for the molding are readily miscible with each other. In the practice of the invention, it is sufficient that the coating film is repeatedly moldable after mixing with a thermoplastic resin used as a main component of the moldings.

A coated molding of the present invention (described in claim 2) according to the invention described in claim 1, in which the thermoplastic resin constituting the coating film is dispersed in the main constituent of the molding and the thermoplastic resin constituting the coating film has the same nature as or a nature different from the thermoplastic resin used as the main constituent of the molding and both thermoplastic resins mutually exhibit a nature of heat fusion, heat adhesion, heat stickiness, heat bonding, heat attachment, heat adherence, heat affinity, heat wetness or heat melting.

A coated molding of the present invention (described in claim 3) according to the invention described in claim 1, in which the thermoplastic resin constituting the coating film has the same nature as or a nature different from the thermoplastic resin used as the main constituent of the molding and exhibits compatibility or miscibility with the thermoplastic resin used as the main constituent of the molding.

A coated molding of the present invention (described in claim 4) according to the invention described in claim 1, in which the thermoplastic resin constituting the coating film has the same nature as or a nature different from the thermoplastic resin used as the main constituent of the molding, and is dispersed in the thermoplastic resin used as the main constituent of the molding so as to be able to be stabilized as having a sea-island structure.

In the present specification, the term "sea-island structure or other structure" means a phase separation structure, a micelle structure, a morphology structure, a crosslinkage structure, a surface•interfacial structure, a micro phase separation structure, an IPN structure, a crystalline high-order structure, an orientation anisotropic structure, a miscibility structure, a compatibility structure, a polymer mixing structure, a crystalline mixing structure, a non-compatible multi-component structure, a non-miscible multi-component structure, a non-compatible and non-miscible multi-component structure, a molecule aggregate structure, a micro phase transition structure, a macro phase transition structure, a lamella structure, a microdomain structure, a high-order structure, a network structure, a dispersion structure, a radial structure, a nebular structure, an archipelagic structure, an archipelagic multi-layered structure, a grain-like structure, a grain-like multi-layered structure, a core and shell structure, a parallel structure, a needle dispersion structure, a linear structure, a crystal—crystal micro domain structure, an amorphous polymer, chain, helix structure, a surface•interfacial structure, an interfacial structure, a globulite structure, a liquid crystal pattern structure, a composite material structure, a polymeric liquid crystal structure, a block copolymer structure, a pillar structure, an inhomogeneous fine structure, a micro structure, a micro layer structure, a layered dispersion structure, a composite dispersion phase structure, a continuous phase structure, a lace-shaped dispersion phase structure, a droplet structure, a dispersion phase structure, a block polymer structure, a graft polymer structure, a spherical structure, a salami-shaped structure, a capsule-shaped structure, an onion-shaped structure, an inhomogeneous mixture structure, a layered dispersion structure, an alloy layer structure, a continuous spherical structure, a flattened•laminated structure, a random structure, an orientation structure, a polydomain structure, an amorphous structure, and the like. These structures may appear singly or in combination. These structures may be evaluated by an evaluating method such as neutral small-angle scattering, X-ray small-angle scattering, small-angle light scattering, a transmission electron microscope, a scanning electron microscope, a phase contrast microscope, a polarization microscope, ESCA, FT-IR, individual super-resolution NMR, pulsed NMR, mechanical relaxation, dielectric relaxation, DSC, DTA, TOA, a fluorescent method, a spin probe method, positron annihilation, SIMS, a scanning tunnel microscope, microscopic Raman, and the like.

The term "stability" means that when the interface and the boundary region between the film-constituted resin and the molding-constituted resin is allowed to leave at normal temperatures, any changes such as of stripping, peeling-off, removal and separation (hereinafter referred to "separation and the like" do not occur as time passes.

A coated molding of the present invention (described in claim 5) according to the invention described in claim 1, in which the thermoplastic resin constituting the coating film has the same nature as or a nature different from the thermoplastic resin used as the main constituent of the molding and is capable of being mixed at a molecular level with the thermoplastic resin used as the main constituent of the molding.

A coated molding of the present invention (described in claim 6) according to the invention described in claim 3, in which the thermoplastic resin used as the main constituent of the molding and the thermoplastic resin constituting the coating film comprise the same resin, or resins having the same skeleton or same branch, or different resins having similar properties.

A coated molding of the present invention (described in claim 7) according to the invention described in claim 3, in which the thermoplastic resin used as the main constituent of the molding comprises at least one selected from styrene resins, vinyl resins, amino resins, olefin resins, allied resins and similar resins, and the thermoplastic resin used as a main constituent of the coating film comprises at least one selected from acrylic resins, styrene resins, vinyl resins, amino resins, olefin resins, allied resins and similar resins.

A coated molding of the present invention (described in claim 8) according to the invention described in claim 3, in which the thermoplastic resin used as the main constituent of the molding comprises an ABS resin, and the thermoplastic resin used as a main constituent of the coating film comprises an acrylonitrile styrene copolymer resin, a styrene-modified acrylic resin or a thermoplastic acrylic resin.

A coated molding of the present invention (described in claim 9) according to the invention described in claim 3, in which the thermoplastic resin used as the main constituent of the molding comprises a high impact polystyrene resin, and the thermoplastic resin used as a main constituent of the coating film comprises a polystyrene resin or a styrene-modified acrylic resin.

A coated molding of the present invention (described in claim 10) according to the invention described in claim 3, in which the thermoplastic resin used as the main constituent of the molding comprises a modified polyphenylene oxide (ether) resin, and the thermoplastic resin constituting the coating film comprises polystyrene resin or a styrene-modified acrylic resin.

A coated molding of the present invention (described in claim 11) according to the invention described in claim 3, in which the thermoplastic resin used as the main constituent of the molding is made of polypropylene resin or polyethylene resin, and the thermoplastic resin constituting the coating film comprises a chlorinated polypropylene resin or a halogenated polyolefin resin.

A coated molding of the present invention (described in claim 12) according to the invention described in claim 4, in which the thermoplastic resin constituting the coating film is dispersed in the form of islands in the thermoplastic resin used as the main constituent of the molding so as to have the sea-island structure or other structure, and the thermoplastic resin constituting the coating film dispersed in the form of islands has an aspect ratio of from 0.2 to 1.

A coated molding of the present invention (described in claim 13) in which a molding, attached on a surface thereof with a paint composed of a thermoplastic resin capable of repeatedly molding by heating and melting after mixing with a thermoplastic resin used as a constituent of a molding, is molded by heating and melting, the thermoplastic resin as the main constituent of the paint is dispersed in the form of island within the thermoplastic resin as the constituent of the molding, and the paint, mainly composed of a thermoplastic resin capable of repeatedly molding by heating and melting after mixing with the thermoplastic resin as the constituent of the molding, is painted on the molding molded by heating and melting.

A coated molding of the present invention (described in claim 14) according to the invention described in claim 13, in which the aspect ratio of the thermoplastic resin as the main constituent of the paint dispersed in the form of islands is from 0.1 to 1.

A coated molding of the present invention (described in claim 15) comprises a molding mainly composed of a thermoplastic resin; and a coating film attached directly on a surface of the molding, wherein a resin constituting the coating film and the resin constituting the molding have affinity for each other at least at interfaces therebetween or in a boundary region, and the coating film comprises a thermoplastic resin capable of repeatedly molding by heating and melting after mixing with the thermoplastic resin used as a main constituent of the molding, the coating film is directly coated to an entire outer surface of the molding, or the coating film is directly coated to a part of an outer or inner surface of the molding.

A method for manufacturing coated moldings of the present invention (described in claim 16), comprises the steps of; molding molded articles from a thermoplastic resin, and coating a paint on a surface of the molded articles wherein the paint comprises as a main constituent thereof a thermoplastic resin capable of repeatedly molding by heating and melting after mixing with the thermoplastic resin used as a main constituent of the molded articles.

A method for recycling coated moldings of the present invention (described in claim 17), comprises the steps of crushing coated moldings, each including a molding coated with a paint constituted of a thermoplastic resin which is capable of repeatedly molding after mixing with a thermoplastic resin constituting the molding and which has the same nature as or a nature different from the thermoplastic resin constituting the molding; re-molding molded articles from the crushed and coated moldings or pelletized coated moldings; and coating the re-molded articles with a paint constituted of a thermoplastic resin which has the same nature as or a nature different from the thermoplastic resin constituting the molding and is capable of repeatedly molding after mixing with the thermoplastic resin constituting the molding.

A method for recycling coated moldings of the present invention (described in claim 18) according to the invention described in claim 17, comprises the steps of; providing crushed moldings as they are, or mixing and melting the crushed moldings to extrude the melted mixture in the form of pellets; and re-molding a molded articles from the crushed moldings or the pellets.

A method for recycling coated moldings of the present invention (described in claim 19) according to the invention described in claim 18, in which crushed pieces or pellets of plural types of coated moldings are constituted of a thermoplastic resin used as a main constituent of moldings and a thermoplastic resin constituting a paint coated on the moldings, the thermoplastic resin for the paint having affinity for the first-mentioned thermoplastic resin at least at interfaces or in a boundary region established on extrusion and capable of repeatedly molding after mixing with the first-mentioned thermoplastic resin, and are mixed at a given ratio and subjected to re-molding.

A method for recycling coated moldings of the present invention (described in claim 20) according to the invention described in claim 19, in which at least one of the coated moldings is a foamed product, and the at least one and the other of coated moldings are melt mixed in such a state as to exert a given back pressure thereon so that a generated gas is dissolved under pressure in a resin melt.

A method for recycling coated moldings of the present invention (described in claim 21) according to the invention described in claim 20, in which a hermetically sealed mold whose mating faces are sealed is pressurized to a level higher than an atmospheric pressure, and a resin melt is injected into the sealed mold through a switching mechanism.

A method for recycling coated moldings of the present invention (described in claim 22) according to the invention described in claim 18, comprises the steps of crushing, melt mixing and extruding into pellets first coated moldings each including an ABS resin molding coated with a paint based on a varnish comprising a styrene-modified acrylic resin; and crushing, melt mixing and extruding into pellets second coated moldings each including a PC resin molding coated with a paint based on a varnish comprising a styrene-modified-acrylic resin.

A method for recycling coated moldings of the present invention (described in claim 23) according to the invention described in claim 18, in which a compatibilizing agent is added at a given ratio by weight to the mixed pellets, when the pellets of plurality of moldings are mixed at a given ratio and molded.

A method for recycling coated moldings of the present invention (described in claim 24) according to the invention described in claim 22, in which the compatibilizing agent is added to at a ratio by weight of 1 to 15% when the pellets of the first and second coated moldings are mixed at the given ratio and molded.

A method for recycling coated moldings of the present invention (described in claim 25) according to the invention described in claim 19, comprises the steps of; crushing, melt mixing and extruding into pellets first coated moldings each including an ABS resin molding coated with a paint based on a varnish comprising a styrene-modified acrylic resin; and crushing, melt mixing and extruding into pellets second moldings of a PET resin.

A method for recycling coated moldings of the present invention (described in claim 26) according to the invention described in claim 23, in which the pellets of the first and second moldings mixed at the given ratio are heated to a predetermined temperature for a given time, and molding the thus heated mixed pellets.

A method for recycling coated moldings of the present invention (described in claim 27) according to the invention described in claim 26, in which moldings obtained by molding the heated mixed pellets are coated with a paint based on a varnish comprising a styrene-modified acrylic resin.

A method for recycling coated moldings of the present invention (described in claim 28) according to the invention described in claim 19, comprises the steps of crushing first coated moldings each including an ABS resin molding coated with a paint based on a varnish comprising a styrene-modified acrylic resin, melt mixing and extruding into pellets; and crushing second coated moldings made of a PMMA resin, melt mixing and extruding into pellets.

A method for recycling coated moldings of the present invention (described in claim 29) according to the invention described in claim 28, in which both pellets are mixed and molded to obtain moldings, and the moldings are coated with a first paint based on a varnish comprising an acrylonitrile styrene copolymer resin.

A method for recycling coated moldings of the present invention (described in claim 30) according to the invention described in claim 19, comprises the steps of crushing first coated moldings made of a HIPS resin, melt mixing and extruding into pellets; crushing second coated moldings made of a foamed PS resin material, melt mixing and extruding into pellets; and mixing the pellets of the first and second moldings and molding the mixed pellets.

A method for recycling coated moldings of the present invention (described in claim 31) according to the invention described in claim 30, in which the resultant moldings are coated with a second paint based on a polystyrene resin varnish.

A method for recycling coated moldings of the present invention (described in claim 32) according to the invention described in claim 17, in which the pellets obtained by melt mixing the crushed moldings and extruding are mixed with a given amount of a virgin resin or a component of the virgin resin, serving as a recycle aid, for the coated moldings, and the mixture is molded in order to obtain moldings.

A method for recycling coated moldings of the present invention (described in claim 33) according to the invention described in claim 32, in which a given amount of at least one addition agent selected from reinforcing materials, fillers and other kinds of addition agents are added to the recycle aid, and the mixture is molded in order to obtain moldings.

A method for recycling coated moldings of the present invention (described in claim 34) according to the invention described in claim 17, in which a refused toner is added to crushed pieces or pellets of moldings of a thermoplastic resin exhibiting at least affinity for a thermoplastic resin constituting the refused toner at a given ratio.

A paint for resin moldings of the present invention (described in claim 35), in which the paint comprises a thermoplastic resin which has the same nature as or a nature different from a thermoplastic resin of coated resin moldings and is capable of repeatedly molding after mixing with the thermoplastic resin of the coated resin moldings.

A paint for resin moldings of the present invention (described in claim 36) according to the invention described in claim 35, in which the thermoplastic resin used as a main constituent of the paint comprises the same resin, resin having the same skeleton or branch as the thermoplastic resin, or different types of resins having similar properties.

A paint for resin moldings of the present invention (described in claim 37) according to the invention described in claim 35, in which the thermoplastic resin used as a main constituent of the paint comprises a resin selected from acrylonitrile•styrene copolymer resin, polystyrene resin, styrene-modified acrylic resins, thermoplastic acrylic resins and halogenated polyolefins.

A paint for resin moldings of the present invention (described in claim 38) according to the invention described in claim 35, in which the thermoplastic resin constituting the paint comprises a single kind of thermoplastic resin.

A paint for resin moldings of the present invention (described in claim 39) according to the invention described in claim 35, in which the thermoplastic resin constituting the paint is made of at least two kinds of thermoplastic resins.

A paint for resin moldings of the present invention (described in claim 40) according to the invention described in claim 36, in which the thermoplastic resin constituting the paint comprises a styrene-modified acrylic resin having a weight average molecular weight ranging from 10,000 to 60,000.

A paint for resin moldings of the present invention (described in claim 41) according to the invention described in claim 40, in which the paint comprises a solvent which has a boiling point determined in response to a molecular weight of the thermoplastic resin mainly constituting the paint.

A paint for resin moldings of the present invention (described in claim 42) according to the invention described in claim 35, comprises a thermoplastic resin, which has the same nature as or a different nature from a thermoplastic resin used as a constituent of coated resin moldings and is capable of repeatedly molding after mixing with the second-mentioned thermoplastic resin, a solvent, and a given amount of a refused toner serving as a pigment.

A method for preparing a paint for resin moldings of the present invention (described in claim 43), comprises providing a thermoplastic resin which is used as a main constituent of a paint for resin moldings and which has the same nature as or different nature from a thermoplastic resin for resin moldings to be coated and is capable of repeatedly molding after mixing with the thermoplastic resin, and preparing a paint with or without addition of any solvent or water and, if necessary, with addition of a pigment or a dye, or a surface conditioner or other addition agents by dispersing or melting.

A method for preparing a paint for resin moldings of the present invention (described in claim 44) according to the invention described in claim 43, comprises adding a solvent having a boiling point which is determined in response to a molecular weight of the thermoplastic resin used as the main constituent of the paint.

A method for preparing a paint for resin moldings of the present invention (described in claim 45) according to the invention described in claim 44, comprises adding a mixed solvent as the solvent to the thermoplastic resin.

In the practice of the invention, varnish is prepared by use of a mixed solvent of toluene, butyl acetate and the like. More particularly, such a solvent is added to a thermoplastic resin of the resin molding attached with the paint film, and the thermoplastic resin used as the main component of the paint for the resin molding and having affinity for the resin of the molding to dissolve them therein to obtain varnish. Addition agents such as pigments, dyes and the like are further added to the vanish to obtain a paint.

In the method for preparing the paint for the resin moldings, any dispersing machines ordinarily used in the field of the painting industry can be employed without special limitation. With respect to solvent-type paints or aqueous paints, they are prepared by use, for example, of roll mill dispersion machines, ball mill dispersion machines, sand grind mill dispersion machines, planetary mixers, high-speed dispersion machines and the like. With respect to powdery paints, mixers, melt kneaders and crushers are used to provide a powder paint having an average size of 30 $\mu$m to 150 $\mu$m.

An apparatus for recycling coated moldings of the present invention (described in claim 49) comprises a crusher for crushing coated moldings which are coated with a paint constituted of a thermoplastic resin having the same nature as or different nature from a thermoplastic resin used to constitute the moldings and capable of repeatedly molding after mixing with the second-mentioned thermoplastic resin; a molding device for molding crushed or pelletized coated moldings into fresh moldings; and coating device for coating a paint constituted of a thermoplastic resin having the same nature as or different nature from the thermoplastic resin used to constitute the moldings and capable of repeatedly molding after mixing with the thermoplastic resin of the moldings, on surfaces of the molded moldings.

An apparatus for recycling coated moldings of the present invention (described in claim 50) according to the invention described in claim 49, further comprises a pellet extrusion device wherein the crushed moldings are melt mixed and pelletized to provide pellets which are then charged into the molding device.

An apparatus for recycling coated moldings of the present invention (described in claim 51) according to the invention described in claim 50, in which the pellet extruding device is a single-screw extruder wherein the crushed moldings are melt mixed and extruded at a low speed at small revolutions of the screw.

A method for evaluating recyclability of reproduced coated moldings of the present invention (described in claim 52) comprises providing molding of test piece obtained by crushing and molding coated moldings which include moldings and a film formed on surfaces of the moldings by coating a paint constituted mainly of a thermoplastic resin having the same nature as or different nature from a thermoplastic resin used as a main constituent of the moldings and capable of repeatedly molding after mixing with the thermoplastic resin for the last-mentioned moldings; coating the the molded test piece with a paint, which is constituted mainly of a thermoplastic resin having the same nature as or different nature from a thermoplastic resin used as a main constituent of the molded test piece and capable of repeatedly molding after mixing with the thermoplastic resin for the molded test piece to provide the reproduced and coated test piece; and subjecting the coated test piece or a cross hatch test to evaluate recyclability of the reproduced coated test piece based on the results of the test.

A method for evaluating recyclability of reproduced coated moldings of the present invention (described in claim 53) comprises providing a mixed resin of a thermoplastic resin constituting moldings and a thermoplastic resin constituting a paint at a given ratio, molding the mixed resin into a test piece of molding, and subjecting the molded test piece to a cross hatch test to evaluate recyclability of reproduced coated moldings based on the results of the test.

A method for evaluating recyclability of reproduced coated moldings of the present invention (described in claim 54) according to the invention described in claim 53 in which a state of dispersion of the thermoplastic resin used as a main constituent of the paint in a thermoplastic resin matrix used as a main constituent of the test piece which is a reproduced coated molding is evaluated by observation through a microphotograph.

A method for evaluating recyclability of reproduced coated moldings of the present invention (described in claim 55) according to the invention described in claim 54 in which recycling of reproduced coated moldings is repeated, and a test for film properties is conducted in every repetition to evaluate recyclability of reproduced coated moldings in every repetition from the transition in the results of the test.

A method for evaluating recyclability of reproduced coated moldings of the present invention (described in claim 56) according to the invention described in claim 55 in which recycling of reproduced coated moldings is repeated, and mechanical strength, thermal properties and other physical properties are measured in every repetition to evaluate recyclability of reproduced coated moldings in every repetition from the transition in the results of the measured physical properties.

In the coated molding according to the present invention having the above construction (described in claim 1), the resin constituting the coating film and the resin constituting the molding have affinity for each other at least at the interfaces therebetween or in the boundary region, and the resin constituting the coating film comprises the thermoplastic resin capable of repeatedly molding by heating and melting after mixing with the thermoplastic resin used as the main constituent of the molding. Accordingly the invention has such an effect or feature that when re-molding is performed in a state where the coating film is attached to the coated molding, the thermoplastic resin used as the main component of the molding and the thermoplastic resin for the coating film are mixed with each other, so as to enable one to recycle in such the state that the coating film is attached to the coated molding.

In the coated molding according to the present invention having the above construction (described in claim 2), the thermoplastic resin constituting the coating film is dispersed in the main constituent of the molding and the thermoplastic resin constituting the coating film has the same nature as or the nature different from the thermoplastic resin used as the main constituent of the molding and both thermoplastic resins mutually exhibit the nature of heat fusion, heat adhesion, heat stickiness, heat bonding, heat attachment, heat adherence, heat affinity, heat wetness or heat melting. Accordingly the present invention also has such an effect that when re-molding is performed in a state where the coating film is attached to the coated molding, the thermoplastic resin used as the main component of the molding and the thermoplastic resin for the coating film are thermally bonded together, so that the thermoplastic resins for the coating film and the molding are not separated from each other without use of any adhesive, with the possibility that a coated molding having given strength is recycled.

In the coated molding according to the present invention having the above construction (described in claim 3), the thermoplastic resin constituting the coating film has the same nature as or the nature different from the thermoplastic resin used as the main constituent of the molding and exhibits compatibility or miscibility with the thermoplastic resin used as the main constituent of the molding. Accordingly the present invention has such an effect that when re-molding is performed in the state where the coating film is attached to the coated moldings, the thermoplastic resin used as the main component of the moldings and the thermoplastic resin for the coating film have mutual affinity, so that either the sea-island structure or others are formed, or both resins are miscibly or compatibly mixed at the molecular level, so as to enable one to recycle without involving any change in physical and chemical properties.

In the coated molding according to the present invention having the above construction (described in claim 4), the thermoplastic resin constituting the coating film has the same nature as or the nature different from the thermoplastic resin used as the main constituent of the molding, and is dispersed in the thermoplastic resin used as the main constituent of the molding so as to be able to be stabilized as having a sea-island structure. Accordingly the present invention has such an effect that when re-molding is performed in a state where the coating film is attached to coated moldings, the thermoplastic resin for the paint film is dispersed in the thermoplastic resin used as the main component of the moldings wherein the sea-island structure or others are stably formed, so as to enable one to recycle without lowering of physical and chemical properties.

The present invention has such an effect that where the thermoplastic resins for both the film and moldings have affinity therebetween to provide the sea-island structure or others and are provided with good compatibility (miscibility) to ensure thermal bonding properties, the thermal plastic resins of the coating film and the molding are not separated from each other at the interfaces in the sea-island structure or others as a result of the thermal bonding therebetween, so as to enable one to recycle coated moldings having certain strength.

In the coated molding according to the present invention having the above construction (described in claim 5), the thermoplastic resin constituting the coating film has the same nature as or the nature different from the thermoplastic resin used as the main constituent of the molding and is capable of being mixed at the molecular level with the thermoplastic resin used as the main constituent of the molding. Accordingly the present invention has such an effect that when re-molding is performed in the state where the coating film is attached to coated moldings, the thermoplastic resin used as the main component of the moldings and the thermoplastic resin for the coating film are mixed at the molecular level, so as to enable one to recycle without involving any change in physical and chemical properties.

In the coated molding according to the present invention having the above construction (described in claim 6), the thermoplastic resin used as the main constituent of the molding and the thermoplastic resin constituting the coating film comprise the same resin, or resins having the same skeleton or same branch, or different resins having similar properties. Accordingly the present invention has such an effect that since the thermoplastic resin used as the main component of the moldings and the thermoplastic resin used as the main component of the coating film are mixed at a molecular level, so as to enable one to recycle without involving any change in physical and chemical properties.

In the coated molding according to the present invention having the above construction (described in claim 7), the thermoplastic resin used as the main constituent of the molding comprises at least one selected from styrene resins, vinyl resins, amino resins, olefin resins, allied resins and similar resins, and the thermoplastic resin used as a main constituent of the coating film comprises at least one selected from acrylic resins, styrene resins, vinyl resins, amino resins, olefin resins, allied resins and similar resins. Accordingly the present invention has such an effect that when re-molding is performed in the state where the coating film is attached to coated moldings, the thermoplastic resin used as the main component of the moldings and the thermoplastic resin used as the main component of the coating film are mixed at the molecular level, so as to enable one to recycle in the state where the coating film is attached to the coated molding.

In the coated molding according to the present invention having the above construction (described in claim 8), the thermoplastic resin used as the main constituent of the molding comprises an ABS resin, and the thermoplastic resin used as a main constituent of the coating film comprises an acrylonitrile styrene copolymer resin, a styrene-modified acrylic resin or a thermoplastic acrylic resin. Accordingly the present invention has such an effect that when re-molding is performed in a state where the coating film is attached to coated moldings, the acrylonitrile•styrene copolymer resin or the styrene-modified acrylic resin for the film and the ABS resin used as the main component of the moldings are mixed the molecular level, or have mutual affinity and form the sea-island structure or others, so as to enable one to recycle the coated moldings.

In the coated molding according to the present invention having the above construction (described in claim 9), the thermoplastic resin used as the main constituent of the molding comprises the high impact polystyrene resin, and the thermoplastic resin used as the main constituent of the coating film comprises the polystyrene resin or the styrene-modified acrylic resin. Accordingly the present invention has such an effect that when re-molding is performed in a state where the coating film is attached to coated moldings, the polystyrene resin or the styrene-modified acrylic resin used in the coating film and the high-impact polystyrene resin used as the main component of the moldings are mixed at a molecular level, or have mutual affinity sufficient to form the sea-island structure or others, so as to enable one to recycle the coated moldings.

In the coated molding according to the present invention having the above construction (described in claim 10), the thermoplastic resin used as the main constituent of the molding comprises the modified polyphenylene oxide (ether) resin, and the thermoplastic resin constituting the coating film comprises polystyrene resin or the styrene-modified acrylic resin. Accordingly the present invention has such an effect that when re-molding is performed in the state where the coating film is attached to coated moldings, the polystyrene resin or the styrene-modified acrylic resin used in the coating film and the modified polyphenylene oxide (ether) resin used as the main component of moldings are mixed, or have mutual affinity sufficient to form the sea-island structure or others, so as to enable one the recycling.

In the coated molding according to the present invention having the above construction (described in claim 11), the thermoplastic resin used as the main constituent of the molding is made of polypropylene resin or polyethylene resin, and the thermoplastic resin constituting the coating film comprises the chlorinated polypropylene resin or the chlorinated polyolefin resin. Accordingly the present invention has such an effect that when re-molding is performed in the state where the coating film is attached to coated moldings, the chlorinated polypropylene resin or the chlorinated polyolefin resin used in the coating film and the modified polypropylene resin or polyethylene resin used as the main component of the moldings are mixed at the molecular level, or have mutual affinity, so as to enable one the recycling.

In the coated molding according to the present invention having the above construction (described in claim 12), the thermoplastic resin constituting the coating film is dispersed in the form of islands in the thermoplastic resin used as the main constituent of the molding so as to have the sea-island structure or other structure, and the thermoplastic resin constituting the coating film dispersed in the form of islands has the aspect ratio of from 0.2 to 1. Accordingly the present invention has such an effect that one is enabled to recycle coated moldings having no directional properties and uniform mechanical strength.

In the coated molding according to the present invention having the above construction (described in claim 13), comprising a molding, coated on a surface thereof with a paint composed of a thermoplastic resin capable of repeatedly molding by heating and melting after mixing with a thermoplastic resin used as a constituent of a molding, is molded by heating and melting, the thermoplastic resin as the main constituent of the paint is dispersed in the form of island within the thermoplastic resin as the constituent of the molding, and the paint, mainly composed of a thermoplastic resin capable of repeatedly molding by heating and melting after mixing with the thermoplastic resin as the constituent of the molding, is painted on the molding molded by heating and melting. Accordingly the invention has such an effect or feature that when re-molding is performed in a state where the coating film is attached to the coated molding, the thermoplastic resin used as the main component of the molding and the thermoplastic resin for the coating film are mixed with each other, so as to enable one to recycle in such the state that the coating film is attached to the coated molding.

In the coated molding according to the present invention having the above construction (described in claim 14), the coating constituent of the paint dispersed in the form of islands is from 0.1 to 1. Accordingly the present invention has such an effect that one is enabled to recycle coated moldings having comparative no directional properties and uniform mechanical strength.

In the coated molding according to the present invention having the above construction (described in claim 15), the coating film is directly attached to the entire outer surface of the molding, or the coating film is directly coated to the part of the outer or inner surface of the molding. Accordingly the present invention has such an effect that when re-molding is performed in the state where the coating film is attached on the outer surface of coated moldings, the thermoplastic resin of the coating film attached on the outer surface of the moldings and the thermoplastic resin used as the constituent of the molding have mutual affinity and mixed in whole with each other to unite into one, so as to enable one to recycle the moldings without changing physical and chemical properties.

In the coated molding according to the present invention having the above construction (described in claim 16), the paint is coated on the surface of the molded articles wherein the paint comprises as the main constituent thereof the thermoplastic resin capable of repeatedly molding by heating and melting after mixing with the thermoplastic resin used as the main constituent of the molded articles. Accordingly the present invention has such an effect that when re-molding is performed in the state where the paint film is attached to the coated moldings, the thermoplastic resin of the paint film and the thermoplastic resin used as the main constituent of the moldings have mutual affinity to form a sea-island structure or others, or are miscibly mixed at a molecular level, so as to enable one to recycle the moldings without changing physical and chemical properties.

The method for recycling coated moldings according to the present invention having the above construction (described in claim 17), comprises the steps of: re-molding the crushed and coated moldings or pelletized coated moldings; each including the molding coated with the paint constituted of the thermoplastic resin which is capable of repeatedly molding by heating and melting after mixing with the thermoplastic resin constituting the molding and which has the same nature as or a nature different from the thermoplastic resin constituting the molding; and coating the surface of the re-molded moldings with the paint constituted of a thermoplastic resin which is capable of repeatedly molding by heating and melting after mixing therewith. Accordingly the present invention has such an effect that when re-molding is performed in a state where the paint film is attached to coated moldings, the thermoplastic resin of the paint film and the thermoplastic resin used as the main constituent of the moldings have mutual affinity to form a sea-island structure or others, or are miscibly mixed at a molecular level, so that any specific steps of fine crushing and extrusion at high shear force as in prior art are unnecessary, making the recycling possible in easy and inexpensive way.

In the method for recycling coated moldings according to the present invention having the above construction (described in claim 20), at least one of the coated moldings is a foamed product, and the at least one and the other of coated moldings are melt mixed in such the state as to exert the given back pressure thereon so that the generated gas is dissolved under pressure in the resin melt. Accordingly the present invention has such an effect that it enables one to recycle a foamed material.

In the method for recycling coated moldings according to the present invention having the above construction (described in claim 21), the hermetically sealed mold whose mating faces are sealed is pressurized to a level higher than an atmospheric pressure, and the resin melt is injected into the sealed mold through a switching mechanism. Accordingly the invention has such an effect that the blowing gas generated is dissolved under pressure in the inside of the resin melt, and the resulting molding has the smooth surface, thus leading to the improved attachment of the paint film, so as to enable one to recycle a foamed material.

In the method for recycling coated moldings according to the present invention having the above construction (described in claim 22), crushing, melt mixing and extruding into pellets first coated moldings each including an ABS resin molding coated with a paint based on a varnish comprising a styrene-modified acrylic resin; and crushing, melt mixing and extruding into pellets second coated moldings each including a PC resin molding coated with a paint based on a varnish comprising a styrene-modified acrylic resin. Accordingly the present invention has such an effect that coated moldings of ABS resins and PC resins can be recycled in mixed form.

In the method for recycling coated moldings according to the present invention having the above construction (described in claim 23), when the pellets of plurality of moldings are mixed at the given ratio and molded, the compatibilizing agent is added at the given ratio by weight to the mixed pellets. Accordingly the present invention has such an effect that the thermoplastic resins used as constituents of the plurality of coated moldings, which have mutual affinity and are repeatedly moldable after mixing at given ratios, are mutually mixed owing to their affinity along with the compatibilizing or miscibilizing agent added thereto at the given ratio by weight to unite into one, so as to enable one to provide moldings made of the recycled mixture of the plurality of coated moldings at the given mixing ratios.

In the method for recycling coated moldings according to the present invention having the above construction (described in claim 24), when the pellets of the first and second coated moldings are mixed at the given ratio and molded, the compatibilizing agent is added to at the ratio by weight of 1 to 15%. Accordingly the present invention has such an effect that the thermoplastic resins used as constituents of first and second coated moldings, which have mutual affinity and are repeatedly moldable after mixing at a given ratio, are mutually mixed owing to their affinity along with a compatibilizing or miscibilizing agent added thereto at the given ratio by weight to unite into one, so as to enable one to provide moldings made of a recycled mixture of the two types of coated moldings at the given mixing ratio.

The method for recycling coated moldings according to the present invention having the above construction (described in claim 25), comprises the steps of; crushing, melt mixing and extruding into pellets first coated moldings each including an ABS resin molding coated with a paint based on a varnish comprising a styrene-modified acrylic resin; and crushing, melt mixing and extruding into pellets second moldings of a PET resin. Accordingly the present invention has such an effect that not only recycling of the mixture of moldings made of ABS and PET resins is realized, but also a road is opened up to the re-utilization of the PET resin, which is one of social problems.

In the method for recycling coated moldings according to the present invention having the above construction (described in claim 26), the pellets of the first and second moldings mixed at the given ratio are heated to a predetermined temperature for a given time, and molding the thus heated mixed pellets. Accordingly the present invention has such an effect that the thermoplastic resins used as constituents of the plurality of coated moldings, which have mutual affinity and are repeatedly moldable after mixing and heating at the given ratio, are mutually mixed owing to their affinities along with the compatibilizing (or miscibilizing) agent added thereto at the given ratio by weight to unite into one, so as to enable one to provide moldings made of a recycled mixture of plural types of the coated moldings.

The method for recycling coated moldings according to the present invention having the above construction (described in claim 28), comprises the steps of crushing first coated moldings each including an ABS resin molding coated with the paint based on the varnish comprising the styrene-modified acrylic resin, melt mixing and extruding into pellets; and crushing second coated moldings made of a PMMA resin, melt mixing and extruding into pellets. Accordingly the present invention has such an effect that not only recycling of the mixture of moldings made of ABS and PMMA resins is realized, but also the road is opened up to the re-utilization of the PMMA resin.

The method for recycling coated moldings according to the present invention having the above construction (described in claim 30), comprises the steps of crushing first coated moldings made of the HIPS resin, melt mixing and extruding into pellets; crushing second coated moldings made of the foamed PS resin material, melt mixing and extruding into pellets; and mixing the pellets of the first and second moldings and molding the mixed pellets. Accordingly the present invention has such an effect that not only recycling of the mixture of moldings of foams made of HIPS and PS resins is realized, but also the road is opened up to the re-utilization of the foamed PET resin.

In the method for recycling coated moldings according to the present invention having the above construction (described in claim 32), the pellets obtained by melt mixing the crushed moldings and extruding are mixed with the given amount of the virgin resin or the component of the virgin resin, serving as the recycle aid, for the coated moldings, and the mixture is molded in order to obtain moldings. Accordingly the present invention has such an effect that recycling is realized while suppressing changes in physical and chemical properties.

In the method for recycling coated moldings according to the present invention having the above construction (described in claim 33), the given amount of at least one addition agent selected from reinforcing materials, fillers and other kinds of addition agents are added to the recycle aid, and the mixture is molded in order to obtain moldings. Accordingly the present invention has such an effect that since there is the case where the thermoplastic resin used as the constituent of the paint film has affinity for the thermoplastic resin used as the main component of a molding, a supplemented virgin resin and addition agents to form a sea-island structure or others, or to provide the mixture wherein they are compatible (miscible) with one another at the molecular level, recycling is realized wherein physical and chemical properties are restrained from lowering.

In the method for recycling coated moldings according to the present invention having the above construction (described in claim 34), the refused toner is added to crushed pieces or pellets of moldings of the thermoplastic resin exhibiting at least affinity for the thermoplastic resin constituting the refused toner at the given ratio. Accordingly the present invention has an effect of breaking a road to the re-utilization of the refused toners.

In the paint for coated moldings according to the present invention having the above construction (described in claim 35), the paint comprises the thermoplastic resin which has the same nature as or the nature different from the thermoplastic resin of coated resin moldings and is capable of repeatedly molding after mixing with the thermoplastic resin of the coated resin moldings. Accordingly the present invention has such an effect that when re-molding is performed in the state of the film being attached to coated moldings which have been coated with the paint thereon, the thermoplastic resin used as the constituent of the film has affinity for and is mixed with the thermoplastic resin used as the main component of the moldings to unite into one, under which the mixture can be molded and recycled without removal of the film from the coated moldings.

In the paint for coated moldings according to the present invention having the above construction (described in claim 36), the thermoplastic resin used as a main constituent of the paint comprises the same resin, resin having the same skeleton or branch as the thermoplastic resin, or different types of resins having similar properties. Accordingly the present invention has such an effect that since the thermoplastic resin used as the main constituent of moldings and the thermoplastic resin used as the main constituent of the paint film can be mixed at a molecular level, it is possible to recycle without change of physical and chemical properties.

In the paint for resin moldings according to the present invention having the above construction (described in claim 37) the thermoplastic resin used as the main constituent of the paint comprises the resin selected from acrylonitrile styrene copolymer resin, polystyrene resin, styrene-modified acrylic resins, thermoplastic acrylic resins and halogenated polyolefins. Accordingly the present invention has such an effect that when re-molding is performed in the state where the paint film is attached to coated moldings wherein the paint for the resin moldings has been applied thereon, the resin used as the constituent of the paint film has affinity for the thermoplastic resin used as the main constituent of the moldings to form the sea-island structure or others, or are compatible (miscible) with each other and mixed at a molecular level, under which recycling is possible when the mixture is molded without removal of the paint film from the coated moldings.

In the paint for resin moldings according to the present invention having the above construction (described in claim 40) the thermoplastic resin constituting the paint comprises a styrene-modified acrylic resin having the weight average molecular weight ranging from 10,000 to 60,000. Accordingly the present invention has an effect of improving painting and recycling properties.

In the paint for resin moldings according to the present invention having the above construction (described in claim 41) the paint comprises the solvent which has the boiling point determined in response to the molecular weight of the thermoplastic resin mainly constituting the paint. Accordingly the present invention has an effect of improving painting properties.

The paint for resin moldings according to the present invention having the above construction (described in claim 42) comprises a thermoplastic resin, which has the same nature as or a different nature from the thermoplastic resin used as the constituent of coated resin moldings and is capable of repeatedly molding after mixing with the second-mentioned thermoplastic resin, the solvent, and the given amount of the refused toner serving as the pigment. It has an effect that refused toners can be efficiently used, thus leading to saving on pigments.

In the method for preparing the paint for resin moldings according to the present invention having the above construction (described in claim 43) by providing the thermoplastic resin which is used as the main constituent of the paint for resin moldings and which has the same nature as or different nature from the thermoplastic resin for resin moldings to be coated and is capable of repeatedly molding after mixing with the thermoplastic resin, and preparing the paint with or without addition of any solvent or water and, if necessary, with addition of the pigment or the dye, or the surface conditioner or other addition agents by dispersing or melting. Accordingly the present invention has such an effect that the paint, which can be recycled without resorting to any specific step, can be prepared.

The method for preparing the paint for resin moldings according to the present invention having the above construction (described in claim 45) adds a mixed solvent as the solvent to the thermoplastic resin. Accordingly the present invention has such an effect that a solvent whose boiling point is determined depending on the molecular weight of a thermoplastic resin used as a main constituent of a paint for resin moldings is added to, so as to enable one to prepare a paint having good painting properties.

The apparatus for recycling coated moldings according to the present invention having the above construction (described in claim 49) comprises: a crusher for crushing coated moldings which are coated with a paint constituted of a thermoplastic resin having the same nature as or different nature from a thermoplastic resin used to constitute the moldings and capable of repeatedly molding after mixing with the second-mentioned thermoplastic resin; a molding device for molding crushed or pelletized coated moldings into fresh moldings; and coating device for coating a paint constituted of a thermoplastic resin having the same nature as or different nature from the thermoplastic resin used to constitute the moldings and capable of repeatedly molding after mixing with the thermoplastic resin of the moldings, on surfaces of the molded moldings. Accordingly the present invention has such an effect that the stripping device as used in prior art is unnecessary, and the simple device is used for recycling without stripping the film from coated moldings while not lowering physical and chemical properties.

The apparatus for recycling coated moldings according to the present invention having the above construction (described in claim 50) further comprises the pellet extrusion device wherein the crushed moldings are melt mixed and pelletized to provide pellets which are then charged into the molding device. Accordingly the present invention has such an effect that the molding apparatus is able to provide moldings from extruded pellets or crushed pieces, and thus, molding is feasible without use of any specific device or step to ensure inexpensive, easy recyclability whereby recyclable resins can be manufactured.

In the apparatus for recycling coated moldings according to the present invention having the above construction (described in claim 51) the pellet extruding device is the single-screw extruder wherein the crushed moldings are melt mixed and extruded at the low speed at small revolutions of the screw. Accordingly the present invention has such an effect that pellets charged in the mold of the molding apparatus are extruded and molded into molded articles by means of the molding apparatus, and thus, the multi-screw extruder having the complicated structure as in prior art apparatus is not necessary and that since it is not necessary to exert the high shear force, coated moldings can be recycled in the simple and inexpensive manner.

The method for evaluating recyclability of reproduced coated moldings according to the present invention having the above construction (described in claim 52) comprises providing molding of test piece obtained by crushing and molding coated moldings which include moldings and the film formed on surfaces of the moldings by coating the paint constituted mainly of the thermoplastic resin having the same nature as or different nature from the thermoplastic resin used as the main constituent of the moldings and capable of repeatedly molding after mixing with the thermoplastic resin for the last-mentioned moldings; coating the the molded test piece with the paint, which is constituted mainly of the thermoplastic resin having the same nature as or different nature from the thermoplastic resin used as the main constituent of the molded test piece and capable of repeatedly molding after mixing with the thermoplastic resin for the molded test piece to provide the reproduced and coated test piece; and subjecting the coated test piece or a cross hatch test to evaluate recyclability of the reproduced coated test piece based on the results of the test. Accordingly the present invention has such an effect that it is possible to accurately evaluate the recyclability by a simple test.

The method for evaluating recyclability of reproduced coated moldings according to the present invention having the above construction (described in claim 53) comprises providing the mixed resin of the thermoplastic resin constituting moldings and the thermoplastic resin constituting the paint at the given ratio, molding the mixed resin into the test piece of molding, and subjecting the molded test piece to the cross hatch test to evaluate recyclability of reproduced coated moldings based on the results of the test. Accordingly the present invention has such an effect that the dispersion state of the thermoplastic resin used as the constituent in the paint relative to the thermoplastic resin used as the constituent of the molding can be evaluated, so that it is possible to accurately evaluate the recyclability by the simple test.

In the method for evaluating recyclability of reproduced coated moldings according to the present invention having the above construction (described in claim 54) that a state of dispersion of the thermoplastic resin used as the main constituent of the paint in the thermoplastic resin matrix used as the main constituent of the test piece which is the reproduced coated molding is evaluated by observation through the microphotograph. Accordingly the present invention has such an effect that the dispersion state of the thermoplastic resin used as the constituent of the paint in the thermoplastic resin used as the constituent of the molding can be evaluated via visual observation, so that it is possible to accurately evaluate the recyclability.

In the method for evaluating recyclability of reproduced coated moldings according to the present invention having the above construction (described in claim 55) recycling of reproduced coated moldings is repeated, and the test for film properties is conducted in every repetition to evaluate recyclability of reproduced coated moldings in every repetition from the transition in the results of the test. Accordingly the present invention has such an effect that the recyclability of reproduced coated moldings can be accurately evaluated in view of the tendency of the film performance after the recycling.

In the method for evaluating recyclability of reproduced coated moldings according to the present invention having the above construction (described in claim 56) that recycling of reproduced coated moldings is repeated, and mechanical strength, thermal properties and other physical properties are measured in every repetition to evaluate recyclability of reproduced coated moldings in every repetition from the transition in the results of the measured physical properties. Accordingly the present invention has such an effect that the recyclability of reproduced coated moldings can be quantitatively, accurately evaluated in view of the tendency of mechanical strength, thermal properties and other physical properties of reproduced coated moldings after the recycling.

BRIEF DESCRIPTION OF THE DRAWINGS

FIGS. 2A to 2C are, respectively, sectional views showing gas injection into a nozzle, a runner and a cavity in the gas-assisted molding according to the embodiment of the invention;

FIGS. 17 to 42 are, respectively, copies of TEP photographs taken by an electron microscope showing the state of affinity between various types of moldings and resin constituents in paints in Example 59 of the invention;

BEST MODE FOR CARRYING OUT THE INVENTION

Figure 1:
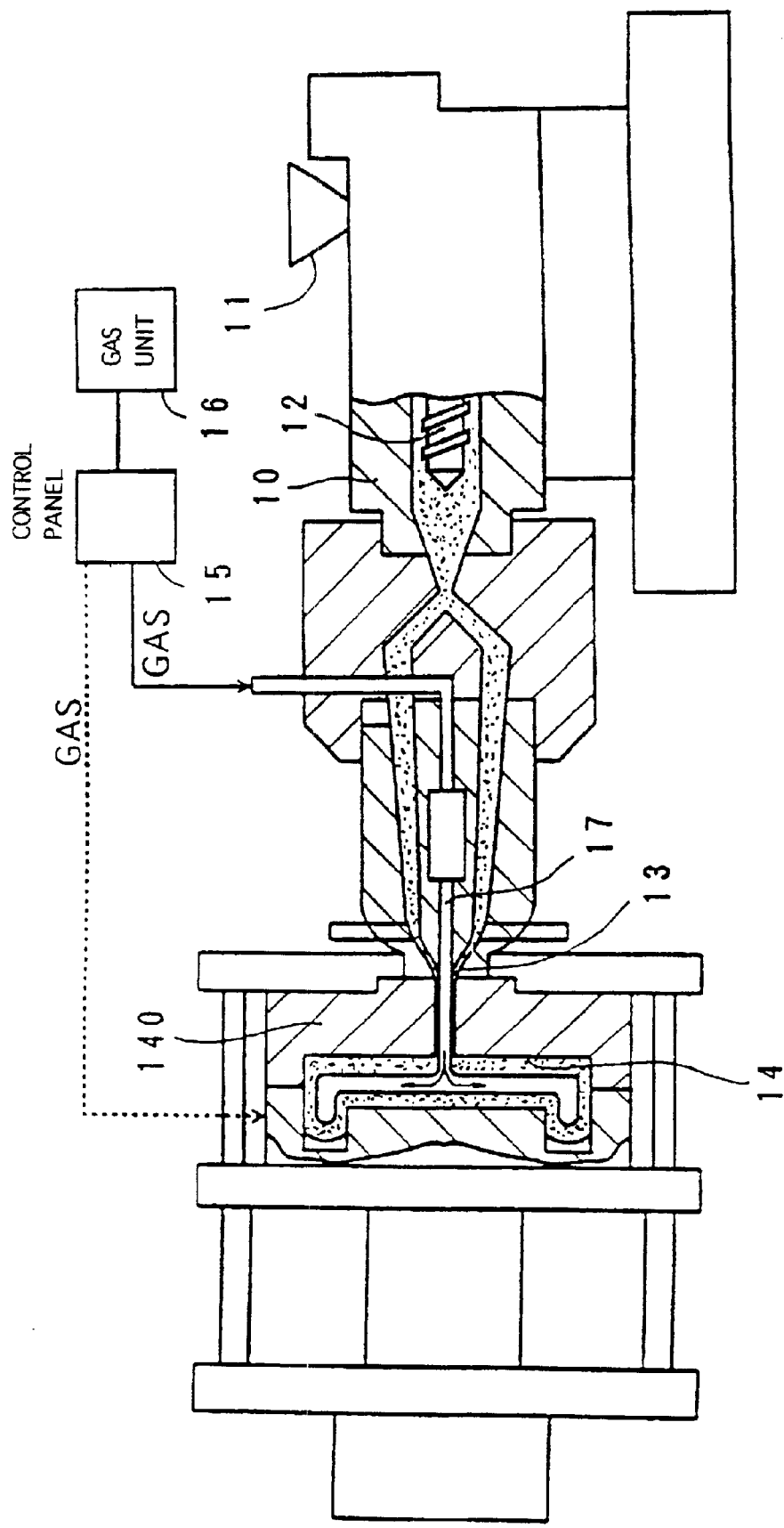
FIG. 1 is a sectional view showing a gas-assisted molding method and apparatus according to an embodiment of the invention.

The best mode for carrying out the invention is described with reference to the accompanying drawings.

Initially, synthetic resins, which are usable as resin moldings for carrying out the invention, are described.

In general, materials called plastics can be broadly classified into resins having properties of being hardened on heating, that is, "thermosetting resins" and resins having properties of being softened on heating, that is, "thermoplastic resins". The synthetic resins usable as molding resins of the invention or as molding resins adopted in embodiments of the invention, are "thermoplastic resins" The "thermoplastic resins" used as a constituent of the resin moldings include a diversity of resins. Examples include ionomers resins (ethylenic ionomer resins), ethylene•ethyl acrylate copolymer (abbreviated as EEA), acrylonitrile•acrylic rubber•styrene copolymer resin (abbreviated as AAS), acrylonitrile•styrene copolymer resin (abbreviated as AS or SAN), acrylonitrile styrene copolymer resin (abbreviated as ACS), ethylene-vinyl acetate copolymer (abbreviated as EVA), ethylene-vinyl alcohol copolymer resin (abbreviated as PVAL), acrylonitrile•butadiene•styrene copolymer resin (abbreviated as ABS), polyvinyl chloride resin (abbreviated as PVC or PVW), chlorinated polyethylene resin (abbreviated as CPE), acetate fiber resin (cellulose acetate resin), polyethylene tetrafluoride resin (abbreviated as PTFE), ethylene tetrafluoride-perfluoroalkyl vinyl ether copolymer resin (abbreviated as PFA), ethylene tetrafluoride-ethylene copolymer resin (abbreviated as ETFE), polyethylene trifluoride chloride resin (abbreviated as CTFE), polyvinylidene chloride, polyvinylidene fluoride (abbreviated as PVF), polyoxymethylene resin (abbreviated as PCM), nylon 6 (abbreviated as PA6), nylon 66 (abbreviated as PA 66), nylon 610 (abbreviated as PA 610), nylon 11 (abbreviated as PA 11), nylon 12 (abbreviated as PA 12), nylon 46 (abbreviated as PA 46), a specific type of nylon (Raney commercially available from Mitsubishi Chemical Corp. (former Mitsubishi Gas Chemical Co., Ltd.), polyarylate resin (aromatic polyester resin, abbreviated as PAR), thermoplastic polyurethane elastomer (abbreviated as TPU), thermoplastic elastomer (abbreviated as TPE), wholly aromatic polyester resin (with another name of polyoxybenzoyl resin, abbreviated as POB), polyetherether-ketone resin (abbreviated as PEEK), polysulfone resin (abbreviated as PSF), polyether sulfone resin (abbreviated as PES), polysulfone resin (abbreviated as PSU), high density polyethylene resin (abbreviated as HDPE), low density polyethylene resin (abbreviated as LDPE), linear low density polyethylene resin (abbreviated as L-LDPE), polyethylene terephthalate resin (abbreviated as PET), polycarbonate resin (abbreviated as PC), polystyrene resin (abbreviated as PS), medium impact polystyrene resin (abbreviated as MIPS), high impact polystyrene resin (abbreviated as HIPS), polyphenylene oxide resin (abbreviated as PPO), polyphenylene ether resin (abbreviated as PPE), styrene-modified polyphenylene oxide resin (abbreviated as modified PPO or styrene-modified PPO), styrene-modified polyphenylene ether resin (abbreviated as modified PPE or styrene-modified PPE), styrene-grafted polyphenylene ether resin (abbreviated as PPE or styrene-modified PPE), styrene-grafted polyphenylene oxide resin (abbreviated as modified PPO or styrene-modified PPO) (the terms "PPO, PPE, modified PPO, modified PPE, styrene-modified PPO and styrene-modified PPE" used herein are generically expressed as styrene-modified PPO (E) resin, polyphenylene oxide (ether) resin, modified (reduced) polyphenylene oxide (ether) resin, modified PPO (E) and the like), polyphenylene sulfide (abbreviated as PPS), polybutadiene resin (abbreviated as PBD), polybutylene terephthalate resin (abbreviated as PBT), polypropylene resin (abbreviated as PP), methacrylic resin (usually called acrylic resin, with an abbreviation of PMMA), methylpentene polymer (abbreviated as PMP), very low density polyethylene resin (abbreviated as VLDPE), ethylene•methyl methacrylate copolymer, polythio ether sulfone resin, polyketone, polyamide imide, modified maleimide resin, ethylene vinyl acetate copolymer-saponified product, ABS permanent electrostatic resin, HIPS permanent electrostatic resin, MIPS permanent electrostatic resin, PS permanent electrostatic resin, PCT resin (polyester resin), polyether imide resin, polyallyl ether ketone, polybutene resin, EMAA resins, polyacrylonitrile, liquid crystal polymers, styrene maleimide copolymer resin, ethylene acrylic acid copolymer resin, silane-crosslinked polymers, liquid crystal polyester resins, biodegradable plastics, and the like.

These resins may be mixed, or may be further modified to provide resins having other properties. For instance, ABS resin is a blend polymer of high rubber ABS resin (abbreviated as HR-ABS) and AS resin, and a modified PPO (E) resin is a blend polymer of polyphenylene oxide (ether) resin and HIPS.

Next, typical examples of these alloys are shown, including PA/modified PPO or E (hereinafter referred to simply as PA/modified PPO (E)), PA/elastomer, PA/PC. PA/ABS, POM/elastomer, PC/ABS, PC/PBT, PC/PET, PC/PMMA, PBT/ABS, PBT/PET, PBT/modified PPO (E) and the like. These are currently produced. In the future, since there are a limitless number of combinations of resins, it is assumed that the combinations increase in number.

The molding materials include not only mixtures of resins, but also materials called composite materials which further contain inorganic and organic materials to improve chemical and physical properties.

For instance, such materials include "fillers" added to for the purpose of lowering costs, or "reinforcing materials," added to for the purpose of reinforcement. Examples of such materials include inorganic fillers and organic fillers.

Addition agent materials include "reinforcing materials", which are added in order to improve resins with respect to thermal properties such as, for example, thermal deformation temperature, brittle temperature, Vicat softening temperature, melting and the like, mechanical properties such as, for example, tensile break strength, tensile yield strength, elongation at break, bending strength, modulus in flexure, Izod impact strength, and the like.

Examples of the reinforcing material include carbon balloons, powder of anthracite coal, artificial rock crystal, silicone resin fine powder, silica spherical fine particles, polyvinyl alcohol fibers, and the like.

The resins are kinds of organic compounds, which are inherently combustible in nature. Materials, which are added to in order to suppress the property and impart thereto flame retardancy, are "flame retardant". The retardants include inorganic flame-retardants, organic flame-retardants, chlorine flame-retardants, bromine flame-retardants, reactive flame-retardants, flame-retarding stabilizers, silicon resins, and the like.

Chemicals, which are formulated in resins being hard and having high rigidity to impart flexibility, elasticity, processability and the like thereto and to adapt them to purposes in end use, are "plasticizer" and include various types of derivatives.

For instance, mention is made of phthalic derivatives, isophthalic derivatives, adipic derivatives, azelaic derivatives, sebacic derivatives, dodecano-2-ic derivatives, maleic derivatives, trimellitic derivatives, citric derivatives, itaconic derivatives, oleic derivatives, stearic derivatives and other fatty acid derivatives, sulfonic derivatives, phosphoric derivatives, glutaric derivatives, other monoester plasticizers, glycolic derivatives, glycerine derivatives, paraffin derivatives, epoxy derivatives, polymer plasticizers, and other plasticizers.

Materials formulated for the purpose of decorative coloration are called "colorants", for which pigments are ordinarily employed. The term "pigment" means colorant powder insoluble in water or solvents. And colorant powder soluble in water is particularly called dye. Examples are those shown below.

Inorganic pigments include white pigments such as titanium oxide, zinc flower, white lead, lithopone, baryte, precipitated barium sulfate, calciumcarbonate, gypsum, precipitated silica and the like.

Black pigments include carbon black, lamp black, titanium black, synthetic iron black, refused toners for duplicators (hereinafter referred to as "refused toner"), and the like.

Gray pigments include zinc powder, lead suboxide, slate powder and the like.

Red pigments include cadmium red, cadmium mercury red, silver red, iron red, molybdenum red, red lead oxide, minium and the like.

Brown pigments include amber, iron oxide brown, cadmium yellow and the like.

Yellow pigments include zinc yellow, yellow ochre, ochre and sienna, iron oxide yellow, synthetic ochre, yellow lead, titanium yellow and the like.

Green pigments include chromium oxide, cobalt green, chrome green and the like.

Blue pigments include ultramarine, iron blue•ferric ferrocyanide, cobalt blue, and the like.

Metallic powder pigments include aluminium powder, bronze powder and the like, which are able to impart metallic nature to plastics.

Other metallic pigments include mica.

Organic pigments include azo pigment, nitroso pigments, nitro pigments, basic dye lakes, mordant lakes, vat dye pigments, and the like, which are used as required.

Besides, phthalocyanine pigments, dioxazine pigments, organic fluorescent pigments are usable.

"Lubricants" may be added to for the purpose of improving processability: they are compatible (miscible) with a resin melt to an extent when plastics are processed, thereby increasing fluidity and reducing a frictional resistance to prevent stickiness. Examples of the lubricant are those mentioned below.

Examples include paraffin and hydrocarbon resins, fatty acids, fatty acid amides, fatty acid esters, fatty alcohols, mixtures thereof, and other lubricants.

Plastics may undergo degradations, such as discoloration and embrittlement, by the action of UV light. Those substances, which absorb harmful UV light to protect resins from the degradation, are "UV absorbers". Examples are described.

There are mentioned salicylic derivatives, benzophenones, benzotriazoles and other UV absorbers, and hindered amine light stabilizers.

Substances added to for the static elimination of resin moldings are antistatic agents, and examples include metal inactivators, nucleating agents, neutralizing agents, antacids and the like.

In order to prevent resin moldings from aging and prolong their life, sage "resistors", "antioxidants", "antiozonants", "anti-fungus agents" and the like are added.

As will be apparent from the foregoing synthetic resins contain aside from the above addition agents, other various addition agents. Such addition agents are properly used depending on the purpose.

The molding procedure of resin moldings is described.

The molding procedures, which are applicable to as embodiments of the invention, may be all of molding processes of thermoplastic resins.

For instance, mention is made of injection molding methods such as general molding (solid molding), gas-assisted molding, a liquefied gas-assisted molding method (e.g. HELUGA), a sandwich molding method, a double-layer molding method, two-color, multi-color, multi-layer, mixed color and tandem injection molding methods, an SP molding method, and the like, a vacuum molding method, a pressure forming method, an extrusion molding method, a profile extrusion molding method, a blow molding method, a rotational molding method, a transfer molding method, a compression molding method, a calendar molding method, an inflation molding method, a laminated molding method, a foam molding method, an injection compression molding method, a compression molding, a blow molding method, a monofilament molding method, casting, a powder molding method, and the like.

A paint capable of forming a film is applied to a molded article in a thickness sufficiently smaller than that of the molded article in order to provide it mainly as a cover mark (decoration) for decoratively making a good appearance at a portion which attracts user's attention. In the case, the film is formed mainly on an outer surface of the molding and, in some cases, on an inner surface (when the molded is opened). The paint should comprise a thermoplastic resin having affinity for a thermoplastic resin used as a main constituent of the resin molding, i.e. a base material, and the first-mentioned thermoplastic resin may be made of the base material.

The resins for the paint include, for example, silicone-modified polyimide resins, styrenated alkyd resins, acrylic resin for PP, vinyl acetate/acrylic resin, natural rosin-modified phenolic resins, natural rosin-modified maleic resin, alcohol-soluble phenolic resin, nylon resins, thermoplastic polyurethane resin, highly chlorinated polypropylene, highly chlorinated polyethylene, chlorinated polypropylene, acryl-modified chlorinated PP, rosin esters, rosin-modified phenol, vinyl chloride/vinyl isobutyl ether copolymer, polyvinyl butyral, vinyl/acetate/vinyl alcohol copolymer, vinyl chloride/vinyl acetate copolymer, polyamide resins, styrene-modified acrylic resin, acrylic resins (MMA/EA), acrylic resin (MMA), acrylic resin (EMA), acrylic resin (BMA), styrene/acrylic resin Em, acrylic resin Em, polyamide resins, urethane resin Em, high molecular weight epoxy resin, acryl-modified PP, fluorine resins having affinity for resins for moldings, urethanated alkyd resin, nitro cellulose, cellulose acetate, fluorine resin Em, vinyl chloride resin, vinyl acetate/acrylic resin, phthalic alkyd resin, urethanated epoxy resin, silicone resin Em, silicone resins, polyester resins, phenolic resin, xylene resin, ketone resin, alkyd resin, butadiene resin, chlorinated polyolefin resins, chlorinated rubber resin, chlorinated rubber, styrene/butadiene latex, vinyl acetate resin Em, styrene resin Em, styrene/butadiene resin Em, butadiene/nitrile resin Em, water-soluble alkyd resin, water-soluble phenolic resin, water-soluble amino resin, water-soluble acrylic resins, and modified resins thereof. The abbreviation "Em" used above means "emulsion". These resins for the paint may be used singly or in combination or two or more. The thermoplastic resin having affinity is intended to mean that when the base material is made of ABS resin, ABS resin of the same nature or quality is mentioned. Aside from ABS resin, there may be mentioned AS (SAN) resin, ASA resin, CA resin, PC resin, PMMA resin, PBT resin, TPU resin, PVC resin, PET resin, blended PC/PBT resin, blended PC/ABS resin, and the like. Examples of these combinations are indicated in Table 67.

Specific examples of the thermoplastic resin used as a constituent of the paint are those resins, which have affinity for ABS resins (including AS resin, AES resin, ACS resin, ASA resin and AAS resin) used as a main constituent of moldings and include styrene alkyd resin, vinyl acetate/acrylic resin, styrene-modified acrylic resin, acrylic resin, styrene acrylic resin emulsion, acrylic resin emulsion, and the like.

Commercially available ones include: resins commercially d under the commercial names and grades of Mitsui Toatsu Chemicals, Inc., such as L1043, ALMATEX L2100, ALMATEX L1090F, ALMATEX L10423, ALMATEX L1044, and ALMATEX L1093; resins commercially available under the commercial names and grades of Nippon Shokubai Co., Ltd., such as AROSET 5210, AROSET 5217, AROSET 5221, AROSET 5227 and AROSET 5242; resins commercially available under the commercial names and grades of Nippon Shokubai Co., Ltd., such as ACRYSET SC-309A and ACRYSET SC-309J; resins commercially available under the commercial names and grades of Nippon Shokubai Co., Ltd., such as AROLON 450, AROLON 453, AROLON 460, AROLON 480 and AROLON 482; resins commercially available under the commercial names and grades of Mitsubishi Rayon Co., Ltd., such as DIANAL-469, DIANAL LR-186, DIANAL LR-485, DIANAL LR-143, DIANAL LR-158, DIANAL LR-001, DIANAL LR-177, DIANAL LR-214, DIANAL LR-163, DIANAL LR-162, DIANAL LR-167, DIANAL LR-396, DIANAL LR-574, and DIANAL LR-194; resins commercially available under the commercial names and grades of Dainippon Ink and Chemicals Inc., such as ACRYDIC A-157, ACRYDIC DL-967, ACRYDICA-165, ACRYDICA-166, ACRYDICA-167, ACRYDICA-190, ACRYDIC A-195, ACRYDIC CL-1185, ACRYDIC AL-169-45, ACRYDIC 56-1155, and ACRYDIC AL-1157; and resins commercially available under the commercial names and grades of Hitachi Chemical Co., Ltd., such as HITALOID 1552, HITALOID 1553, HITALOID 1508, HITALOID 1512, and the like.

The thermoplastic resins used as a constituent of the paint which has affinity for polypropylene resin include chlorinated polyolefins, chlorinates polyethylene, chlorinated polypropylene, acryl-modified chlorinated polyolefins, acryl-modified chlorinated polyethylene, acryl-modified chlorinated polypropylene, chlorinated modified polyolefins, chlorinated modified polyethylene, chlorinated modified polypropylene and the like.

Specific examples include: resins, commercial names and grades of Hitachi Chemical Co., Ltd., such as HITALOID 1508 and HITALOID 1512; resins of Mitsubishi Rayon Co., Ltd., such as DIANAL JR-1478 and DIANAL JR-1409; and resins of Nippon Paper Industries Co., Ltd., such as SUPERCHLON 773H, SUPERCHLON 822, SUPERCHLON 892L, SUPERCHLON 832L, SUPERCHLON 803L, SUPERCHLON L, SUPERCHLON 803MW, SUPERCHLON E, SUPERCHLON 803M, SUPERCHLON 813A, SUPERCHLON 803H, SUPERCHLON 804M, SUPERCHLON C, SUPERCHLON 814H, SUPERCHLON L-206, SUPERCHLON A, SUPERCHLON B, SUPERCHLON BX, and the like.

The thermoplastic resin used as a main constituent of an molded article is constituted of at least one resin of ABS resin, high-impact polystyrene resin, styrene-modified polyphenylene ether resins modified polyphenylene ether resin, modified polyphenylene oxide resin, polyphenylene ether resin, polyphenylene oxide resin, polycarbonate resin, vinyl chloride resin, polypropylene resin, nylon resins, polyethylene resin, and the like resins.

The thermoplastic resin used as a main constituent of a paint film, which has affinity for the thermoplastic resin used as the main constituent of the molded article is likewise constituted of at least one of resins including ABS resin, acrylonitrile styrene copolymer resin, high impact polystyrene resin, polystyrene resin, polyamide resin, vinyl chloride resin, styrene alkyd resin, thermoplastic acrylic resin, chlorinated polyolefin resin, chlorinated polyethylene resin, chlorinated polypropylene resin, chlorinated polyolefin resins, halogenated polyethylene resins, halogenated polypropylene resins, vinyl acetate-modified (reduced) acrylic resin, vinyl chloride/vinyl acetate copolymer resin, styrene-modified (reduced) acrylic resin, styrene acrylic resin emulsion, alkyd resin/soluble cotton, thermoplastic acrylic resin/soluble cotton, vinyl acetate-modified (reduced) acrylic resin, alkyl resin, urethane-modified (reduced) alkyl resin, polyvinyl butyral, water-soluble acrylic resin, water-soluble styrene-modified (reduced) acrylic resin, acryl-modified (reduced) thermoplastic urethane resin, and modified (reduced)=resins thereof, derivatives and related resins.

Where the thermoplastic resin used as a main constituent of a molded article consists of ABS resin, the thermoplastic resin for a main constituent of a paint film is constituted of at least one of acrylonitrile styrene copolymer resin, styrenated alkyd resin, thermoplastic acrylic resin, vinyl acetate-modified (reduced) acrylic resin, styrene-modified (reduced) acrylic resin, styrene acrylic resin emulsion, alkyd resin/soluble cotton, thermoplastic acrylic resin/soluble cotton, vinyl acetate-modified (reduced) acrylic resin, alkyl resin, urethane-modified (reduced) alkyl resin, polyvinyl butyral, water-soluble acrylic resin, water-soluble styrene-modified (reduced) acrylic resin, acryl-modified (reduced) thermoplastic urethane resin, and allied resins.

Where the thermoplastic resin used as a main constituent of a molded article consists of polyphenylene ether resin, the thermoplastic resin for a main constituent of a paint film is constituted of at least one of polystyrene resin, styrenated alkyd resin, thermoplastic acrylic resin, styrene-modified (reduced) acrylic resin, styrene acrylic resin emulsion, urethane-modified (reduced) alkyl resin, water-soluble acrylic resin, water-soluble styrene-modified (reduced) acrylic resin, acryl-modified (reduced) thermoplastic urethane resin, and allied resins.

Where the thermoplastic resin used as a main constituent of a molded article consists of polypropylene or polyethylene resin, the thermoplastic resin for a main constituent of a paint film is constituted of at least one of chlorinated polyolefin resins, chlorinated polyethylene resin, chlorinated polypropylene resin, halogenated polyolefin resins, halogenated polyethylene resins, halogenated polypropylene resins, and allied resins.

Where the thermoplastic resin used as a main constituent of a molded article consists of vinyl chloride resin, the thermoplastic resin for a main constituent of a paint film is constituted of at least one of vinyl chloride resin, vinyl acetate resin, vinyl acetate-modified acrylic resin, polyvinyl alcohol, vinyl chloride•vinyl acetate copolymer resin, styrene-modified acrylic resin, chlorinated polyolefin resins, chlorinated polyethylene resin, chlorinated polypropylene resin, halogenated polyolefin resins, halogenated polyethylene resins, halogenated polypropylene resins, and allied resins.

We check recycling properties using the combinations of the thermoplastic resins for the main constituent of moldings and the thermoplastic resins for the main constituents of paint films, with the results shown in Table 138.

Natural and synthetic polymers called a compatibilizing (miscibilizing) agent or a resin improver (hereinafter referred to generically as compatibilizing (miscibilizing) agent) may also be usable as the resin for paints. A great number of these agents are commercially sold, for example, under the commercial name of Kraton by Shell Chem. Co., Paraloid by Rohm and Haas Co., Royaltuf by Uniroyal, Exxelor by Exxon Chem. Corp., Sylark by Arco Chem. Co., Lotader by Cdf Chimie, MODIPER, BLEMMER, Ariarim by NOF Corp., BONDFAST and BONDINE by Sumitomo Chemical Co., Ltd., YUMEX by Sanyo Chemical Industries, Ltd., RPS and RAS by Nippon Shokubai Kagaku Kogyo Co., Ltd., Bennet imported by Nagase Sangyo K. K., Rexpearl RA by Kureha Chemical Ind. Co., Ltd., Rexpearl by Nippon Petrochemicals, Co., Ltd., VMX by Mitsubishi Petrochemical Co., Ltd., TUFTEC by Asahi Chemical Ind. Co., Ltd., Resada by Toagosei Co., Ltd., and the like. These are specifically materials including, for example, PSt-SEBS), epoxy-modified PS-g-PMMA, SBSSEBS and its maleic product, maleic polyolefins, 50 parts of St impregnated in and polymerized with 50 parts of EVA (67/33 on the weight basis), P(MMA-CO—C"$_4$—CO-St), MBS, P(C"$_2$—CO-GMA), P(C"$_2$CO-EA-CO-Mah), EA:5–32% Mah:1.7–3.2%, P(C"$_2$—CO-GMA), GMA:5–15%, P(C"$_2$CO-EA-CO-Mah), P(St-CO-Mah), maleic products of polyolefins, maleic EPDM, EPDM-g-P(St, AN), core/shell-type block polymers having, for example, cores of Pbu and Ac and shells of PMMA, hydrogenated SBS (SEBS), and maleic products thereof, styrene/ethylene/butadiene block copolymer, polyethylene/polymethyl methacrylate (PMMA) block copolymer, polyethylene/polystyrene (or PMMA) graft copolymer, maleic anhydride-grafted polypropylene, styrene/maleic anhydride copolymer, ethylene glycidyl methacrylate copolymer, copolymer of styrene (or MMA) grafted to ethylene•glycidyl methacrylate copolymer, cumyl phenol or maleic anhydride-grafted PE, carboxylic acid-modified PE, SEBS, CPE, copolymer of multifunctional monomer+peroxide, PS-grafted PE, PS-PE block copolymer, ionomers, carboxylic acid or carboxylic anhydride-modified PE, ethylene-mathacrylic acid copolymer, maleic anhydride-grafted PP, acrylic acid-grafted PP, chlorinated paraffin, maleic anhydride-grafted SEBS, ethylene-ethyl acrylate copolymer, maleic anhydride-grafted EPR, maleic anhydride-grafted SEBS, reactive PS, chlorinated PE, polyacrylic acid imide, EPDM, EPR, EPDM-PPGP, PS-LDPEGP, PS-PEGP, SBS, hydrogenated SB, SB, S-EP, SIS, S-I-HBD, SEBS, SBS, PS-PEGP, SI, PS-PbdGP, PS-PMMABP, GP, PS-PMMABP, GP, PS-PMMABP, PS-PMMABP, PS-PCLBP, chlorinated SB, PS-PEAGP, hydrogenated Pbd-PCLBP, EVA, PCL-PSBP, CPE, EPDM-g-PMMA, BR-PMMABP, PS-PMMABP, hydrogenated SIS, SEBS, PS-PABP, SEBS, PF-g-PMMA, PF-g-PS, PS-PIBP-POE-PAGP, PDMS-PEOBP, PP-PAGP, PS-PBABP, carboxylated PE or p(E-MAA), ionomers, MAH-modified PP, MAH-modified EPR, EAM, p(St-MAH), or p(St-MI), pSt-AA) or p(St-AA-MAH), p(St-An-MAH), p(St-MAH) or MAH-modified EPR, p(MAH-acrylate), carboxylated PP, p(St-MMA-MAH), sulfonated PS, maleic anhydride-modified PP/amino group-terminated NBR, maleic anhydride-modified SBSS or maleic anhydride-modified SEBS, PS-PMMAGP, PS-PEGP, SIRAM, PS-PABP, PS-PEAGP, PS-PFGP, PS-PIBP, EPRRAM, PEO-PAGP, PMDS-PMMAGP, BP, PP-PAGP, PP-EPDMGP, Ac-cell-PANGP, PMMA-EPDMGP, PMMA-PEGP, PEO-PMDSBP, CPERAM, PS-PBABP, maleic anhydride PPGP, carboxylated PPGP, maleic anhydride-modified PPGP or amino-terminated NBRRAM, carboxylated PEGP or p(E-MAA)RAM, hydrogented PB-PMMAGP, CPERAM, chlorinated PERAM, CPERAM, EPDMRAM, SBGP or SISS or S-I-HBD or SBB or CPE, p(St-MAA) RAM, MAH-StGP, maleic anhydride-modified EPRRAM, sulfonated PSRMA, SBS, PS-PCLBP, PS-EPGP, SEBS, hydrogenated PSRMA, EVARAM, PS-PMMABP, hydrogenated SIS or SEBS, p(MAH-arylate)RAM, p(St-MAH) or p(St-MI)RAM, EPDMRAM, hydrogenated SBRAM, chlorinated SBRAM, p (St-AA) or p (St-AA-MAH) RAM, p (St-AN-MAH) RAM, p (St-MAH) RAM, PR-PMMA, BP, p(St-MMA-MAH)RAM, styrene-modified PE, styrene-modified EVA, styrene-modified PP, (meth)acrylate-modified PE, (meth)acrylate-modified PP, vinyl acetate-modified EVA, functional group-containing VMX, PS-PI block copolymer, PS-PMMA block copolymer, PS-PE block copolymer, PS-PEA graft copolymer, PS-PB graft copolymer, CPE, EPR, PP-EPDM graft copolymer, PP-PA graft copolymer, PEO-PA graft copolymer, PDMS-PEO block copolymer, LDPE-g-PS, LDPE-g-PMMA, LDPE-g-AS, PP-g-PS, PP-g-ASD, EEA-g-PS, EEA-g-PMMA, E or EA-g-AS, EV-AS, EEA-g-PS, EEA-g-PMMA, EVA-g-AS, P(C"$_2$, GMA)-g-PS with 60/10/30 wt %, P(C"$_2$, GMA)-g-PMMA with 60/10/30 wt %, P(C"$_2$, GMA)-g-P (AN, St) with 60/10/10/20 wt %, P(C"$_2$, EA, Mah)-g-PMMA with 60/8/2/30 wt %, E/EA/MAh-g-PS, E/EA/MAh-g-PMMA, E/EA/MAh-g-AS, P(C"$_2$, EA, Mah)-g-P (AN, St) with 60/8/2/10/20 wt %, copolymers of ethylene and GMA along with vinyl acetate (abbreviation: VA) and methyl acrylate (abbreviation: MA) available under the commercial names of BONDFAST (grades: 2C, E, 2A, 7A, 2B, 7B, 20B, 7L, 7M, 20M), E-GMA, E-GMA-VA, E-GMA-MA, terpolymers obtained by copolymerization of ethylene, 2 to 4 wt % of MAH and ethyl acrylate (abbreviation: EA) available under the commercial names of BONDINE (grades: FX8000, LX 4110, HX8210, TX8030, HX8290, HX8140, AX8060, AX8390), an elastomer of Asahi Chemical Industry Co., Ltd., (commercial name: TUFTECh), consisting of an SEB-based thermoplastic elastomer wherein a polybutadiene site of an SB-based block copolymer is hydrogenated, EVA/EPDM/ polyolefin graft copolymers, compatibilizing (miscibilizing) agents of Arakawa Chemical Industries, Ltd., with grades of GMA-1, GMA-2, GMA-3, GMA-4, GMA-5, GMA-6, GMA-7, GMA-8, GMA-9, OH-1, OH-2, OH-3,)OH-4, OH-5, OH-6, DE-1, DE-2, DE-3, DE-4, DE-5, and DE-6, styrene glycidyl methacrylate (abbreviation: St-GMA) copolymer, styrene-2-hydroxypropyl methacrylate (abbreviation: St-2HPMA), styrene-diethylaminoethyl methacrylate (abbreviation: St-DE), P(MAH-arylate), S-EPGP, PS-PCLBP, SBS, sulfonated PS, maleic anhydride-modified EPR, MAH-StGP, P (St-MAA), SBGP or SiS or S-1-HBD or SBS or CPE, EPDM, carboxylated PE, carboxylated PP or PE-MAA), maleic anhydride-modified PP or amino-terminated NBR, carboxylated PP, maleic anhydride PP, PMMA-EPDMGP, PP-EPDM-GPO, PP-PAGP, PEO-PAGP, EPR, PS-PIBP, PS-PFBP, (block polymer), SI, PS-PEGP, PS-PBGP, PS-PEGP, PS-PMMAGP (graft polymer), acrylate polymer having a multilayered structure, polyolefin-grafted and reactive polyolefin-grafted copolymers, EVA/EPDM polyolefin graft copolymer, EGMA, P(Et-CO-EA-CO-MAH), SEBS, EGMA, acid-modified SEBS, polyolefin graft copolymers, maleic EPDM, maleic PE, maleic PP, maleic EVA, maleic SEBS, styrene maleic anhydride copolymer, SANB grafted EPDM, reactive polystyrene, polycaprolactone-b-polystyrene, reactive styrene•glycidyl methacrylate•acrylic acid copolymer, reactive phenoxy peroxide polymer, polycaprolactone, EVA, EVA/EPDM/polyolefin graft copolymers, anionically polymerized diblock copolymers, hydrogenated styrene-isoprene block copolymer, ethylene-maleic anhydride-MMA terpolymer, acid-modified styrene block copolymer, and derivatives thereof. The abbreviations used have the following meanings: EVA represents ethylene-vinyl acetate copolymer, EPDM ethylene-propylene-diene copolymer (ethylene-propylene-diene rubber), EGMA ethylene-glycidyl methacrylate copolymer, SEBS styrene-ethylene-butadiene-styrene copolymer, GMA glycidyl methacrylate, MAH (Mah) maleic anhydride, EA ethyl acrylate, PI polyimide, PEA ethyl polyacrylate, PB polybutadiene, EPR ethylene-propylene rubber, PEO polyethylene oxide, PDMS polydimethylcyclohexane, EEA ethylene-ethyl acrylate copolymer, MA methyl methacrylate, VA vinyl acetate, E ethylene, St styrene, Pst polystyrene, GMA glycidyl methacrylate, 2HPMAA 2-hydroxymethacrylate, DE diethylaminoethyl methacrylate, AN acrylonitrile, and MMA methyl methacrylate.

A resin having affinity for a resin used as a constituent of a molding, e.g. an acrylonitrile styrene copolymer resin, is dissolved in a solvent to provide a varnish, to which pigments, dyes and other addition agents are added to obtain a paint composition. The composition is thinly coated onto an outer surface of a molding made, for example, of an ABS resin. After the resin molding coated with the thin film on the surface thereof has been on the market as a commodity, it is recovered, is crushed as it is without scraping the paint film off and again converted to pellets (hereinafter referred to as re-pelletized). The resultant pellets can be re-used as a molding material. This is because the resin used as the surface painting has satisfactory affinity for the resin of the molding and has good heat adhesion properties or compatibility (miscibility).

Where the thermoplastic resin used as the main constituent of moldings consists of HIPS or modified PPO (E) resin, PSD resin (GP) is formulated as in the case of the AS resin (SAN) to obtain a paint. This composition is coated onto the surface of the molding, from which it will be seen that such coated moldings can be reproduced. In practical painting, the thickness of the paint film is in the range of 0.1 μm to 300 μm. Assuming that if the film thickness is at 15 μm and a 3 mm thick molding is coated once, the ratio by weight of the paint and the molding 1:200 (0.5%). Even if such a small amount of a paint resin is mixed with a base resin of the molding, thermoplastic resin of the paint film has affinity for, good thermal adhesion to or compatible (miscible) with the thermoplastic base resin, thus involving little or no problem.

With a molding obtained after repetition of five recycles, it contains a film component of 0.5%×5 (the number of paintings or the recycle number)=2.5%. Because of the good affinity, thermal adhesion properties or compatibility (miscibility), there arise no problem, and such an amount does not contribute greatly to the change in physical and chemical properties.

For the preparation of paints capable of being recycled (which may be, in some cases, referred to re-recycle, re-recycling or the like), it has to be considered at the start to check what type of resin is used for moldings and what type of resin has affinity for the first-mentioned resin. The latter resin is dissolved in a solvent therefor, to which pigments or dyes, stabilizers, surface conditioners (leveling agents), pigment dispersants, suspension stabilizers, antifoam agents and other addition agents are added thereby obtaining a paint. Of course, powder paint may also be used without use of any solvent.

The types and forms of paints include solvent-type paints, emulsion-type paints, suspension-type paints, aqueous paints, powder paints, high solid paints, solvent-free paints, paints containing a supercritical fluid, and paints comprising liquefied gases including inert gases such as carbon dioxide, He, Ne, Ar, nitrogen gas and the like, combustible gases such as LPG, methane, ethane, propane, butane, pentane and the like, and combustion improving gases (fuel additive gas) such as air, oxygen, chlorine and the like.

Typical examples of combinations of thermoplastic resins exhibiting affinity, thermal adhesion properties or compatibility (miscibility) are shown in the matrices of Table 67.

In practice, aside from those resins set out in Table 67, other resins may also be used for paints. The resins used as a constituent of paint are sufficient to have affinity for molding resins. In order to consider an example of a resin, which is easy to be converted to paint, consideration is given to the molecular structure of a polymer having affinity, thermal adhesion properties or compatibility (miscibility). For instance, where polystyrene is used as a molding resin, it is considered beneficial to use a modified styrene resin or copolymers thereof having —OH (hydroxyl group), —COOH (carboxyl group) or —SO$_3$H (sulfone group) and represented according to the following chemical formula

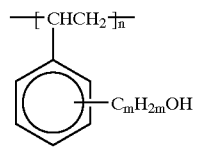

Natural thermoplastic resins or synthesized thermoplastic resins called a compatible (miscible) agent may also be used to prepare paints, which can be recycled.

Where a resin for molding and a resin for paint film do not have direct affinity for each other, mixing of a compatibilizing (miscibilizing) agent with the resin for the paint film permits a paint having affinity and capable of being recycled.

Moreover, where a resin for molding and a resin for paint film do not have direct affinity for each other, addition of a compatibilizing (miscibilizing) agent at the time of re-pelletization or molding allows mutual affinity of the resins to be established, thereby enabling one to recycle the moldings irrespective of the fact that the resin for the paint film and the molding resin have no direct affinity.

Under these circumstances, it is necessary to judge whether or not a resin for paint and a resin for molding have such properties as mutual affinity, thermal adhesion properties, and compatibility (miscibility). The affinity, thermal adhesion properties, compatibility (miscibility) and the like are described in more detail.

Measurements for judging compatibility (miscibility) such as affinity, thermal adhesion properties and the like, which are important factors for evaluating recyclability or the possibility of recycling, are described below.

1. Morphological Measurements
  (1) Measurements of transparency, refractive index
  (2) Observation of a dispersion state through an optical and phase contrast microscope and an electron microscope, and observation through an optical microscope (CM), a scanning electron microscope (SEM), and a transmission electron microscope.
  (3) Light scattering method
  (4) X-ray small-angle scattering method
  (5) Neutron small-angle scattering method
  (6) X-ray diffraction method
  (7) Fluorescent method
2. Measurements by Solid Physical Properties
  (1) Addition of volume weigh ratio
  (2) Measurement of a glass transition point (Tg) by a refractive index method
  (3) Measurement of a glass transition point (Tg) by dilatometry
  (4) Measurement of a glass transition point (Tg) by differential calorimetry (DTC), and judgment as compatible or miscible on observation of a crystal point.
  (5) Measurement of a glass transition point (Tg) by differential scanning calorimetry (DSC), and judgment as compatible or miscible on observation of a crystal point.
  (6) Measurement of a glass transition point (Tg) by thermal optical analysis (TOA, TPO)
  (7) Measurement of dynamic relaxation
  (8) Measurement of dielectric relaxation
  (9) Measurement of magnetic relaxation (pulsed NMR)
  (10) With use of FT-IR, if intense interaction between different types of polymers is recognized according to the Fourier transformation infrared absorption spectra, they are evaluated as compatible or miscible.
3. Thermodynamic Measurements
  (1) Measurement of precipitability and a variation (rate) in turbidity from 1)* in a common solvent.
  1)* A solution of a polymer blend by use of a solvent capable of simultaneously dissolving two types of polymers.
  (2) Measurement of heat of mixing
  (3) Measurement of viscosity (Feldmand method)
  (4) Measurement of osmotic pressure
  (5) Measurement by measurement of a glass transition point (Tg) from a solubility parameter (d, SP value) (Small's calculation method, viscosity method, swelling method, and gas chromatography)
  (6) Measurement of tan d when using measurement of elasticity by kinematic viscosity
4. Other Methods
  (1) Bending test (breakage test of a flat sheet or cylinder processed by use of a mold or a strand obtained by means of an extruder)

(2) Cross-hatch test
(3) Observation of the state of an interface of a cut film

The compatibility of a polymer blend has been theoretically discussed from the standpoint of statistical thermodynamics by expressing a variation of the Gibbs free energy prior to and after mixing of constituent polymers as a function of the mixing composition, temperature and molecule characteristic parameter of the polymers. Whether the polymer constituents undergo compatibility (miscibility) or phase separation is discussed while making a phase diagram.

Figure 6:
FIG. 6 is a copy of an electron micrograph showing the state of affinity between a styrene-modified acrylic resin and an ABS resin in Example 5 of the invention.
Figure 7:
FIG. 7 is a copy of an electron micrograph showing the state of affinity between a styrene-modified acrylic resin and a HIPS resin in Example 7 of the invention.

In practice, the results of a test, which is carried out to judge whether or not the resin (styrene-modified acrylic resin) used in paint #10 in Examples appearing hereinafter has thermal adhesion and compatibility properties relative to the recycled product from a resin molding consisting of ABS resin or HIPS resin, are shown in FIGS. 6 and 7 as copies of transmission electron microphotographs (hereinafter referred to TEM photograph). A black dye for the resin (styrene-modified acrylic resin) in paint #10 consisted of $OsO_4$ or $RuO_4$.

Figure 8:
FIG. 8 is a copy of an electron micrograph showing the state of non-affinity between a thermosetting urethane resin and an ABS resin in Comparative Example.
Figure 9:
FIG. 9 is a copy of an electron micrograph showing the state of non-affinity between a thermosetting urethane resin and an ABS resin in Comparative Example.

As will be apparent from FIGS. 6 and 7, the resin of paint #10 is readily dispersed or uniformly dispersed in the ABS resin or HIPS resin which is a main constituent of the resin molding and kneaded by means of a single screw extruder, with its particle size being about 1 to $2\mu$ in the ABS resin or HIPS resin matrix. The dispersed particles are elliptically elongated, and thus, has a so-called sea-island structure having black elongated islands therein. This is considered to be an inhomogeneous compatible (miscible) system. A thermosetting urethane resin paint, which is considered as not having any compatibility (miscibility) with ABS resin or HIPS resin, was likewise reproduced, and the results of TEM photographs being taken are shown in FIGS. 8 and 9. As will be apparent from FIGS. 8 and 9, unlike the styrene-modified acrylic resin, no sea-island structure is shown (see FIGS. 6, 7). It was recognized that when a thin slice of the film was made by means of a microtome, the ABS resin and the HIPS resin had good affinity for the resin of paint #10 at the interface therebetween, and no phase separation at the interface was found. On the other hand, with the urethane resin, separation took place at the interface, thus being judged, as they had no affinity.

As will be apparent from the copies of the TEM photographs, AS resin (resin used as a constituent of paint #30) relative to ABS resin and PS resin (resin used as a constituent of paint #20) relative to HIPS resin have such relations that AS resin and PS resin are, respectively, starting materials for the preparation of ABS resin and HIPS resin. The respective pairs of the resins are assumed to be compatible (miscible) with each other and no observation through TEM was positively made.

Figure 50:
FIGS. 50 to 53 are, respectively, copies of TEM photographs taken by an electron microscope showing the state of affinity of various types of moldings and resin constituents in paint in embodiments of the invention.

FIG. 50 is a TEM photograph of a reproduced molding which is obtained by mixing a styrene-modified acrylic resin (paint resin of Dainippon Ink and Chemicals Inc., with a commercial name of ACRYDIC and a grade of 56-1155) used as a thermoplastic resin for paint film and a PS resin (made by Mitsubishi Chemical Polytech Co., Ltd. with a commercial name of DIAREX and a grade of HF-77) used a thermoplastic resin for a main constituent of a molding.

The results of the observation of the TEM photograph shown in FIG. 50 reveal that the styrene-modified acrylic resin used as the thermoplastic resin for the paint film is uniformly monodispersed in the PS resin, which is a thermoplastic resin used as the main component of the molding, substantially in a spherical form with a size of 1 $\mu$m or below, thus establishing a most preferable, ideal sea-island structure.

Figure 51:
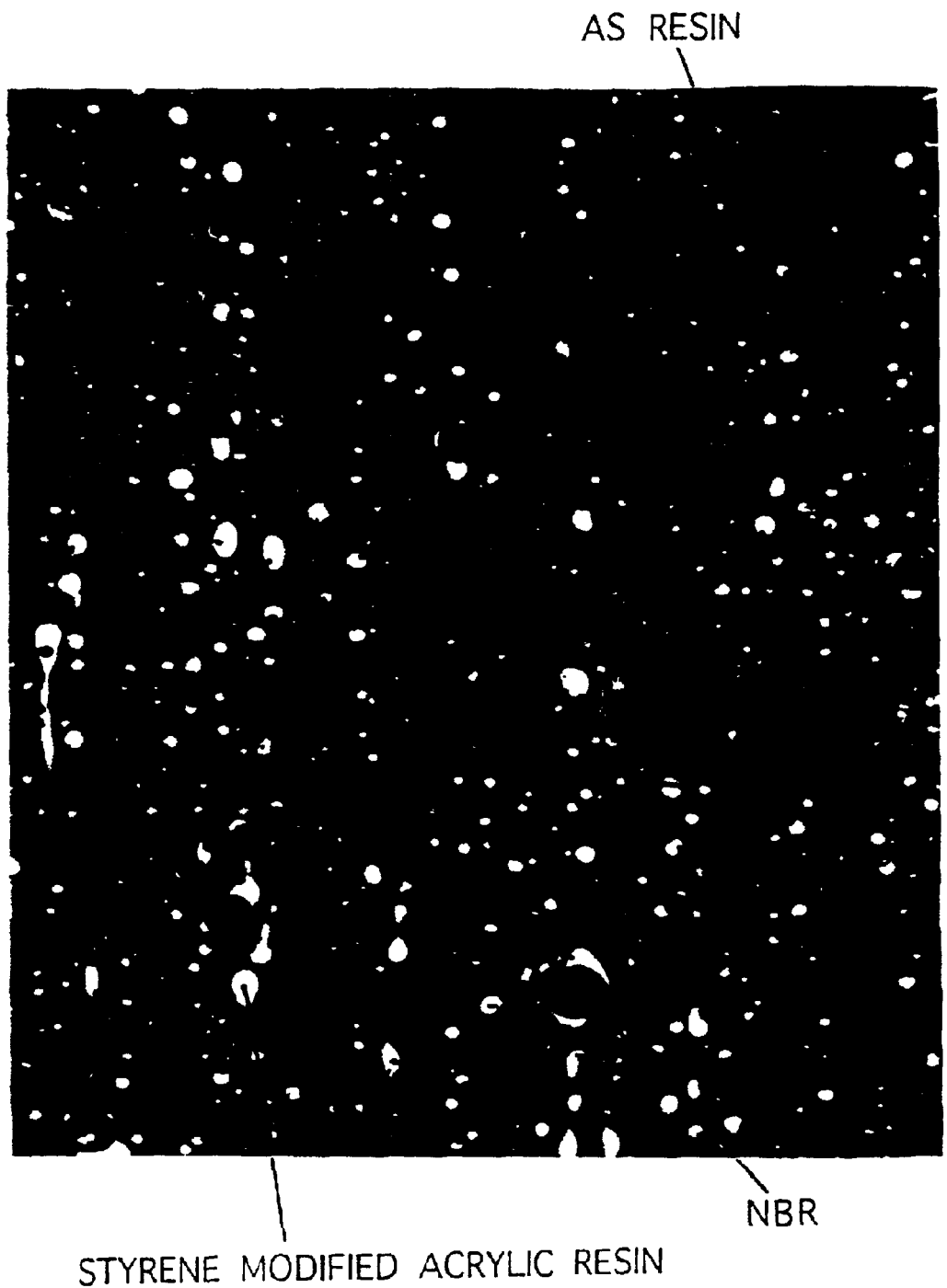

The TEM photograph shown in FIG. 51 is that of a molding which is recycled by use of a styrene-modified acrylic resin (paint resin of Dainippon Ink and Chemicals Inc., with a commercial name of ACRYDIC and a grade of 56-1155) used as a thermoplastic resin for paint film and an ABS resin (made by Asahi Chemical Industry Co., Ltd. with a commercial name of STAYLAC and a grade of 120) used as a thermoplastic resin for a main constituent of a molding.

The results of the observation of the TEM photograph shown in FIG. 51 reveal that the styrene-modified acrylic resin used as the thermoplastic resin for the paint film is uniformly monodispersed in the ABS resin, which is a thermoplastic resin used as the main component of the molding, substantially in a spherical form with a size of 0.5 $\mu$m or below, thus establishing a most preferable, ideal sea-island structure.

Figure 52:
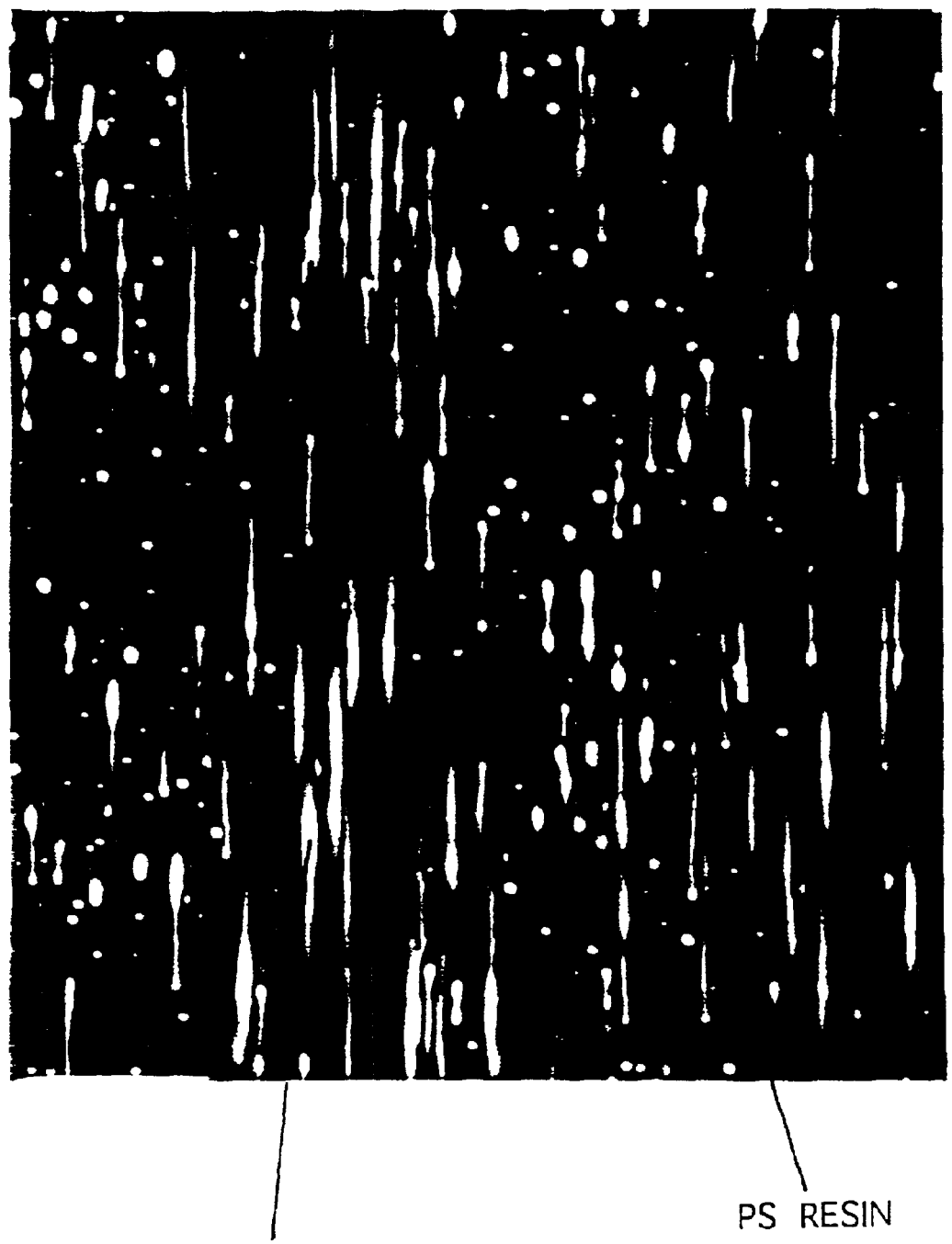

The TEM photograph shown in FIG. 52 is that of a molding which is recycled by mixing a styrene-modified acrylic resin (paint resin of Dainippon Ink and Chemicals Inc., with a commercial name of ACRYDIC and a grade of 56-1155) used as a thermoplastic resin for paint film with a PS resin (made by Mitsubishi Polytech Co., Ltd. with a commercial name of DIAREX and a grade of HF-77) used as a thermoplastic resin for a main constituent of a molding, to which 5% of a compatibilizing (miscibilizing) agent (compatibilizing agent of Nippon Oil and Fats Co., Ltd., with a commercial name of MODIPER and a grade of BT200 (P(AN-r-St)-b-PMMA=10/20/70) is further added in order to change the morphology of the thermoplastic resin for the paint film.

The results of the observation of the TEM photograph shown in FIG. 52 reveal that the styrene-modified acrylic resin used as the thermoplastic resin for the paint film is uniformly monodispersed in the PS resin, but individual particles are elliptically elongated along the direction of the flow of the melt resin and oriented in a certain direction.

In this connection, however, the particles of the thermoplastic resin for the paint film are smaller in size on comparison with those in the TEM photograph of FIG. 50.

Figure 53:
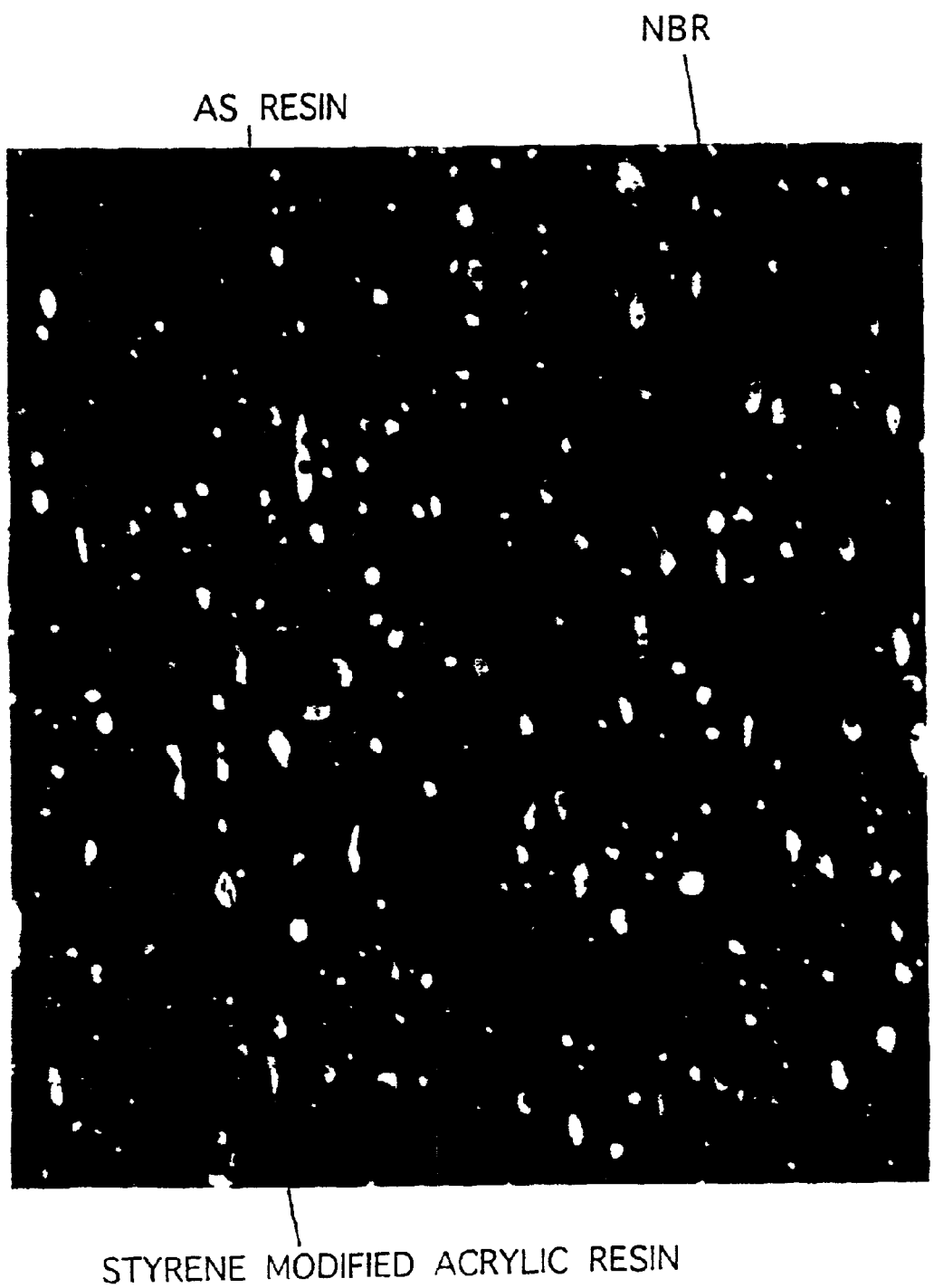

The TEM photograph shown in FIG. 53 is that of a molding which is recycled by mixing a styrene-modified acrylic resin (paint resin of Dainippon Ink and Chemicals Inc., with a commercial name of ACRYDIC and a grade of 56-1155) used as a thermoplastic resin for paint film with an ABS resin (made by Mitsubishi Polytech Co., Ltd. with a commercial name of STAYLAC and a grade of 120) used as a thermoplastic resin for a main constituent of a molding, to which 5% of a compatibilizing (miscibilizing) agent (compatibilizing agent of Nippon Oil and Fats Co., Ltd., with a commercial name of MODIPER and a grade of BT200 (P(AN-r-St)-b-PMMA=10/20/70) is further added in order to change the morphology of the thermoplastic resin for the paint film.

The results of the observation of the TEM photograph shown in FIG. 53 reveal that the styrene-modified acrylic resin used as the thermoplastic resin for the paint film is uniformly monodispersed in the ABS resin, but part of the particles are elliptically elongated along the direction of the flow of the melt resin and oriented in a certain direction.

Where the thermoplastic resin for paint film is dispersed in the form of islands in the thermoplastic resin matrix for a main constituent of the molding to provide a sea-island structure, the ratio of the minor side or diameter to the major side or diameter of the thermoplastic resin for the paint film dispersed in the form of islands, i.e. an aspect ratio, is preferably in the range of 0.2 to 1. As will be apparent from the above-mentioned TEM photographs or TEM photographs appearing hereinafter, where no stripping off or separation takes place at an aspect ratio of 0.1 or less, such a thermoplastic resin can withstand use satisfactorily depending on the manner of application and may be recycled.

With regard to paint resin for PP resin: chlorinated polypropylene

Chlorinated polypropylene used as recycle paint exhibits good adhesion to PP resin when the content of chloride (wt %) ranges from 20% to 60%.

There is the tendency that when the chlorine content becomes lower, affinity for the PP resin increases, and on the contrary, a higher content results in lower affinity.

The product obtained by copolymerizing the above-mentioned thermoplastic acrylic resin with the chlorinated polypropylene is an acryl-modified (reduced) chlorinated polypropylene resin.

When the differential scanning calorimetry (abbreviation: DSC) of the styrene-modified acrylic resin of paint #10 and ABS resin or HIPS resin was carried out with respect to their affinity, thermal adhesion properties and compatibility (miscibility). Although it was assumed that when the styrene-modified acrylic=resin and the ABS resin or HIPS resin were compatible (miscible), the transition point was changed, no change was actually recognized. The styrene-modified acrylic resin has a transition point at 235° C., and as shown in FIGS. 10 to 14, the blends of the styrene-modified acrylic resin and the ABS or HIPS resin had no transition point.

Figure 10:
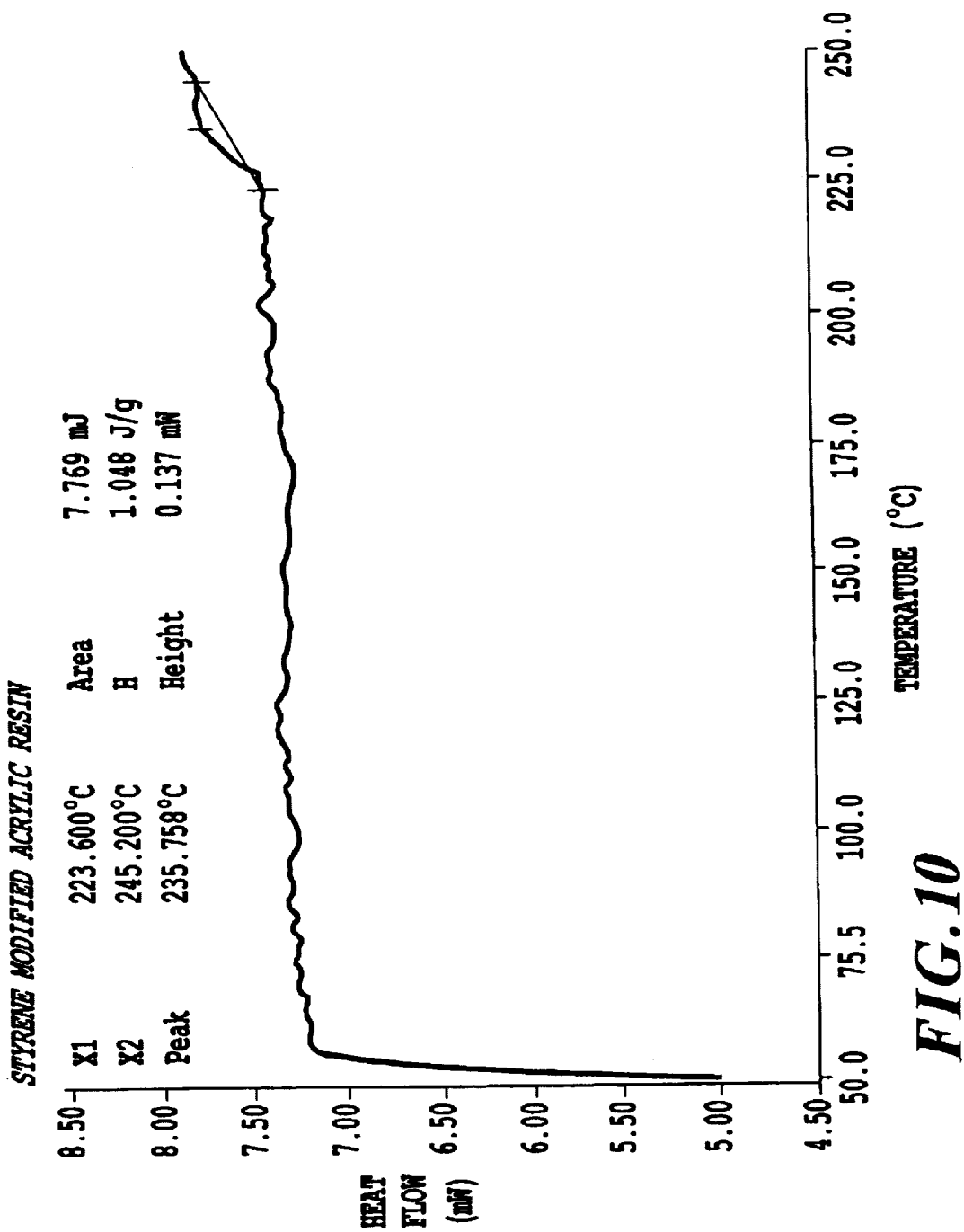
FIG. 10 is a graph showing the results of measurement of differential scanning calory of a styrene-modified acrylic resin in Examples 3, 5 and 6 of the invention.
Figure 11:
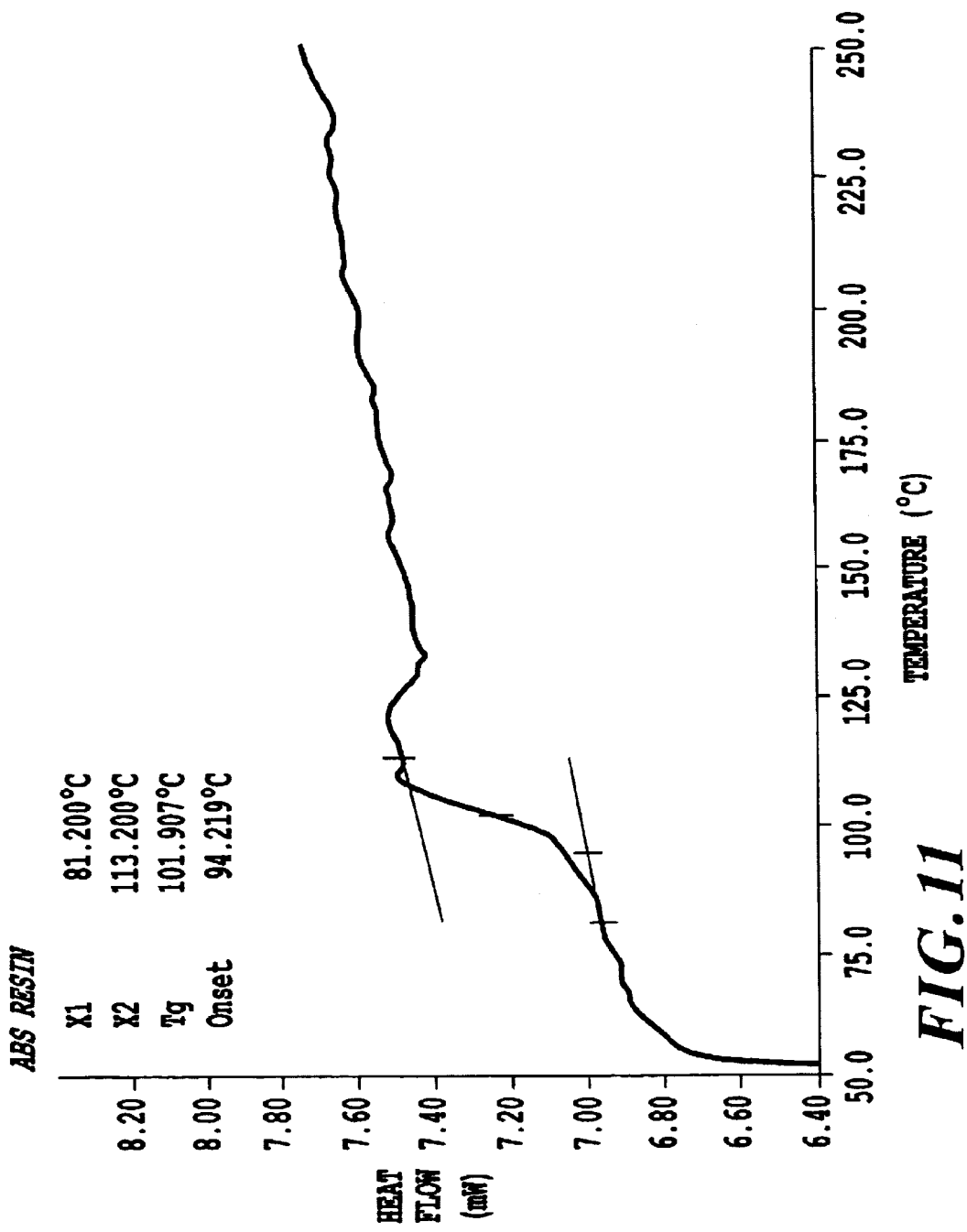
FIG. 11 is a graph showing the results of measurement of differential scanning calory of an ABS resin in Examples 4 and 5 of the invention.
Figure 12:
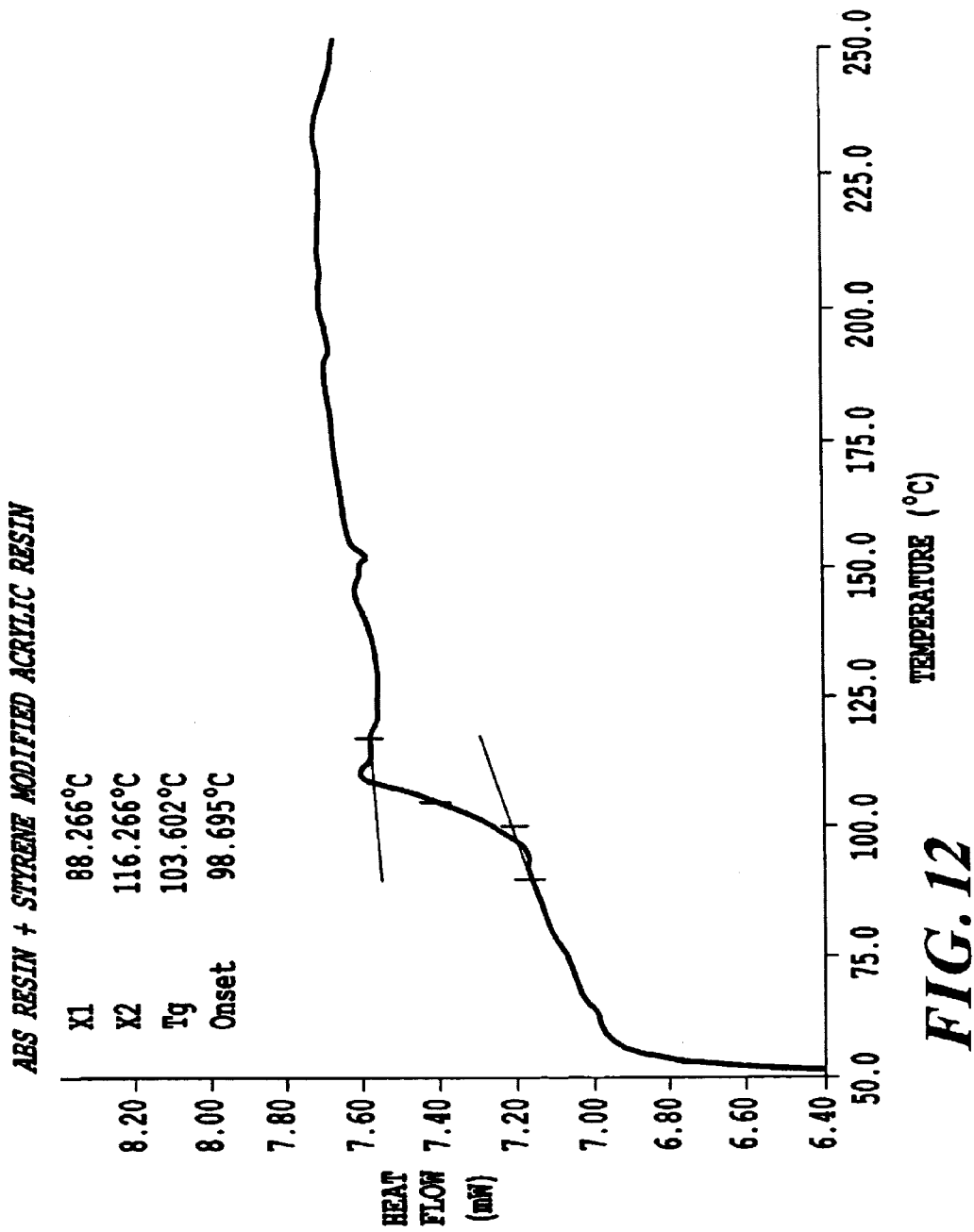
FIG. 12 is a graph showing the results of measurement of differential scanning calory which show the state of affinity between a styrene-modified acrylic resin and an ABS resin in Example 5.
Figure 13:
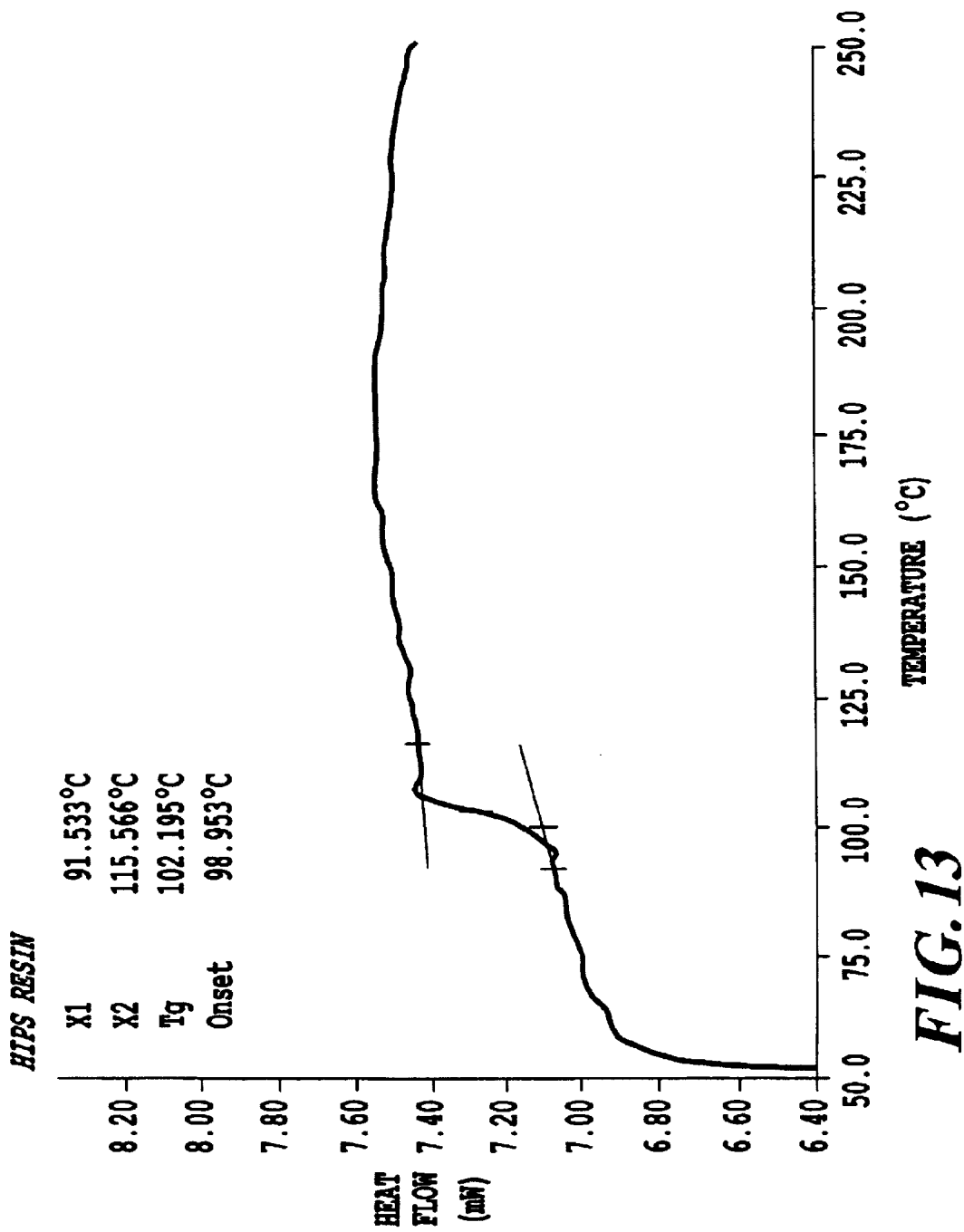
FIG. 13 is a graph showing the results of measurement of differential scanning calory of a HIPS resin in Examples 6 and 7 of the invention.

More particularly, as shown in FIG. 10, the styrene-modified acrylic resin is found to have a transition point at about 235° C. from the results of the DSC measurement. When this resin is mixed with ABS resin whose transition point is not found in the vicinity of 235° C. as shown in FIG. 11, the resultant reproduced resin exhibited no transition point in the vicinity of 235° C., as is shown in FIG. 12, although a mixing ratio of the styrene-modified acrylic resin is small.

Figure 14:
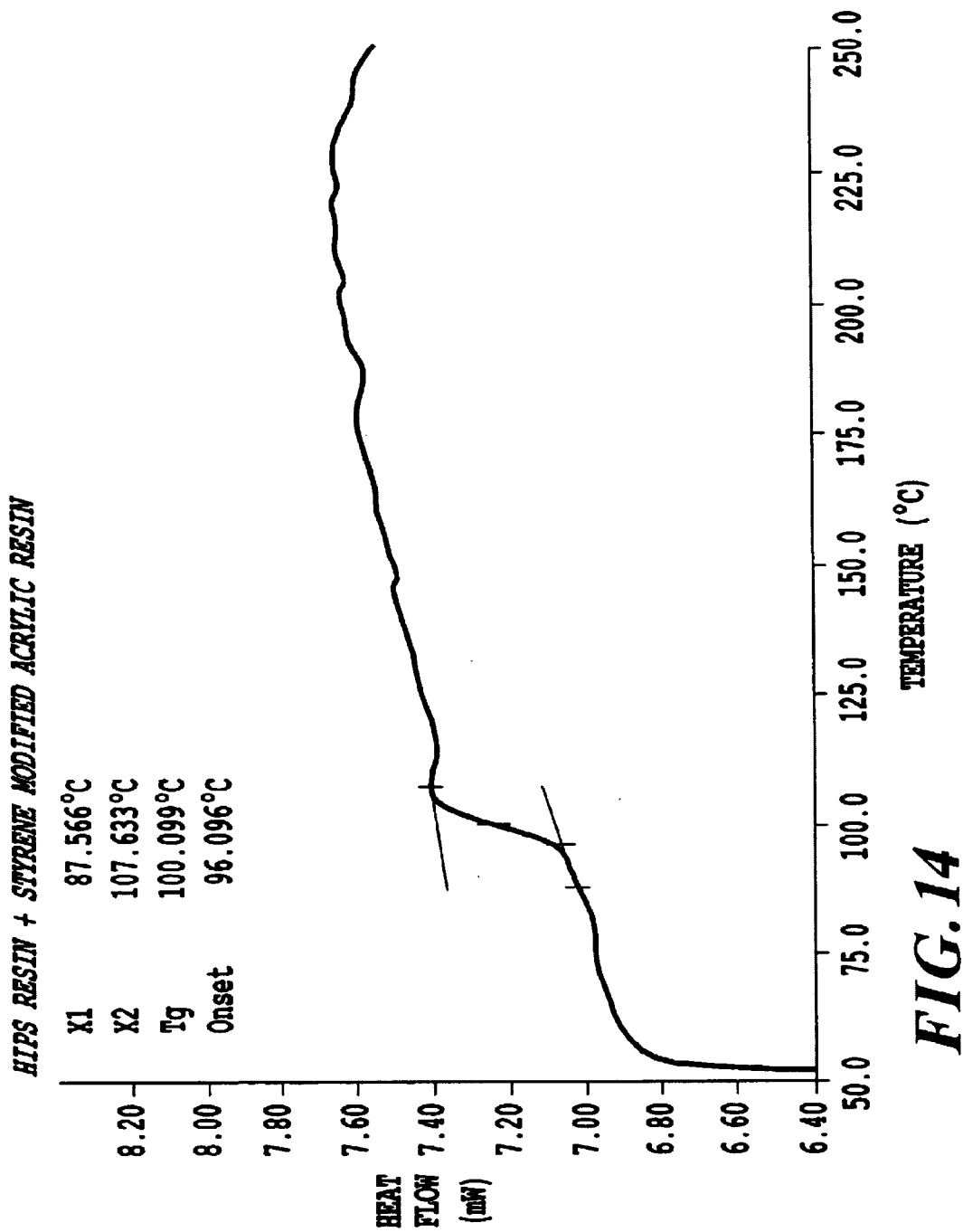
FIG. 14 is a graph showing the results of measurement of differential scanning calory which show the state of affinity between a styrene-modified acrylic resin and a HIPS resin in Example 7.

Likewise, when the styrene-modified acrylic resin of the paint is mixed with the HIP resin having no transition point in the vicinity of 235° C., no transition point appears in the vicinity of 235° C. in the resultant reproduced resin as is particularly shown in FIG. 14'.

The thermal adhesion properties and the like are described.

Where a molding resin and a paint film resin are not compatible (miscible) with each other but have mutual thermal adhesion properties and the like, several recyclings are possible. The term "thermal adhesion properties and the like" is intended to have the following meaning. When both types of resins are crushed and pelletized, they are melted by application of heat in a heating column, for example, of a single screw extruder and aREFINEly dispersed to 1000 μm or below by the physical force (where moREFINEly dispersed, it is preferred to use an extruder having a higher mixing performance, e.g. a double screw extruder). Alternatively, they are melted by application of heat in a heating column of a molding machine at the time of molding and finely dispersed by the physical force to 1000 μm or below. At any of the stages including a stage of melting both resins, a stage of solidification by cooling, and a stage after the solidification by cooling, both resins undergo thermal adhesion physical and chemical bondings, effects and characteristics such as an anchor or anchoring effect, a fastener effect, covalent bond, hydrogen bond, Van der Waals force, Coulomb force, adsorption, electrostaticity, diffusion, interfacial tension, compatibility, miscibility, viscoelasticity and the like.

As in the Japanese Laid-open Patent Application No. Hei 6-134757, when thermoplastic resins and thermosetting resins are used, both types of resins do not undergo thermal adhesion by heat at the time of the molding. The resultant recycle considerably lowers in physical properties. However, where both resins are thermoplastic in nature and undergo thermal adhesion, physical properties do not significantly lower.

A simple method of evaluating the thermal adhesion properties is as follows: different resins (i.e. molding resin and paint film resin) are mixed at a ratio by weight of 100:10, and mixed under melting conditions by means of an extruder, or a melt indexer on a laboratory scale. The resultant resin bulk is cooled and solidified, followed by making a thin slice with a thickness of several hundreds μm to several μm by means of a microtome and observation of the interface of the resins through an optical microscope or an electron microscope. If no separation is observed, it can be judged that both resins have good thermal adhesion properties and the like. Moreover, the molding or a test piece called pan cake, each obtained from the resin bulk, is subjected to a cross hatch test in a manner as described in JIS K 5400 8.4.2, whereupon when and adhesion of not less than 90/100 is attained, it can be judged that both resins have good thermal adhesion properties and the like.

The composition (formulation) of the paint is described below.

The "solvent" used in the paint includes, for examples, ones indicated below.

Hydrocarbons include normal hexane, lower aromatic compound-containing mineral spirits, toluene, xylene, turpentine oil, methylcyclohexane, ethylcyclohexane and the like.

Alcohols include methanol, ethanol, sec-butanol, tert-butanol, methylisobutyl carbinol, and the like.

Ether alcohols and ethers include methyl cellosolve, cellosolve, butyl cellosolve, tert-butyl cellosolve, 3-methyl-3-methoxybutanol, methyl carbitol, carbitol, butylcarbitol and the like.

Esters and ether esters include methyl acetate, ethyl acetate, isopropyl acetate, butyl acetate, isobutyl acetate, amyl acetate, methyl cellosolve acetate, butyl cellosolve acetate, methoxybutyl acetate, carbitol acetate, propylene glycol monomethyl ether, and the like.

Ketones include acetone, methyl ethyl ketone, methyl isobutyl ketone, cyclohexanone, diacetone alcohol, diisobutyl ketone, isophorone, and the like.

Besides, there may be mentioned water, dimethylformamide, and the like.

Further, mention may be made of supercritical fluids, and liquefied gases including inert gases such as carbon dioxide, He, Ne, Ar, nitrogen gas and the like, combustible gases such as LPG, methane, ethane, propane, butane, pentane and the like, and combustion improving gases (fuel additive gas) such as air, oxygen, chlorine and the like.

The "addition agents" capable of being added to the paint include substantially all of addition agents ordinarily used in paints. Examples are mentioned below, including plasticizers, anti-foaming agents, segregation-preventing agents, mottle preventives, lifting preventives, surface active agents, anti-skinning agents, thickeners, anti-settling agents, anti-sagging agents, anti-sag agents, preservatives, mildew-proofing agents, UV stabilizers, flame retarders, anti-staining agents, delustering agents, stabilizers for vinyl chloride resin, anti-fungus agents, and the like.

The "pigment" and "dye" are, for example, those mentioned below.

White pigments include zinc flower, antimony white, monobasic lead sulfate, white lead, titanium white, and the like.

Black pigments include carbon black, lamp black, bone black, black lead, iron black, refused toners, and the like.

Red pigments include chrome vermilion, iron red, Lake Red 4R, Carmine FB, dinitroaniline orange, Pyrazolone Orange, Pyrazolone Red, Perinone Orange, Permanent Red 2B. Lake Red 2B, BON Maroon light, Bourdeu 10B, BON Maroon Medium, Thioindigo Bourdeu, Bon Maroon L, Perylene vermilion, Perylene scarlet, Perylene maroon, Benzimidazolone Orange, and the like. Yellow pigments include zinc yellow, iron oxide yellow, titanium oxide, ochre, antimony yellow, barium yellow, monoazo pigments, diazo pigment, condensed azo pigment, isoindolinone pigment, threne pigment and the like.

Green pigments include chrome green, cobalt green, chromium oxide, cyanine green, brominated green, chrome green, and the like.

Blue pigments include ultramarine, Prussian blue, metal-free cyanine blue, indanthrene blue, cobalt blue, and the like.

Purple pigments include cobalt violet, manganese violet, quinacridone violet, quinacridone red, dioxazine violet, and the like.

Rust-proofing pigments include zinc powder, zincated lead, minium, zinc chromate, calcium zincate, STORONE-tium chromate, cyanamide lead, basic lead chromate, basic lead sulfate, MIO, and the like.

Metallic powder pigments include aluminium powder, and the like.

Extender pigments include calcium carbonate, clay, kaolin, diatomaceous earth, silica white, bentonite, talc powder, precipitated magnesium carbonate, barium sulfate, barium carbonate, and the like.

Other pigments include copper suboxide, fluorescent pigments, glass beads, litharge, micaceous titanium foil, mica powder, and the like.

Dyes include direct dyes, acid dyes, base dyes, metal-containing complex dyes, oil-soluble dyes, and the like.

The recycle aids or assistants are described.

The term "recycle aid or assistant" broadly, generically means addition agents which are added to in order to return physical properties which have been lowered during the course of recycling, or in order to change physical properties as required separately. These addition agent include fillers for thermoplastic resins, reinforcing agents, flame retarders, plasticizers, colorants, lubricants, UV absorbers, antistatic agents, metal inactivating agents, nucleating agents, neutralizing agents and antacids, age resistor, antioxidant agents, antiiozonants, foaming agents, foaming aids, stabilizers, slipping agents, internal release agents, anticlouding agents, coupling agents, preservatives, mildewproofing agents, antifungus agents, compatibilizing (miscibilizing) agents, and the like addition agents. Besides, there are included resins capable of alloying with other resins to provide resin blends having different properties. Moreover, mention is made of rubber products such as polybutadiene (abbreviation: PBD), butadiene rubber (abbreviation: BR), acrylic acid nitrile butadiene rubber (abbreviation: NBR), styrene butadiene rubber (abbreviation: SBR), ethylene propylene rubber (abbreviation: EPR), chlorinated polyethylene (abbreviation: CPE), acrylic rubber (abbreviation: AR), and high rubber ABS resin, and a-methylstyrene (abbreviation: AMR) and N-phenylmaleimide (abbreviation: PMI), both for improving a heat resistance.

It is considered that a great factor, which contributes to the physical properties in the course of recycling of thermoplastic resins, resides in that thermoplastic resins undergo heat history at the time of molding or re-pelletization, so that molecule bonds are cut to provide low molecular weight substances in large amounts.

In such a case, a virgin resin may be added to the recycle at a given ratio when re-pelletized or molded. Alternatively, a specific type of constituent among the resins may be supplemented. As will be apparent from experimental data in examples appearing hereinafter, there is a tendency of lowering Izod impact strength. In the applications wherein the lowering tendency presents a serious problem, an addition agent constituent of enhancing the impact strength, e.g. NBR (acrylic acid nitrile butadiene rubber) relative to ABS resin, or SBR (styrene butadiene rubber) relative to HIPS resin, is, in some cases, used.

The possible painting or coating methods, by which the paint is applied onto an outer surface of a resin molding or, in some cases, on inner surface thereof, according to embodiments of the invention, may be all painting methods currently employed for this purpose. Examples of the painting methods are described.

In general, "spray coating or painting" making use of a spray gun is used for painting. The spray coating includes, for example, electrostatic coating, spray coating, air spray coating, airless spray coating, airless air spray coating or the like.

Besides, coating or painting is feasible by use of brush coating, roller brush coating, dip coating, centrifugal coating, curtain flow coater coating, shower coating, roll coating, die coating, powder coating, high temperature and low temperature powder flame spray coating, fluidization dip coating, injection molding transfer coating, or the like.

As a coating method wherein a paint is charged into a mold at the time of injection molding, e.g. a method wherein a coating material is charged and coated without opening a mold, a high pressure in-mold coating method called HPIMC method has been technically developed.

Further, there have been developed methods, by the companies of Batternefeld, Warwic, Evode, Rober and the like, wherein a paint (powder) is initially injected and then an ordinary molding material (core material) is injected to attain the formation of a coating simultaneously with the injection. There are further methods called GIPT method and powder injection coating technique.

When a coating composition or paint making used of PS resin having a weight average molecular weight Mw=about 280,000 to 290,000 is sprayed from a spray gun at the time of coating, there is experienced, in some cases, a cobwebbing phenomenon owing to the great molecular weight, in which the coated surface is roughened in the form of spun sugar.

In order to solve the problem of the coated surface being roughened, it is preferred that the paint being fed is lowered in temperature by means of a temperature control unit to a given level or below, and that the ambient temperature in a place where coating is effected is controlled at 15° C. or below.

It has been confirmed that where a coating test is carried out by use of a paint comprising a PS resin having such a low molecular weight that the weight average molecular weight Mw=about 3000, no cobwebbing phenomenon occurs, thereby overcoming the problem of the coated surface being roughened. In addition, it has been confirmed that a good coated surface is obtained when an ambient temperature is at 28° C.

With a paint making use of AS resin having a weight average molecular weight, Mw=about 190,000, the cobwebbing phenomenon occurs, whereas no cobwebbing phenomenon occurs when using AS resin having a weight average molecular weigh, Mw about 3000. The results are same as those using PS resin.

From the foregoing, it will be seen that the molecular weight of a starting resin for paints takes part in the working properties of coating. Accordingly, the molecular weight of paint or coating resin should be properly selected while taking the balance of coating properties and film properties into account.

Embodiments for carrying out the invention with respect to the recycling method and apparatus are described.

The recycling method and apparatus of thermoplastic resin moldings coated with paints on the surface thereof make use of the resin particles, which are obtained by charging the molding into a crushing device to provide particles suitable for a subsequent mixing or kneading process.

Since a resin for a molding and a resin for a paint film has good affinity for each other, it is sufficient for a kneading device used to keep its backpressure to an extent not causing any surging phenomenon. To this end, although apparatus ensuring a high degree of mixing and capable of adding a high shear force, such as a multi-screw extruder, NCM, a VS kneader (VSCO kneader) and the like are usable, a high degree of mixing is not necessary, and in general, the use of a single screw extruder (single-screw extruder) or a uniaxial extruder is sufficient.

The single screw extruder is not critical with respect to the shape and type of screw, and those extruders whose screw pitches are constant or whose screw pitches are gradually reduced from a feeder section toward a metering section may all be usable. As a matter of course, an extruder having a high degree of mixing and a high shear force, e.g. a multi-screw extruder or NCM, may be used without any problem.

The recycling of moldings made of foamed resins is described. While the silver streak or swirl mark formed on the surface of moldings is prevented, adhesion properties of the paint film are improved.

Foamed products called foamed moldings cover a wide range including foamed moldings having a high expansion ratio, which are typically made of foamed polystyrene, foamed EVA, foamed PVC, foamed thermoplastic urethanes and the like, and foamed products with a low expansion ratio such as those of ABS resin and HIPS resin obtained by injection molding. These are foamed at the time of the molding according to some foaming techniques. The foaming method is broadly classified into a physical method and a chemical method. Examples of the physical foaming method include a method of foaming under mechanical agitation, and a method wherein a volatile solvent is charged into a resin melt and heated for gasification to cause foaming. On the other hand, examples of the chemical foaming method include a method wherein a chemical reaction is caused to proceed and a generating gas is utilized for foaming. In general, foaming agents are, in most cases, used from the standpoint of the ease in handling.

The foaming agents are classified into physical foaming agents and chemical foaming agents. Examples of the former physical foaming agent include inorganic liquids and gases such as (1) nitrogen gas, (2) air, (3) carbon dioxide, (4) water vapor, (5) water, and organic liquids and gases, typical of which are halogenated hydrocarbons such as (1) dichloroethane, (2) methylene chloride, and (3) flon gases.

Examples of the latter chemical foaming agents include bicarbonates such as (1) sodium bicarbonate, (2) ammonium bicarbonate and the like, carbonates such as (1) ammonium carbonate, nitrites such as (1) ammonium nitrite, azide compounds such as (1) Ca $(N_3)_2$, hydrides such as (1) sodium boronhydride, and combinations of light metals, such as Mg, Al and the like, applied with water, an acid or an alkali to generate hydrogen gas. These are inorganic foaming agents.

On the other hand, organic foaming agents include azo compounds, hydrazine derivatives, semicarbazides, azides, nitroso compounds, and triazole compounds such as (1) azodicarbonamide, (2) azobisisobutyronitrile, (3) barium azodicarboxylate, (4) dinitriosopentamethylenetetreamine, (5) p, p'-oxybis (benzenesulfonylhydrazide), (6) para-toluenesulfonylhydrazide, (7) diazoaminobenzene, (8) N,N'-dimethyl-N, N'-dinitrosoterephthalamide, (9) nitrourea, (10) acetone-p-toluenesulfonylhydroazone, (11) p-toluenesulofonylazide, (12) 2, 4-toluenesufonylhydrazide, (13) p-methylurethanebenzenesulfonylhydrazide, (14) trinitrosomethylenetriamine, (15) p-toluenesulfonylsemicarbazide, (16) oxalyl hydrazide, (17) nitroguanidine, (18) hydradicarbonamide, (19) trihydrazinotriazine, and the like.

The utilization of foamed resins as a recycle is described below.

A foamed styrol recycling material, which is used for recycling mixing pelletized styrol with another type of recycling material, is purchased by recycle makers in the form of pellets. This is because if foamed styrol is used in a crushed form, silver steaks and swirl marks are formed on the surface of recycled moldings by the action of a foaming gas or an unreacted foaming agent. The silver streaks or swirl marks lower in adherence to the molded resin. If the paint is coated, the paint film may be peeled off from the silver streaks or swirl marks.

When a melt mixed resin of foamed styrol and HIPS resin is merely molded by use of an ordinary mold, apparatus and technique, silver streaks and swirl marks are formed on the surface of the resultant molding. Where paint #10 (consisting of the formulation indicated in Tables 5 and 6 and paint #20 (consisting of the formulation indicated in Tables 3 and 4) are, respectively, coated onto the molding and subjected to a cross hatch test for evaluation of paint film adhesion properties. The results are shown in Table 68, revealing that satisfactory adhesion properties are not obtained.

Under these circumstances, once pelletized, the foamed styrol is heated and melted to remove a foaming gas therefrom or to thermally decompose an unreacted foaming agent.

The use of recycled resin pellets obtained by the pelletization is convenient. In this connection, however, in view of the economy of costs required for the pelletization, a product obtained by crushing foamed styrol, as it is, in the form of pieces to an extent of about 10 $cm^3$ without pelletization and HIPS resin are mixed at a ratio by volume of 10:90 by means of an auto collar device, followed by charging into a heating cylinder of an injection molding machine, melt mixing, and injection into a mold to obtain moldings.

The foaming gas or a gas generated from an unreacted foaming agent is dissolved under pressure in the resin melt in the heating cylinder of the molding machine by application of a back pressure at about 30 $kg/cm^2$ in terms of a molding machine gauge pressure when the resin is weighed. In order to prevent the resin melt from sagging (called "sniveling" on the spot) from a nozzle by application of the back pressure at about 30 $kg/cm^3$ or by the pressure of a foaming gas being generated, a hydraulic actuated shut-off nozzle is used, for example, as the nozzle. Besides, nozzles capable of preventing the "sniveling" may all be usable including a pneumatic-actuated shot-off nozzle, a hydraulic actuated hot rubber valve gate (e.g. a hot rubber system, made by Mold Masters Co., Ltd.), a pneumatic actuated hot rubber valve gate (a hot runner system, made by Husky Corp.), a spring-type hot rubber valve gate (made by Saito Giken Co., Ltd.), and the like.

Without resorting to such devices as mentioned above, the "sniveling" does not occur when the melt is weighed while applying a backpressure under nozzle-touched conditions. This is because when a molding is placed in a mold, a sprue is filled in a sprue bush. Accordingly, molding is possible in an open nozzle.

In the case where an expansion ratio is 1.5 or over, foamed resin moldings are reduced in volume and recycles to enhance working properties. This embodiment is particularly described below.

The volume reduction is performed by various methods including a method of thermally melting moldings by compression pressing, hot pressing, hot compression pressing, hot melting, or immersion in hot water, a method wherein the molding is placed in a solvent therefor, evaporated to dryness, and freeze-dried, a method where a foamed molding is placed in a closed container and pressurized to a level higher than an atmospheric pressure to reduced the volume, and a method wherein a foamed molding is placed in a closed contained and heated simultaneously with the pressurization to a level higher than an atmospheric pressure to melt the molding, thereby reducing its volume.

The method and apparatus for reproducing coated moldings by recycling covers, cases, boxes and the like of duplicators, printers and facsimiles (hereinafter referred to as "OA machines"), domestic appliances, building materials and the like, which are collected from the market, are described.

The QA machines collected from the market are disassembled and separated into re-usable parts and non-re-usable parts. The re-usable parts are, in fact, re-used and the non-re-usable parts are replaced by fresh ones to inexpensively return to the market. This is systematically established. Such a system is called "re-use" in Japan.

The paint used for the plastic cover is usually made of thermosetting urethane paint. The paint film is thermosetting in nature, so that if machines are recovered for the re-use and the plastic cover is recycled after crushing and pelletization, the step of removing the paint film is necessary. However, if paint for the coating is made of a thermoplastic paint which can be recycled, the removal of the paint film is not necessary for the recycling.

In the method and apparatus for reproducing daringly moldings in this embodiment of the invention, a toner, dirt or hand stain attached to the plastic cover of the machine is removed, and a thermoplastic paint is coated in order to make a good appearance, thereby ensuring recycling without removal of the paint film.

The molecular weight and composition of paint are described.

For instance, paint #10 and paint #149 serving as recycle paint are compared with each other. The thermoplastic resin used in paint #10 and paint #149 is constituted of a styrene-modified acrylic resin, which is a kind of modified acrylic resin.

The term "modified" mainly means copolymerization and, besides, grafts polymerization or resin blend. The styrene-modified acrylic resin is mainly composed of a so-called "styrene/MMA/(meth) alkyl ester" copolymer (resin) wherein styrene, MMA and (meth) alkyl ester are regularly or irregularly bonded together. The properties depend on the mixing ratios (usually called modification ratios) of styrene and MMA or/and (meth) alkyl ester.

The styrene-modified acrylic resin having a greater ratio of the acrylic component exhibits higher hardness, water resistance, chemical resistance and weatherability, but becomes brittle with poor impact and heat cycle resistances. On the other hand, if the ratio of the acrylic component is smaller, the above defects disappear. Although the hardness and the resistances to water and chemicals lower, the coatability becomes better.

In general, thermoplastic resins are obtained by polymerizing one or more monomers. Polymerizable monomers may be any ones capable of being polymerized and include styrene, hydroxyl group-containing polymerizable monomers, carboxyl group-containing polymerizable monomers, and other polymerizable monomers.

For the preparation of such a thermoplastic acrylic resin as mentioned above, ordinary polymerization methods are used, and particularly, a solution polymerization method and an emulsion polymerization method are suitable.

Typical examples of the polymerizable monomers are exemplified, including monoesters of (meth) acrylic acid and monovalent alcohols having from 1 to 20 carbon atoms, such as methyl (meth) acrylate, ethyl (meth) acrylate, butyl (meth) acrylate, isobutyl (meth) acrylate, 2-ethylhexyl (meth) acrylate, lauryl (meth) acrylate, and the like, styrene, (meth) acrylamide, dimethylacrylamide, N,N-dimethylpropylacrylamide, (meth) acrylnitrile, butadiene, and the like.

Typical examples of the hydroxyl group-containing polymerizable monomers include 2-hydroxyethyl acrylate, 2-hydroxyethyl acrylate, hydroxypropyl acrylate, hydroxypropyl methacrylate, and the like.

Typical examples of the carboxyl group-containing polymerizable monomers include not only (meth) acrylic acid, crotonic acid, itaconic acid, maleic acid and the like, but also various types of unsaturated dicarboxylic acid monoesters such as itaconic acid, maleic acid and fumaric acid.

Typical other types of polymerizable monomers, which are mentioned by limitation only to glycidyl group-containing polymerizable monomers, include glycidyl acrylate, glycidyl methacrylate, and the like.

Methyl methacrylate polymer (methacrylic resin) had a high glass transition point (hereinafter referred as "Tg") and good hardness and water resistance, but is poor in impact resistance, adhesion properties and heat cycle resistance. In order to improve the physical properties of the film, a higher alkyl methacrylate or a higher alkyl acrylate is copolymerized which results in the lowering of hardness and water and chemical resistances.

The modified acrylic resins include, aside from the above-stated styrene-modified acrylic resin, those resins modified with alkyd, vinyltoluene, thermoplastic epoxy resin, thermoplastic urethane resin, vinyl acetate, rosin, vinyl chloride, halogens such as chlorine, and the like. Apart from the above-mentioned modifications, these may be combined to provide, for example, styrene-modified chlorinated acrylic resin, styrene-urethane-modified acrylic resin, alkyd-modified styrenated acrylic resin, and the like. Accordingly, the modified acrylic resins generically include all materials or compounds obtained by bonding with acrylic group.

The paint resin for moldings constituted of polypropylene resin includes, aside from chlorinated polypropylene resin, acryl-modified polypropylene resin, and those resins modified with styrene, vinyltoluene, vinyl acetate and the like. Besides, as mentioned above, there maybe used modified polypropylenes obtained by bonding (graft polymerizing or copolymerizing) such urethane resin, alkyl resin or vinyl chloride with resins, which are obtained by bonding reactive radicals with polypropylene resin.

In this way, those resins as mentioned above can be prepared by a multitude of combinations having different modification ratios, and the recycling properties change depending on the modification ratio. In fact, the modified acrylic resin exhibits good recycling properties against ABS resin and HIPS resin, and the modified polypropylene resin exhibits good recycling properties against related polypropylene resin, polyethylene resin and ordinarily called olefin resins. Although these resins are mixed in small amounts, no problem arises. However, if the modification ratio increases, the recycling properties may lower although depending on the type of modifying material (radicals).

With regard to Paint #10 and paint #149, paint #10 and paint #149 both exhibit perfect recycling properties against ABS resin, HIPS resin and styrene-modified PPO (E) resin.

The great difference between paint #10 and paint #149 resides in the solubility of the paint film in solvent, and it is considered that this difference is principally ascribed to the difference in the molecular weight.

The weight average molecular weight (Mw) of the styrene-modified acrylic resin for the paint #10 is 17,000 with a number average molecular weight (Mn) of 34,000. On the other hand, the styrene-modified acrylic resin for paint #149 has a weight average molecular weight (Mw) of 30,000 and a number average molecular weight (Mn) of 60,000, which is about double the former. This is considered to cause the great difference. In fact, when the molecular weight is great, the molecules are more entangled and with the result that it is assumed that a solvent resistance increases.

The coatability (generically meaning the state of a film at the time when a paint diluted with a solvent is sprayed from a spray gun in the form of a mist, and the misted paint is deposited on a surface to be coated to provide a film (film formation), the ease in the capability of misting when the paint is sprayed from the spray gun at the time of coating, and the mist size) differs depending on the molecular weight.

The weight average molecular weight approximately ranges from 10,000 to 60,000, preferably from 20,000 to 40,000. A resin whose molecular weight is lower than 10,000 is not satisfactory with respect to a resistance to chemicals. On the other hand, a resin having a molecular weight higher than 60,000 presents a problem on coating operations, e.g. such a cobwebbing phenomenon as mentioned before, and a satisfactory paint film cannot be obtained. In practice, when the molecular weight is small, good coatability is attained, but a greater molecular weight tends to deteriorate the coatability.

Although depending on the field of application, resins having a molecular weight ranging from 3,000 to 150,000 may be usable. In coating methods other than the spray coating, the range of the molecular weight may differ and becomes wider. Some coating methods are feasible irrespective of the molecular weight.

If a styrene-modified acrylic resin has too high a molecular weight and is thus viscous, webbing may occur on coating. As is shown in Table 139, the webbing can be appropriately prevented when using a mixed solvent containing a high boiling solvent, e.g. cyclohexanone, diacetone alcohol, isophorone or the like, in an amount of 1% to 20%, preferably 3% to 10%. Eventually, resins having a weight average molecular weight of 1,000 to 100,000 can be used.

Besides, in order to solve the above problem, addition agents such as a surface conditioner may be added to the paint, or two or more kinds of paint resins may be mixed. In fact, it has been found that when a styrene-modified acrylic resin for paint #149 is mixed with paint #10, paint #10 exhibits an improved chemical resistance. Further, when a greater amount of the styrene-modified acrylic resin for paint #149 is mixed, the chemical resistance is more improved. Besides, in order to improve the chemical resistance, modification (reduction) with a chemical-resistant resin, e.g. nitro cellulose or a vinyl chloride copolymer, enables to improve the chemical resistance to an extent. However, when a content of a vinyl chloride copolymer or the like increases, affinity for molding resins becomes poor, thus impeding recycling properties. Modification (reduction) of resins, which exhibit poor affinity for molding resins, places a limit thereon.

Aside from the above-stated methods, it nay occur to use a method wherein a large amount of a solvent is charged so as to lower the viscosity of paint. When using a viscosity suitable for coating, a solid content is so small that the resultant film becomes unsatisfactory with respect to its appearance and build. In order to attain a desired appearance, a greater number of coating cycles has to be repeated (with the need of wet-on-wet coating).

The relation between the weight average molecular weight of a pain and the boiling point of a solvent is as shown in Table 139, revealing that a greater molecular weight leads to the use of a higher boiling solvent.

The glass transition point (Tg) of styrene-modified acrylic resin should preferably be in the range of 20° C. to 80° C. If Tg is lower than 20° C., such a resin is not satisfactory with respect to the surface tackiness and staining properties. On the contrary, when Tg is higher than 80° C., there is the tendency that cracks are liable to occur.

In order to carry out recycling, problems arise not only in the structure or form of a paint film thermoplastic resin and a thermoplastic resin used as a main constituent of a molding, but also in that when the paint film thermoplastic resin is mixed with the thermoplastic resin serving as a main constituent of a molding, how far the physical and chemical properties lower.

In the case where the paint film thermoplastic resin shows a sea-island structure or other structures in the thermoplastic resin for a main constituent of a molding, the size of the islands, which is 10 μm or below, is expressed as having compatibility, which is distinguished from the case of the structure with a size of 10 μm or over which has been indicated as showing affinity. Where the paint film thermoplastic resin is dispersed to provide a sea-island structure or other structures in a thermoplastic resin used as a main constituent of a molding, the ideal morphological structure is ideally "spherical" in shape. When the particles of the paint film thermoplastic resin is elongated (in the form of an ellipse), it is preferred that the aspect ratio is in the range of 0.2 (with a minor diameter i.e. breadth of 0.2 and a major diameter i.e. length of 1) to 1 (with a minor diameter of 1 and a major diameter of 1. Depending on the field of application, the mixture with an aspect ratio of approximately 0.1 or below may withstand use.

EXAMPLES

The invention is described by way of examples.

Example 1

In the method of preparing a paint in Example 1, AS resin for injection molding, made by Denki Kagaku Kogyou K. K., (commercial name and grade: AS-EXB (color: natural color)) was charged into a mixed solvent of toluene and butyl acetate at 1:1 while agitating in a dispersion device so as to make a solid content of 30%, followed by dissolution under further agitation for 5 hours to obtain vanish (A).

Subsequently, starting materials indicated in Table 1 were mixed and agitated for 20 minutes beforehand by means of a dispersion device to provide a mill base, followed by dispersion by means of a three-roll mill to a particle size of 10 μm. The thus dispersed mill base was dissolved by addition of materials indicated in Table 2 to obtain paint #30 (color: beige).

Example 2

In the method of preparing a paint in Example 2, PS resin for injection molding, made by Asahi Chemical Industry Co., Ltd., (commercial name and grade: STYRON 685 (color: natural color)) was charged into a mixed solvent of toluene and butyl acetate at 1:1 while agitating in a dispersion device so as to make a solid content of 30%, followed by dissolution under further agitation for 5 hours to obtain vanish (B).

Subsequently, starting materials indicated in Table 3 were treated in the same manner as in Example 1, followed by addition of materials indicated in Table 4 to the resultant mill base and dissolution to obtain paint #20 (color: beige)

Example 3

Vanish (C) consists of a styrene-modified acrylic resin varnish having a solid content of 50% and made by Dainippon Ink and Chemicals Inc., (commercial name: ACRYDIC A-157).

In the method of preparing a paint of Example 3, materials indicated in Table 5 were mixed and agitated beforehand in a dispersion device for 20 minutes to obtain a mill base, followed by dispersion by means of a three-roll mill to a particle size of 10 μm. The thus dispersed mill base was dissolved by addition of materials indicated in Table 6 to obtain paint #10 (color: beige) Thinner for dilution was one having such a formulation as indicated in Table 7.

Example 4

The recycling method and apparatus of Example 4 are described below.

In the recycling method and apparatus of Example 4, a front cover of a plain paper copier (PPC) was used for molding and its outer surface is coated for the reproduction.

The front cover has a length of 600 m, a height of 30 mm and a width of 450, with an average thickness of 3.5 mm. This cover was molded according to a gas-assisted molding technique (AGI molding method of Asahi Chemical Industry Co., Ltd.), as shown in FIGS. 1, 2 (C) and 3 (C), using a mold and ABS resin (ABS resin of Asahi Chemical Industry Co., Ltd., with a commercial name and a grade of STAYLAC 191F and with a white color) as a molding material, and also a 850 tons injection molding machine.

The gas-assisted molding apparatus based on the gas-assisted molding method is so arranged that, as shown in FIG. 1, pellets charged into a hopper 11 is heated in a cylinder 10, melt mixed, and injection molded by means of a screw 12 via a nozzle 13 into a cavity 14 within a mold 140. At the same time, for example, a high pressure nitrogen gas fed from a gas unit 16 is controlled in its pressure by means of a control panel 15, and the gas is charged into the inside of the resin charged in the cavity 14 from the center of the nozzle 13 via a gas nozzle 17, thereby assisting the resin melt to be uniformly forced against the cavity 14.

Figure 3A:
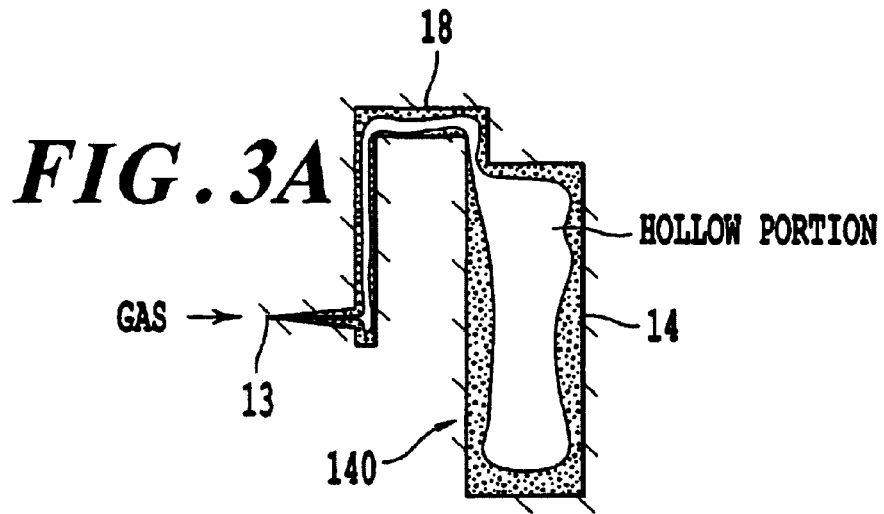
FIGS. 3A to 3C are, respectively, illustrative views illustrating gas injection into a nozzle, a runner and a cavity in the gas-assisted molding according to the embodiment of the invention.
Figure 3B:
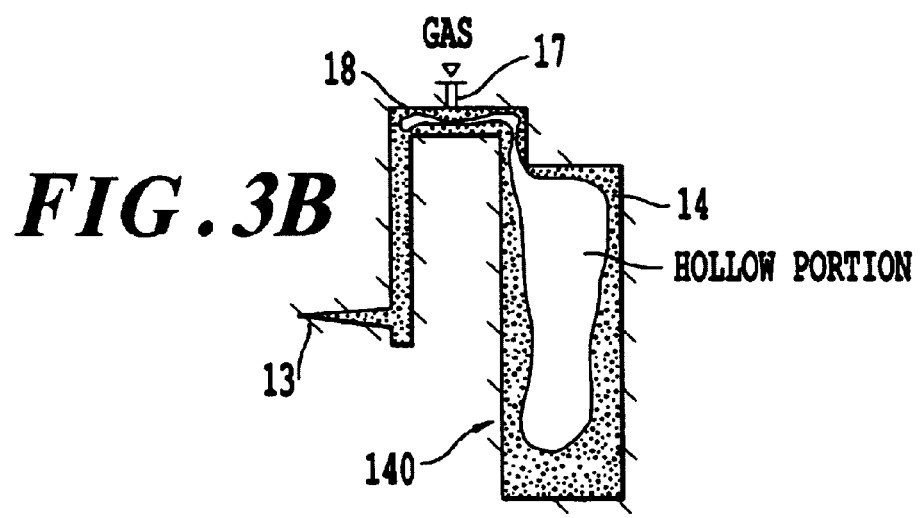
Figure 3C:
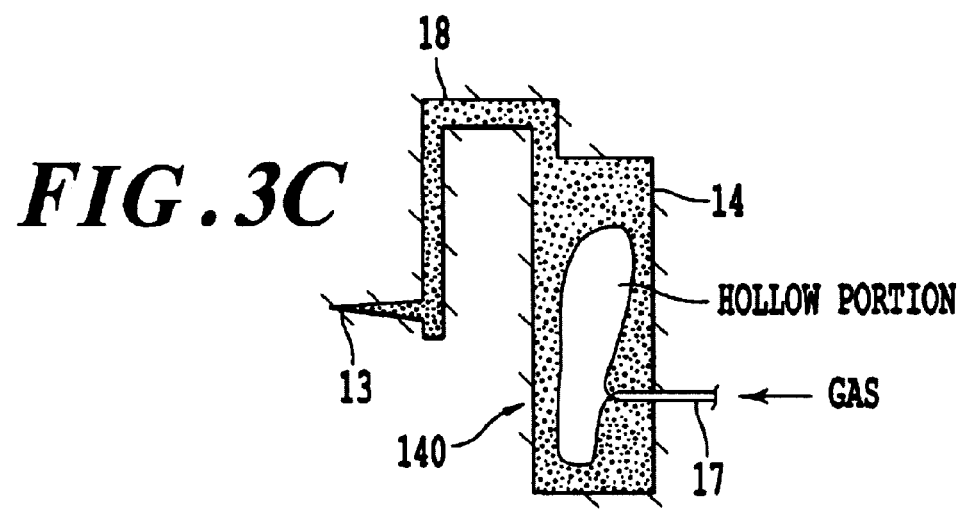

FIG. 1 shows an example where the gas is charged into the cavity through the nozzle 13. As shown in FIGS. 2 and 3, a gas may be fed to a runner 18, or a gas may be directly fed to the cavity 14, if necessary. In this example, the direct feed of a gas into the cavity 14 as shown in FIGS. 2(C) and 3 (C) is adopted.

Separately, thinner S1 indicated in Table 7 was further added, as a solvent, to paint #30 of Example 1, followed by adjusting the viscosity of the paint to 15 seconds when determined by use of Iwata's NK-2 cup at a paint temperature of 20° C. A spray gun, made by Iwata K. K. (W-71-3G, which is hereinafter referred to simply as spray gun) and shown in FIG. 4, was used to coat the molding obtained in such a way as set out above at an air pressure of 3 to 4 kg/cm$^2$. After setting for 2 minutes or over, the coated molding was placed in an electric hot air drying furnace and dried at an atmospheric temperature of 70° C. for 30 minutes. The dry film thickness was found to be 17±3 μm.

Figure 4:
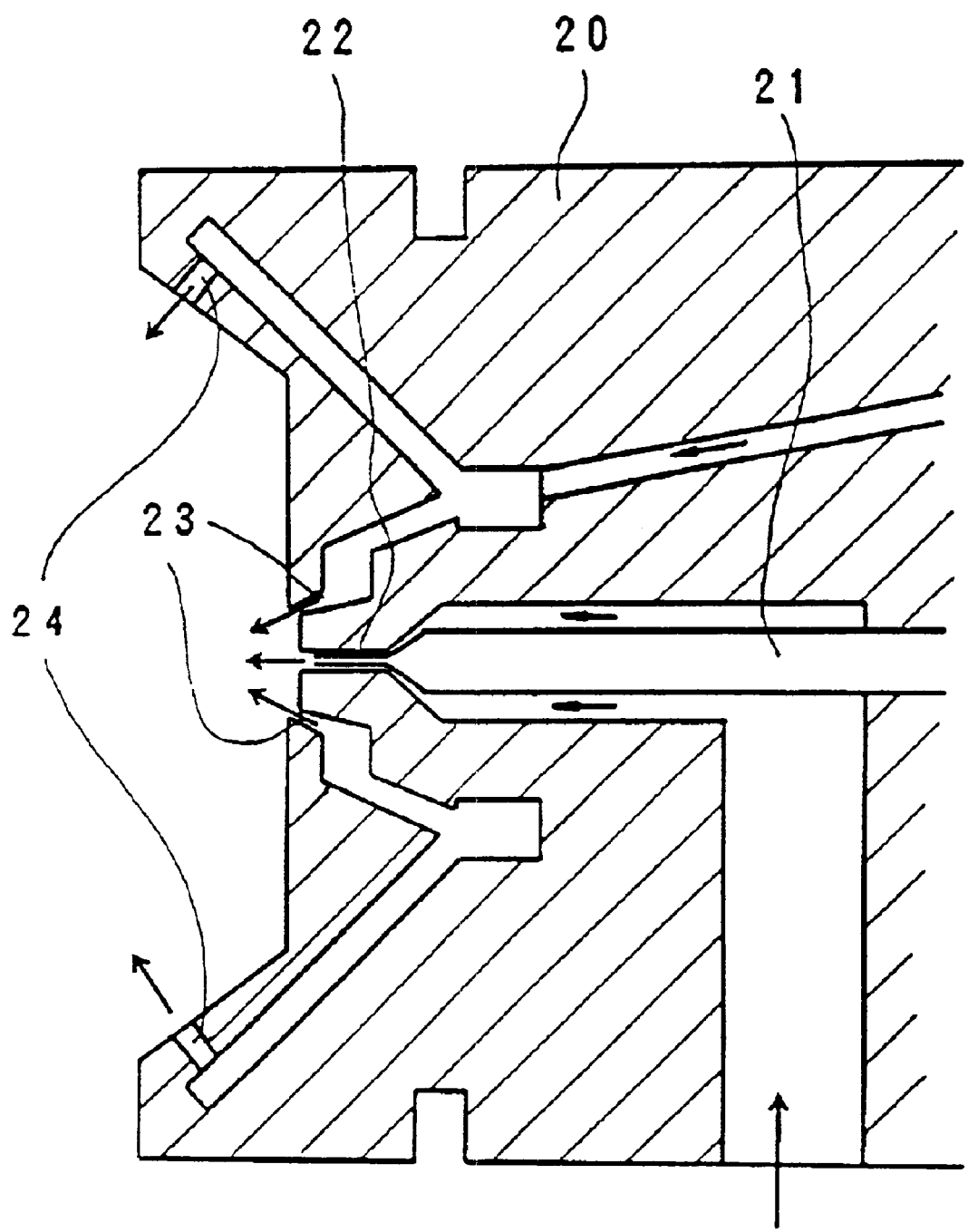
FIG. 4 is an enlarged, sectional view showing paint and an air jet nozzle in a spray gun according to an embodiment of the invention.

As shown in FIG. 4, the spray gun includes a body 20, a needle valve 21 which is detachably provided within the body 20, a paint nozzle 22 inserted with the needle valve 21 and capable of spraying a fed spay, central discharge ports 3 capable of blowing off, in the form of a mist, the paint jetted around the paint nozzle 22 and along the outer peripheral walls in the form of a cone, and a pattern control discharge port 24 for controlling a spray pattern of the paint. The resin molding is coated on the surface thereof with the paint in a given spray pattern.

Subsequently, a crusher (Model KMA-700 with 75 horsepowers (55 kW) (hereinafter referred to merely as "crusher"), made by Ohta Ind. Cop., Ltd.) was used to crush the molding into pieces having a size of 20 mm or below.

The crushed pieces were melt mixed by use of a single screw extruder (Model: SV65) (hereinafter referred to merely as "extruder), made by Nakagata Seisakusho K. K. and shown in FIG. 5. The temperatures of the cylinder were set from the head at 255° C., 250° C., 245° C., 240° C. and 235° C., respectively. Two 40 mesh screens were inserted into a cylinder head section. Thereafter, the mixture was pelletized by use of a pelletizer, made by Chuou Seiki K. K. (Model: VC618) (hereinafter referred to merely as "pelletizer") to obtain pellets having a diameter of 1.6 mm to 2.1 mm and a length of about 3.5 mm).

Figure 5:
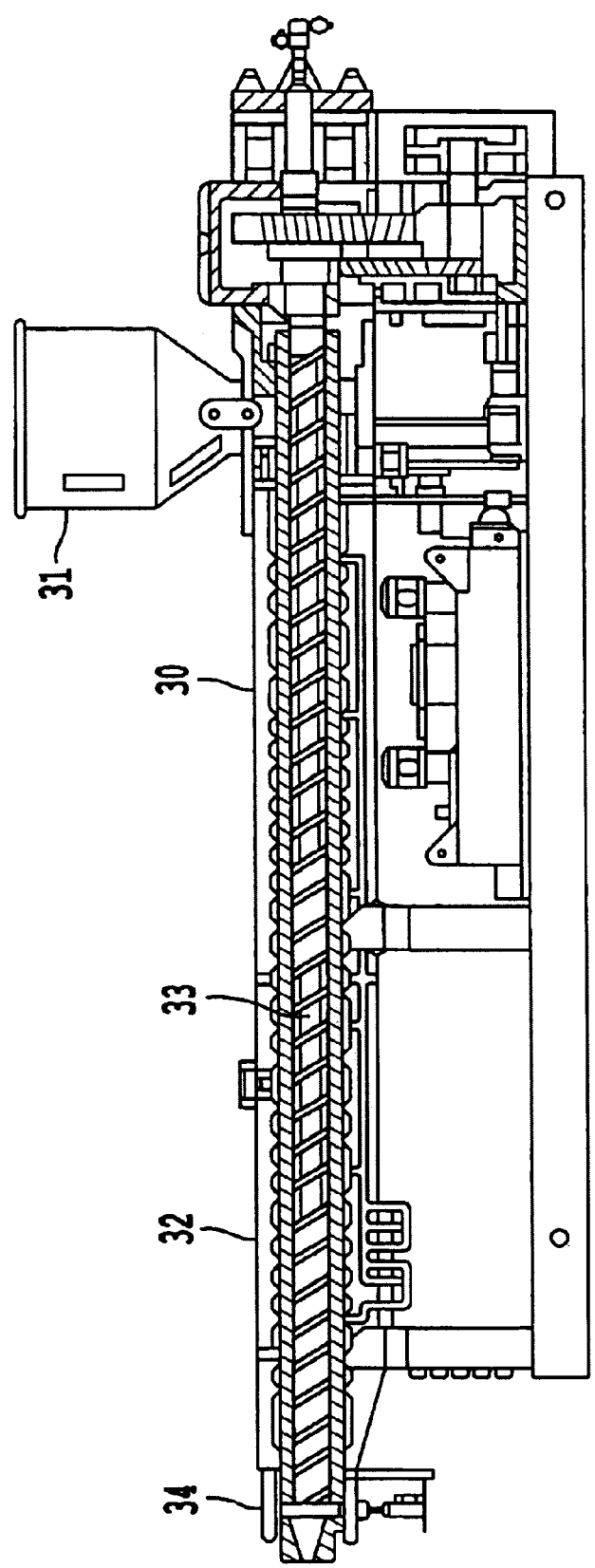
FIG. 5 is a sectional view showing a single screw extruder according to an embodiment of the invention.

The single screw extruder includes, as shown in FIG. 5, a hopper 31, into which a crushed resin molding is charged, a coiled heater 32 provided within a cylinder 30 and capable of heating the charged resin molding to melt, and a single screw for mixing and extruding the molten resin via a die 34.

The pelletized molding material (i.e. a material obtained by crushing the coated resin molding, melt mixing and palletizing) is subjected to molding by use of the same mold and molding apparatus as set out above. In this way, recycling of a molding material is repeated three cycles including molding, coating, crushing and pelletizing (called first cycle or first turn), then re-molding, coating, crushing and pelletizing (second cycle or second turn), and finally again re-molding, coating, crushing and pelletizing (third cycle or third turn).

The recycling properties of the resultant molding material, which has been subjected repetition of the above cycles were determined according to testing methods of molding materials shown in Table 8 and also according to the testing methods of the appearances of paint film and ink film and performances of paint film and ink film shown in Table 9. The results of the tests are shown in Table 10.

In Table 10, *2) shows measurements of physical and chemical properties of a fresh molding resin initially used for molding (i.e. a molding material purchased from a material maker and called "virgin material or V material").

In Table 10, *3) shows measurements of physical and chemical properties of a molding material obtained by crushing palletizing a molding made of a virgin material, and the results of tests on coatability and film properties when the above-mentioned molding material is molded into a molded article and coated with a recyclable paint. (The cycle of molding is at 2, the cycle of re-pelletization is at 1, and the cycle of recyclable coating is at 1.)

In Table 10, *4) shows measurements of physical and chemical properties of a molding material after crushing and pelletization of the coated molding of *3). Further, there are also shown the results of tests on coatability and film properties at the time when the above molding material is molded into a molded article, on which a recyclable paint is coated. (The cycle of molding is at 3, the cycle of re-pelletization at 2, and the cycle of recyclable coating at 2.)

In Table 10, *5) shows measurement of physical and chemical properties of a molding material obtained by again crushing and palletizing the molded article of *4). Further, there are also shown the results of tests on coatability and film properties at the time when the above molding material is molded into a molded article, on which a recyclable paint is coated. (The cycle of molding is at 4, the cycle re-pelletization at 4, and the cycle of recyclable coating at 3.)

Example 5

The recycling method and apparatus of Example 5 were such that there were used the same molded article, molding material, molding apparatus, coating machine, and recycling apparatus as in Example 4, but paint #10 (wherein thinner S2 of Table 7 was used as a solvent) was employed as a coating paint. The number of molding cycles, the testing methods of a molding material, the appearance of paint film ink film, and the testing method of the properties of paint film•ink film were carried out or determined according to the methods set out in Tables 8 and 9 in the same manner as in Example 4.

Example 6

The recycling method and apparatus of Example 6 were such that there were used the same molded article as used in Example 4, but using HIPS resin (HIPS resin of Asahi Chemical Industry Co., Ltd. with a commercial name and a grade of STYRON 492 and with a white color) as a molding material, in which the same molding apparatus, coating machine and recycling apparatus as used in Example 4 were also used. Paint #20 (wherein thinner S1 of Table 7 was used as a solvent) was employed as a paint. The molding cycles, the testing method of the molding material, the appearance of paint film•ink film, and the testing method of properties of paint film•ink film were carried out according to the methods set out in Tables 8, 9 in the same manner as in Example 4.

The results of the recycling tests of the molding material subjected to the repetition of the recycling are shown in Table 12.

Example 7

The recycling method and apparatus of Example 7 were such that there was used the same molding as in Example 4, but using HIPS resin (HIPS resin of Asahi Chemical Industry Co., Ltd. with a commercial name and a grade of STYRON 492 and with a white color) as a molding material, in which the same molding apparatus, coating machine and recycling apparatus as used in Example 4 were also used. Paint #10 (wherein thinner S2 of Table 7 was used as a solvent) was employed as a paint. The molding cycles, the testing method of the molding material, the appearance of paint film•ink film, and the testing method of properties of paint film•ink film were carried out according to the methods set out in Tables 8, 9 in the same manner as in Example 4.

The results of the recycling tests of the molding material subjected to the repetition of the recycling are shown in Table 13.

Example 8

The printed molding and printing method of Example 8 were such that an ABS resin (made by Asahi Chemical Industry Co., Ltd., with a commercial name and a grade of STAYLAC 191F and with a white color) for injection molding was injection molded by use of the same injection molding machine and mold as used in the foregoing painting examples to obtain an injection molded article. All of the components indicated in Table 14 were dispersed by means of a three-roll mill to a particle size of 10 $\mu$m to obtain ink #35 (color: red) for silk-screen printing. This ink was applied onto the outer surface of the injection molded article through a 270 mesh Tetron screen so that five portions with a size of 50 mm×30 mm were printed in solid.

The results of the printability of the ink and the properties of the ink film on the thus obtained molding or molded article are shown in Table 15. The testing methods of Table 15 are accorded to those of Table 8.

In Table 15, *13) shows the results of the tests on the printability and ink film properties when silk screen printing was effected on a molding made of a fresh molding resin initially used for molding (i.e. a molding material purchased from a material manufacturer and called "virgin material or V material").

In Table 15, *14) shows the results of tests on the printability and ink film properties when silk screen printing was again effected on a molding, which is made of a molding material obtained by again crushing the silk screen printed molding of the virgin material and pelletized.

The molding solid printed with the ink was again crushed by the same crusher as used above to a size of 20 mm or below, followed by extrusion with an extruder. The temperatures of the cylinder were, respectively, set, from the head, at 255° C., 250° C., 245° C. and 235° C.

The crushed pieces were pelletized by use of a pelletizer (with a diameter of 1.6 mm to 2.1 mm and a length of about 3.5 mm), and the resultant pellets were re-molded, revealing that no foreign matter derived from the red in was recognized on or in the appearance of the molding.

Example 9

The printed molding and printing method of Example 9 were such that ink # 15 for silk screen printing, which was prepared according to the method of preparing an ink as set out in Example 8 using such a formulation as shown in Table 16, was applied onto the molding made by use of the same resin material, molding machine and procedure as in Example 8 in such a way that five portions were printed in solid through the screen in the same manner as in Example 8. The results of evaluation of the ink film on the molding are shown in Table 17.

The respective test methods in Table 17 are accorded to Table 8. The contents of *13) and *14) in Table 1 are similar to those of Example 8.

Subsequently, the molding was pelletized in the same manner as in Example 8, and the resultant pellets were again molded, revealing that no foreign matter from the red ink was recognized in or on the appearance of the molding.

Example 10

The printed molding and printing method of Example 10 were such that an injection molding resin (HIPS resin, made by Asahi Chemical Industry Co. Ltd., with a commercial name and a grade of STYRON 492 and with a white color) was molded in the same molding machine and procedure as in Example 8. The resultant molding was printed in solid at five portions thereof with ink #25 for silk screen printing, which was prepared from such a formulation as shown in Table 8 according to the ink preparation method as set out in Example 8, by use of the same screen as used in Example 8. The results of evaluation of the resultant ink film on the molding are shown in Table 19.

The respective test methods in Table 19 are accorded to Table 8. The contents of *13) and *14) in Table 19 are similar to those of Example 8.

Subsequently, the molding was pelletized in the same manner as in Example 8, and the resultant pellets were again molded, revealing that no foreign matter from the red ink was recognized in or on the appearance of the molding.

Example 11

The printed molding and printing method of Example 11 were such that an injection molding resin (HIPS resin, made by Asahi Chemical Industry Co. Ltd., with a commercial name and a grade of STYRON 492 and with a white color) was molded in the same molding material, molding machine and procedure as in Example 10. The resultant molding was screen printed with ink #15 in the same manner as in Example 8. The results of evaluation of the resultant ink film on the molding are shown in Table 20. The respective test methods in Table 20 are accorded to Table 8. The contents of *13) and *14) in Table 20 are similar to those of Example 8.

Subsequently, the molding was pelletized in the same manner as in Example 8, and the resultant pellets were again molded, revealing that no foreign matter from the red ink was recognized in or on the appearance of the molding.

The failure phenomena occurring in the course of the molding of plastics are described.

<1>Failure phenomena of moldings, which are unlikely to cope with because of their unclear causes, are those mentioned below.

(1) Scorch failure (caused by oxidation of resins or addition agents in the heating column of a molding machine)
(2) Failure by contamination foreign matter (due to the carbonized products of resins)
(3) Silver streak (caused by vaporization of volatile substances in molding surfaces)
(4) Black streak
(5) Failure in gloss
(6) Flow mark (occurring when the flow of a resin melt changes)
(7) Mottle (caused by mixing of the color of a prior molding resin)
(8) Weld mark (occurring at a position where resin flows collide with each other)
(9) Weld line (occurring at a position where resin flows collide with each other)
(10) Bloom <2>Failure phenomena of moldings, which can be overcome by improving a mold or changing the profile of a molded article

(11) Molding flash
(12) Short shot (charge failure of resin)
(13) Sink mark (a recessed surface caused by great volumetric shrinkage of resin)
(14) Voids
(15) Jetting
(16) Crazing, cracking
(17) Warpage, torsion
(18) Dimensional variation
(19) Peeling
(20) Flaws
(21) Cracks The moldings, which cause the above failures generally, have problems on use and may be, in most cases, discarded. Moldings having failures (1) to (10) among those failure phenomena may be used when coated on the surfaces thereof. However, it is conventional that most paints make use of thermosetting resins, in which when re-pelletized, the paint film presents a problem, frequently making it difficult to re-pelletize such moldings. If the paint film is peeled as stated before, re-pelletization is possible.

When using the recycling method described in the foregoing examples of the invention, these defective products can be coated to provide non-defective articles. This eventually leads to an improved yield of a molding material. Conventionally, defective moldings have been used for reclamation work, or burnt. According to the invention, defective articles may be re-utilized as non-defective articles, thus performing a role of ecological problems.

The frequency of the failure phenomena in individual molding cycles (or turns) and recycling cycles (or turns) is described in examples where combinations of molding resins and paint resins differ from each other.

Example 12

The daringly molding and recycling method of Example 12 were such that an ABS resin (made by Asahi Chemical Industry Co., Ltd., with a commercial name and a grade of STAYLAC 191F and with a white color) was provided as a molding material, and a gas-assisted injection molding method (AGI molding method) was used for molding. Paint #30 was used, and applied to according to a spray coating method (spray coating). The results are shown in Table 21.

In the table, *15) shows-the results when a molding material called a virgin material and purchased from a molding material maker was molded, *16) shows the results in case where the molding, which is obtained by molding the virgin material, is crushed and pelletized, followed by re-molding. *17) shows the results in case where the molding of *16) is coated with a recyclable pain, again crushed and pelletized, and the resultant molding pellets are molded.

Example 13

The coated molding and recycling method of Example 13 were substantially the same as in Example 12 except that only the paint was changed to paint #10. The results are shown in Table 22.

In Table 22, the contents of *15, *16) and *17) are the same as those of Example 12.

Example 14

The coated molding and the recycling method of Example 14 were such that HIPS resin (HIPS resin made by Asahi Chemical Ind. Co., Ltd. with a commercial name and a grade of STYRON 492 and also with a white color) was used as a molding resin and molded in the same molding procedure as in Example 13, and #30 was used as a paint, with the results shown in Table 23.

The contents of *15, *16) and *17) are the same as those of Example 12.

Example 16

The coated molding and the recycling method of Example 16 were such that styrene-modified polyphenylene oxide (ether) resin (abbreviation PPO(E) resin) (styrene-modified polyphenylene ether resin made by Asahi Chemical Ind. Co., Ltd., with a commercial name and a grade of Xyron 100Z with a white color) was used as a molding material, and the same type of molding as in Example 4 was molded by use of the same machine and procedure as in Example 4, followed by coating and pelletization. (It will be noted that the cylinder setting temperatures of the extruder were at 275° C., 270° C., 260° C., 250° C., and 245° C.)

The paint used was #10 *wherein thinner S2 indicated in Table 7 was used as a solvent). In Table 25, there are shown the results of the coatability and film properties in the molding of the virgin material for comparison in the respective cycles of this example. The tests were, respectively, carried out according to the methods set out in Table 8.

The molding cycles of and the frequencies of individual failure phenomena in the moldings of Example 16 are shown in Table 26.

Example 17

The coated molding and recycling method of Example 17 were such that the same molding as in Example 16 was obtained by use of the same molding material, machine and procedure as in Example 16, coated, and pelletized.

The paint used was #20 (wherein thinner S1 indicated in Table 7 was employed as a solvent).

In Table 27, there are shown the results of the coatability and the film properties in the respective cycles along with those for comparison. The test methods are according to Table 9.

The molding cycles of and the frequencies of individual failure phenomena in the moldings of Example 17 are shown in Table 27.

Example 18

The coated molding and recycling method of Example 18 were such that an ABS resin (ABS resin made by Asahi Chemical Ind. Co., Ltd., with a commercial name and a grade of STAYLAC 191 and also with a white color) was used as a molding material, and molded in the same molding machine and procedure as in Example 4.

Paint #10 (wherein thinner S2 indicated in Table 7 was employed as a solvent) was coated, after which the resultant coated molding was crushed, extruded and pelletized in the same manner as in Example 4.

On the other hand, a polycarbonate resin (PC resin made by Mitsubishi Chemical Corp., with a commercial name and a grade of IUPILON S3000 and a natural color) was provided as a molding material, and solid molded by means of a 450 tons injection molding machine to obtain a paper tray (L: 260 mm, H: 20 mm, W: 240, with a tray average thickness of 3.5 mm) for plain paper copier (PPC).

Paint #10 (wherein thinner S2 indicated in Table 7 was used as a solvent) was coated onto the resulting molding, followed by crushing by means of a crusher.

The crushed pieces were extruded by means of an extruder (wherein the temperatures of the cylinder were set, from its head, at 300° C., 290° C., 280° C., 270° C. and 265° C.), and pelletized.

The afore-indicated reproduced ABS resin pellets and the reproduced PC resin pellets were mixed at an ABS/PC mixing ratio by weight of 85/15, followed by tumbling by means of a tumbler (Model: SKD 50, made by K. K. Kawata) (hereinafter referred to merely as "tumbler") to obtain mixed pellets of ABS/PC. The mixed pellets were subjected to molding of a front cover of the same type of plain paper copier (PPC) as in Example 4. The resultant ABS/PC resin molding was coated with paint #10 (using, as a solvent, thinner S2 indicated in Table 7), followed b crushing, extrusion, and pelletization to obtain ABS/PC reproduced blend polymer pellets.

The thus obtained ABS/PC reproduced blend polymer pellets were again molded.

In Table 29, there are shown the results of coatability and film properties of an ABS resin virgin material and a PC resin virgin material, both for comparison, and the recycles of the ABS/PC blend moldings of this example. The test methods in the respective tables are accorded to Table 8.

The molding cycles of and the frequency of the respective failure phenomena in the moldings of Example 18 are shown in Table 30.

In Table 30, there are shown the states of the failure occurrences at the time of molding of the ABS resin virgin material and the PC resin virgin material, both for comparison, and the ABS/PC blend polymer (blend resin) reproduced materials of this example.

Example 19

The coated moldings and recycling method of Example 19 were such that two types of molding resins as used in Example 18 were used for molding in the same molding machine and procedure, and paint #30 (wherein thinner S1 indicated in Table 7 was used as a solvent) was employed as a paint. In Table 31, the results of coatability and film properties of an ABS resin virgin material and a PC resin virgin material, both for comparison, and the recycles of the ABS/PC blend moldings of this example.

The respective test methods in the tables are accorded to Table 8.

The molding cycles of and frequencies of the individual failure phenomena occurring in the moldings of Example 19 are shown in Table 32. In Table 32, there are shown the states of the failure occurrences at the time of molding of the ABS resin virgin material and the PC resin virgin material, both for comparison, and the ABS/PC blend polymer (blend resin) reproduced materials of this example.

Example 20

The coated moldings and recycling method of Example 20 were such that paint #10 (wherein thinner S2 indicated in Table 7 was used as a solvent) was coated onto a front cover molding and paint #30 (wherein thinner 52 indicated in Table 7 was used as a solvent) was coated onto a paper tray molding as in Example 18. Aside from the paints, the same molding material, molding machine and procedure as in Example 18 were used for molding. In Table 33, the results of coatability and film properties of an ABS resin virgin material and a PC resin virgin material, both for comparison, and the recycles of the ABS/PC blend gas-assisted moldings of this example coated with paint #10. The respective test methods in the tables are accorded to Table 8.

The molding cycles of and frequencies of the individual failure phenomena occurring in the moldings of Example 20 are shown in Table 34.

In Table 34, there are shown the states of the failure occurrences at the time of molding of the ABS resin virgin material and the PC resin virgin material, both for comparison, and-the ABS/PC blend polymer (blend resin) reproduced materials of this example.

Example 21

The coated moldings and recycling method of Example 21 were such that paint #30 (wherein thinner S1 of Table 7 was used as a solvent) was coated onto a front cover molding and paint #10 (wherein thinner S2 of Table 7 was used as a solvent) was coated onto a paper tray molding as in Example 19. Except the above, the moldings were obtained by use of the same molding material, molding machine and procedure and coated with paint #30.

In Table 35, the results of coatability and film properties of an ABS resin virgin material and a PC resin virgin material, both for comparison, and the recycles of the ABS/PC blend moldings of this example. The respective test methods in the tables are accorded to Table 8.

The molding cycles of and frequencies of the individual failure phenomena occurring in the moldings of Example 21 are shown in Table 36. In Table 36, there are shown the states of the failure occurrences at the time of molding of the ABS resin virgin material and the PC resin virgin material, both for comparison, and the ABS/PC blend polymer (blend resin) reproduced materials of this example.

Example 22

The coated moldings and recycling method of Example 22 were such that a compatibilizing (miscibilizing) agent was used when mixing ABS/PC and that the same types of molding materials as in Example 18 were used to obtain ABS/PC reproduced blend pellets in the same procedure.

In order to enhance compatibilities (miscibilities) for ABS, PC and styrene-modified acrylic resin (i.e. a thermoplastic resin forming a paint film), a compatibilizing (miscibilizing) agent of NOF Corporation (commercial name: MODIPER CH430) was added to the reproduced blend pellets at a ratio by weight of 5%. For obtaining the mixed resin, the tumbler was used.

The reproduced blend pellets were again molded in the form of a cover in the same manner as in Example 18, followed by coating with paint #30 (wherein thinner S1 of Table 7 was used as a solvent). Thereafter, the reproduction and molding were repeated in the same manner as in Example 19.

In Table 37, the results of coatability and film properties of an ABS resin virgin material and a PC resin virgin material, both for comparison, and the recycles of the reproduced ABS/PC blend moldings of this example using the compatibilizing (miscibilizing) agent. The respective test methods in the tables are accorded to Table 8.

The molding cycles of and frequencies of the individual failure phenomena occurring in the moldings of Example 22 are shown in Table 38. In Table 38, there are shown the states of the failure occurrences at the time of molding of the ABS resin virgin material and the PC resin virgin material, both for comparison, and the ABS/PC blend polymer (blend resin) reproduced materials of this example using the compatibilizing (miscibilizing) agent.

Example 23

The coated moldings and recycling method of Example 23 were such that the same molding material, molding machine, and procedure as in Example 19 were used to obtain reproduced blend pellets of ABS/PC. In order to enhance compatibilities (miscibilities) for ABS, PC and styrene-modified acrylic resin (i.e. a thermoplastic resin forming a paint film), such a compatibilizing (miscibilizing) agent as used in Example 22 was mixed the blend pellets. The reproduced blend pellets were used to mold a cover in the same manner as in Example 18, followed by coating with paint #10 (wherein thinner S2 of Table 7 was used as a solvent). Thereafter, the reproduction and molding were repeated in the same manner as in Example 18.

In Table 39, the results of coatability and film properties of an ABS resin virgin material and a PC resin virgin material, both for comparison, and the recycles of the ABS/PC blend moldings of this example using the compatibilizing (miscibilizing) agent. The respective test methods in the tables are accorded to Table 8.

The molding cycles of and frequencies of the individual failure phenomena occurring in the moldings of Example 23 are shown in Table 40. In Table 40, there are shown the states of the failure occurrences at the time of molding of the ABS resin virgin material and the PC resin virgin material, both for comparison, and the ABS/PC blend polymer (blend resin) reproduced materials of this example using the compatibilizing (miscibilizing) agent.

Example 24

The coated moldings and recycling method of Example 23 were such that the same molding material, molding machine, and procedure as in Example 19 were used to obtain reproduced blend pellets of ABS/PC. In order to enhance compatibilities (miscibilities) for ABS, PC and styrene-modified acrylic resin (i.e. a thermoplastic resin forming a paint film), such a compatibilizing (miscibilizing) agent as used in Example 22 was mixed with the blend pellets.

The reproduced blend pellets were used to mold a cover in the same manner as in Example 18, followed by coating with paint #10 (wherein thinner S2 of Table 7 was used as a solvent). Thereafter, the reproduction and molding were repeated in the same manner as in Example 18. In Table 41, the results of coatability and film properties of an ABS resin virgin material and a PC resin virgin material, both for comparison, and the recycles of the ABS/PC blend moldings of this example using the compatibilizing (miscibilizing) agent. The respective test methods in the tables are accorded to Table 8.

The molding cycles of and frequencies of the individual failure phenomena occurring in the moldings of Example 24 are shown in Table 42. In Table 42, there are shown the states of the failure occurrences at the time of molding of the ABS resin virgin material and the PC resin virgin material, both for comparison, and the ABS/PC blend polymer (blend resin) reproduced materials of this example using the compatibilizing (miscibilizing) agent.

Example 25

The coated moldings and recycling method of Example 21 were such that the same molding material, molding machine, and procedure as in Example 19 were used to obtain reproduced blend pellets of ABS/PC. In order to enhance compatibilities (miscibilities) for ABS, PC and styrene-modified acrylic resin (i.e. a thermoplastic resin forming a paint film), such a compatibilizing (miscibilizing) agent as used in Example 22 was mixed with the blend pellets. The reproduced blend pellets were used to mold a cover in the same manner as in Example 18, followed by coating with paint #10 (wherein thinner S2 of Table 7 was used as a solvent). Thereafter, the reproduction and molding were repeated in the same manner as in Example 18.

In Table 43, the results of coatability and film properties of an ABS resin virgin material and a PC resin virgin material, both for comparison, and the recycles of the ABS/PC blend moldings of this example using the compatibilizing (miscibilizing) agent. The respective test methods in the tables are accorded to Table 8.

The molding cycles of and frequencies of the individual failure phenomena occurring in the moldings of Example 25 are shown in Table 43. In Table 43, there are shown the states of the failure occurrences at the time of molding of the ABS resin virgin material and the PC resin virgin material, both for comparison, and the ABS/PC blend polymer (blend resin) reproduced materials of this example using the compatibilizing (miscibilizing) agent.

Example 26

The coated moldings and recycling method of Example 26 were such that for the purpose of recycling or reproduction of PET bottles currently treated as general wastes, reproduced pellets of PET bottles collected from the market were mixed with reproduced pellets of ABS resin at a given ratio at a stage prior to molding, and used.

Reproduced ABS resin pellets, which were obtained from the cover molded of the same virgin molding material as used in Example 18, and PET resin-reproduced pellets (purchased from recycle makers), which were obtained by crushing and pelletizing PET bottles, were mixed in a tumbler at a ABS/PET ratio by weight of 85/15 to obtain mixed resin pellets of ABS/PET.

In order to prevent hydrolysis of the PET resin, the mixed pellets were dried at 80° C. for 24 hours by use of a dehumidifier dryer (Model: D-200), made by Kawata K. K.

The thus dried, mixed resin pellets were molded into a cover in the same manner as in Example 18.

The resultant moldings were coated with paint #10 (wherein thinner S2 of Table 7 was used as a solvent).

The coated moldings were crushed, extruded, pelletized and re-molded in the same manner as in Example 18. In Table 45, the results of coatability and film properties of the ABS/PET blend moldings of this example using the PET. For comparison, an ABS resin virgin material was also molded. The respective test methods in Table 45 are accorded to Table 8.

The molding cycles of and frequencies of the individual failure phenomena occurring in the moldings of Example 26 are shown in Table 46.

Example 27

The coated moldings and recycling method of Example 27 were such that Example 26 was repeated except that paint was changed to #30.

In Table 47, the results of coatability and film properties of the ABS/PET blend moldings of this example using the PET. For comparison, an ABS resin virgin material was also molded. The respective test methods in Table 47 are accorded to Table 8.

The molding cycles of and frequencies of the individual failure phenomena occurring in the moldings of Example 27 are shown in Table 47.

Example 28

Recycling of PMMA Resin

The coated moldings and recycling method of Example 28 were such that for the purpose of recycling of PMMA resin moldings used for tail lamps of vehicles currently treated as general wastes, reproduced pellets of the tail lamp moldings collected from the market were mixed with reproduced pellets of ABS resin at a given ratio at a stage prior to molding, and used.

In this example, Example 26 was repeated except that the PMM resin reproduced pellets, which were obtained by crushing the tale lamp moldings of vehicles and pelletized, (purchased from recycle makers) were used in place of the PET resin.

In Table 49, the results of coatability and film properties of the ABS/PMMA blend moldings of this example using the PMMA resin are shown. For comparison, an ABS resin virgin material was also molded. The respective test methods in Table 49 are accorded to Table 8.

The molding cycles and frequencies of the individual failure phenomena occurring at the time of molding of the ABS/PMMA mixed resin in Example 28 are shown in Table 50.

Example 29

Recycling of PMMA Resin

The coated moldings and recycling method of Example 29 were such that Example 28 was repeated except that the paint was changed to #30.

In Table 51, the results of coatability and film properties of the ABS/PMMA blend moldings of this example using the PMMA resin are shown. For comparison, a virgin material was also molded. The respective test methods in Table 51 are accorded to Table 8.

The molding cycles and frequencies of the individual failure phenomena occurring at the time of molding the ABS/PMMA mixed resin in Example 29 are shown in Table 52.

Example 30

The coated moldings and recycling method of Example 30 were such that for the purpose of recycling of foamed styrol (hereinafter referred to simply as foamed PS) currently treated as general wastes, reproduced pellets of the foamed PS collected from the market were mixed with reproduced pellets of HIPS resin at a given ratio at a stage prior to molding, and used.

In this example, Example 26 was repeated except that high impact polystyrene resin (HIPS resin, made by Asahi Chemical Ind. Co., Ltd., with a commercial name and a grade of STYRON 492 and with a white color) was used as a molding material, reproduced pellets of the foamed PS (purchased from recycling makers), which were obtained by crushing and pelletizing foamed PS, were used in place of PET, and the paint used was #10. In Table 53, the results of coatability and film properties of the HIPS/foamed PS blend moldings of this example using HIPS are shown. For comparison, a HIPS resin virgin material was also molded. The respective test methods in Table 53 are accorded to Table 8.

The molding cycles and frequencies of the individual failure phenomena occurring at the time of molding of the HIPS/foamed PS mixed resin in Example 30 are shown in Table 54.

Example 31

The coated moldings and recycling method of Example 29 were such that Example 30 was repeated except that the paint was changed to #30 (wherein thinner S1 of Table 7 was used as a solvent).

In Table 55, the results of coatability and film properties of the HIPS/foamed PS blend moldings of this example using the HIPS resin are shown. For comparison, a HIPS resin virgin material was also molded. The respective test methods in Table 55 are accorded to Table 8.

The molding cycles and frequencies of the individual failure phenomena occurring at the time of molding the HIPS/foamed PS mixed resin in Example 31 are shown in Table 56.

Example 32

The paint and a method of preparing the paint in Example 32 were such that, based on the formulation indicated in Table 57, an alcohol-soluble nylon resin made by Toray Co., Ltd. (with a commercial name and a grade of AMILAN MC8000) was charged into a mixed solvent of methanol, n-butanol and water while agitating with a dispersion device, followed by dissolution under further agitation for 5 hours to obtain varnish (D) having a solid content of 27%.

Subsequently, the materials indicated in Table 58 were beforehand mixed under agitation by means of a dispersion device for 10 minutes to provide mill base, followed by dispersion by means of a three-roll mill to a size of 10 $\mu$m. The thus dispersed mill base were added to and dissolved in the materials indicated in Table 59 to obtain paint #40 (color: beige).

Example 33

The coated moldings and recycling method of Example 33 were such that Example 4 was repeated except that styrene-modified polyphenylene oxide (ether) resin (styrene-modified polyphenylene ether resin, made by Asahi Chemical Ind. Co., Ltd. with a commercial name and a grade of Xyron 100Z and with a white color) was used as a molding material and that the paint used was paint #40 of Example 32 (wherein thinner S5 indicated in Table 60 was used as a solvent). In Table 61, the results of coatability and film properties of the moldings of this example in the respective recycles are shown. For comparison, a modified PPO(E) resin virgin material was also molded. The respective test methods in Table 61 are accorded to Table 8.

The molding cycles and frequencies of the individual failure phenomena occurring at the time of molding in Example 33 are shown in Table 62.

Example 34

The coated moldings and recycling method of Example 34 were such that Example 33 was repeated except that the molding resin was changed to ABS resin (ABS resin, made by Asahi Chemical Ind. Co., Ltd., with a commercial name and a grade of STAYLAC 191 and with a white color) and the paint consisted of the same paint #40 (wherein thinner S5 indicated in Table 60 was used as a solvent). The results of coatability and film properties of the molding of an ABS resin virgin material for comparison and the moldings of this example in the respective cycles are shown in Table 63. The test methods in Table 63 are accorded to Table 8.

The molding cycles and frequencies of the individual failure phenomena occurring at the time of molding in Example 34 are shown in Table 64.

Example 35

The coated moldings and recycled products of Example 35 were such that Example 33 was repeated except that HIPS resin (HIPS resin, made by Asahi Chemical Ind. Co., Ltd., with a commercial name and a grade of STYRON 492 and with a white color) and that the paint consisted of paint #40 (wherein thinner S5 indicated in Table 60 was used as a solvent).

In Table 65, the results of coatability and film properties of the molding of a HIPS resin virgin material for comparison and the moldings of this example in the respective cycles are shown in Table 65. The test methods in Table 65 are accorded to Table 8.

The molding cycles and frequencies of the individual failure phenomena occurring at the time of molding in Example 35 are shown in Table 66.

Example 36

The coated moldings and recycling method of Example 36 were such that moldings were obtained from a melt mixed resin of foamed PS and HIPS by use of ordinary mold, apparatus and procedure. The moldings were processed on the surfaces thereof according sandpaper finish, wire brushing or shot blasting, thereby removing silver streaks or swirl marks appearing in the molding surfaces to make a smooth surface, followed by coating.

The molding was actually subjected sandpaper finish to make a smooth surface thereof. This molding was coated with paints #10 and #20, respectively, and subjected to a cross hatch test for evaluation film adhesion properties. The results are shown in Table 69, revealing good adhesion properties.

Example 37

Figure 15:
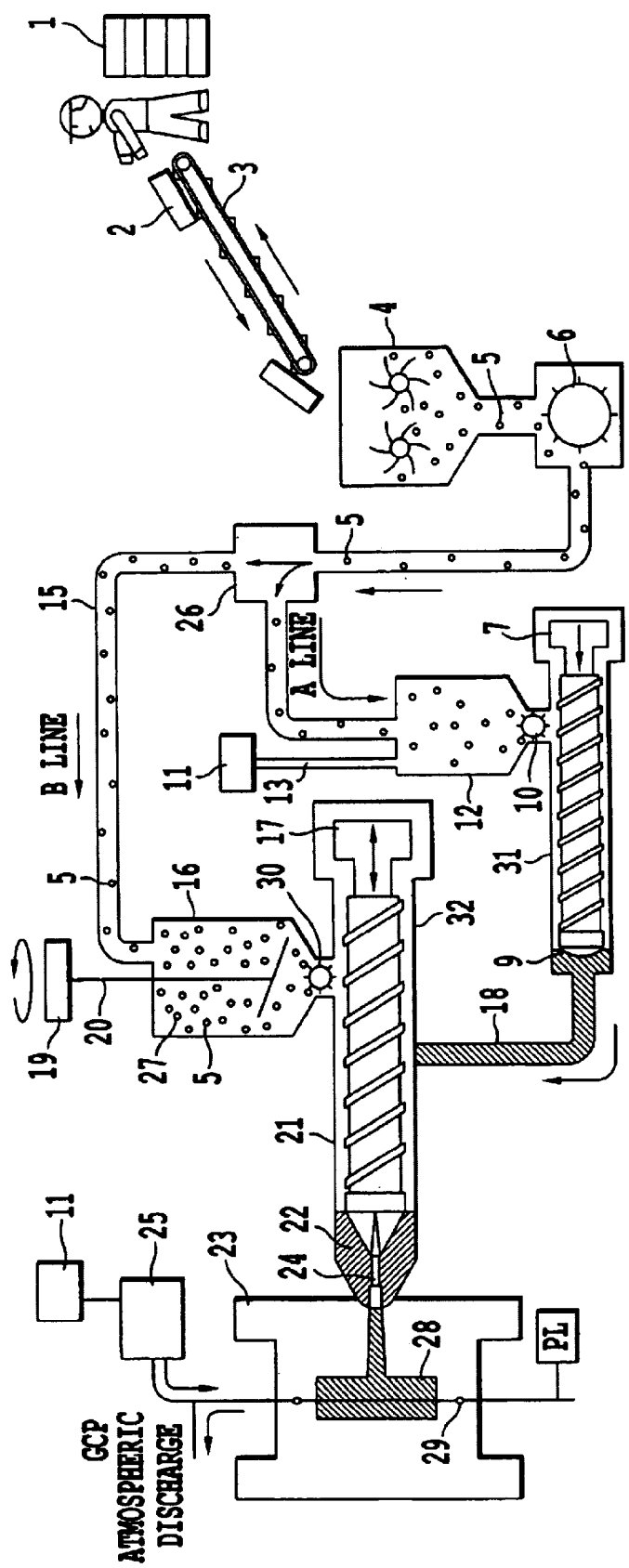
FIG. 15 is a schematic illustrative view showing reproduction method and apparatus of coated moldings in Examples 37 and 38 of the invention.

The recycling method of coated molding of Example 37 was such that as shown in FIG. 15, a closed mold (hereinafter referred to as sealed mold) was used in which a mold was sealed with an O ring at all mating faces such as parting faces, ejector pins and the like. If it was difficult to seal ejector pins one by one, an ejector plate was surrounded with a box, and its parting face was sealed with an O ring. This is called an ejector box system.

Prior to injection, the seal mold was pressurized to atmospheric pressure or higher actually by use of about 8 kg/cm$^2$ of air. While keeping the pressurized conditions, a melt mixed resin of foamed PS and HIPS slightly having the capability of foaming was injected. Simultaneously with completion of the injection, the air pressurizing the mold was released to the atmosphere. After completion of cooling and solidification of the resin melt, the mold was opened to remove the resultant molding. To use "sealed mold" and beforehand pressurize the sealed mold with a gas such as air to not lower than an atmospheric pressure is referred to as "gas pressurization" or "gas counter pressure (abbreviated as GCP)".

As a result, there was obtained a molding wherein the occurrence of silver streaks or swirl marks on the molding surface was avoided and which had a good smooth surface and foamed layers in part of the inside thereof.

Since any silver streak or swirl mark was found in the molding, it was not necessary to effect pretreatment for coating such as sandpaper finish or shot blasting. The molding was coated with paints #10 and #20, respectively, and subjected to a cross hatch test for evaluating film adhesion properties. These results are shown in Table 70, revealing good adhesion properties.

Where foamed moldings are recycled and re-molded in a manner as set forth above in which part of the foamed molding is mixed with other type of resin for the purpose of recycling of part thereof after crushing or without crushing, or where all of a foamed molding is used for molding, the surface can be made smooth according to the sand paper finishing of Example 36 or the GCP method of Example 37, with the result that the adhesion properties of the paint film is improved.

Example 38

The recycling method and apparatus of coated moldings of Example 38 embody the recycling method and apparatus of coated moldings stated before, and are provided with a volume reducing mechanism as shown in FIG. 15. There was made an apparatus for a recycling test of foamed PS wherein the foamed PS resin melt, which was reduced in volume by melting under heating conditions by use a heating cylinder of an extruder 31 as a volume reduction mechanism, was continuously introduced into the heating cylinder 21 having an hydraulic shut off nozzle 24 only when a screw within the heating cylinder 21 of the injection molding machine was in weighing operation, thereby permitting and the foamed PS resin melt and a HIPS resin melt to be mixed at given ratio in the heating cylinder 21.

The recycling method and apparatus of coated moldings of Example 38 and a test using the same are described in detail with reference to FIG. 15.

Based on "A line" in the figure, recycling in the volume reduction of foamed PS is described. Foamed PS 1 used as a waste is charged into a crusher 4 wherein it is crushed into pieces having a size of about 20 mm. The thus crushed foamed PS is introduced into a first hopper 12 and melted under heating conditions in a heating cylinder 8 of an extruder. The thermally melted foamed PS is fed into a heating column 21 of a molding machine by means of a hydraulic motor 7.

On the other hand, HIPS resin pellets are placed in a second hopper 16. The foamed PS resin melt and the HIPS resin are melt mixed by means of the screw within the heating cylinder 21 of the invention molding machine. The resultant mixed resin melt is injected into a sealed mold via a shutoff nozzle 8, and after solidification by cooling, was removed from the mold.

Next, the recycling in the volume reduction of foamed PS is described based on "B line". In the course of the operations of the B line, the communication between the die 9 of the extruder and the heating cylinder 21 of the injection molding machine is interrupted.

Foamed PS crushed with the crusher 4 is fed to a second hopper 16 of the injection molding machine by means of a transporter 6, and mixed with HIPS resin by means of an agitator (spring) 20. The thus mixed resin is forced into the heating cylinder 21 of the injection molding machine by means of a forcing blade 30. The forced, mixed resin is melt mixed by means of the screw in the heating cylinder 21, thereby obtaining a mixed resin melt of the HIPS resin and foamed PS. The thus obtained mixed resin melt is injected within the "sealed mold", subjected to GCP, through a shutoff nozzle 24 of the hydraulic-operated type, followed by solidification by cooling and removal from the mold.

The resultant molding was coated with paint #10, and the results of coatability and film properties of the thus coated molding, i.e. the molding processed in the "A line", are shown in Table 71, and the results for the molding obtained in the "B line" are shown in Table 72.

The test items and test methods in the tables are, respectively, accorded to Table 8.

When using such a method as set forth above, it is possible to easily recycle articles made of thermoplastic resins other than foamed PS, e.g. synthetic fiber wastes, containers for drinking water, and the like. If the injection molding machine is changed to an extrusion molding machine, a blow molding machine or the like, moldings other than injection moldings can be obtained.

The appearance of the moldings obtained in this way was found to be good because foaming gases or undecomposed foaming agents are completely decomposed in the "A line" wherein foamed PS is heated and melted in the heating cylinder of the extruder.

On the other hand, with respect to the appearance of the moldings obtained in the "B line", silver streaks or flow marks ascribed to a foaming gas or an undecomposed foaming agent are observed, so that the appearance is improved by use of the GCP technique.

Example 39

The recycling method and apparatus of coated moldings of Example 39 were an example of application to re-use of a plastic cover of a copying machine collected from actual fields, and were carried out in the following manner.

The plastic cover was made of injection moldings of ABS resin (CYCOLAC ZFJ5SP of Ube Cycon, Ltd. (the abbreviation "SP" means a grade wherein antistatic agent is added to)). The surface was soiled, and it was assumed that an antistatic agent (usually made of surfactants) for preventing electrostatic deposition of dirt was bled out, with the apprehension that these influenced the adhesion of a film. In order to remove the soil and the antistatic agent, the cover was wiped with a piece of absorbent cotton soaked with isopropyl alcohol.

Because a logo mark indicating a commercial name was silk screen printed on part of the cover, this silk screen print was removed by wiping out with a piece of absorbent cotton soaked with methyl ethyl ketone.

Because a seal showing the operation manual was attached to the inner side of the plastic cover, it was gradually peeled off while passing hot air from a hair dryer. The adhesive left on the plastic cover was removed by wiping with a piece of absorbent cotton soaked with isopropyl alcohol.

Some of plastic covers (front cover) were much soiled with "dirt from the hands" or "toners" as a result of frequent handlings of the cover for the exchange of toners on the part of users. These covers were immersed in an aqueous solution of a surface active agent, and brushed. However, the plastic cover was a molded one which was made according to a gas-assisted molding method, and the aqueous solution entered into a hollow portion in the inside of the cover. Accordingly, it was under apprehension that when coated, the solution came out from the portion to worsen coating operations and influence adhesion of a paint film.

A charge port of a gas was shaped as a hole having a diameter of 2.5 mm and a depth of 12 mm. In order to solve the above problem, it occurred that the gas charge port was sealed with an adhesive such as an epoxy resin. However, when the cover was pelletized for recycling, a thermoplastic resin used as a main constituent of a molding and a thermoplastic resin for paint film had no affinity therebetween, with the fear that moldability, physical properties of the materials and film properties lowered. A melt of an ABS resin having affinity for both the thermoplastic resin used as a main constituent of the molding and the thermoplastic resin for paint film was used for sealing between both resins.

Alternatively, an ABS resin rod having a diameter of 2.6 mm and a length of 15 mm was forced into the hole to attempt the sealing. However, it was considered that all were poor in working efficiency and were not good in economy.

In view of the working efficiency, the gas charge port was closed by means of M3, a stainless steel self-tapping screw with an effective thread of 10 mm. An electrically operated driver enabled one to readily close the gas charge port with the self-tapping screw. After washing, the cover was washed with water satisfactorily and dried, followed by removal of the self-tapping screw with the drive and coating with paint #10. In this way, a plastic cover having an appearance usable in re-use was obtained.

An ABS resin, which had affinity for both the thermoplastic resin for a main component of the molding and the thermoplastic for paint film, was shaped in the same form as the stainless steel self-tapping screw, by which its removing work could be omitted. An attempt was made to sealing with the plastic screw by means of the electrically operated driver. However, in the course of the sealing work, the screw head was broken off owing to the shortage of strength. The stainless steel self-tapping screw could be repeatedly used, and was thus good in economy.

The coatability and paint film properties of the plastic cover obtained by the above-stated procedure are shown in Table 73. These results reveal that the plastic cover can satisfactorily withstand use and recycled.

The plastic cover, which was coated with paint #10 for the purpose of the re-use, was crushed, and pelletized by use of a pelletizing apparatus. The thus obtained pellets were molded by use of an injection molding machine to obtain molded articles. The molded article did not involve any molding failure phenomena, such as burned spots, contamination•foreign matter, silver streaks, mottle and the like, caused by incorporation of the paint film. Table 74 shows the results of the molding processability.

The molded article was coated with paint #10 by use of an air spray coating device. The coatability and film properties of the resultant plastic cover are shown in Table 75.

The above results reveal that the cover can satisfactorily withstand use, and are judged to be recyclable.

Example 40

The recycling method and apparatus of coated moldings of Example 40 were such that in the same manner as in the above example, 2 parts by volume of a refused toner was added to and mixed with 98 parts of ABS recycle resin (a product of the second cycle in Example 5) along with a small amount of a baby oil (hereinafter referred to as "spreading agent"), followed by molding by use of an injection molding machine. The resultant molding had no molding failure phenomena, such as a failure in dispersion, burned spots, contamination foreign matter, silver streaks, mottle and the like, caused by incorporation of the refused toner. Table 76 shows the results of the molding processability.

The molded article (i.e. a molding added with 2 parts of "refused toner") was coated with paint #10 by use of the same method and apparatus as in Example 4. The coatability and film properties of the resultant plastic cover are shown in Table 77.

The above results reveal that the refused toner can be usable as filler and pigment for ABS resin and can satisfactorily withstand use after coating and is thus judged as recyclable.

The OA machine based on the xerographic principle may, in some case, invite lowering of image quality (e.g. white skip, black skip, white streak, black streak and the like owing to the entrance of extraneous light or by internal reflection of light. The "QA machines" can be grouped into two systems including one using a laser beam (hereinafter referred to "digital system" and the other making use of reflected light (hereinafter referred to as analog system"). When a photosensitive body (hereinafter referred to as "drum") of the "OA machine" is sensitized on exposure to light from outside or internal reflected light, the intensity of the resultant copy becomes thickened or thinned.

In order to solve these problems, the plastic cover is made thick, or a cover is provided in the inside of the "OA machine" for the purpose of shielding light or preventing the internal reflection. Still alternatively, a black color coating is formed on the inner side. However, all the cases are expensive and are not economical.

In Example 40, the "refused toner" discarded as a waste is used as a black pigment of molding resin to provide a black molding, with its outer surface being coated with recyclable paint #10. The resultant molding, which has a beige-colored outer surface and a black-colored inside, can be manufactured inexpensively. Thus, there can be obtained a recyclable molding, which is able to prevent the image quality of copies from lowering owing to the entrance of extraneous light or the internal reflection of light.

Rear covers of the analog-type copiers (made by Fuji Xerox Co., Ltd., with a commercial name of Vivace 500) were used along with refused toner to obtain black rear cover moldings. The rear cover moldings were coated with paint #10. A rear cover molding made of a conventional V material (color: white) was also made. The copiers equipped with the two types of rear covers were used for copying under the sunlight.

Table 78 shows the results of relative evaluation on black color density when the densities of the resultant copies were measured by use of the Macbeth densitometer.

More particularly, the case where a rear cover obtained by a conventional molding process is mounted in a copier is compared with the case where a rear cover colored in black by used-of a refused toner is coated with recyclable paint #10 to prevent light transmission and reflection and is mounted in a copier.

Figure 16:
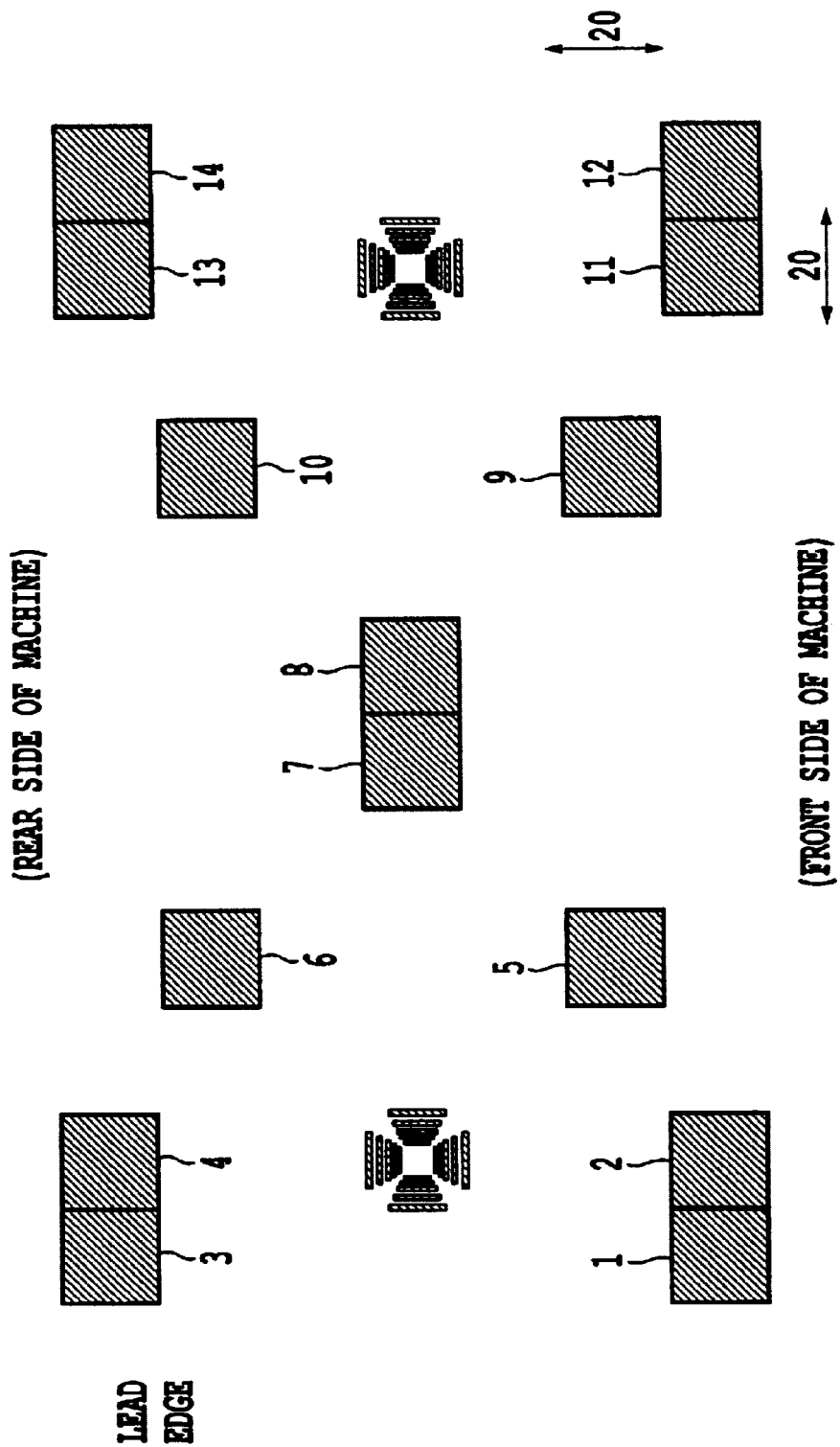
FIG. 16 is an illustrative view showing a position of measuring a concentration of a rear cover and a test chart in Example 40 of the invention.

FIG. 16 shows a test chart (test chart 0001) used for the density measurement and the rear cover positions of measuring the density.

Example 41

The recycling method and apparatus of coated moldings of Example 41 are characterized in that dust explosion is prevented at the time of recycling a refused toner in Example 40.

A refused toner is in the form of fine powder and is combustible in nature. Such a matter has the possibility of dust explosion. Where it was mixed by use of a tumbler, a small amount of water was sprayed so as to avoid the dust explosion, under which the refused toner was mixed with ABS. The resultant mixed resin was molded, whereupon it was found that the resultant molding had swirl marks or silver streaks on the surface thereof because the water served as a foaming agent. In order to solve this problem, such an injection molding machine and a sealed mold as in Example 37 were used for molding according to the GCP method. When water acted as a foaming agent, the amount of generated gas is about 5.5 times larger than azodicarbonamide (abbreviation: ADCA), which is a widely employed foaming agent. Accordingly, the molding was effected while elevating a GCP pressure to 18 kg/cm$^2$, no swirl mark or silver streak was found, and the resultant molding had such an appearance as a solid molded article.

For the elevation of the GCP pressure, two gas boosters (Model: 8AGD-5), made by Haskel, Inc., were arranged in parallel to each other.

The thus obtained moldings were coated with paint #10 by use of the same coating device as in Example 4. The, moldability, coatability and film properties are shown in Table 79.

Example 42

Recycling method and apparatus of coated moldings of Example 42 are characterized in that while the refused toner in Example 40 was used as filler and pigments of moldings made of the thermoplastic resin, the refused toner was used as a pigment for a paint coated on the surface of a molded article.

More particularly, in Example 41, the refused toner was used as filler and black pigment for the ABS resin used in the moldings. In example 42, the refused toner was employed as a black pigment of a pint.

The paint was prepared by beforehand agitating starting materials (wherein Varnish (C) is made by Dainippon Ink and Chemicals Co., Ltd., with a commercial named and a grade of ACRYDIC A-157 (styrene-modified acrylic resin), indicated in Table 80, by means of a dispersing device for 20 minutes to provide a mill base, followed by dispersion by means of a three-roll mill to a size of 10 μm. The thus dispersed mill was added to and dissolved in starting materials indicated in Table 81, to obtain paint #50 (color: black).

Example 43

The recycling method and apparatus of coated moldings of Example 43 are characterized in that for the purpose of preventing a paint mist from scattering and permitting uniform coating to corners, an airless air spray device is used to coat a paint on the surface of a molding by atomizing the paint under paint-pressurized conditions and controlling a paint pattern by means of air.

Thinner S2 for dilution was added to the paint #50 prepared above so that a paint viscosity was adjusted to 18 seconds when determined by use of the NK-2 cup of Iwata K. K. at 20° C. The diluted paint was coated onto the rear surface (inner surface) of an ABS resin molding of the second cycle in Example 4 by use of an airless air spray device, made by Asahi Sunac Co., Ltd., (a commercial name of AIRLAP UNIT with a model of AP1021AW) (hereinafter referred to merely as "airless air gun") under conditions of a paint pressure of 3 kg/cm$^2$, a nozzle diameter of 0.7 mm, and a wrap air pressure of 2 kg/cm$^2$, followed by drying in the same manner as in Example 4 in a dry thickness of 15±3 μm. Table 82 shows coatability and paint film properties.

The moldings coated with paint #50 were crushed and re-pelletized in the same manner as in Example 4 using such a crusher, extruder and pelletizer as used. The reproduced ABS resin was molded again by means of an injection molding machine, with the result that no problem was involved in the moldability, ensuring a smooth molding process. The results of the moldability are shown in Table 83.

Example 44

The recycling method and apparatus of coated moldings of Example 44 are characterized in that for the purpose of preventing a paint mist from scattering and permitting uniform coating to corners, the airless air gun is used to coat a paint on the surface of a molding by atomizing the paint under paint-pressurized conditions.

An adjusted paint #50 (wherein the above-mentioned thinner S2 was used as a solvent) was employed for inner surface coating on the rear surface (inner surface) of an ABS resin molding of the second cycle in Example 4. In the same manner as in the above example, in order to prevent the scattering of a paint mist and ensure uniform coating to corners, an airless air spray device, made by Asahi Sunac Co., Ltd., (a commercial name of OLISHIN with a model of AP1021Q) (hereinafter referred to merely as "airless air gun") was used for coating at a paint pressure of 80 kg/cm$^2$. The dry thickness was 15±3 μm. Table 84 shows coatability and pain film properties.

The moldings coated with paint #50 were crushed and re-pelletized, and the resultant reproduced ABS resin was again molded, with the result that no problem was involved in the moldability, ensuring a smooth molding process. The results of the moldability are shown in Table 85.

Example 45

The recycling method and apparatus of coated moldings of Example 45 are characterized in that plastic moldings were coated on the surface thereof according to an electrostatic coating technique.

The coating efficiency of paint #10 on moldings by means of a spray gun is generally at about 40%. The coating efficiency is defined as a value dividing a weight of a dry paint film attached to the molding by a weight of an employed paint, followed by multiplication by 100. The weight of the employed paint means a weight of a dissolved solid matter (NV) (NV: abbreviation of Non Volatile).

A high potential generator is of Model EH80B, made by Asahi Sunac Co., Ltd., and an air electrostatic handgun was of Model HB 110. The electrostatic nozzle was of Model HN53F-HM and was a flat spray nozzle, and a potential was set at 60 kV. (The gun meeting the above requirements is hereinafter referred to as electrostatic coating device.)

Isopropyl alcohol was applied onto an ABS reproduced resin molding recycled at the first cycle in Example 5 by use of the above electrostatic coating device. Thereafter, paint #10, which was adjusted in viscosity, was coated by use of the electrostatic coating device in a state where the isopropyl alcohol was not vaporized or evaporated from the surface, or the molding surface was still wetted. After the coating, the paint was dried under the same drying conditions using the same drying device as in Example 4. The dry film thickness as found to be 22 μm±2 μm.

Like the case using the spray gun, the coating efficiency attained by the electrostatic coating device of Example 45 was calculated, revealing that it was at about 59% to 63%.

The reason why the coating efficiency increased is that negatively charged atomized paint particles discharged from the air electrostatic hand gun are attracted toward the a coating hanger made of a positively charged metal by the action of the Coulomb attraction. Since the molding surface was wetted with isopropyl alcohol, the negatively charged, atomized paint particles are collected closely to the coating hanger by the action of the Coulomb attraction, thereby improving the coating efficiency.

The thinner S2 may be used in placed of isopropyl alcohol. In the case, the coating efficiency is improved, and a coating efficiency of about 55% to 59% results.

In this way, other solvents or thinners capable of showing similar effects may also be used.

Example 46

The recycling method and apparatus of coated moldings of Example 46 are characterized in that plastic moldings were coated on the surface thereof according to brushing.

Paint #30, not diluted with thinner S2, was coated on an ABS reproduced resin molding recycled at the first cycle in Example 4 by brushing using a general-purpose brush (with a width of 50 mm), made by Maruden K. K. Although the brush marks were left, film properties were of no problem. The coated molding was dried by the same drying device as in Example 4. The dry film thickness was found to be at about 20 $\mu$m. The film properties are shown in table 86.

Example 47

The recycling method and apparatus of coated moldings of example 47 are characterized in that coating film is coated on the surface of plastic moldings according to roller brushing.

Paint #10 without dilution with thinner 52 was coated on an ABS reproduced resin molding recycled at the first cycle in Example 4 by brushing using a roller brush made by Maruden K. K. Although the dispersion of the dry film thickness was large, film properties were of no problem. The coating film was dried by the same drying device as in Example 4. The dry film thickness was found to be at about 10 $\mu$m to 20 $\mu$m. The film properties are shown in Table 87.

Example 48

The recycling method and apparatus of coated moldings of Example 48 are characterized in that plastic moldings were coated on the surface thereof by dip coating.

The paint #30 was subjected to dip coating on an ABS reproduced resin molding recycled at the first cycle in Example 4.

The molding was obtained according to the gas-assisted molding technique, and had a hollow portion in the inside thereof, with the fear that the paint entered into the hollow portion to develop a coating failure. Accordingly, a stainless steel M3 tapping screw was used to close a gas charge port, like the foregoing examples.

Using a cup for viscosity measurement as in Example 4, the paint #30 was diluted with thinner S1 so that its viscosity was adjusted to 13 seconds at 20° C. the thus adjusted paint was placed in a stainless steel container, in which the molding was immersed and coated.

After completion of sags and runs of the paint, the coated paint was dried in the same drying device, drying method and step as in the foregoing example. The dry film thickness was at about 7 $\mu$m.

The film properties are shown in Table 88.

Example 49

The recycling method and apparatus of coated moldings of Example 49 are characterized in that plastic moldings were obtained by extrusion molding.

Using a bent-type extruder, made by Toshiba Machine Co., Ltd., (type: SE90DCV), an ABS resin, made by Asahi Chemical Ind. Co., Ltd., (with a commercial name and a grade of STAYLAC A3190 and with a white color (colored with a master batch for 10-fold dilution) was extrusion molded into a plate molding having a thickness of 3 mm.

The cylinder temperatures were, respectively, set at 230±5° C., 240±5° C. (bent section), 230+5° C., 215±5° C., and 200±5° C., thus the bent section being set at a slightly higher temperature. The dies used had a width of 1100 mm, and the dies temperatures were, respectively, set at 230±5° for $D_1$, 220±5° C. for $D_2$, 215±5° C. for $D_3$, 215±5° C. for $D_4$, 220±5° C. for $D_5$, and 230±5° C. for $D_6$. A three-roll mill was set at 90° C. for one roll and 45° C. and 40° C. for the other two, respectively.

Thereafter, the plate molding was cut into pieces having a size of 600 mm×500 mm by use of a trimming cutter and a guillotine cutter. (The cut plate molding pieces were hereinafter referred to as "plate member".) The plate member was coated on the surface thereof with paint 10 (used thinner S2) by use of the same coating device as in Example 4. The resultant dry film thickness was found to be at 15 $\mu$m±3 $\mu$m.

The thus coated plate members were pelletized by use of the same recycling apparatus as in Example 4. The pelletized molding material (a recycled molding material without peeling the paint film therefrom) was again molded under the same molding conditions as set out above by use of the same extruder and dies, whereupon it was found the resin underwent degradation by means of the heat of the first molding and recycling, and the sheet extruded at the time of the extrusion molding was drawn down on the way of discharge from the dies to rolls. In order to avoid this trouble, the dies and the rolls were arranged to come closer to each other from 150 mm to 50 mm, by which the drawdown could be avoided.

Separately, 50% of a virgin material of the type used as the molding material was mixed with the recycled pellets as a recycling aid in a tumbler prior to the molding. This recycle (mixed pellets of the virgin material) was molded, whereupon a plate member could be obtained without causing any drawdown. The thus obtained plate member was coated in the same manner as in the foregoing example.

The recycling was carried out in such a cycle as set out above. The coatability and film properties in the respective cycles are shown in Table 89.

Example 50

The recycling method and apparatus of coated moldings of Example 50 differ from Example 49 in that paint #10 was changed to paint #30.

In example 50, paint #30 (wherein thinner S1 was used for dilution) was used, followed by processing in the same molding material, processing machine and steps as in Example 49.

The coatability and paint film properties in the respective cycles are shown in Table 90.

Example 51

The recycling method and apparatus of coated moldings of Example 51 differ from Example 49 in that ABS resin used as a molding material was changed to HIPS resin.

In Example 51, HIPS resin, made by Asahi Chemical Ind. Co., Ltd., (with a commercial name and a grade of STYRON 475D and with a white color (colored with a master batch for 10-fold dilution) was provided as a molding material and paint #10 (wherein thinner S2 was used for dilution) was used, which were processed by use of the same molding machine and steps as in example 49.

Since HIPS resin was used as the molding material, the cylinder temperatures of the extruder were, respectively, set at 215° C.±5° C., 225° C.+5° C. (bent section), 215° C.±5° C., 200° C.±5° C., and 185° C.±5° C. so that the bent section was set at a slightly higher temperature. The temperatures of the dies were, respectively, set at 215±5° C. for $D_1$, 205±5° C., for $D_2$, 200±5° C. for $D_3$, 200±5° C. for $D_4$, 205±5° C. for $D_5$, and 215±5° C. for $D_6$. A three-roll mill was set at 80° C. for one roll and 50° C. and 45° C. for the other two, respectively.

Like Example 49, drawdown took place at the time of molding of the recycle material, and could be avoided in the same manner as in Example 49.

Table 91 shows coatability and paint film properties in the respective cycles.

Example 52

The recycling method and apparatus of coated moldings of Example 52 differ from Example 51 in that paint #10 was changed to paint #20.

Using paint #20 (wherein thinner S2 was used for dilution) as paint, the same molding material was processed by use of the same molding machine, steps and molding conditions as in Example 51.

The coatability and paint film properties in the respective cycles are shown in Table 92.

Example 53

The recycling method and apparatus of coated moldings of Example 53 are characterized in that the coated plate members in the respective cycles in Example 50 were subjected to vacuum molding.

Products having a length of 400 mm, a width of 350 mm and a thickness of 35 mm were made by use of a vacuum molding machine (made by Asai Seisakusho K. K., (type: FR-523)).

Initially, the respective plate members were heated to a temperature of 170° C. and softened. The heating time was about 300 seconds and was controlled while observing the state of drawdown. Thereafter, each plate member was subjected to vacuum molding at a vacuum pressure of 50 mmHg. For the molding, the paint film-deposited surface was turned outside of the molding, and the resultant molding was cut by means of a NC Ruder and press to provide a product.

The thus obtained products of every cycle were observed with respect to peeling of the paint film at the cut face and bent portion of the product, crack, luster, surface irregularity, wrinkle and the like. In order to confirm the adhesion properties of the film, a cross-hatch test was performed. The results are shown in Table 93.

It is assumed that no abnormality was found in the paint films, and this is because the resin for the film is thermoplastic and exhibits satisfactory elongation on preheating prior to the molding.

Example 54

The recycling method and apparatus of coated moldings of Example 54 are characterized in that the coated plate members in the respective cycles in Example 49 were subjected to vacuum molding.

In Table 94, there are shown the results of the tests on appearance and adhesion properties of the films prior to and after the molding, like Example 53.

It is assumed that no abnormality was found in the paint films, and this is because the resin for the film is thermoplastic and exhibits satisfactory elongation on preheating prior to the molding.

Example 55

The recycling method and apparatus of coated moldings of Example 55 are characterized in that the coated plate members in the respective cycles in Example 51 were subjected to vacuum molding.

In Example 55, the coated plate members obtained in the respective cycles of Example 51 were vacuum molded in the same apparatus and steps as in Example 53.

The molding material was made of HIPS resin, and a preheating temperature was set at a temperature as low as 155° C.

Table 95 shows the results of tests on an appearance and adhesion properties of the films prior to and after the molding like the foregoing example. It is assumed that no abnormality was found in the paint films, and this is because the resin for the film is thermoplastic and exhibits satisfactory elongation on preheating prior to the molding.

Example 56

The recycling method and apparatus of coated moldings of Example 56 are characterized in that the coated plate members in the respective cycles in Example 52 were subjected to vacuum molding.

In Example 56, the coated plate members obtained in the respective cycles of Example 52 were vacuum molded in the same apparatus and steps as in Example 55.

Table 96 shows the results of tests on an appearance and adhesion properties of the films prior to and after the molding.

It is assumed that no abnormality was found in the paint films, and this is because the resin for the film is thermoplastic and exhibits satisfactory elongation on preheating prior to the molding.

Example 57

The recycling method and apparatus of coated moldings of Example 57 are characterized in that ABS resin moldings were printed on outer and inner surfaces thereof.

The ABS resin molding obtained in the second cycle of Example 4 were coated on the surface with paint #10 and then subjected to silk screen printing of a logo mark, for example, of XEROX" with ink #15 (indicated in Table 16) at a corner on the surface. Thereafter, the molding was subjected to tanpon printing (pad printing) with the ink #15, with the note that "Recyclable molding without peeling of a paint film and removal of print for which coating and printing are carried out by use of a paint and an ink, both having affinity for a resin for the molding".

Using the ink #15, information necessary for recycling, which included the type of resin for moldings, the type of resin for ink film, the weight of the product, the number of recycling, the recycling history, the UL file No., and the like, was printed as a bar code 39. The information may be printed on the inner surface of the molding or on the outer surface provided that no functional problem arises.

Aside from the bar code 39, a two-dimensional bar code may be used. The printed bar code could be read by means of a bar code reader. The molding was recycled by use of the same crusher, extruder and pelletizer as in Example 4 to obtain re-pellets. The pellets were molded by means of an injection molding machine, whereupon failure phenomena, such as red and black foreign matters, silver streaks, mottle, clouding and the like, which are considered to result from the paint film and ink film as in the foregoing examples, are similar to those experienced at the molding virgin materials.

Example 58

The method of evaluation of recyclability in Example 58 is to evaluate whether or not a thermoplastic resin for a paint film and a thermoplastic resin used as a main constituent of a molded article have mutual affinity sufficient to provide a recyclable combination. The method is carried out in the following manner to evaluate the affinity between the thermoplastic resin for paint film and the thermoplastic resin for the molding.

The evaluation as to whether or not a thermoplastic resin for a paint film and a thermoplastic resin for a molding have mutual affinity, or whether or not they are in a recyclable combination, is generally made according to any of the afore-stated methods. Alternatively, it is considered to make an overall evaluation based on the results of a plurality of evaluations. In Example 58, affinity was evaluated according to a cross-hatch test.

First, 10 parts of a thermoplastic resin for a paint film was mixed with 90 parts of a thermoplastic resin used as a main constituent for a molding, each on the weight basis. The mixture was subjected to a single screw or multi-screw extruder to prepare pellets of a mixed resin made of the thermoplastic resin for the paint film and the thermoplastic resin for the molding.

The pellets were prepared by uniformly mixing both resins in a tumbler, and melt mixing the resultant mixed resin in an extruder to obtain mixed resin pellets made of the thermoplastic resin for the film and the thermoplastic resin for the molding.

A test piece (sample) should preferably be made by use of an extruder as stated above. If a sample to be inspected is small in amount, a melt indexer maybe used. Besides, both types of resins were placed in a container (e.g. a glass beaker) and melted under heating conditions to a temperature higher than the melting points of the respective resins. While agitating for about 10 to 30 minutes, the respective resins were well mixed to obtain a mixed resin mass. The mixed resin block was subsequently crushed.

The mixed resin pellets of the thermoplastic resin for the paint film and the thermoplastic resin for the molding thus obtained were placed in an amount of 10 g or 30 g between plates each having a size of 600 mm×600 mm and a thickness of 1 mm and coated with a TEFLON on the surface thereof (for which something like a ferro plate used for printing may be used). While heating to melting points of the respective resins, the plates were compressed under a pressure of 1 kg/cm$^2$ to 500 kg/cm$^2$ thereby making an about 1 mm thick thin plate ordinarily called "pancake" made of the mixed resin.

The "pancake" thus obtained was subjected to a cross hatch test wherein it was cut in the form of a cross hatch according to the method described in JIS K5400 8.5.2. indicated in Table 8. A cellophane additive tape was attached to the cross hatched surface, and peeled off at a certain angle. In this way, the affinity between the thermoplastic resin for the paint film and the thermoplastic resin for the molding was evaluated.

When the results of the cross hatch test are 90/100 or over, both resins have mutual affinity and are evaluated so that there is a great possibility that they are in a recyclable combination.

In Table 98-2, the results of the cross hatch test are shown with respect to the resins for a paint film indicated in Table 98-1 as an instance. In Table 98-2, when, for example, the results of the cross hatch test is 100/100 or 50/100, the denominator of 100 is omitted from the standpoint of a limited space, and only a numerator of 100 or 50 is indicated.

As described above, the tested resins are usable as a resin for paint film. Combinations of thermoplastic resins, which are used as a main constituent of moldings, are also subjected to the cross hatch test.

The tested resins are usable as a resin for paint as set out above. These resins were subjected to the cross hatch test in combinations with compatibilizing (miscibilizing) agents and thermoplastic resins serving as a main constituent of moldings.

As a result, resins having a relatively small molecular weight, such as resins for paints, have good properties of affinity provided that they were tested according to the cross hatch test.

On the other hand, some resins for moldings and compatibilizing (miscibilizing) agents, which are relatively greater in molecular weight on comparison with paint resins, have little affinity so far as this is determined according to the cross hatch test.

Example 59

The method of evaluation of recyclability of Example 59 was such that part of the pellets used to make the "pancake" in Example 58 was employed, i.e. the thermoplastic resin for a paint film and the thermoplastic resin for moldings are mixed and molded to provide test pieces. The pieces are subjected to TEM observation to evaluate the recyclability. The form and the dispersion state of the thermoplastic resin for paint film in the thermoplastic resin for moldings are evaluated through TEM photographs.

Figure 17:
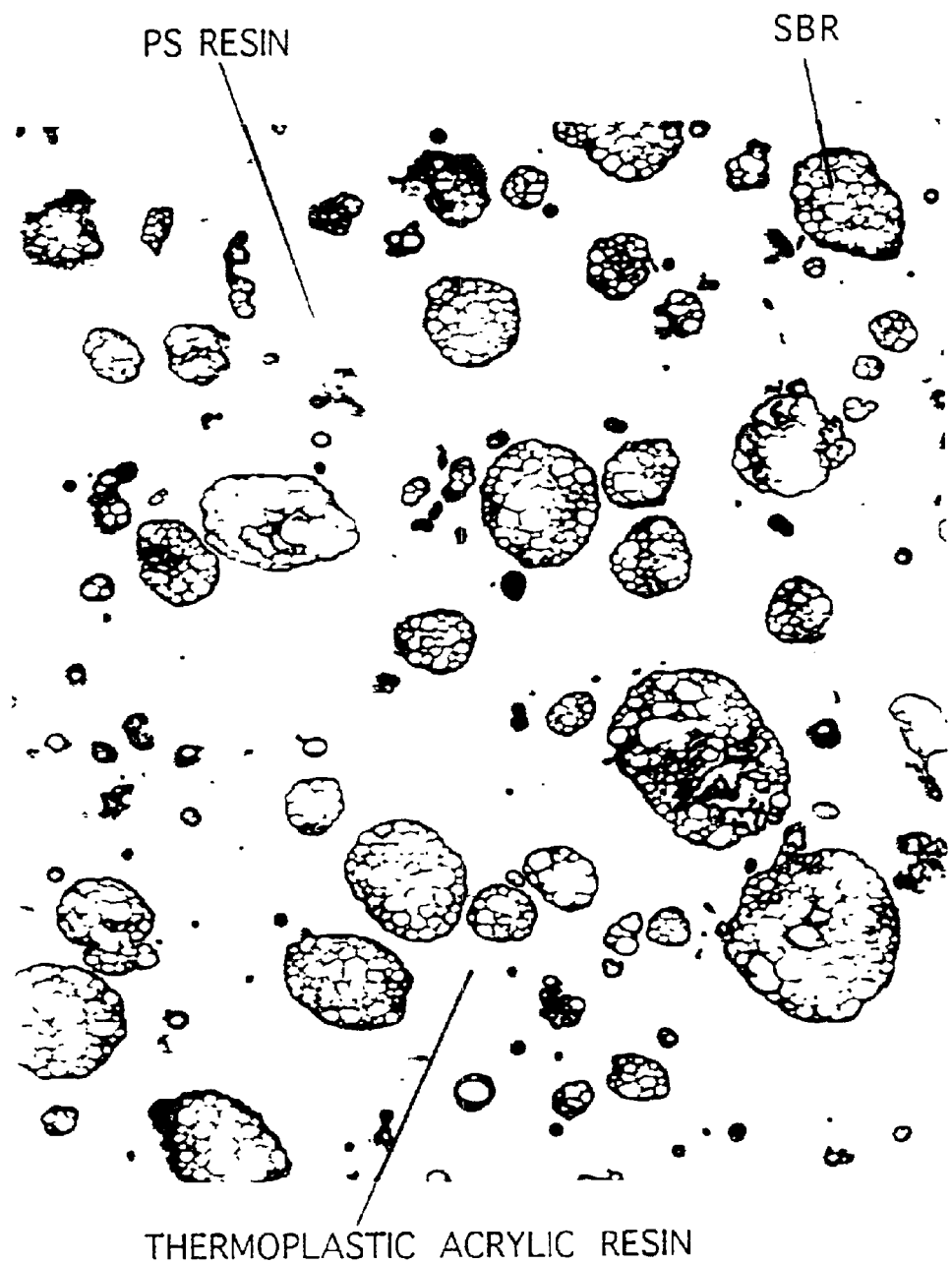

FIG. 17 is a TEM photograph of a test piece which was obtained by molding a mixture of a thermoplastic acrylic resin used as a resin for paint film (a paint resin, made by Dainippon Ink and Chemicals Ind. Co., Ltd, with a commercial name and a grade of ACRYDIC A-166) and a HIPS resin used as a thermoplastic resin used as a main constituent of moldings (high impact polystyrene resin, made by Asahi Chemical Ind. Co., Ltd., with a commercial name and a grade of STYRON 495).

From the results of the observation of the TEM photograph, it will be seen that the thermoplastic resin used as a paint film resin is uniformly monodispersed in the PS resin in the HIPS resin used as the main constituent of moldings. Part of the former resin is elliptically elongated and oriented along the direction of the flow of the resin. Any peel or absence at the interfaces between both types of resins is not observed, and both resins have mutual affinity and are evaluated as a recyclable combination.

Figure 18:
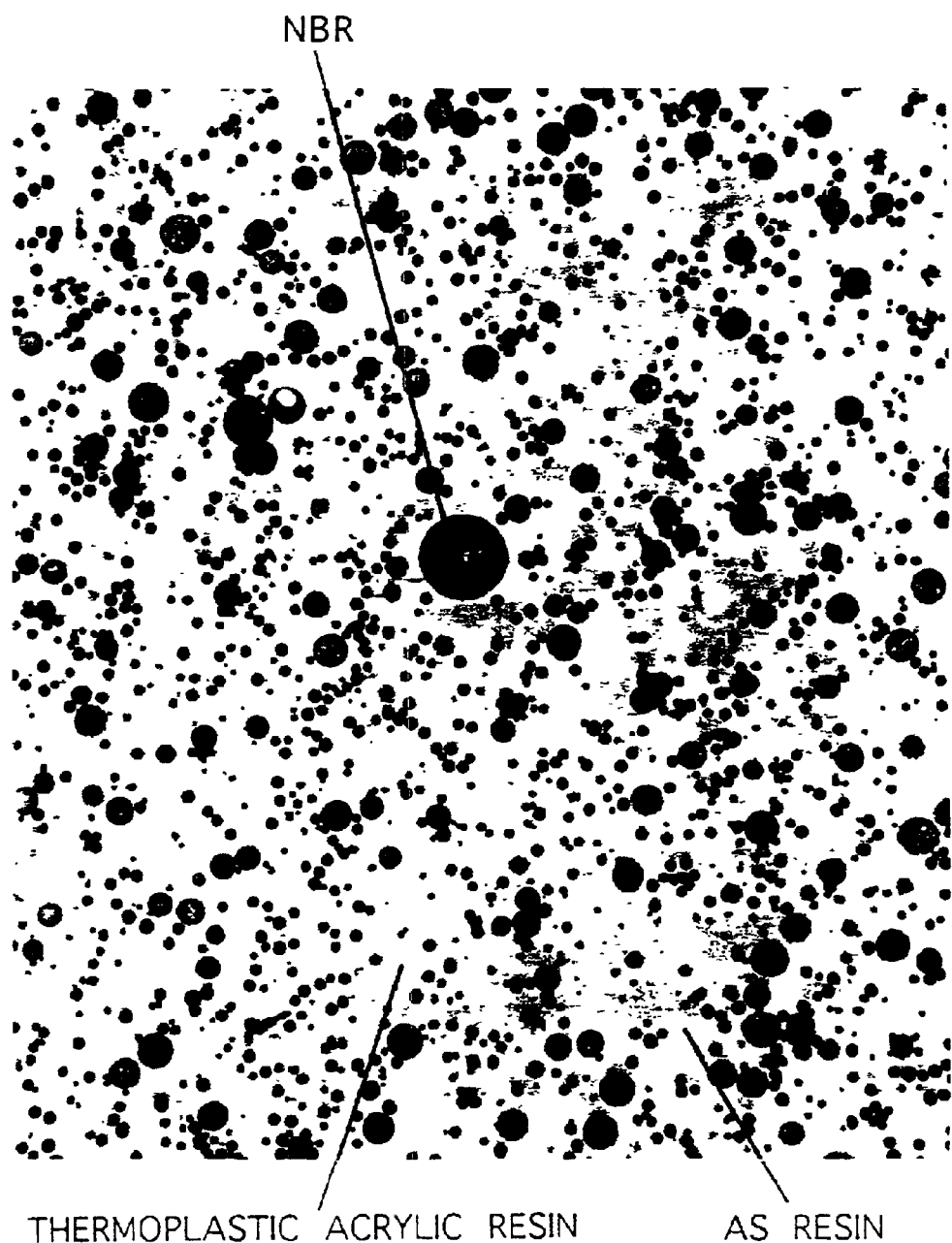

FIG. 18 is a TEM photograph of a test piece which is obtained by molding a mixture of a thermoplastic acrylic resin used as a resin for paint film (a paint resin, made by Dainippon Ink and Chemicals Ind. Co., Ltd, with a commercial name and a grade of ACRYDIC A-166) and an ABS resin used as a thermoplastic resin for a main constituent of moldings (ABS resin, made by Asahi Chemical Ind. Co., Ltd., with a commercial name and a grade of STAYLAC 120).

From the results of the observation of the TEM photograph, it will be seen that the thermoplastic resin used as a paint film resin is uniformly monodispersed in the AS resin of the ABS resin used as the main constituent of moldings. Any peel at the interfaces between both types of resins is not observed, and both resins have mutual affinity and are evaluated as a recyclable combination.

Figure 19:
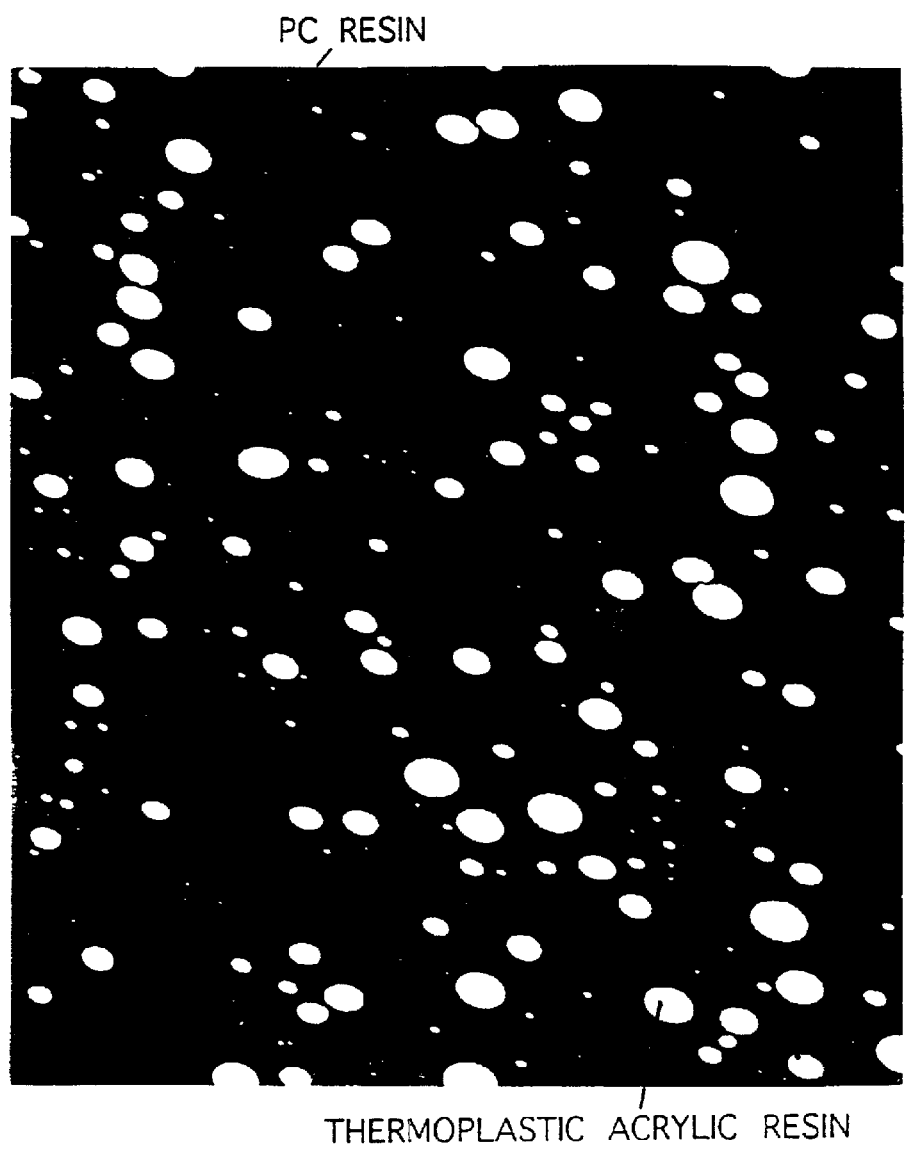

FIG. 19 is a TEM photograph of a test piece which is obtained by molding a mixture of a thermoplastic acrylic resin used as a resin for paint film (a paint resin, made by Dainippon Ink and Chemicals Ind. Co., Ltd, with a commercial name and a grade of ACRYDIC A-166) and a PC resin used as a thermoplastic resin for a main constituent of moldings (polycarbonate resin, made by Teijin Chemical Co., Ltd., with a commercial name and a grade of PANLITE 1250).

From the results of the observation of the TEM photograph, it will be seen that the thermoplastic resin for paint film is uniformly, spherically monodispersed in the PC resin. Any peel at the interfaces between both types of resins is not observed, and both resins have mutual affinity and are evaluated as a recyclable combination.

Figure 20:

FIG. 20 is a TEM photograph of a test piece which is obtained by molding a mixture of a thermoplastic acrylic resin used as a resin for paint film (a paint resin, made by Dainippon Ink and Chemicals Ind. Co., Ltd, with a commercial name and a grade of ACRYDIC A-166(and a PVC resin used as a thermoplastic resin for a main constituent of moldings (hard rigid vinyl chloride resin, made by Riken Vinyl Co., Ltd., with a commercial name and a grade of VBV0006F).

Figure 21:

FIG. 21 is an enlarged view of the above test piece, which was dyed with osmic acid ($OsO_4$) and further with ruthenic acid ($RuO_4$), and enlarged ten thousand times.

From the results of the observation of the TEM photographs, the thermoplastic acrylic resin for the paint film was dispersed in the PVC resin. Peels were observed at the interfaces, and the absence of the resin for paint film was found. Thus, these resins are not evaluated as a recyclable combination.

Figure 22:
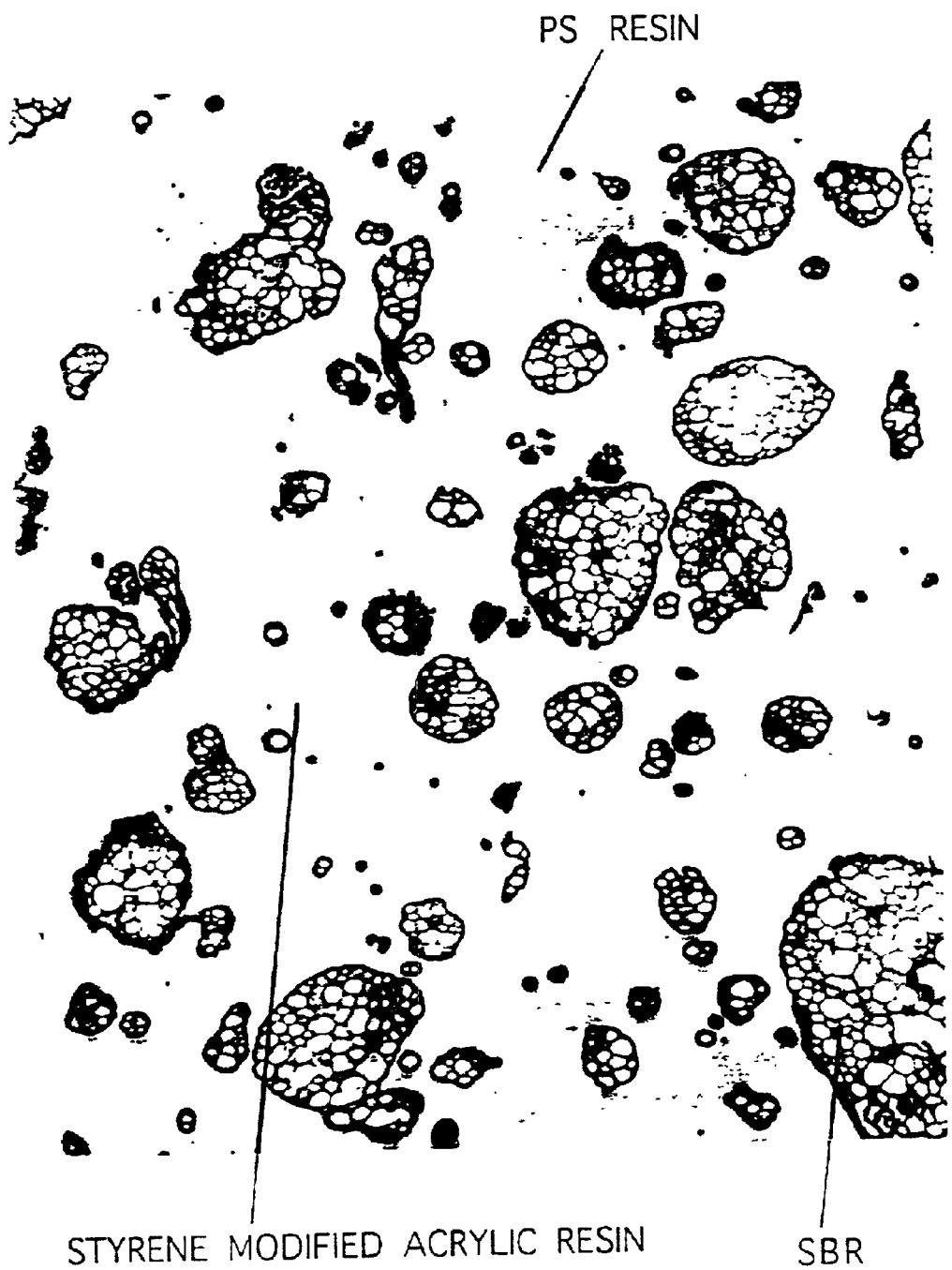

FIG. 22 is a TEM photograph of a test piece which is obtained by molding a mixture of a styrene-modified acrylic resin used as a resin for paint film (a paint resin, made by Mitsubishi Rayon Co., Ltd., with a commercial name of DIANAL BR-52) and a HIPS resin used as a thermoplastic resin for a main constituent of moldings (high impact polystyrene resin, made by Asahi Chemical Ind. Co., Ltd., with a commercial name and a grade of STYRON 495).

From the results of the observation of the TEM photograph, it will be seen that most of the styrene-modified acrylic resin used as a thermoplastic resin for paint film is compatible with the PS resin of the HIPS resin, and part thereof is uniformly monodispersed, thus exhibiting affinity for the HIPS resin. Any peel at the interfaces between both types of resins is not observed, and both resins are evaluated as a recyclable combination.

Figure 23:
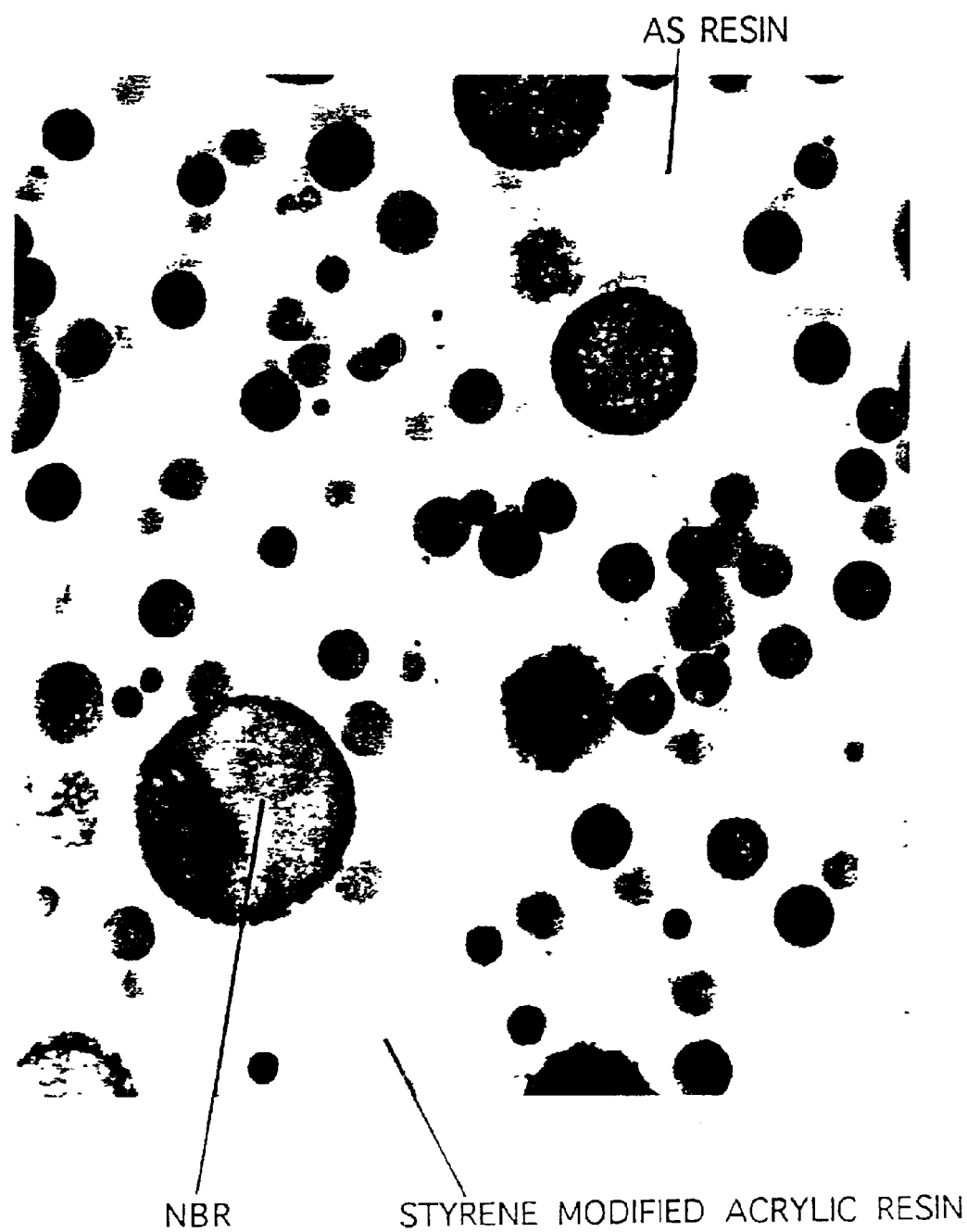

FIG. 23 is a TEM photograph of a test piece which is obtained by molding a mixture of a styrene-modified acrylic resin used as a resin for paint film (a paint resin, made by Mitsubishi Rayon Co., Ltd., with a commercial name and a grade of DIANAL BR-52) and an ABS resin used as a thermoplastic resin for a main constituent of moldings (ABS resin, made by Asahi Chemical Ind. Co., Ltd., with a commercial name and a grade of STAYLAC 120).

From the results of the observation of the TEM photograph, it will be seen that the styrene-modified acrylic resin used as a thermoplastic resin for paint film is finely, uniformly monodispersed in the AS resin of the ABS resin, thus exhibiting affinity for the resin. Any peel at the interfaces between both types of resins is not observed, and both resins are evaluated as a recyclable combination.

Figure 24:

FIG. 24 is a TEM photograph of a test piece which is obtained by molding a mixture of a chlorinated polypropylene resin used as a resin for paint film (a paint resin, made by Nippon Paper Industries Co., Ltd., with a commercial name and a grade of SUPERCHLON 224H) and a PP resin used as a thermoplastic resin for a main constituent of moldings (polypropylene resin, made by Japan Polyolefins Co., Ltd., with a commercial name and a grade of JAYARCMER MK541).

From the results of the observation of the TEM photograph, it will be seen that the chlorinated polypropylene resin used as a thermoplastic resin for paint film is not uniformly dispersed in the PP resin, and the absence of the resin for the paint film is observed. Thus, these are not evaluated as a recyclable combination.

Figure 25:

FIG. 25 is a TEM photograph of a test piece which is obtained by molding a mixture of a styrene-modified acrylic resin used as a resin for paint film (a paint resin, made by Mitsubishi Rayon Co., Ltd, with a commercial name and a grade of DIANAL BR-52) and a PVC resin used as a thermoplastic resin for a main constituent of moldings (rigid vinyl chloride resin, made by Riken Vinyl Co., Ltd., with a commercial name and a grade of VBV 0006F (grade for injection molding). The dyeing treatment was carried out by use of ruthenic acid ($RuO_4$).

Figure 26:

FIG. 26 is a TEM photograph wherein the test piece of FIG. 25 is dyed with osmic acid ($OsO_4$) and further with ruthenic acid ($RuO_4$).

From the results of the observation of the TEM photographs, the styrene-modified acrylic resin for the paint film was dispersed in the PVC resin. Peels were observed at individual interfaces, and the absence of the resin for paint film was found, with no affinity being shown. Thus, these resins are not evaluated as a recyclable combination.

Figure 27:

FIG. 27 is a TEM photograph of a test piece which is obtained by molding a mixture of a styrene-modified acrylic resin used as a resin for paint film (a paint resin, made by Mitsubishi Rayon Co., Ltd., with a commercial name and a grade of DIANAL BR-52) and a PP resin used as a thermoplastic resin for a main constituent of moldings (polypropylene resin, made by Nippon Polyolefins Co., Ltd., with a commercial name and a grade of JAYAROMER MK541).

From the results of the observation of the TEM photograph, it will be seen that the styrene-modified acrylic resin used as a thermoplastic resin for paint film is dispersed in the PP resin. Any peel at the interfaces is not observed, but it cannot be evaluated soon from the TEM photograph whether or not these are a recyclable combination.

Figure 28:
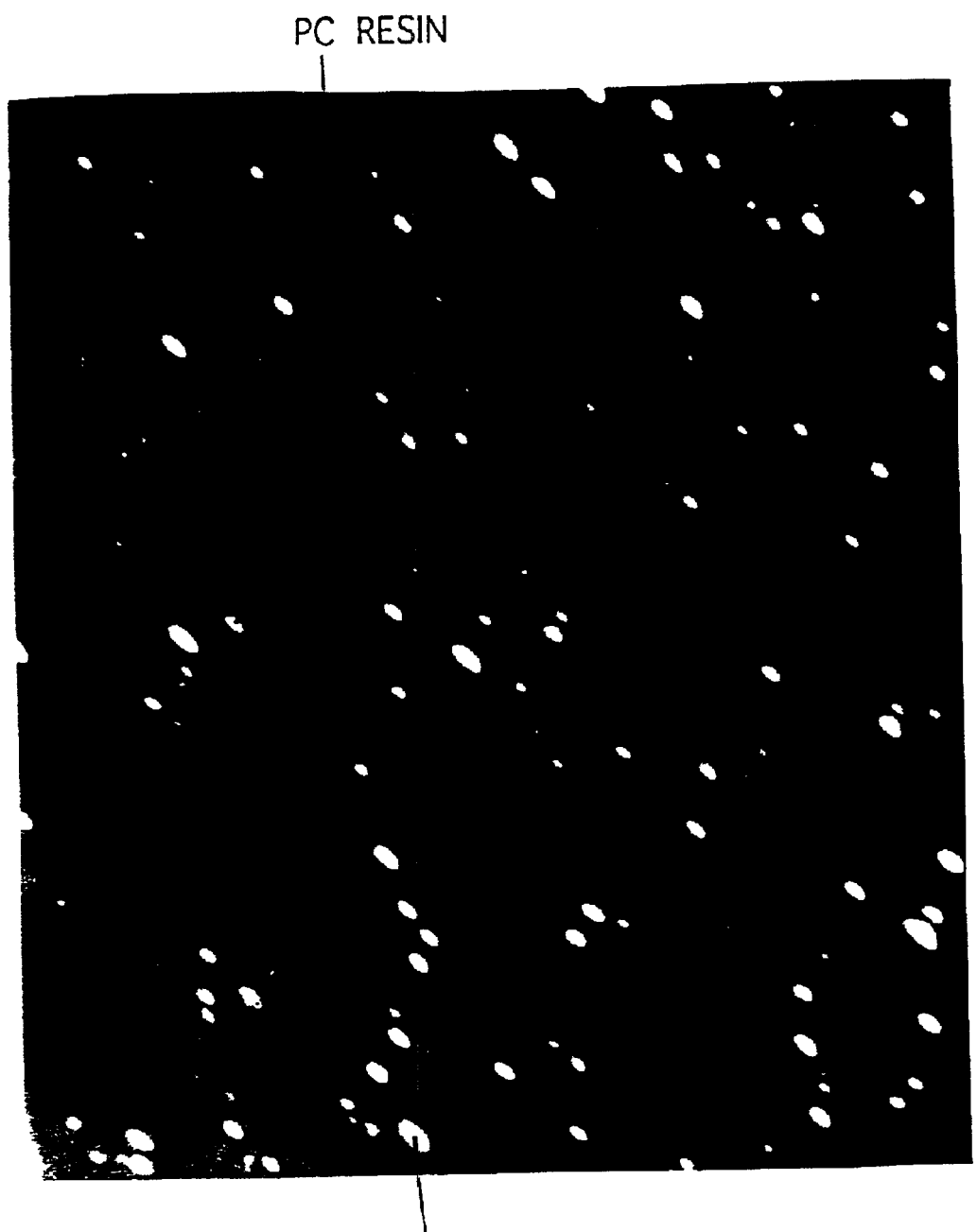

FIG. 28 is a TEM photograph of a test piece which is obtained by molding a mixture of a styrene-modified acrylic resin used as a resin for paint film (a paint resin, made by Mitsubishi Rayon Co., Ltd., with a commercial name and a grade of DIANAL BR-52) and a PC resin used as a thermoplastic resin for a main constituent of moldings (polycarbonate resin, made by Teijin Chemical Co., Ltd., with a commercial name and a grade of PANLITE 1250).

From the results of the observation of the TEM-photograph, it will be seen that the styrene-modified acrylic resin used as a thermoplastic resin for paint film is uniformly, spherically monodispersed in the PC resin, and they are miscible with each other. Any peel at the interfaces is not observed, and these are evaluated as a recyclable combination.

Figure 29:

FIG. 29 is a TEM photograph of a test piece which is obtained by molding a mixture of a styrene-acrylic resin emulsion (a paint resin, made by Tohpe Corporation, with a commercial name and a grade of XA-4408) and a HIPS resin used as a thermoplastic resin for a main constituent of moldings (high impact polystyrene resin, made by Asahi Chemical Ind. Co., Ltd., with a commercial name and a grade of STYRON 495).

From the results of the observation of the TEM photograph, it will be seen that the styrene-acrylic resin emulsion used as a thermoplastic resin for paint film is uniformly dispersed in the PS resin of the HIPS resin, thus showing compatibility. Any peel at the interfaces is not observed, and these are evaluated as a recyclable combination.

Figure 30:
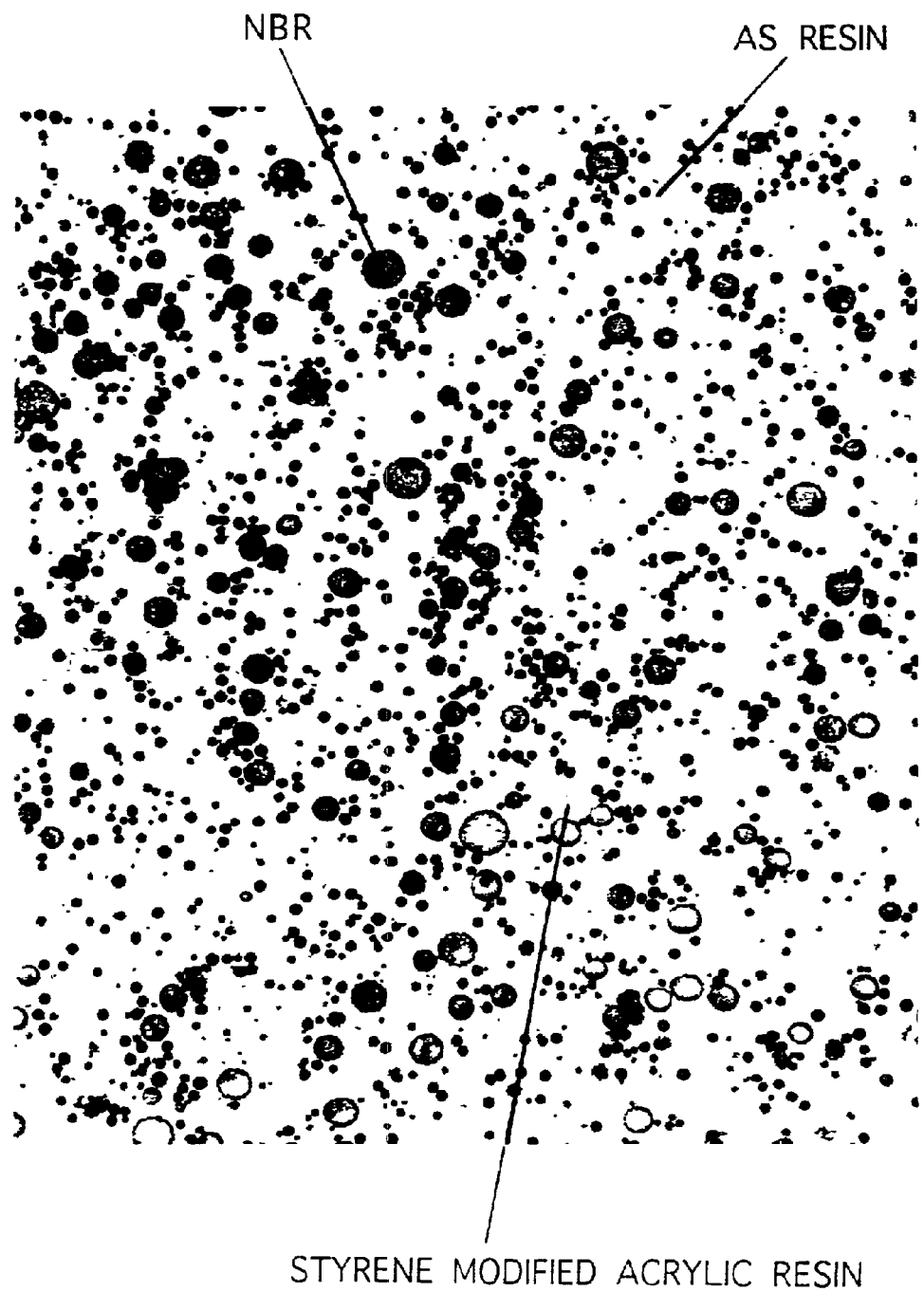

FIG. 30 is a TEM photograph of a test piece which is obtained by molding a mixture of a styrene-acrylic resin emulsion (a paint resin, made by Tohpe Corporation, with a commercial name and a grade of XA-4408) and an ABS resin used as a thermoplastic resin for a main constituent of moldings (ABS resin, made by Asahi Chemical Ind. Co., Ltd., with a commercial name and a grade of STAYLAC 120).

From the results of the observation of the TEM photograph, it will be seen that most of the styrene-acrylic resin emulsion used as a thermoplastic resin for paint film is miscible with the AS resin of the ABS resin, and part of the emulsion is uniformly dispersed. Any peel at the interfaces is not observed, and these are evaluated as a recyclable combination.

Figure 31:

FIG. 31 is a TEM photograph of a test piece which is obtained by molding a mixture of a styrene-acrylic resin emulsion (a paint resin, made by Tohpe Corporation, with a commercial name and a grade of XA-4408) and a polypropylene resin used as a thermoplastic resin for a main constituent of moldings (polypropylene resin, made by Japan Polyolefins Co., Ltd., with a commercial name and a grade of JAYAROMER MK541).

From the results of the observation of the TEM photograph, it will be seen that the styrene-acrylic resin emulsion used as a thermoplastic resin for paint film is uniformly dispersed in the PP resin without any peel at the interfaces. The black pots observed at the interfaces are considered such that part of the PP resin is taken in the paint resin and shows affinity therefor.

The results (no heat applied) of the adhesion properties in Table 98 reveal that no affinity is shown. From the TEM photograph wherein heat is actually applied to, they are evaluated as a recyclable combination.

Figure 32:

FIG. 32 is a TEM photograph of a test piece which is obtained by molding a mixture of a styrene-acrylic resin emulsion (a paint resin, made by Tohpe Corporation, with a commercial name and a grade of XA-4408) and a PVC resin used as a thermoplastic resin for a main constituent of moldings (rigid vinyl chloride resin, made by Riken Vinyl Ind. Co., Ltd., with a commercial name and a grade of VBV 0006F (injection molding grade)).

FIG. 32 shows the photograph of the test piece specimen, which was dyed with ruthenic acid ($RuO_4$). From the results of the observation of the TEM photograph, it will be seen that the styrene-acrylic resin emulsion used as a thermoplastic resin for paint film is dispersed in the PVC resin. Peels are found at the respective interfaces, and the absence of the paint film resin is seen. Thus, these are not evaluated as a recyclable combination.

Figure 33:
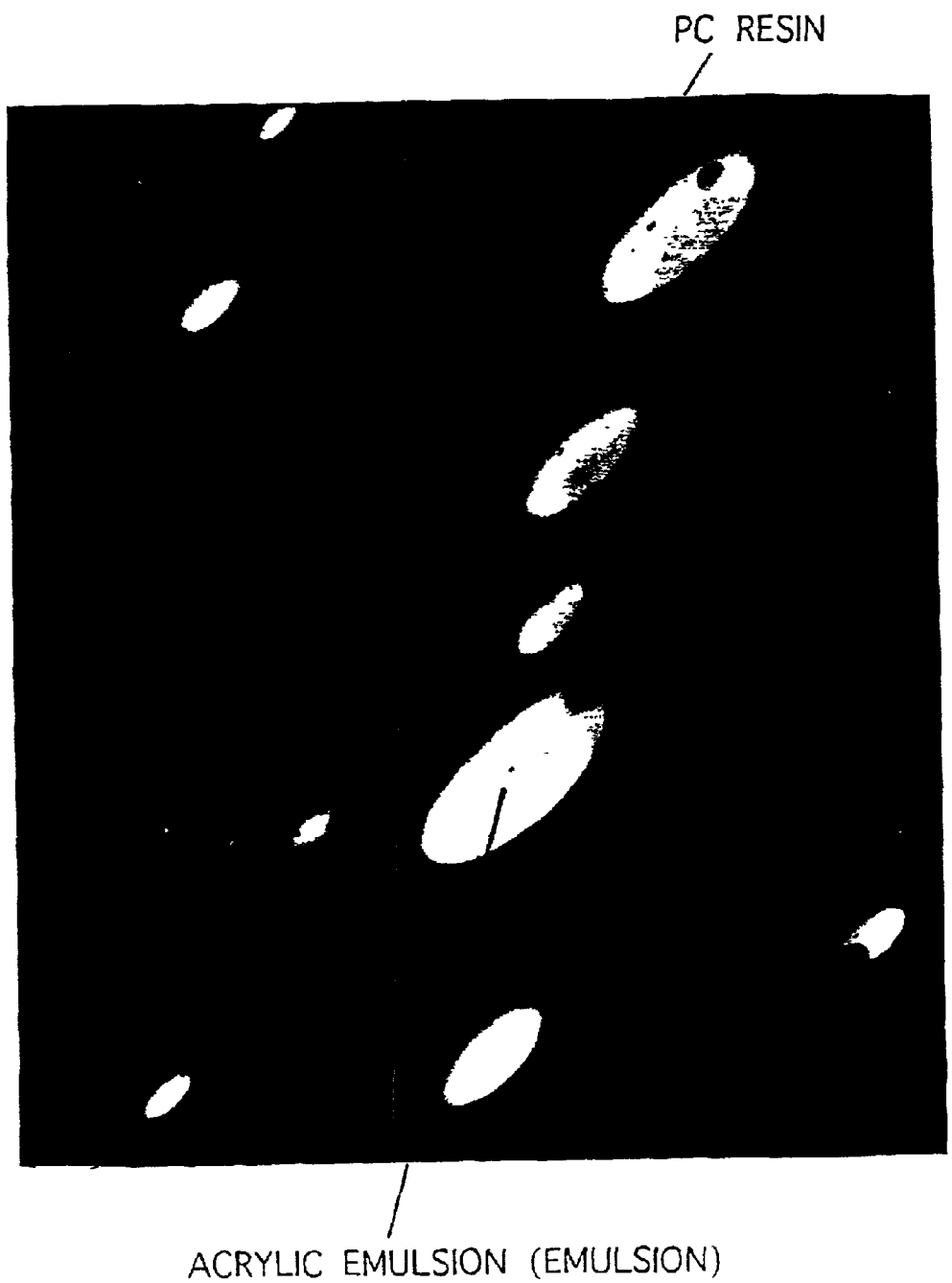

FIG. 33 is a TEM photograph of a test piece which is obtained by molding a mixture of a styrene-acrylic resin emulsion (a paint resin, made by Tohpe Corporation, with a commercial name and a grade of XA-4408) and a PC resin used as a thermoplastic resin for a main constituent of moldings (polycarbonate resin, made by Teijin Chemical Co., Ltd., with a commercial name and a grade of PANLITE 1250).

From the results of the observation of the TEM photograph, it will be seen that the styrene-acrylic resin emulsion used as a thermoplastic resin for paint film is uniformly dispersed and spherically monodispersed in the PC resin and shows affinity for the PC resin. No peel is found at the respective interfaces. Thus, these are evaluated as a recyclable combination.

FIG. 34 is a TEM photograph of a test piece which is obtained by molding a mixture of an acrylic resin emulsion (a paint resin, made by Tohpe Corporation, with a commercial name and a grade of XA-2409) and a HIPS resin used as a thermoplastic resin for a main constituent of moldings (high impact polystyrene resin, made by Asahi Chemical Ind. Co., Ltd., with a commercial name and a grade of STYRON 495).

From the results of the observation of the TEM photograph, it will be seen that the acrylic resin emulsion used as a thermoplastic resin for paint film is uniformly dispersed in the PS resin of the HIPS resin. Any peel at the interfaces is not observed, and these are evaluated as a recyclable combination.

Figure 35:

FIG. 35 is a TEM photograph of a test piece which is obtained by molding a mixture of an acrylic resin emulsion (a paint resin, made by Tohpe Corporation, with a commercial name and a grade of XA-2409) and an ABS resin used as a thermoplastic resin for a main constituent of moldings (ABS resin, made by Asahi Chemical Ind. Co., Ltd., with a commercial name and a grade of STAYLAC 120).

From the results of the observation of the TEM photograph, it will be seen that most of the acrylic resin emulsion used as a thermoplastic resin for paint film is miscible with the AS resin of the ABS resin, thus showing affinity. Any peel at the interfaces is not observed, and these are evaluated as a recyclable combination.

Figure 36:

FIG. 36 is a TEM photograph of a test piece which is obtained by molding a mixture of an acrylic resin emulsion (a paint resin, made by Tohpe Corporation, with a commercial name and a grade of XA-2409) and a PP resin used as a thermoplastic resin for a main constituent of moldings (polypropylene resin, made by Japan Polyolefins Co., Ltd., with a commercial name and a grade of JAYAROMER MK541).

From the results of the observation of the TEM photograph, it will be seen that the acrylic resin emulsion used as a thermoplastic resin for paint film is not uniformly dispersed in the PP resin. Since the absence of the paint film resin is locally found, these resins are not evaluated as a recyclable combination.

Figure 37:
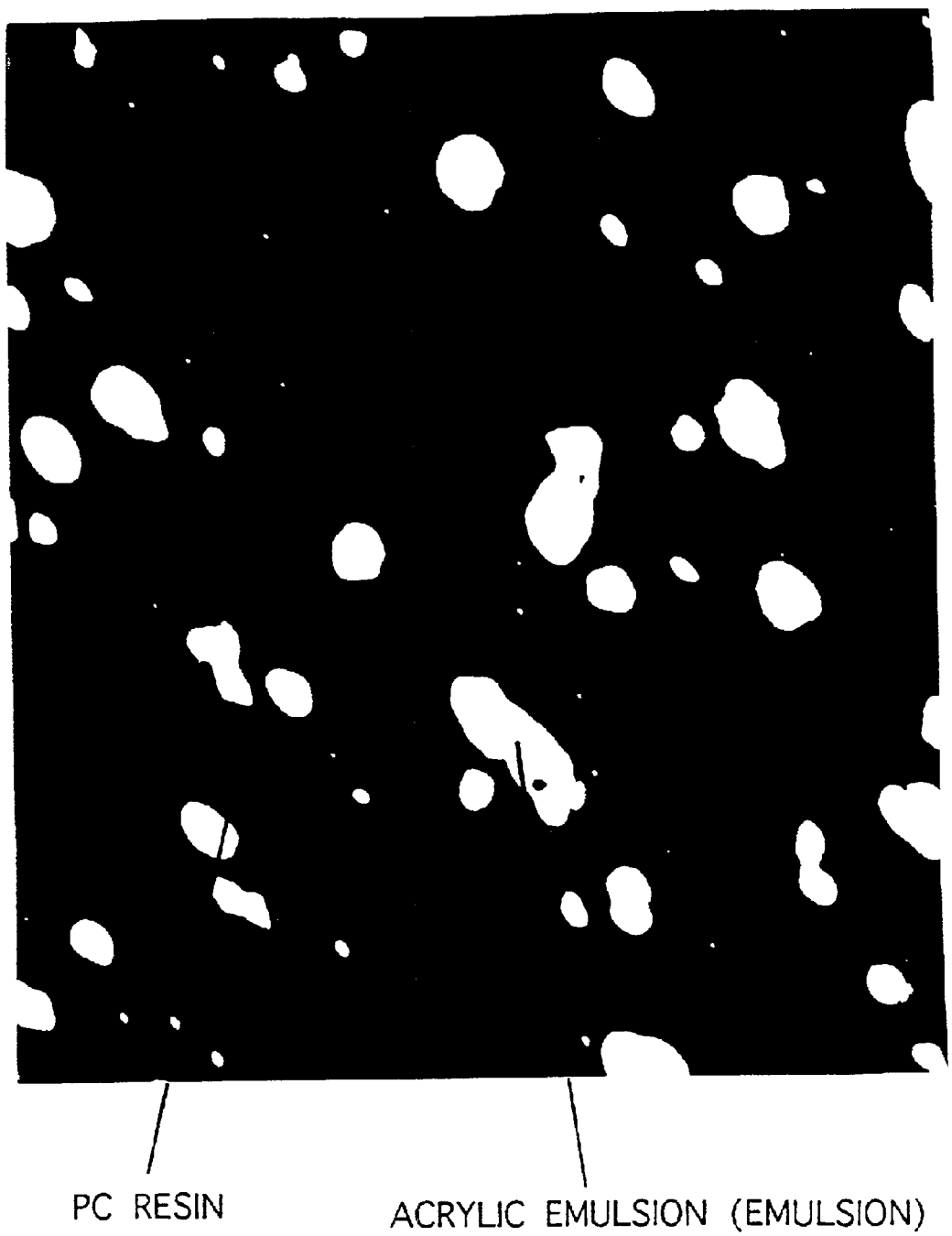

FIG. 37 is a TEM photograph of a test piece which is obtained by molding a mixture of an acrylic resin emulsion (a paint resin, made by Tohpe Corporation, with a commercial name and a grade of XA-2409) and a PC resin used as a thermoplastic resin for a main constituent of moldings (polycarbonate resin, made by Teijin Chemical Co., Ltd., with a commercial name and a grade of PANLITE 1250).

From the results of the observation of the TEM photograph, it will be seen that the acrylic resin emulsion used as a thermoplastic resin for paint film is uniformly dispersed and spherically monodispersed in the PC resin, thus showing compatibility. Any peel is not found at the respective interfaces, and thus, these are evaluated as a recyclable combination.

Figure 38:

FIG. 38 is a TEM photograph of a test piece which is obtained by molding a mixture of an acrylic resin emulsion (a paint resin, made by Tohpe Corporation, with a commercial name and a grade of XA-2409) and a PA resin used as a thermoplastic resin for a main constituent of moldings (nylon resin, made by Asahi Chemical Industry Co., Ltd., with a commercial name and a grade of REONA 1300S).

From the results of the observation of the TEM photograph, it will be seen that the acrylic resin emulsion used as a thermoplastic resin for paint film is completely compatible with the PA resin at a molecular level, and thus, these are evaluated as a recyclable combination.

Figure 39:
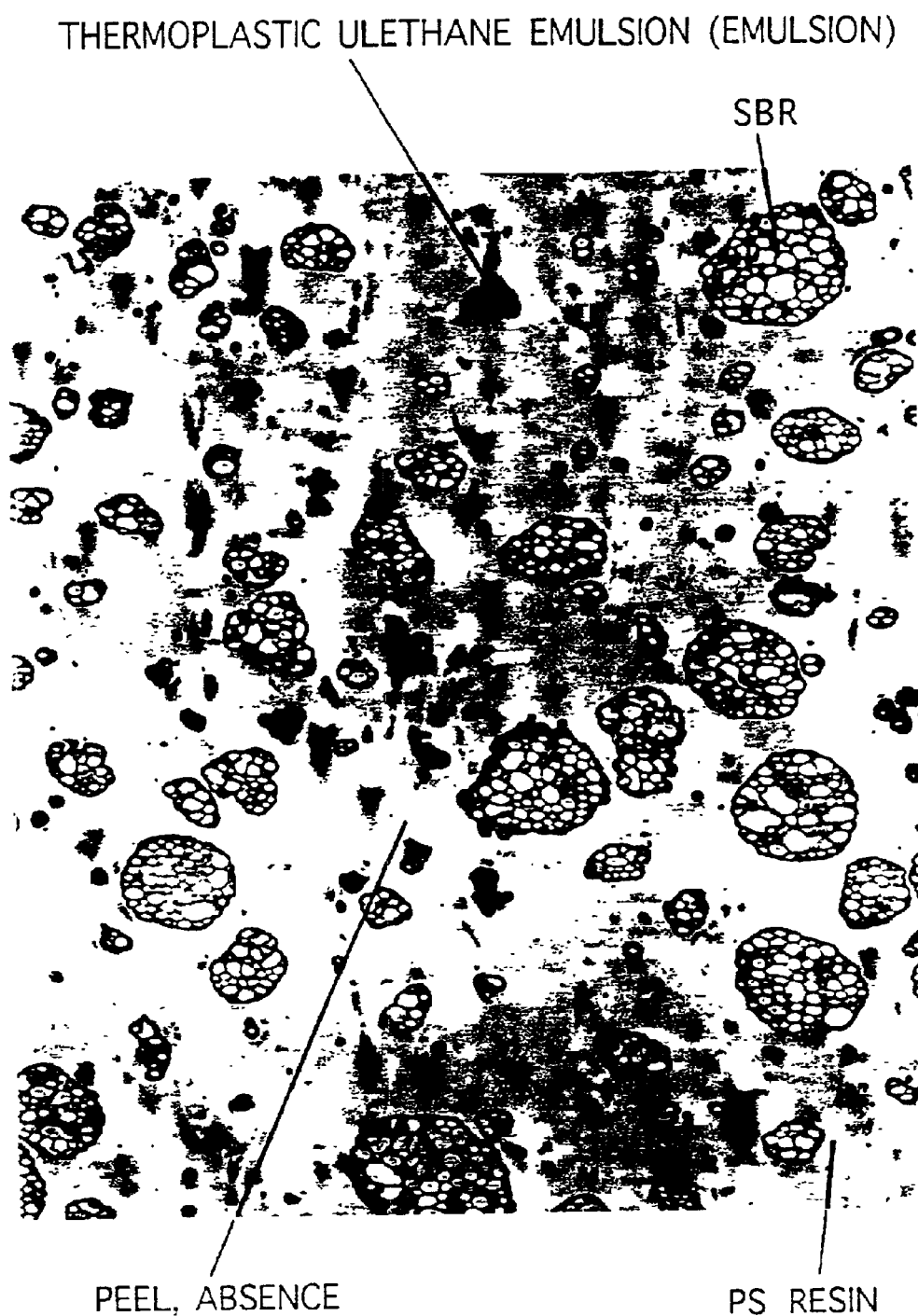

FIG. 39 is a TEM photograph of a test piece which is obtained by molding a mixture of a urethane resin emulsion (a paint resin, made by Tohpe Corporation, with a commercial name and a grade of GL-TOP-U) and a HIPS resin used as a thermoplastic resin for a main constituent of moldings (high impact polystyrene resin, made by Asahi Chemical Ind. Co., Ltd., with a commercial name and a grade of STYRON 495). Peels at the interfaces and the absence of the thermoplastic resin for paint film are clearly observed.

From the results of the observation of the TEM photograph, it will be seen that the urethane resin emulsion used as a thermoplastic resin for paint film is uniformly dispersed in the PS resin of the HIPS resin. Peels at the interfaces are not observed, and the absence of the paint film resin is found. Thus, these are not evaluated as a recyclable combination.

Figure 40:

FIG. 40 is a TEM photograph of a test piece which is obtained by molding a mixture of a urethane resin emulsion (a paint resin, made by Tohpe Corporation, with a commercial name and a grade of GL-TOP-U) and an ABS resin used as a thermoplastic resin for a main constituent of moldings (ABS resin, made by Asahi Chemical Ind. Co., Ltd., with a commercial name and a grade of STAYLAC 120).

From the results of the observation of the TEM photograph, it will be seen that the urethane resin emulsion used as a thermoplastic resin for paint film is uniformly dispersed in the AS resin of the ABS resin. Peels at the interfaces are observed, and
The absence of the paint film resin is found. Thus, these are not evaluated as a recyclable combination.

Figure 41:

FIG. 41 is a TEM photograph of a test piece which is obtained by molding a mixture of a urethane resin emulsion (urethane resin emulsion (a paint resin, made by Tohpe Corporation, with a commercial name and a grade of GL-TOP-U) and a PVC resin used as a thermoplastic resin for a main constituent of moldings (rigid vinyl chloride resin, made by Riken Vinyl Industry Co., Ltd., with a commercial name and a grade of VBV 0006F).

From the results of the observation of the TEM photograph, it will be seen that the urethane resin emulsion used as a thermoplastic resin for paint film is dispersed in the PVC resin Peels at the interfaces are observed, and the absence of the paint film resin is found. Thus, these are not evaluated as a recyclable combination.

Figure 42:

FIG. 42 is a TEM photograph of a test piece which is obtained by molding a mixture of a chlorinated polypropylene resin (a paint resin, made by Mitsubishi Rayon Co., Ltd., with a commercial name and a grade of DIANAL JR1487) and a PP resin used as a thermoplastic resin for a main constituent of moldings (polypropylene resin, made by Nippon Polyolefins Co., Ltd., with a commercial name and a grade of JAYAROMER MK541).

From the results of the observation of the TEM photograph, it will be seen that the chlorinated polypropylene resin is uniformly dispersed in the PP resin, with no peel being found at the respective interfaces. No absence of the pain film resin is found. Thus, these are evaluated as a recyclable combination.

In FIGS. 6 to 9 and 17 to 42, the dyeing agent "$OsO_4$" means dyeing only wit osmic acid ($OsO_4$), "$RuO_4$" means dyeing only with ruthenic acid ($RuO_4$), and "$OsO_4+RuO_4$" means that a specimen dyes first with osmic acid ($OsO_4$) is then re-dyed with ruthenic acid ($RuO_4$).

Example 60

The recyclability evaluation method of Example 60 were such that clear paints #101 t #151 indicated in Table 99-1 and prepared by use of a resin for paint film were, respectively, coated onto thermoplastic moldings made of ABS, HIPS, styrene-modified PPO(E), etc., indicated in Table 99-2. The adhesion properties of the resultant films were subjected to the cross hatch test described in JIS K 5400 8.5.2 set out in Table 8.

When the results of judgment on the adhesion property of the respective films are at 90/100 or higher in the table (wherein the denominator of 100 is omitted and the results of the judgment are indicated as "◎" and "○" in the table), it has been judged that the thermoplastic resin for the paint film and the thermoplastic resin for the molding have high affinity, with the great possibility that they are recyclable.

In Tables 99-1 to 99-3, the types of paints, the results of the test, and notes are shown.

Example 61

The recyclability evaluation method of Example 61 was such that recycling of a molding material was repeated wherein reproduced resin pellets, which were obtained from coated moldings obtained by coating of moldings in the same manner as in Example 4, were re-molded, coated, crushed and re-pelletized, and a cross hatch test was conducted for each recycle to evaluate the recyclability based on the results of the tests.

An ABS resin, made by Asahi Chemical Ind. Co., Ltd., with a commercial name and a grade of STAYLAC 191 was used as a molding material, and recyclable paints used included paint #149 (wherein thinner S2 indicated in Table 7 was used as a solvent), paint #151 (wherein de-ionized water was used as a solvent for dilution) and paint #149Mt (wherein Mt means metallic, and thinner S2 indicated in Table 7 was used as a solvent). The cylinder temperatures of an extruder were, respectively, set at 255° C., 250° C., 245° C., 240° C., and 230° C., which were commonly used for all cases including a thermosetting urethane paint for comparison and recycles having no coatings thereon.

Tables 100-2, 101 and 102 show the results of performance tests in the respective cycles (turns). For comparison, the above-indicated ABS resin was recycled without any coating, with the results shown in Table 103. The results of the instances where two types of thermosetting urethane resin paints were used including a urethane resin (10:1) paint of Tohpe Corporation, with a commercial name and a grade of REFINE 2K and a urethane resin (4:1) paint of Mikasa Paint Co., Ltd., with a commercial name and a grade of BMU-5 are shown in Tables 104 and 105.

The test items, test methods, required value and units in Tables 100-2 to 122 are, respectively, those indicated in Table 100-1 or Tables 8 and 9. In Tables 100-2 to 126, the test items are indicated in terms of symbols B1 to B17 and C1 to C14 defined in table 100-1 from the standpoint of the space limitation.

Example 62

The recyclability evaluation method of Example 62 was such that recycling was repeated in the same manner as in Example 61, and the evaluation tests indicated in Tables 8 and 9 and including the cross hatch test were conducted for each recycling, and the recyclability was evaluated based on the results of the tests.

A HIPS resin, made by Asahi Chemical Ind. Co., Ltd., with a commercial name and a grade of STYRON 492 was used as a molding material, and recyclable paints used included paint #149 and paint #151. The cylinder temperatures of an extruder were, respectively, set from the head at 250° C., 240° C., 230° C., 220° C., and 200° C., which were commonly used for all cases including a thermosetting urethane paint for comparison and recycles having no coatings thereon.

Tables 106, 107 show the results of performance tests in the respective cycles (turns). For comparison, the above-indicated HIPS resin was recycled without any coating, with the results shown in Table 108. The results of the instances where two types of thermosetting urethane resin paints were used including a urethane resin (10:1) paint of Tohpe Corporation, with a commercial name and a grade of REFINE 2K and a urethane resin (4:1) paint of Mikasa Paint Co., Ltd., with a commercial name and a grade of BMU-5 are shown in Tables 109 and 110.

Example 63

The recyclability evaluation method of Example 63 was such that recycling was repeated in the same manner as in Example 61, and the cross hatch test was conducted for each recycling, and the recyclability was evaluated based on the results of the test.

A styrene-modified PPO (E) resin, made by Asahi Chemical Ind. Co., Ltd., with a commercial name and a grade of Xyron 100Z was used as a molding material, and paint #149 was used as a recyclable paint. The cylinder temperatures of an extruder were, respectively, set from the head at 260° C., 250° C., 240° C., 220° C., and 200° C.

Table 110 shows the results of performance test in the respective cycles (turns). For comparison, the results of recycling without any coating are shown in Table 112.

Example 64

The recyclability evaluation method of Example 64 was such that recycling was repeated in the same manner as in Example 61, and the evaluation tests including the cross hatch test were conducted for each recycling, and the recyclability was evaluated based on the results of the tests.

A flame-retardant HIPS resin, made by Asahi Chemical Ind. Co., Ltd., with a commercial name and a grade of STYRON V5741 was used as a molding material, and paint #149 was used as a recyclable paint. The cylinder temperatures of an extruder were, respectively, set from the head at 250° C., 240° C., 230° C., 220° C., and 200° C.

Table 113 shows the results of performance test in the respective cycles (turns). For comparison, the results of recycling without any coating are shown in Table 114.

Example 65

The recyclability evaluation method of Example 65 was such that recycling was repeated in the same manner as in Example 61, and the evaluation tests including the cross hatch test were conducted for each recycling, and the recyclability was evaluated based on the results of the tests.

A flame-retardant ABS resin, made by Asahi Chemical Ind. Co., Ltd., with a commercial name and a grade of STAYLAC VA58 was used as a molding material, and paint #149was used as a recyclable paint. The cylinder temperatures of an extruder were, respectively, set from the head at 250° C., 240° C., 230° C., 220° C., and 200° C.

Table 115 shows the results of performance test in the respective cycles (turns). For comparison, the results of recycling without any coating are shown in Table 116.

Example 66

The recyclability evaluation method of Example 65 was such that recycling was repeated in the same manner as in Example 61, and the evaluation tests including the cross hatch test were conducted for each recycling, and the recyclability was evaluated based on the results of the tests.

A flame-retardant ABS resin, made by Ube Cycon Co., Ltd., with a commercial name and a grade of Cycorac ZFJ12 was used as a molding material, and paint #149 was used as a recyclable paint. The cylinder temperatures of an extruder were, respectively, set from the head at 250° C., 240° C., 230° C., 220° C., and 200° C.

Table 117 shows the results of performance test in the respective cycles (turns). For comparison, the results of recycling without any coating are shown in Table 118.

Example 67

The recyclability evaluation method of Example 65 was such that recycling was repeated in the same manner as in Example 61, and the cross hatch test was conducted for each recycling, and the recyclability was evaluated based on the results of the test.

A PC/ABS resin, made by GE Plastics Japan Co., Ltd., with a commercial name and a grade of Cycolloy C6200 was used as a molding material, and paint #149 was used as a recyclable paint. The cylinder temperatures of an extruder were, respectively, set from the head at slightly low levels of 245° C., 220° C., 230° C., 200° C., and 200° C.

In the course of the extrusion step of preparing pellets in the first cycle (turn) recycling of the PC/ABS resin, a surging phenomenon took place irrespective of coating, so that the strand could not be well extruded, making pelletization difficult. Accordingly, the results of performance tests of the first cycle (turn) alone are shown in Table 119. For comparison, the results of recycling without any coating are shown in Table 120.

Example 68

The recyclability evaluation method of Example 65 was such that recycling was repeated in the same manner as in Example 61, and the cross hatch test was conducted for each recycling, and the recyclability was evaluated based on the results of the test.

A PP resin, made by Nippon Polyolefins Co., Ltd., with a commercial name and a grade of MK454B was used as a molding material, and paint #132 (wherein thinner S3 indicated in Table 7 was used as a solvent) was employed as recyclable paint. The cylinder temperatures of an extruder were, respectively, set from the head at 240° C., 230° C., 220° C., 220° C., and 210° C.

Table 121 shows the results of performance test in the respective cycles (turns). For comparison, the results of recycling without any coating are shown in Table 122.

Example 69

Example 69 relates to recyclable paints and the like, along with the preparation thereof.

The preparation method and apparatus in this example are the same as those of Example 1. In Tables 123-1 to 123-4, there are, respectively, shown starting materials for paint (makers, grades and the like), solvents used for dissolution or dispersion and other addition agents, thinners for dilution, affinity (recyclability) for thermoplastic resins used as a main component of moldings, and non-affinity (non-recyclability). In Table 124, coatability of individual paints and film properties are shown. The thermoplastic resins, which are used to evaluate the coatability and film properties, are shown at the lowermost section in Table 124. The respective test methods of Table 124 are accorded to Table 8.

The recyclability was evaluated in such a way that thermoplastic resin moldings coated with the respective paints were each pelletized in the same manner as in Example 4, and the pellets were molded, with the results shown in Table 125. The thermoplastic resins used to evaluate the recyclability and moldability are shown in the lowermost section in Table 125.

Example 70

The recyclability evaluation method of Example 70 was such that moldings coated on the surface thereof by means of a curtain flow coater were evaluated with respect to the coatability and film properties.

Paint #149 was adjusted in viscosity to 38 seconds at 20° C. when using Iwata's cup set out hereinbefore, and was coated onto ABS sheet moldings by means of a flow coater (Model: FL-S33F), made by Iwata Air Compressor Mfg. Co., Ltd., at a line speed of 70 m/minute in an amount of 70 to 100 g/m$^2$.

The resultant coated product had a dry film thickness of 15 to 18 μm. The recyclable coated moldings were subjected to the test methods indicated in Table 9 to evaluate the coatability and film properties thereof. The results are shown in Table 126.

Example 71

The recyclability evaluation method of Example 71 was such that moldings coated on the surface thereof by means of a curtain flow coater were evaluated with respect to the coatability and film properties.

Paint #149 was adjusted in viscosity to 30 seconds at 20° C. when using Iwata's cup set out hereinbefore, and was coated onto ABS sheet moldings by means of a natural roll coater, made by Mochizuki Machinery Ind. Co., Ltd., at a line speed of 60 m/minute in an amount of 50 to 60 g/m$^2$.

The resultant coated product had a dry film thickness of 8 to 10 μm. The recyclable coated moldings were subjected to the test methods indicated in Table 8 to evaluate the coatability and film properties thereof. The results are shown in Table 127.

Example 72

The coating method and apparatus of Example 72 illustrate powder coating of thermoplastic resin power paints (hereinafter referred to as "thermoplastic resin powder paint" or merely as "powder paint").

Figure 43:
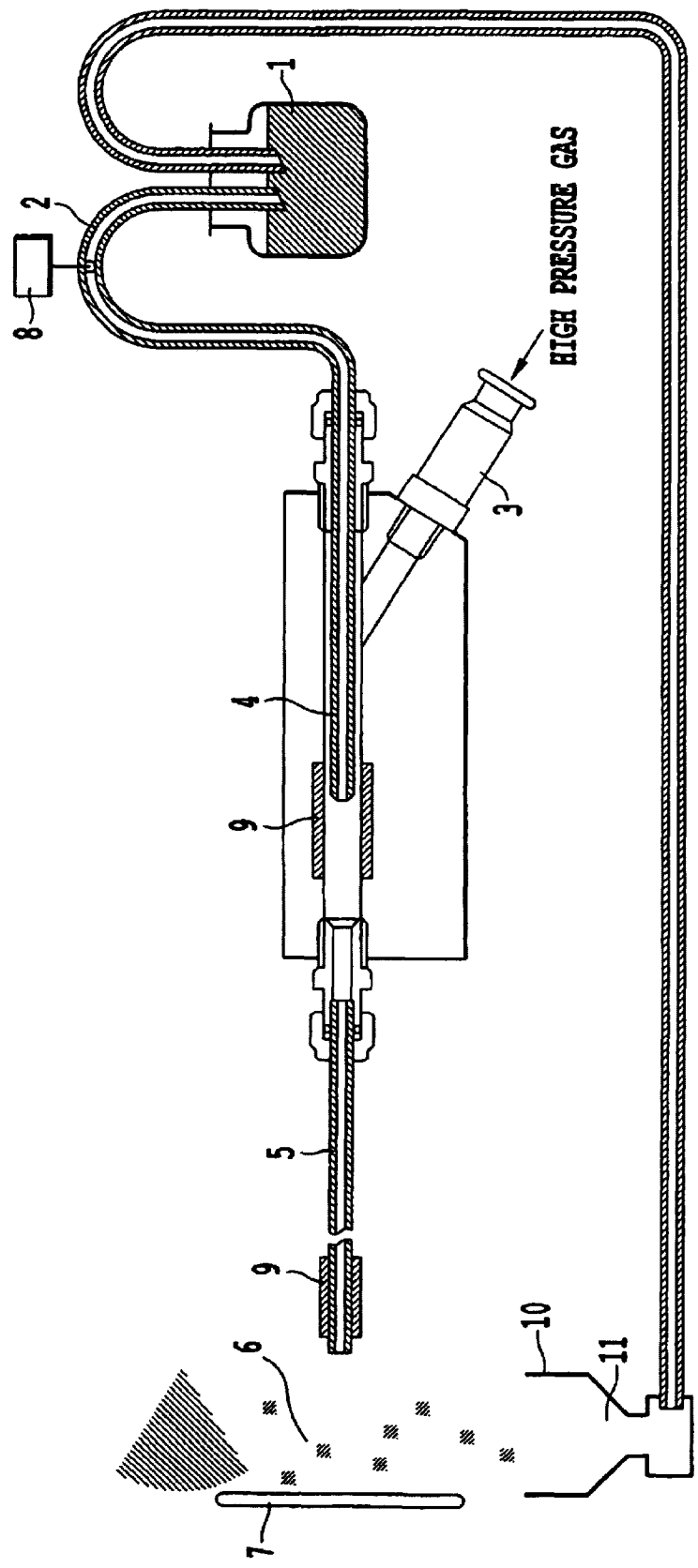
FIG. 43 is an illustrative view illustrating a powder paint device in Example 67 of the invention.

The principle of powder coating using thermoplastic resin powder paints is described with reference to FIG. 43. A powder paint (1) consists of a thermoplastic resin powder paint, wherein a resin used as a finely divided powder paint having an average particle size of about 20 to 100 μm is made of a thermoplastic resin. A high pressure gas plug (3) is connected to a high pressure gas generator wherein the gas is compressed to a level higher than an atmospheric pressure. When the high pressure gas is passed to an apparatus, a negative pressure is established with a fine tube (4) and a hose (2) by virtue of the principle of the venturi tube, thereby causing the powder paint (1) to be sucked. The thus sucked powder (1) in the tube is accelerated by flow velocity of the high pressure gas being flown within a paint accelerating tube (5), and arrives at and collides with the surface of a plastic molding. On the collision, part of the kinetic energy of the particles is converted to a thermal energy. This thermal energy thermally melts the particles of the powder paint (1), along with the surface of the thermoplastic resin molding being melted. Thus, both types of resins are caused to be bonded together to form a film.

The apparatus includes the hose (2) for feeding the powder paint (1) to the inside of the apparatus, a high pressure gas intake port (a high pressure gas coupler (3)), the paint accelerating tube (5), a paint feed control valve (8), the venturi tube (4), and a heater (9) provided with a temperature controller for the purpose of preventing an abrupt drop of temperature as is caused by the high pressure gas being adiabatically expanded at the tip of a nozzle. The paint particles, which remain without film formation, are recovered by means of a recovery device (10). The thus recovery rate of the pain arrived at about 90%.

The preparation of thermoplastic resin powder paint is described.

Materials indicated in Table 128 are mixed in a pre-mixer, and thermally mixed at 100 to 120° C. in a heated mixer (extruder) to obtain pellets. 10 wt % of dry ice was added to the pellets and finely divided into a powder paint #121Pw having an average size of 35 μm.

In Example 72, the powder paint #121Pw was accelerated to about 50 to 85% of a sound velocity by use of a high pressure inert nitrogen gas compressed to 250 kg/cm$^2$, followed by collision at the surface of the molding obtained in the first cycle (turn) of Example 4 thereby forming a film thereon.

The recyclable coated moldings thus obtained were evaluated according to the test methods shown in Table 8 with respect to the coatability and film properties. The results are shown in Table 129.

The moldings attached with the coating film of the recyclable powder paint of Example 76 thus obtained was reproduced in the same manner as in Example 4 to provide recycling resin pellets. The pellets were subjected to a confirmation test on moldability, with the result that no problem on molding operations arose as is caused by the incorporation of the powder paint.

It was confirmed through the tests of Examples 61, 62 and 63 that the thermoplastic resin for the powder paint #121Pw and the thermoplastic resin for a main constituent of the molding have good affinity for each other. They do not greatly influence the physical properties of materials and the measurement of physical properties after recycling was not purposely effected.

The types of gases usable for the powder coating generally include inert gases such as nitrogen gas, carbon dioxide gas and the like. If combustion improving gases (fuel additive gas), such as air, oxygen and the like, are used and a powder paint is combustible in nature, great care should be paid to handling. Care should also be paid to when using combustible gases such as methane, ethane and the like. Volatile liquids maybe used as a high pressure gas after vaporization by application of heat.

The term "high pressure gas" used herein generically means gases compressed to a pressure of 3 kg/cm$^2$.

When suing the powder coating method, it is not necessary to dissolve resins in solvents and to daringly use low molecular weight resins as set out hereinbefore. Since coating is feasible in a solvent-free condition, the worsening of working environments is reduced, and a low degree of public nuisance can be realized.

The resins usable for powder paints may include substantially all thermoplastic resins set out hereinbefore (such as paint resins, molding resins, and organic polymers used as compatibilizing (miscibilizing) agents) irrespective of the molecular weight. Taking film properties into consideration, resins having a melting temperature of 60° C. or over are preferred. Higher melting temperatures enable one to increase the velocity of a powder paint by increasing a gas pressure, to slightly increase a temperature of a powder paint beforehand, to increase the surface temperature of a product to be coated, and to increase an ambient temperature at which coating is carried out.

For the acceleration of powder paint, electrostatic induction may be used aside form the high pressure gas.

Example 73

In Example 73, styrene-modified PPO (E) is used as a flame retardant in resins in order to cope with the regulations concerning non-halogen and antimony-free flame retardants.

With flame-retardant ABS, such flame retardants and retardant aids as set out before have to be added thereto. Accordingly, it is the difficult to cope with the regulations. In fact, currently employed molding materials, which meet the regulations, include PC/ABS resins (for example, PC/ABS resin made by GE Plastics Japan Co., Ltd., with a commercial name of CYCOLOY C6200)). When this resin is used for recycling, the results differ from those of Examples 18 to 25 irrespective of the presence or absence of coatings. When molded, the structural balance between PC and ABS is lost, which may depend on a different mixing ratio between PC and ABS resins. Alternatively, the PC undergoes hydrolysis by application of heat. As a result, when pelletized by use of the same apparatus and method as in Example 4, the resin changes in extrusion rate of an extruder, and a so-called surging phenomenon took place, making pelletization difficult.

Further, compatibilizing (miscibilizing) agents (made by NOF corporation, with commercial name and grades of CT120, CT121, CT134 and CH430) were, respectively, added to the resin in an amount of 5 wt %, the surging phenomenon could not be suppressed.

Since pelletization was not possible owing to the surging, a hot cut device was used to pelletize the resin.

The physical properties shown in Table 130 are the results of the case where the hot cut device was used without use of any addition agents for preventing the surging phenomenon.

Mention is made of styrene-modified PPO(E) resin as one of resins, which undergo only a reduced degree of thermal degradation due to the heat history, are relatively easy in recycling, and meet the regulations. The styrene-modified PPO(E) resin has poor weatherability and may not be, in some cases, applied to articles, such as a cover (box), which are susceptible to deterioration by light. However, if styrene-modified PPO(E) resin moldings having poor weatherability are coated on the surfaces thereof, the problem of the poor weatherability can be solved. In addition, where the coated film contains a hydrophilic resin or other addition agents, or contains large amounts of inorganic materials (e.g. pigments), the coated moldings is unlikely to be electrically charged and is less soiled owing to the charging. As a matter of course, the resin for the top coating is made of a thermoplastic resin such as, for example, styrene-modified acrylic resin, and thus, has affinity for styrene-modified PPO(E) resin which is a constituent of moldings. In this case, repeated recycling becomes possible.

In Table 130, the results of a weatherability accelerating test using a fadeometer are shown with respect to test piece moldings obtained by molding a mixture of flame-retardant ABS resin adjusted in color to white (flame retardant ABS resin, made by Ube Cycon Co., Ltd., with a commercial name of CYCOLAC ZFJ12), PC/ABS resin (PC/ABS resin, made by GE Plastics Japan Co., Ltd. with a commercial name of SYCOLOY C6200), and styrene-modified PPO(E) resin (styrene-modified PPO(E) resin, made by Asahi Chemical Ind. Co., Ltd., with a commercial name of Xyron 100Z), and test piece moldings made of the above-mentioned styrene-modified PPO(E) resin, both coated with paint #149, and also test piece moldings made of the styrene-modified PPO(E) resin and coated with a urethane resin (10:1) paint. The test method is accorded to the method described in JIS K5400 9.7.2 indicated in Table B.

Judging totally from the results of the measurements of the physical properties and the weatherability of Table 13, it will be seen that where the styrene-modified PPO(E) resin is coated, the weatherability is satisfactory and is sufficient to clear the above-mentioned regulations along with good recyclability.

Example 74

In Examples 26 and 27, it was stated that PET resin was mixed with ABS resin. In Example 74, a compatibilizing (miscibilizing) agent was further added to at the time of recycling thereby improving the physical properties of the ABS/PET alloy resin.

Table 131 shows the results of measurement of Izod impact strength in case where 5 wt % of a compatibilizing (miscibilizing) agent (a compatibilizing (miscibilizing) agent, made by NIPPON OIL AND FATS CO. LTD. (NOF) Corporation, with a commercial name and a grade of MODIPER A4410 (structure: E/GMA-g-PSAN=50/50 (wt)) was added (i.e. mixed by use of the afore-mentioned tumbler) was added to the pellets of the ABS/PET alloy resin (i.e. pellets attached with the film of paint #10) obtained in example 26. For comparison, the results of the case where no addition agent was added to are also shown.

Moreover, the results of improving the Izod impact strength at the welded portion are shown in Table 132. According to JIS standards K 7203, the bending strength was measured, whereupon it was found that the molding to which no compatibilizing (miscibilizing) agent was added was broken at the welded portion when the degree of deflection arrived at 7 mm. On the other hand, the welded portion was not broken at a degree of deflection arriving at 50 mm when the compatibilizing (miscibilizing) agent was added to in an amount of 5 wt %.

The measurement of the Izod impact strength in Tables 131, 132 was made according to the JIS standards K 7110 using a ⅛ inch thick-notched sample.

Example 75

Example 75 was such that at the time of recycling, reproduced pellets of the afore-mentioned PET bottles were added, as a recycling assistant, to the styrene-modified PPO (E) (i.e. reproduced pellets of the first turn coated with paint #10) whose physical properties lowered owing to the heat history underwent during the recycling, thereby intending improved physical properties.

Figure 44:
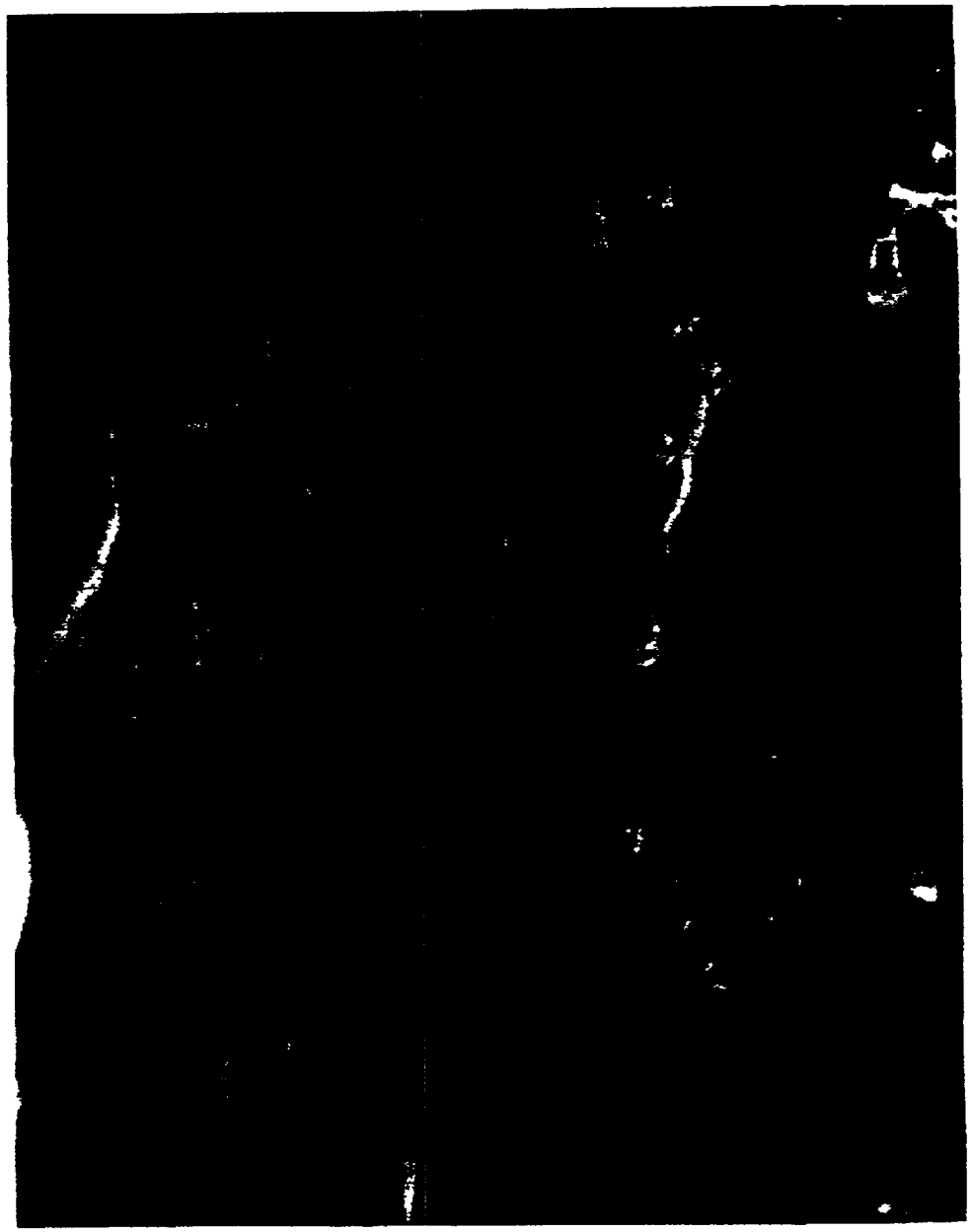
FIG. 44 is a copy of an SEM photograph taken by an electron microscope showing the state of dispersion of a molding and a resin constituent in a paint in Example 75 of the invention.

FIG. 44 shows an SEM photograph of a fracture of a molding obtained by injection molding of a mixture of 40 wt % of the reproduced styrene-modified PPO(E) and 60 wt % of the reproduced PET resin, revealing that the styrene-modified PPO(E) resin was spherically dispersed in the PET resin.

Example 76

Figure 45:
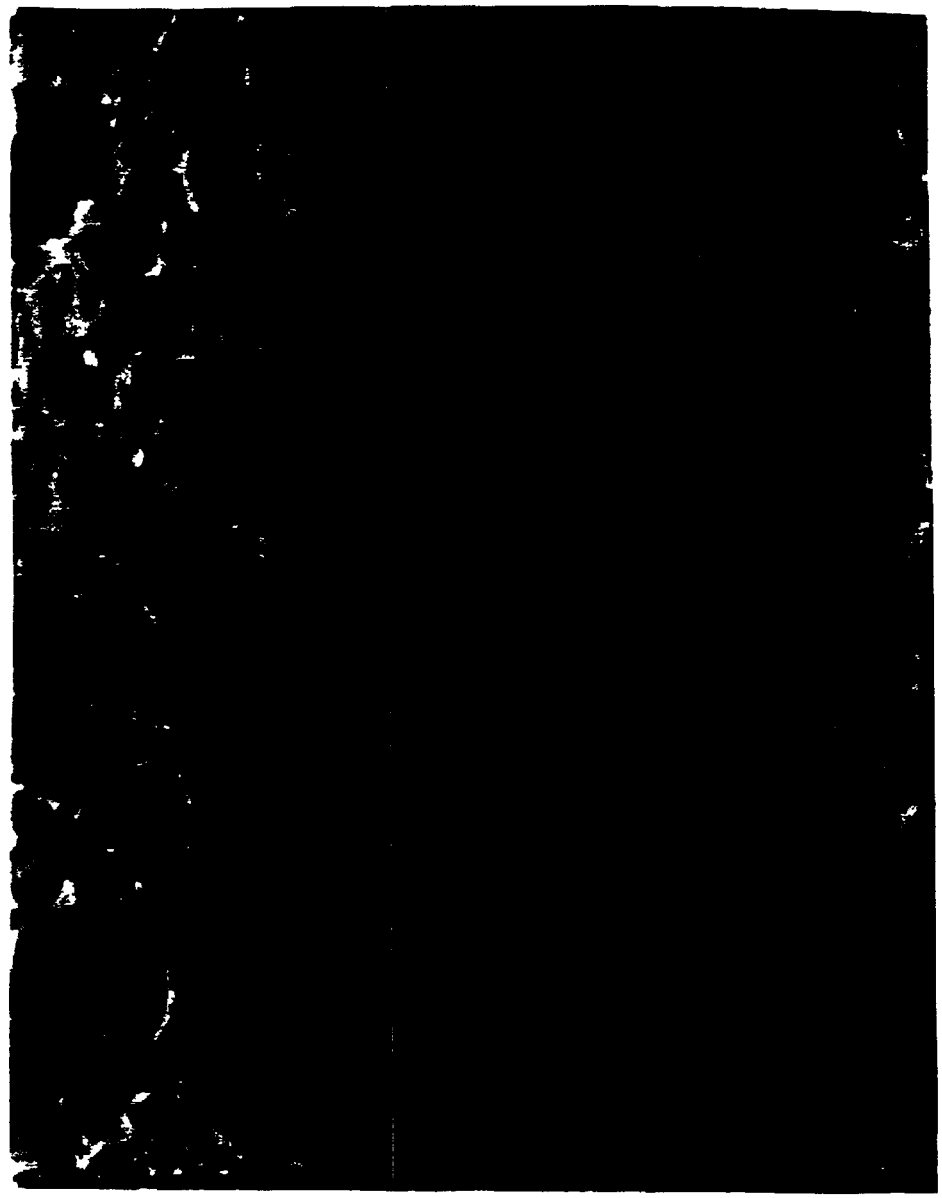
FIG. 45 is a copy of an SEM photograph taken by an electron microscope showing the state of dispersion of a molding and a resin constituent in a paint in Example 76 of the invention.

FIG. 45 shows an SEM photograph of a break section of a molding obtained by injection molding of a mixed resin which was obtained by mixing 40 wt % of the afore-mentioned reproduced styrene-modified PPO(E) resin and 60 wt % of the afore-mentioned PET resin, to which 10 wt % of a compatibilizing (miscibilizing) agent (compatibilizing (miscibilizing) agent, made by NOF Corporation with E/GMA=85/15 (wt)) in order to change the structure and morphology of the reproduced PET resin in the styrene-modified PPO(E) resin.

The comparison with the case of Example 75 reveals that the styrene-modified PPO(E) resin is in the form of finer spheres in the PET resin.

Example 77

Example 76 was repeated except that the compatibilizing (miscibilizing) agent of Example 76 was changed to a compatibilizing (miscibilizing) agent (MODIPER A4100, made by NOF Corporation with E/GMA-g-PSt=70/30 (wt)) and the amount was likewise at 10 wt %.

Figure 46:
FIG. 46 a copy of an SEM photograph taken by an electron microscope showing the state of dispersion of a molding and a resin constituent in a paint in Example 77 of the invention.

From the observation of FIG. 46, the styrene-modified PPO(E) resin is moREFINEly dispersed in the PET resin on comparison with Example 76.

Example 78

Example 76 was repeated except that the compatibilizing (miscibilizing) agent of Example 76 was changed to a compatibilizing (miscibilizing) agent (MODIPER A4101, made by NOF Corporation with E/GMA-g-PSt=50/50 (wt)) and the amount was likewise at 10 wt %.

Figure 47:
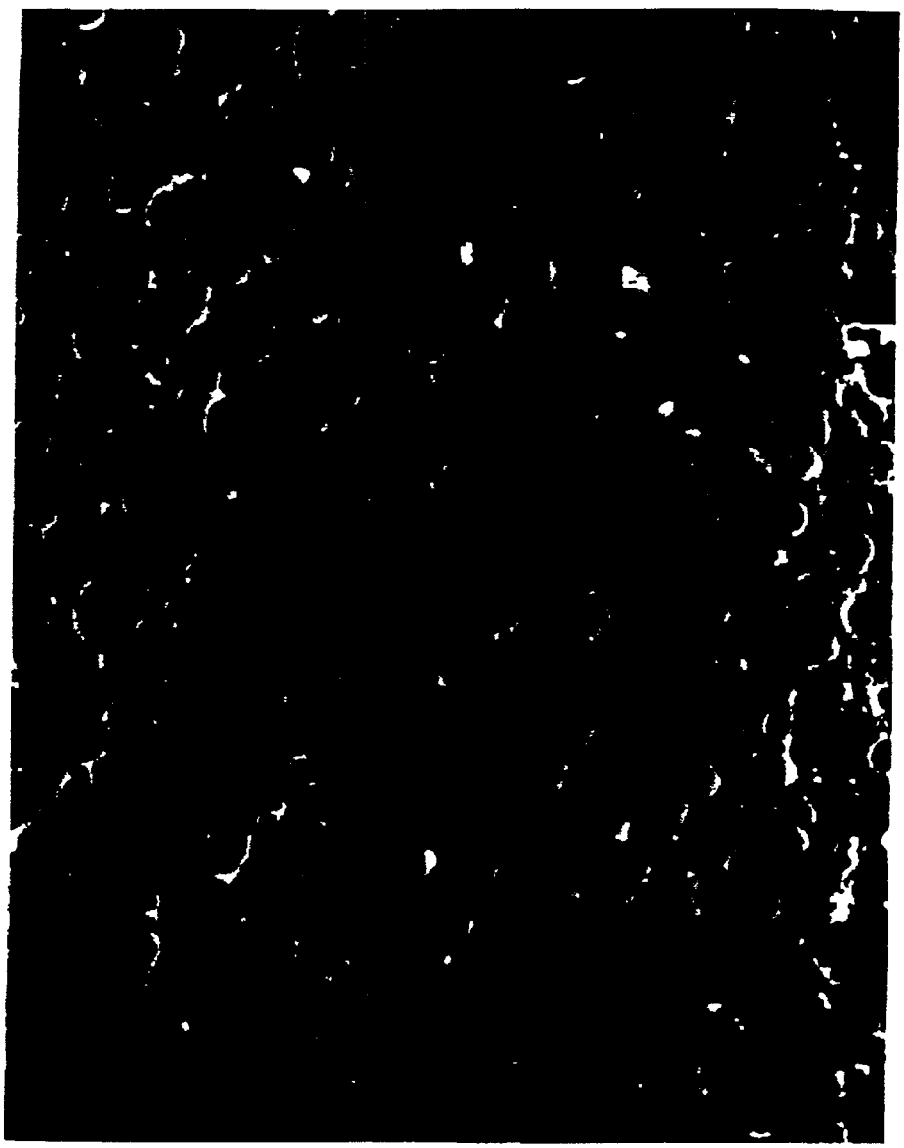
FIG. 47 a copy of an SEM photograph taken by an electron microscope showing the state of dispersion of a molding and a resin constituent in a paint in Example 78 of the invention.

From the observation of FIG. 47, the styrene-modified PPO(E) resin is moREFINEly dispersed in the PET resin on comparison with Example 77.

Example 79

The mixed resins obtained in Examples 76 to 78 were subjected to measurements of mechanical physical properties, with the results shown in Table 133.

In Table 133, *31) Breakage before a displacement arrives at 1.5 times the thickness of a test piece.

*32) Prescribed bending strength (without breakage when a displacement arrives at 1.5 times the thickness of a test piece).

Example 80

In Example 80, a compatibilizing (miscibilizing) agent was used in order to change the structure and morphology of paint resins.

It was stated hereinbefore that a thermoplastic resin for paint film was monodispersed in and was compatible (miscible) with a thermoplastic resin for a main constituent of moldings. The thermoplastic resin for paint film, e.g. a styrene-modified acrylic resin, is elliptically elongated and oriented in HIPS or ABS. In FIG. 28, there have been shown the spheres of the styrene-modified acrylic resin in the PC resin.

Figure 48:
FIG. 48 a copy of an SEM photograph taken by an electron microscope showing the state of dispersion of a resin constituent in a molding paint in Example 80 of the invention.

FIG. 48 shows an SEM photograph of a fracture of a injection molded product obtained by molding a mixture of 40 wt % of styrene-modified acrylic resin with 60 wt % of ABS resin.

Figure 49:
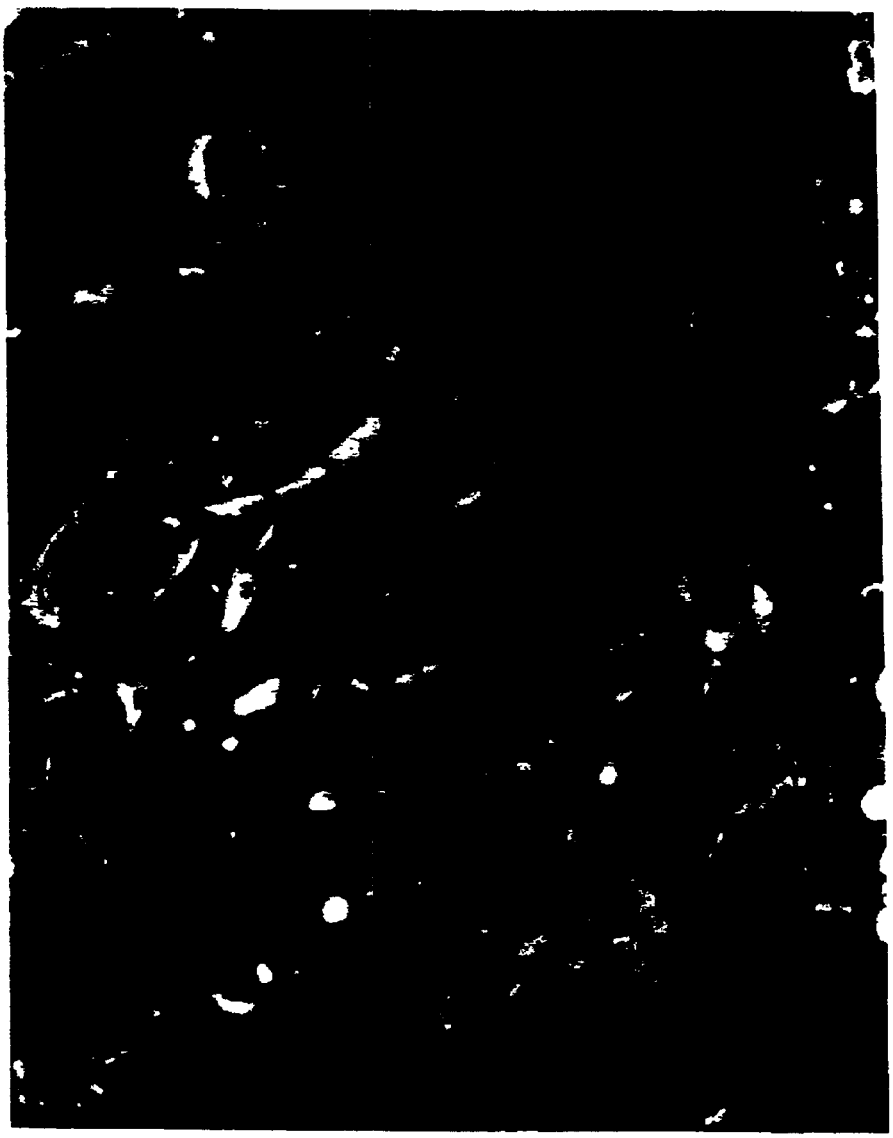
FIG. 49 a copy of an SEM photograph taken by an electron microscope showing the state of dispersion of a molding and a resin constituent in a paint in Example 90 of the invention.

FIG. 49 shows an SEM resin of a fracture of an injection molded product of a mixture composed of a mixed resin of the above ABS/styrene-modified acrylic resin (i.e. a thermoplastic resin for paint #149) (60/40 (wt %)), and a compatibilizing (miscibilizing) agent (MODIPER BT 200, made by NOF Corporation (P(AN-r-St)-b-PMMA=10/20/70 (wt))) in order to change (or make a finer dispersion) the structure and morphology of the paint resin.

While the styrene-modified (reduced) acrylic resin used as a paint resin is in the form of sheets in FIG. 48, it is round in shape in FIG. 49.

Example 81

Example 81 relates to a recycling aid or assistant.

The recycling aid is a general term for compatibilizing (miscibilizing) which are able to change the structure and morphology of resins for paint film at the time of pelletization and molding and to improve the fluidity of resins for ensuring easier molding operations and which are added to for the preparation of alloys with other types of resins such as reproduced resins of PET bottles as in Example 26, and other substances which are able to change the structure and morphology of resins as shown in Example 80 and to improve adhesion properties of a paint or coated film by migration to the surface layer or the surface of moldings at the time of molding and which have such properties as mentioned above.

As will be apparent from Tables 100, 105, 106 and 107 of example 61, when recycling is repeated, the physical properties of molding materials tend to lower (especially, the Izod impact strength lowers considerably).

In order to solve the above problem, ABS resin (high rubber ABS resin, made by Asahi Chemical Co., Ltd., with a commercial name and a grade of STAYLAC 191F) was, respectively, added to resin pellets of first to third recycles in an amount of 20 wt % for the first recycle pellets, 30 wt % for the second recycle pellets, and 30 wt % for the third recycle pellets by means of the same tumbler as used in Example 18, thereby obtaining three types of mixed resin pellets. The three types were, respectively, subjected to measurements of physical properties according to the methods described in Table 9. The results are shown in Table 134.

Example 82

In Example 82, the pellets of the HIPS resin of Example 62 obtained in the respective recycles were provided, with which there were mixed, in the same manner as in Example 81, a recycling aid (high rubber HIPS resin, made by Asahi Chemical Ind. Co., Ltd., with a commercial name and a grade of STYRON 8672) in an amount of 30 wt % for the first recycle pellets, 40 wt % for the second recycle pellets, and 30 wt % for the third recycle pellets. The resultant mixed resin pellets were each subjected to measurements of physical properties according to the methods set out in Table 9. The results are shown in Table 135.

Example 83

In Example 83, the pellets of the styrene-modified PPO (E) resin of Example 63 obtained in the respective recycles were provided, with which there were mixed, in the same manner as in Example 82, a virgin material serving as a recycling aid (styrene-modified PPO(E) resin, made by Asahi Chemical Ind. Co., Ltd., with a commercial name and a grade of Xyron 100Z) in an amount of 30 wt % for the first recycle pellets, 30 wt % for the second recycle pellets, and 30 wt % for the third recycle pellets. The resultant mixed resin pellets were each subjected to measurements of physical properties according to the methods set out in Table 9. The results are shown in Table 136.

Example 84

In Example 84, an evaluation test was conducted as to whether or not a recyclable thermoplastic film was attacked with commercially available detergent chemicals (cleaners for removing dirt, hereinafter referred to as "chemicals").

The test method was such that a coated molding passed 48 hours after coating was rubbed on the coated film surface, fifty times, with a cotton piece attached with a small amount of each chemical indicated in Table 137. The pressing force was set at 500 q/cm².

It was evaluated that how far the film was attacked with (dissolved in) the respective chemicals. The results are shown in Table 137. For comparison, a similar evaluation was effected on a thermosetting urethane resin (10:1) film.

In Table 137, symbols have the following meanings:
○: No change in the film
Δ: The film was lustered
X: The film was attacked with a chemical to expose a molding surface.
*33) Thermosetting urethane paint, made by Cashoo K. K. (commercial name and grade: STORONE #100)

Example 85

Example 85 is an example of blow molding.

PP resin (broad grade PP resin (random copolymer), made by Nippon Polyolefins Co., Ltd., with a commercial name and a grade of JAYAROMER SG510) was used, and a blow molding machine was of Model S-50N-D, made by Placo K. K.

The molding material was molded by means of the blow molding machine to provide 500 ml wide-mouthed bottles. The molding conditions were such that the heating cylinder temperatures were set at 210° C., 205° C., 200° C. and 195° C. As a result, the resin melt temperature was 195° C. Air was blown under conditions of a pressure of 5 kg/cm², and a time of 10 seconds.

The molded wide-mouthed chemical bottle moldings for chemicals were subjected to burner treatment (flame treatment), and were printed solid with #113 ink as ink by use of a roller brush on the bottle surface.

The print film-bearing wide-mouthed chemical bottles were pelletized by use of the same apparatus and method as in Example 4.

The pelletized PP recycle (reproduced) materials were again molded into wide-mouthed chemical bottles of the same shape by use of the same molding machine and mold as used above. The physical properties lowered (the melt flow increased) owing to the heat at the time of the first molding cycle and the recycling, and thus, drawdown took place under such molding conditions as used for the virgin material, making the molding difficult. To avoid this, the parison was so controlled as to avoid the drawdown.

The results of the recycling revealed that any molding failures did not appear, including the variation in weight, uneven section, gloss irregularity, burn marks and the like, which were ascribed to the incorporation of the ink film.

50 wt % of the above-mentioned PP resin virgin material used as a recycle aid was mixed with the recycle material in the tumbler, and the resultant mixture was molded, revealing that any drawndown did not take place.

Moreover, in order to improve moldability, 50% of PP resin for injection molding (PP resin (random copolymer) for injection molding, made by Nippon Polyolefins Co., ltd., with a commercial name and a grade of JAYAROMER MG410) was mixed with the PP recycle material for improving fluidity. The mixture was injection molded by use of the same apparatus and mold as used in Example 4 to obtain moldings. As a result, any failure phenomena, such as burn marks, silver streaks and the like, which were caused by the incorporation of the ink, was not recognized.

The preferred embodiments and examples of the present invention, as herein disclosed, are taken as some embodiments for explaining the present invention. It is to be understood that the present invention should not be restricted by these embodiments, examples and any modifications and additions are possible so far as they are not beyond the technical idea or principle based on descriptions of the scope of the patent claims.

INDUSTRIAL UTILITY

Recycling of coated moldings attached with paint films is enabled while suppressing physical properties of recycles from lowering. The effective use of resources can be realized without resorting to any specific procedure while ensuring simple and inexpensive recycling.

Attached are tables 1–139 which are discussed in the specification.

TABLE 1

(mill base)

| raw materials | rate (weight(kg)) |
|---|---|
| varnish(A) | 24 |
| titanium oxide | 8 |
| iron oxide yellow | 0.05 |
| carbon black | 0.01 |
| calcium carbonate | 6 |
| talc | 3 |
| butyl acetate | 11 |

TABLE 2

(dissolution)

| raw materials | rate (weight(kg)) |
|---|---|
| varnish(A) | 33 |
| toluene | 13 |
| butyl acetate | 11 |
| cyclohexanone | 10 |
| silicone additive | 0.3 |

TABLE 3

(mill base)

| raw materials | rate (weight(kg)) |
|---|---|
| varnish(B) | 24 |
| titanium oxide | 8 |
| iron oxide yellow | 0.05 |
| carbon black | 0.01 |
| calcium carbonate | 6 |

TABLE 3-continued (mill base)

| raw materials | rate (weight(kg)) |
|---|---|
| talc | 3 |
| toluene | 10 |
| butyl acetate | 11 |

TABLE 4

(dissolution)

| raw materials | rate (weight(kg)) |
|---|---|
| varnish(B) | 33 |
| toluene | 9 |
| butyl acetate | 11 |
| cyclohexanone | 10 |
| silicone additive | 0.3 |

TABLE 5

(mill base)

| raw materials | rate (weight(kg)) |
|---|---|
| varnish(C) | 24 |
| titanium oxide | 8 |
| iron oxide yellow | 0.05 |
| carbon black | 0.01 |
| calcium carbonate | 6 |
| talc | 3 |
| toluene | 10 |
| butyl acetate | 11 |

(note) varnish(C) is styrene-modified acrylic resin varnish of Dainippon Ink and Chemicals Inc., (Commercial name and grade; Acrydic A-157 (solid content of 50%)

TABLE 6

(melting)

| raw materials | rate (weight(kg)) |
|---|---|
| varnish(C) | 30 |
| toluene | 5 |
| silicone additive | 0.3 |

TABLE 14

| raw materials | rate (weight(kg)) |
|---|---|
| varnish(A) | 50 |
| red oxide | 12 |
| calcium carbonate | 10 |
| talc | 4 |
| bentone SD-1 | 0.3 |
| butyl acetate | 10 |

TABLE 16

| raw materials | rate (weight(kg)) |
|---|---|
| varnish(C) | 35 |
| red oxide | 12 |
| calcium carbonate | 10 |
| talc | 4 |
| bentone SD-1 | 0.3 |
| butyl acetate | 10 |

TABLE 7

Table showing mixing rate of thinner

| | (item, thinner No) mixing rate (weight (kg)) | | | |
|---|---|---|---|---|
| raw material (solvent) | thinner No S1 | thinner No S2 | thinner No S3 | thinner No S4 |
| toluene | 60 | 50 | 60 | 20 |
| methylisobutylketone | 11 | — | — | — |
| isobutanol | 25 | — | — | — |
| cyclohexanone | 4 | — | 5 | — |
| isopropyl alcohol | — | 40 | — | 80 |
| butylcellosolve | — | 10 | — | — |
| butyl acetate | — | — | 35 | — |
| (total) | 100 | 100 | 100 | 100 |

TABLE 8

Test item, test method, required value and unit of Coating film

| | test method | required value(reference) | unit |
|---|---|---|---|
| 1. coatability(appearance), luster, surface irregularity, wrinkle and so on | accordance with JIS K 5400 7.1 | nothing | |
| 2. paint film property | | | |
| (1) dry thickness of paint film | | 10 μm or over | μm |

TABLE 8-continued

Test item, test method, required value and unit of Coating film

| | test method | required value(reference) | unit |
|---|---|---|---|
| (2) pencil hardness test | accordance with JIS K 5400 8.4.2 | | |
| (3) relative specular glossiness at 60 degree | accordance with JIS K 5400 6.7 | | |
| (4) cross hatch test at 90 degree | accordance with JIS K 5400 8.5.2 | adhesion 100/100 | |
| (7) hot water dip test | accordance with JIS K 5400 8.19 | no abnormality in gloss, discoloration, | mm |
| | (40° C., 48 hr. dipping) | bulging and so on | |
| | cross hatch test after hot water dip test | adhesion 100/100 | |
| | cross cut test after hot water dip test | peeling width 1 mm or below | |
| (8) humidity test | accordance with JIS K 5400 9.2.2 | no abnormality in gloss, discoloration, | mm |
| | (98% RH 50° C. 72 hr.) | bulging and so on | |
| | cross hatch test after humidity test | adhesion 100/100 | |
| | cross cut test after humidity test | peeling width 1 mm or below | |
| (9) salt water dip test | accordance with JIS K 5400 9.23 | no abnormality in gloss, discoloration, | mm |
| | (3% NaCl water solution 40° C., 72 hr. Dipping) | bulging and so on | |
| | cross hatch test after salt water test | adhesion 100/100 | |
| | cross cut test after salt water test | peeling width 1 mm or below | |
| (10) impact resistance test | ½ inch θ × 300 g × 50 cm | nothing of crack, peeling and so on | |
| (11) abrasion resistance test | CS10/500 g/1000 rpm | 150 mgf or below | mg |
| (12) weather resistance test | JIS K 5400 9.7.2 100 hr. | ΔE = 3 or below | |

TABLE 9

Table showing test item, test method, required value and unit of Molding Material

| test item | test method | required value(reference) | unit |
|---|---|---|---|
| 3. fundamental properties of material | | | |
| (1) density | JIS K 6911 5.2 | | g/ml |
| 4. Thermal properties of material | | | |
| (1) heat deformation temperature (*27) | ATEM-D648 | | ° C. |
| (2) Vicat softening point temperature | ATEM-D1525 | | ° C. |
| (3-1) melt flow rate | JIS K 7210 | | g/10 min |
| (3-3) melt flow rate | ISO-R1133 | | g/10 min |
| (3-3) melt flow rate | 250° C. 10 kg | | g/10 min |
| (memo)measurements of melt flow rate vary in response to varieties of resin | | | |
| 5. Mechanical properties of material | | | |
| (1) tensile break strength | ATEM-D638 | | kg/cm$^2$ |
| (2) elongation at break | ATEM-D638 | | % |
| (3) bending strength | ATEM-D790 | | kg/cm$^2$ |
| (4) modulus in flexure | ATEM-D790 | | kg/cm$^2$ |
| (5) Izod impact strength (*28) | ATEM-D256 | | kg-cm/cm |
| (6) Rockwell hardness (*29) | R scale | | |
| (memo)measurements of Rockwell hardness vary in response to varieties of resin | L scale | | |
| 7. The others | | | |
| (1) water absorption (*30) | JIS K 7209 | | % |

(memo)
(*27) load-deflection temperature 18 . . . 6 kg load
(*28) notched
(*29) Rockwell hardness; ¼" strip (without surface finish) transversed measuring section at gate side, R scale or L scale
(*30) measurement of variation in weight of dumb-bell specimen after leaving it 24 hours under water of 23° C.

TABLE 10

| | item<br>molding material; ABS resin<br>paint; paint #30 | | | |
|---|---|---|---|---|
| test (examination) item | fresh molding by<br>virgin material *2) | first<br>recycle *3) | second<br>recycle *4) | third<br>recycle *5) |
| 1. Molding material | | | | |
| 1-1 thermal properties | | | | |
| heat deformation temperature ° C. | 80.9 | 82.3 | 83 | 82.4 |
| Vicat softening point temperature ° C. | 105.4 | 104.5 | 103.9 | 103.4 |
| melt flow rate | 25.8 | 30.6 | 33.2 | 35.1 |
| 1-2 mechanical properties | | | | |
| tensile strength kg/cm$^2$ | 420 | 420 | 420 | 420 |
| bending strength kg/cm$^2$ | 700 | 710 | 720 | 720 |
| elongation % | 21 | 19 | 21 | 18 |
| modulus in flexure kg/cm$^2$ | 23800 | 26500 | 26500 | 27100 |
| izod impact strength kg-cm/cm | 14.9 | 13.6 | 11.9 | 10.5 |
| 2. Coatability | | | | |
| 2-1 appearance | | ○ | ○ | ○ |
| 2-2 paint film properties | | | | |
| pencil hardness test | | HB or over | HB or over | HB or over |
| cross hatch test | | 100/100 | 100/100 | 100/100 |
| crosscut test | | 1 mm or less | 1 mm or less | mm or less |
| hot water dip test | | no abnormality<br>100/100 | no abnormality<br>100/100 | no abnormality<br>100/100 |
| humidity test | | no abnormality<br>100/100 | no abnormality<br>100/100 | no abnormality<br>100/100 |
| salt water dip test | | no abnormality<br>100/100 | no abnormality<br>100/100 | no abnormality<br>100/100 |

Test method and others depend upon tables 8 and 9.

TABLE 11

| | item<br>molding material; ABS resin<br>paint; paint #10 | | | |
|---|---|---|---|---|
| test (examination) item | fresh molding by<br>virgin material *2) | first<br>recycle *3) | second<br>recycle *4) | third<br>recycle *5) |
| 1. Molding material | | | | |
| 1-1 thermal properties | | | | |
| heat deformation temperature ° C. | 80.9 | 85.2 | 83.6 | 83.4 |
| Vicat softening point temperature ° C. | 105.4 | 105.9 | 105.9 | 106.5 |
| melt flow rate | 25.8 | 28.2 | 29.1 | 30.4 |
| 1-2 mechanical properties | | | | |
| tensile strength kg/cm$^2$ | 420 | 430 | 430 | 430 |
| bending strength kg/cm$^2$ | 700 | 720 | 720 | 720 |
| elongation % | 21 | 17 | 17 | 17 |
| modulus in flexure kg/cm$^2$ | 23800 | 24500 | 26600 | 26800 |
| izod impact strength kg-cm/cm | 14.9 | 13.2 | 11.6 | 9.5 |
| 2. Coatability | | | | |
| 2-1 appearance | | ○ | ○ | ○ |
| 2-2 paint film properties | | | | |
| pencil hardness test | | HB or over | HB or over | HB or over |
| cross hatch test | | 100/100 | 100/100 | 100/100 |
| crosscut test | | 1 mm or less | 1 mm or less | 1 mm or less |
| hot water dip test | | no abnormality<br>100/100 | no abnormality<br>100/100 | no abnormality<br>100/100 |

TABLE 11-continued

| | item molding material; ABS resin paint; paint #10 | | | |
|---|---|---|---|---|
| test (examination) item | fresh molding by virgin material *2) | first recycle *3) | second recycle *4) | third recycle *5) |
| humidity test | | no abnormality 100/100 | no abnormality 100/100 | no abnormality 100/100 |
| salt water dip test | | no abnormality 100/100 | no abnormality 100/100 | no abnormality 100/100 |

Test method and others depend upon tables 8 and 9.
*2), *3), *4) and *5) are the same as those described in 4th Example.

TABLE 12

| | item molding material; HIPS resin paint; paint #20 | | | |
|---|---|---|---|---|
| test (examination) item | fresh molding by virgin material *2) | first recycle *3) | second recycle *4) | third recycle *5) |
| 1. Molding material | | | | |
| 1-1 thermal properties | | | | |
| heat deformation temperature ° C. | 83.5 | 78.5 | 76.4 | 74.5 |
| vicat softening point temperature ° C. | 104.9 | 100.4 | 97.4 | 96.3 |
| melt flow rate | 2.8 | 3.9 | 4.6 | 5.8 |
| 1-2 mechanical properties | | | | |
| tensile strength kg/cm$^2$ | 290 | 290 | 290 | 290 |
| bending strength kg/cm$^2$ | 490 | 520 | 540 | 540 |
| elongation % | 53 | 41 | 35 | 32 |
| modulus in flexure kg/cm$^2$ | 24500 | 23800 | 23900 | 23700 |
| izod impact strength kg-cm/cm | 6.9 | 6.3 | 5.8 | 5.3 |
| 2. Coatability | | | | |
| 2-1 appearance | | ○ | ○ | ○ |
| 2-2 paint film properties | | | | |
| pencil hardness test | | HB or over | HB or over | HB or over |
| cross hatch test | | 100/100 | 100/100 | 100/100 |
| crosscut test | | 1 mm or less | 1 mm or less | 1 mm or less |
| hot water dip test | | no abnormality 100/100 | no abnormality 100/100 | no abnormality 100/100 |
| humidity test | | no abnormality 100/100 | no abnormality 100/100 | no abnormality 100/100 |
| salt water dip test | | no abnormality 100/100 | no abnormality 100/100 | no abnormality 100/100 |

Test method and others depend upon tables 8 and 9.
*2), *3), *4) and *5) are the same as those described in 4th Example.

TABLE 13

| | item molding material; HIPS resin paint; paint #10 | | | |
|---|---|---|---|---|
| test (examination) item | fresh molding by virgin material *2) | first recycle *3) | second recycle *4) | third recycle *5) |
| 1. Molding material | | | | |
| 1-1 thermal properties | | | | |
| heat deformation temperature ° C. | 83.5 | 82.7 | 80.8 | 79.5 |
| vicat softening point temperature ° C. | 104.9 | 104.6 | 104.3 | 103.6 |
| melt flow rate | 2.8 | 3.4 | 3.4 | 3.6 |
| 1-2 mechanical properties | | | | |
| tensile strength kg/cm$^2$ | 290 | 300 | 300 | 300 |
| bending strength kg/cm$^2$ | 490 | 530 | 540 | 560 |

TABLE 13-continued

| | item molding material; HIPS resin paint; paint #10 | | | |
|---|---|---|---|---|
| test (examination) item | fresh molding by virgin material *2) | first recycle *3) | second recycle *4) | third recycle *5) |
| elongation % | 53 | 45 | 34 | 35 |
| modulus in flexure kg/cm$^2$ | 24500 | 23700 | 24000 | 24100 |
| izod impact strength kg-cm/cm | 6.9 | 6.5 | 5.8 | 5.3 |
| 2. Coatability | | | | |
| 2-1 appearance | | ○ | ○ | ○ |
| 2-2 paint film properties | | | | |
| pencil hardness test | | HB or over | HB or over | HB or over |
| cross hatch test | | 100/100 | 100/100 | 100/100 |
| crosscut test | | 1 mm or less | 1 mm or less | 1 mm or less |
| hot water dip test | | no abnormality 100/100 | no abnormality 100/100 | no abnormality 100/100 |
| humidity test | | no abnormality 100/100 | no abnormality 100/100 | no abnormality 100/100 |
| salt water dip test | | no abnormality 100/100 | no abnormality 100/100 | no abnormality 100/100 |

Test method and others depend upon tables 8 and 9.
*2), *3), *4) and *5) are the same as those described in 4th Example.

TABLE 18

| raw materials | rate (weight (kg)) |
|---|---|
| varnish (B) | 35 |
| r d oxide | 12 |
| calcium carbonate | 10 |
| talc | 4 |
| bentone SD-1 | 0.3 |
| butyl acetate | 10 |

TABLE 57 varnish (D)

| raw materials | rate (weight (kg)) |
|---|---|
| amilan MC8000 | 27 |
| methanol | 56 |
| normal butanol | 13 |
| purified water | 4 |
| (total) | 100 |

TABLE 58

(mill base)

| raw materials | rate (weight (kg)) |
|---|---|
| varnish (D); (refer to table 57) | 30 |
| titanium oxide | 10 |
| iron oxide yellow | 0.06 |
| carbon black | 0.01 |
| calcium carbonate | 6 |
| talc | 3.5 |
| (total) | 49.57 |

TABLE 59

(dissolution)

| raw materials | rate (weight (kg)) |
|---|---|
| mill base; (refer to table 58) | 49.57 |
| varnish (D); (refer to table 57) | 40 |
| methanol | 5.23 |
| butylcellosolve | 5 |
| homogenole L-100 | 0.2 |
| (total) | 100 |

TABLE 80

(mill bas)

| raw materials | rat (weight (kg)) |
|---|---|
| varnish (C) | 24 |
| refused ton r | 10 |
| talc | 10 |
| toluene | 10 |
| butyl acetate | 11 |

TABLE 81

(dissolution)

| raw materials | rate (weight (kg)) |
|---|---|
| varnish (C) | 30 |
| toluene | 5 |
| silicon type addition agent | 0.3 |

TABLE 15

| test (examination) item | item molding material; ABS resin ink; ink #35 | |
|---|---|---|
| | fresh molding by virgin material*13) | first recycle*14) |
| 1. Printability | | |
| 1-1 appearance | ○ | ○ |
| 1-2 ink film properties | | |
| pencil hardness test | HB or over | HB or over |
| cross hatch test | 100/100 | 100/100 |
| crosscut test | 1 mm or less | 1 mm or less |
| hot water dip test | no abnormality 100/100 | no abnormality 100/100 |
| humidity test | no abnormality 100/100 | no abnormality 100/100 |
| salt water dip test | no abnormality 100/100 | no abnormality 100/100 |

Test method and others depend upon table 8.

TABLE 17

| test (examination) item | item molding material; ABS resin ink; ink #15 | |
|---|---|---|
| | fresh molding by virgin material*13) | first recycle*14) |
| 1. Printability | | |
| 1-1 appearance | ○ | ○ |
| 1-2 ink film properties | | |
| pencil hardness test | HB or over | HB or over |
| cross hatch test | 100/100 | 100/100 |
| crosscut test | 1 mm or less | 1 mm or less |
| hot water dip test | no abnormality 100/100 | no abnormality 100/100 |
| humidity test | no abnormality 100/100 | no abnormality 100/100 |
| salt water dip test | no abnormality 100/100 | no abnormality 100/100 |

Test method and others depend upon table 8.

TABLE 20

| test (examination) item | item molding material; HIPS resin ink; ink #15 | |
|---|---|---|
| | fresh molding by virgin material*13) | first recycle*14) |
| 1. Printability | | |
| 1-1 appearance | ○ | ○ |
| 1-2 ink film properties | | |
| pencil hardness test | HB or over | HB or over |
| cross hatch test | 100/100 | 100/100 |
| crosscut test | 1 mm or less | 1 mm or less |
| hot water dip test | no abnormality 100/100 | no abnormality 100/100 |
| humidity test | no abnormality 100/100 | no abnormality 100/100 |
| salt water dip test | no abnormality 100/100 | no abnormality 100/100 |

Test method and others depend upon table 8.
*13) and *14) are the same as those described in 8th Example.

TABLE 19

| test (examination) item | item molding material; HIPS resin ink; ink #25 | |
|---|---|---|
| | fresh molding by virgin material*13) | first recycle*14) |
| 1. Printability | | |
| 1-1 appearance | ○ | ○ |
| 1-2 ink film properties | | |
| pencil hardness test | HB or over | HB or over |
| cross hatch test | 100/100 | 100/100 |
| crosscut test | 1 mm or less | 1 mm or less |
| hot water dip test | no abnormality 100/100 | no abnormality 100/100 |
| humidity test | no abnormality 100/100 | no abnormality 100/100 |
| salt water dip test | no abnormality 100/100 | no abnormality 100/100 |

Test method and others depend upon table 8.
*13) and *14) are the same as those described in 8th Example.

TABLE 21

| failure phenomena | item molding material; ABS resin paint; paint #30 | | |
|---|---|---|---|
| | first molding*15) | second molding*16) | third molding*17) |
| total molding number | 617 | 258 | 265 |
| scorch failure | 0 | 0 | 2 |
| failure by contamination or foreign matter | 29 | 1 | 2 |
| silver streak | 0 | 0 | 0 |
| short shot | 8 | 3 | 44 |
| sink mark | 40 | 0 | 0 |
| jetting | 0 | 0 | 0 |
| cracks | 0 | 0 | 0 |

TABLE 22

| failure phenomena | item molding material; ABS resin paint; paint #10 | | |
|---|---|---|---|
| | first molding*15) | second molding*16) | third molding*17) |
| total molding number | 617 | 252 | 212 |
| scorch failure | 0 | 0 | 0 |
| failure by contamination or foreign matter | 29 | 11 | 0 |
| silver streak | 0 | 0 | 0 |
| short shot | 8 | 2 | 2 |
| sink mark | 40 | 0 | 0 |
| jetting | 0 | 0 | 0 |
| cracks | 0 | 0 | 0 |

*15), *16) and *17) are the same as those described in 12th Example.

TABLE 23

| | item | | |
| | molding material; HIPS resin | | |
| | paint; paint #20 | | |
| failure phenomena | first molding*15) | second molding*16) | third molding*17) |
|---|---|---|---|
| total molding number | 589 | 206 | 202 |
| scorch failure | 0 | 0 | 0 |
| failure by contamination or foreign matter | 19 | 0 | 0 |
| silver streak | 0 | 6 | 0 |
| short shot | 32 | 0 | 1 |
| sink mark | 0 | 0 | 44 |
| jetting | 0 | 0 | 0 |
| cracks | 14 | 15 | 0 |

*15), *16) and *17) are the same as those described in 12th Example.

TABLE 24

| | item | | |
| | molding material; HIPS resin | | |
| | paint; paint #10 | | |
| failure phenomena | first molding*15) | second molding*16) | third molding*17) |
|---|---|---|---|
| total molding number | 589 | 235 | 202 |
| scorch failure | 0 | 0 | 0 |
| failure by contamination or foreign matter | 19 | 0 | 0 |
| silver streak | 0 | 0 | 0 |
| short shot | 32 | 11 | 0 |
| sink mark | 0 | 3 | 0 |
| jetting | 0 | 0 | 0 |
| cracks | 14 | 11 | 0 |

*15), *16) and *17) are the same as those described in 12th Example.

TABLE 25

| | item | | | |
| | molding materials: modified PPO(E) resin | | | |
| | paint; paint #10 | | | |
| test (examination) item | (comparative example) fresh molding by virgin material*2) | first recycle*3) | second recycle*4) | third recycle*5) |
|---|---|---|---|---|
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 26

| | item | | |
| | molding material; modified PPO(E) | | |
| | paint; paint #10 | | |
| failure phenomena | first molding*15) | second molding*16) | third molding*17) |
|---|---|---|---|
| total molding number | 603 | 520 | 310 |
| scorch failure | 5 | 0 | 0 |
| failure by contamination or foreign matter | 2 | 2 | 6 |
| silver streak | 11 | 9 | 5 |
| short shot | 7 | 3 | 0 |
| sink mark | 0 | 0 | 2 |
| jetting | 0 | 0 | 0 |
| cracks | 1 | 0 | 0 |

*15), *16) and *17) are the same as those described in 12th Example.

TABLE 28

| | item | | |
| | molding material; modified PPO(E) | | |
| | paint; paint #20 | | |
| failure phenomena | first molding*15) | second molding*16) | third molding*17) |
|---|---|---|---|
| total molding number | 580 | 500 | 385 |
| scorch failure | 6 | 0 | 0 |
| failure by contamination or foreign matter | 6 | 3 | 4 |
| silver streak | 10 | 0 | 0 |
| short shot | 4 | 4 | 6 |
| sink mark | 0 | 0 | 0 |
| jetting | 7 | 1 | 0 |
| cracks | 1 | 0 | 0 |

*15), *16) and *17) are the same as those described in 12th Example.

TABLE 27

| | item | | | |
|---|---|---|---|---|
| | molding materials; modified PPO(E) resin | | | |
| | paint; paint #20 | | | |
| test (examination) item | (comparative example) fresh molding by virgin material*2) | first recycle*3) | second recycle*4) | third recycle*5) |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 29

| | item | | | | |
|---|---|---|---|---|---|
| | molding material; ABS resin paint; paint #10 (comparative example) | molding material; PC resin paint; paint #10 (comparative example) | molding material; PC/ABS resin paint; paint #10 | | |
| test (examination) item | fresh molding by virgin material*2) | fresh molding by virgin material*2) | first recycle*3) | second recycle*4) | third recycle*5) |
| 1. Coatability | | | | | |
| 1-1 appearance | ○ | ○ | ○ | ○ | ○ |
| 1-2 paint film properties | | | | | |
| pencil hardness test | HB or over | HB or over | HB or over | HB or over | HB or over |
| cross hatch test | 100/100 | 100/100 | 100/100 | 100/100 | 100/100 |
| crosscut test | 1 mm or less | 1 mm or less | 1 mm or less | 1 mm or less | 1 mm or less |
| hot water dip test | no abnormality 100/100 | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 | no abnormality 100/100 |

Test method and others depend upon table 8.
*2), *3), *3) and *5) are the same as those described in 4th Example.

TABLE 30

| | item | | | | |
|---|---|---|---|---|---|
| | molding material; ABS resin paint; paint #10 (comparative example) | molding material; PC resin paint; paint #10 (comparative example) | molding material; PC/ABS resin paint; paint #10 | | |
| failure phenomena | fresh molding by virgin material*15) | fresh molding by virgin material*15) | first molding*18) | second molding*19) | third molding*20) |
| total molding number | 578 | 511 | 607 | 428 | 415 |
| scorch failure | 3 | 6 | 3 | 0 | 2 |
| failure by contamination or foreign matter | 2 | 1 | 9 | 3 | 2 |
| silver streak | 10 | 11 | 9 | 0 | 1 |

TABLE 30-continued

| | item | | | | |
|---|---|---|---|---|---|
| | molding material; ABS resin paint; paint #10 (comparative example) | molding material; PC resin paint; paint #10 (comparative example) | molding material; PC/ABS resin paint; paint #10 | | |
| failure phenomena | fresh molding by virgin material*15) | fresh molding by virgin material*15) | first molding*18) | second molding*19) | third molding*20) |
| short shot | 11 | 7 | 7 | 2 | 20 |
| sink mark | 0 | 0 | 0 | 0 | 0 |
| jetting | 0 | 0 | 0 | 0 | 0 |
| cracks | 3 | 0 | 3 | 1 | 0 |

*15) is the same as those described in 12th Example.
*18), *19) and *20) show case of molding PC/ABS blend polymer (blend resin).

TABLE 31

| | item | | | | |
|---|---|---|---|---|---|
| | molding material; ABS resin paint; paint #30 (comparative example) | molding material; PC resin paint; paint #30 (comparative example) | molding material; PC/ABS resin paint; paint #30 | | |
| test (examination) item | fresh molding by virgin material*2) | fresh molding by virgin material*2) | first recycle*3) | second recycle*4) | third recycle*5) |
| 1. Coatability | | | | | |
| 1-1 appearance | ○ | ○ | ○ | ○ | ○ |
| 1-2 paint film properties | | | | | |
| pencil hardness test | HB or over | HB or over | HB or over | HB or over | HB or over |
| cross hatch test | 100/100 | 100/100 | 100/100 | 100/100 | 100/100 |
| crosscut test | 1 mm or less | 1 mm or less | 1 mm or less | 1 mm or less | 1 mm or less |
| hot water dip test | no abnormality 100/100 | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 | no abnormality 100/100 |

Test method and others depend upon table 8.
*2), *3), *3) and *5) are the same as those described in 4th Example.

TABLE 32

| | item | | | | |
|---|---|---|---|---|---|
| | molding material; ABS resin paint; paint #30 (comparative example) | molding material; PC resin paint; paint #30 (comparative example) | molding material; PC/ABS resin paint; paint #30 | | |
| failure phenomena | fresh molding by virgin material*15) | fresh molding by virgin material*15) | first molding*18) | second molding*19) | third molding*20) |
| total molding number | 588 | 597 | 537 | 471 | 409 |
| scorch failure | 5 | 7 | 3 | 7 | 5 |
| failure by contamination or foreign matter | 3 | 7 | 7 | 0 | 5 |
| silver streak | 10 | 13 | 13 | 9 | 0 |
| short shot | 10 | 5 | 5 | 7 | 16 |
| sink mark | 0 | 0 | 0 | 0 | 0 |
| jetting | 0 | 0 | 0 | 0 | 0 |
| cracks | 5 | 0 | 4 | 1 | 0 |

*15) is the same as those described in 12th Example.
*18), *19) and *20) show case of molding PC/ABS blend polymer (blend resin).

TABLE 33

| | item | | | | |
|---|---|---|---|---|---|
| | molding material; ABS resin paint; paint #10 (comparative example) | molding material; PC resin paint; paint #30 (comparative example) | molding material; PC/ABS resin paint; paint #10 | | |
| test (examination) item | fresh molding by virgin material*2) | fresh molding by virgin material*2) | first recycle*3) | second recycle*4) | third recycle*5) |
| 1. Coatability | | | | | |
| 1-1 appearance | ○ | ○ | ○ | ○ | ○ |
| 1-2 paint film properties | | | | | |
| pencil hardness test | HB or over | HB or over | HB or over | HB or over | HB or over |
| cross hatch test | 100/100 | 100/100 | 100/100 | 100/100 | 100/100 |
| crosscut test | 1 mm or less | 1 mm or less | 1 mm or less | 1 mm or less | 1 mm or less |
| hot water dip test | no abnormality 100/100 | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 | no abnormality 100/100 |

Test method and others depend upon table 8.
*2), *3), *3) and *5) are the same as those described in 4th Example.

TABLE 34

| | item | | | | |
|---|---|---|---|---|---|
| | molding material; ABS resin paint; paint #10 (comparative example) | molding material; PC resin paint; paint #30 (comparative example) | molding material; PC/ABS resin paint; paint #10 | | |
| failure phenomena | fresh molding by virgin material*15) | fresh molding by virgin material*15) | first molding*18) | second molding*19) | third molding*20) |
| total molding number | 611 | 517 | 559 | 397 | 272 |
| scorch failure | 9 | 5 | 7 | 0 | 5 |
| failure by contamination or foreign matter | 9 | 10 | 3 | 2 | 5 |
| silver streak | 13 | 13 | 12 | 2 | 0 |
| short shot | 1 | 3 | 6 | 1 | 11 |
| sink mark | 0 | 0 | 0 | 0 | 0 |
| jetting | 0 | 0 | 0 | 0 | 0 |
| cracks | 0 | 0 | 5 | 1 | 3 |

*15) is the same as those described in 12th Example.
*18), *19) and *20) show case of molding PC/ABS blend polymer (blend resin).

TABLE 35

| | item | | | | |
|---|---|---|---|---|---|
| | molding material; ABS resin paint; paint #30 (comparative example) | molding material; PC resin paint; paint #10 (comparative example) | molding material; PC/ABS resin paint; paint #30 | | |
| test (examination) item | fresh molding by virgin material*2) | fresh molding by virgin material*2) | first recycle*3) | second recycle*4) | third recycle*5) |
| 1. Coatability | | | | | |
| 1-1 appearance | ○ | ○ | ○ | ○ | ○ |
| 1-2 paint film properties | | | | | |
| pencil hardness test | HB or over | HB or over | HB or over | HB or over | HB or over |
| cross hatch test | 100/100 | 100/100 | 100/100 | 100/100 | 100/100 |
| crosscut test | 1 mm or less | 1 mm or less | 1 mm or less | 1 mm or less | 1 mm or less |

TABLE 35-continued

|  | molding material; ABS resin paint; paint #30 (comparative example) | molding material; PC resin paint; paint #10 (comparative example) | molding material; PC/ABS resin paint; paint #30 | | |
|---|---|---|---|---|---|
| test (examination) item | fresh molding by virgin material*2) | fresh molding by virgin material*2) | first recycle*3) | second recycle*4) | third recycle*5) |
| hot water dip test | no abnormality 100/100 | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 | no abnormality 100/100 |

Test method and others depend upon table 8.
*2), *3), *3) and *5) are the same as those described in 4th Example.

TABLE 36

|  | molding material; ABS resin paint; paint #30 (comparative example) | molding material; PC resin paint; paint #10 (comparative example) | molding material; PC/ABS resin paint; paint #30 | | |
|---|---|---|---|---|---|
| failure phenomena | fresh molding by virgin material*15) | fresh molding by virgin material*15) | first molding*18) | second molding*19) | third molding*20) |
| total molding number | 497 | 523 | 601 | 337 | 291 |
| scorch failure | 7 | 9 | 7 | 3 | 0 |
| failure by contamination or foreign matter | 7 | 1 | 9 | 0 | 1 |
| silver streak | 9 | 14 | 9 | 0 | 0 |
| short shot | 13 | 2 | 11 | 7 | 18 |
| sink mark | 0 | 0 | 0 | 0 | 0 |
| jetting | 0 | 0 | 0 | 0 | 0 |
| cracks | 1 | 0 | 5 | 1 | 1 |

*15) is the same as those described in 12th Example.
*18), *19) and *20) show case of molding PC/ABS blend polymer (blend resin).

TABLE 37

|  | molding material; ABS resin paint; paint #10 (comparative example) | molding material; PC resin paint; paint #10 (comparative example) | molding material; PC/ABS resin paint; paint #30 | | |
|---|---|---|---|---|---|
| test (examination) item | fresh molding by virgin material*2) | fresh molding by virgin material*2) | first recycle*3) | second recycle*4) | third recycle*5) |
| 1. Coatability |  |  |  |  |  |
| 1-1 appearance | ○ | ○ | ○ | ○ | ○ |
| 1-2 paint film properties |  |  |  |  |  |
| pencil hardness test | HB or over | HB or over | HB or over | HB or over | HB or over |
| cross hatch test | 100/100 | 100/100 | 100/100 | 100/100 | 100/100 |
| crosscut test | 1 mm or less | 1 mm or less | 1 mm or less | 1 mm or less | 1 mm or less |
| hot water dip test | no abnormality 100/100 | no abnormality 100/100 | no abnormality 100/100 | no abnormality 100/100 | no abnormality 100/100 |

TABLE 37-continued

|  | item | | | | |
|---|---|---|---|---|---|
|  | molding material; ABS resin paint; paint #10 (comparative example) | molding material; PC resin paint; paint #10 (comparative example) | molding material; PC/ABS resin paint; paint #30 | | |
| test (examination) item | fresh molding by virgin material*2) | fresh molding by virgin material*2) | first recycle*3) | second recycle*4) | third recycle*5) |
| humidity test | no abnormality 100/100 | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 | no abnormality 100/100 |

Test method and others depend upon table 8.
*2), *3), *3) and *5) are the same as those described in 4th Example.

TABLE 38

|  | item | | | | |
|---|---|---|---|---|---|
|  | molding material; ABS resin paint; paint #10 (comparative example) | molding material; PC resin paint; paint #10 (comparative example) | molding material; PC/ABS resin paint; paint #30 | | |
| failure phenomena | fresh molding by virgin material*15) | fresh molding by virgin material*15) | first molding*18) | second molding*19) | third molding*20) |
| total molding number | 473 | 517 | 566 | 411 | 324 |
| scorch failure | 1 | 5 | 7 | 2 | 1 |
| failure by contamination or foreign matter | 2 | 4 | 11 | 10 | 1 |
| silver streak | 9 | 15 | 9 | 0 | 0 |
| short shot | 11 | 11 | 13 | 13 | 22 |
| sink mark | 0 | 0 | 0 | 0 | 0 |
| jetting | 0 | 0 | 0 | 0 | 0 |
| cracks | 2 | 0 | 5 | 0 | 1 |

*15) is the same as those described in 12th Example.
*18), *19) and *20) show case of molding PC/ABS blend polymer (blend resin).

TABLE 39

|  | item | | | | |
|---|---|---|---|---|---|
|  | molding material; ABS resin paint; paint #30 (comparative example) | molding material; PC resin paint; paint #30 (comparative example) | molding material; PC/ABS resin paint; paint #10 | | |
| test (examination) item | fresh molding by virgin material*2) | fresh molding by virgin material*2) | first recycle*3) | second recycle*4) | third recycle*5) |
| 1. Coatability |  |  |  |  |  |
| 1-1 appearance | ○ | ○ | ○ | ○ | ○ |
| 1-2 paint film properties |  |  |  |  |  |
| pencil hardness test | HB or over | HB or over | HB or over | HB or over | HB or over |
| cross hatch test | 100/100 | 100/100 | 100/100 | 100/100 | 100/100 |
| crosscut test | 1 mm or less | 1 mm or less | 1 mm or less | 1 mm or less | 1 mm or less |
| hot water dip test | no abnormality 100/100 | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 | no abnormality 100/100 |

Test method and others depend upon table 8.
*2), *3), *3) and *5) are the same as those described in 4th Example.

TABLE 40

| | item | | | | |
|---|---|---|---|---|---|
| | molding material; ABS resin paint; paint #30 (comparative example) | molding material; PC resin paint; paint #30 (comparative example) | molding material; PC/ABS resin paint; paint #10 | | |
| failure phenomena | fresh molding by virgin material*15) | fresh molding by virgin material*15) | first molding*18) | second molding*19) | third molding*20) |
| total molding number | 529 | 499 | 519 | 397 | 303 |
| scorch failure | 5 | 9 | 5 | 3 | 1 |
| failure by contamination or foreign matter | 7 | 7 | 2 | 5 | 4 |
| silver streak | 2 | 4 | 11 | 0 | 0 |
| short shot | 7 | 11 | 18 | 9 | 11 |
| sink mark | 0 | 0 | 0 | 0 | 0 |
| jetting | 0 | 0 | 0 | 0 | 0 |
| cracks | 7 | 0 | 3 | 1 | 2 |

*15) is the same as those described in 12th Example.
*18), *19) and *20) show case of molding PC/ABS blend polymer (blend resin).

TABLE 41

| | item | | | | |
|---|---|---|---|---|---|
| | molding material; ABS resin paint; paint #10 (comparative example) | molding material; PC resin paint; paint #30 (comparative example) | molding material; PC/ABS resin paint; paint #10 | | |
| test (examination) item | fresh molding by virgin material*2) | fresh molding by virgin material*2) | first recycle*3) | second recycle*4) | third recycle*5) |
| 1. Coatability | | | | | |
| 1-1 appearance | ○ | ○ | ○ | ○ | ○ |
| 1-2 paint film properties | | | | | |
| pencil hardness test | HB or over | HB or over | HB or over | HB or over | HB or over |
| cross hatch test | 100/100 | 100/100 | 100/100 | 100/100 | 100/100 |
| crosscut test | 1 mm or less | 1 mm or less | 1 mm or less | 1 mm or less | 1 mm or less |
| hot water dip test | no abnormality 100/100 | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 | no abnormality 100/100 |

Test method and others depend upon table 8.
*2), *3), *3) and *5) are the same as those described in 4th Example.

TABLE 42

| | item | | | | |
|---|---|---|---|---|---|
| | molding material; ABS resin paint; paint #10 (comparative example) | molding material; PC resin paint; paint #30 (comparative example) | molding material; PC/ABS resin paint; paint #10 | | |
| failure phenomena | fresh molding by virgin material*15) | fresh molding by virgin material*15) | first molding*18) | second molding*19) | third molding*20) |
| total molding number | 556 | 571 | 576 | 412 | 297 |
| scorch failure | 9 | 6 | 8 | 8 | 3 |
| failure by contamination or foreign matter | 7 | 3 | 8 | 3 | 3 |
| silver streak | 2 | 8 | 4 | 5 | 1 |
| short shot | 11 | 15 | 20 | 14 | 9 |
| sink mark | 0 | 0 | 0 | 0 | 0 |

TABLE 42-continued

|  | item | | | | |
|---|---|---|---|---|---|
|  | molding material; ABS resin paint; paint #10 (comparative example) | molding material; PC resin paint; paint #30 (comparative example) | molding material; PC/ABS resin paint; paint #10 | | |
| failure phenomena | fresh molding by virgin material*15) | fresh molding by virgin material*15) | first molding*18) | second molding*19) | third molding*20) |
| jetting | 0 | 0 | 0 | 0 | 0 |
| cracks | 1 | 0 | 1 | 0 | 1 |

*15) is the same as those described in 12th Example.
*18), *19) and *20) show case of molding PC/ABS blend polymer (blend resin).

TABLE 43

|  | item | | | | |
|---|---|---|---|---|---|
|  | molding material; ABS resin paint; paint #30 (comparative example) | molding material; PC resin paint; paint #10 (comparative example) | molding material; PC/ABS resin paint; paint #10 | | |
| test (examination) item | fresh molding by virgin material*2) | fresh molding by virgin material*2) | first recycle*3) | second recycle*4) | third recycle*5) |
| 1. Coatability |  |  |  |  |  |
| 1-1 appearance | ○ | ○ | ○ | ○ | ○ |
| 1-2 paint film properties |  |  |  |  |  |
| pencil hardness test | HB or over | HB or over | HB or over | HB or over | HB or over |
| cross hatch test | 100/100 | 100/100 | 100/100 | 100/100 | 100/100 |
| crosscut test | 1 mm or less | 1 mm or less | 1 mm or less | 1 mm or less | 1 mm or less |
| hot water dip test | no abnormality 100/100 | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 | no abnormality 100/100 |

Test method and others depend upon table 8.
*2), *3), *3) and *5) are the same as those described in 4th Example.

TABLE 44

|  | item | | | | |
|---|---|---|---|---|---|
|  | molding material; ABS resin paint; paint #30 (comparative example) | molding material; PC resin paint; paint #10 (comparative example) | molding material; PC/ABS resin paint; paint #10 | | |
| failure phenomena | fresh molding by virgin material*15) | fresh molding by virgin material*15) | first molding*18) | second molding*19) | third molding*20) |
| total molding number | 556 | 584 | 568 | 438 | 339 |
| scorch failure | 5 | 6 | 2 | 3 | 4 |
| failure by contamination or foreign matter | 2 | 2 | 4 | 4 | 1 |
| silver streak | 3 | 13 | 6 | 5 | 4 |
| short shot | 9 | 2 | 11 | 6 | 15 |
| sink mark | 0 | 0 | 0 | 0 | 0 |
| jetting | 0 | 0 | 0 | 0 | 0 |
| cracks | 3 | 0 | 2 | 1 | 1 |

*15) is the same as those described in 12th Example.
*18), *19) and *20) show case of molding PC/ABS blend polymer (blend resin).

TABLE 45

| test (examination) item | molding material; ABS resin paint; paint #10 (comparative example) fresh molding by virgin material*2) | molding material; ABS/PET resin paint; paint #10 | | |
|---|---|---|---|---|
| | | first recycle*6A) | second recycle*7A) | third recycle*8A) |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2) is the same as that in the 4th Example.
*6A), *7A) and *8A) show content wherein reproduced pellets of PET resin are added after crushing and pelletizing virgin material in content of *3), *4) and *5) in 4th Example.

TABLE 46

| failure phenomena | molding material; ABS/PET resin paint; paint #10 | | |
|---|---|---|---|
| | first molding*15D) | second molding*21) | third molding*22) |
| total molding number | 496 | 408 | 312 |
| scorch failure | 5 | 8 | 3 |
| failure by contamination or foreign matter | 92 | 69 | 53 |
| silver streak | 6 | 11 | 8 |
| short shot | 0 | 4 | 3 |
| sink mark | 0 | 0 | 0 |
| jetting | 0 | 0 | 0 |
| cracks | 0 | 4 | 1 |

*15D) shows case of mixing resins with each other and molding.
*21) shows case of first-recycling material in *15D).
*22) shows case of second-recycling material in *15D).

TABLE 48

| failure phenomena | molding material; ABS/PET resin paint; paint #30 | | |
|---|---|---|---|
| | first molding*15D) | second molding*21) | third molding*22) |
| total molding number | 453 | 349 | 222 |
| scorch failure | 2 | 3 | 4 |
| failure by contamination or foreign matter | 108 | 84 | 53 |
| silver streak | 10 | 6 | 2 |
| short shot | 8 | 3 | 8 |
| sink mark | 0 | 0 | 0 |
| jetting | 0 | 0 | 0 |
| cracks | 2 | 2 | 2 |

*15D) shows case of mixing resins with each other and molding.
*21) shows case of first-recycling material in *15D).
*22) shows case of second-recycling material in *15D).

TABLE 47

| test (examination) item | molding material; ABS resin paint; paint #30 (comparative example) fresh molding by virgin material*2) | molding material; ABS/PET resin paint; paint #30 | | |
|---|---|---|---|---|
| | | first recycle*6A) | second recycle*7A) | third recycle*8A) |
| 1. Coatability | | | | |
| 1-1 appearance | | ○ | ○ | ○ | ○ |

TABLE 47-continued

| test (examination) item | molding material; ABS resin paint; paint #30 (comparative example) fresh molding by virgin material*2) | molding material; ABS/PET resin paint; paint #30 | | |
|---|---|---|---|---|
| | | first recycle*6A) | second recycle*7A) | third recycle*8A) |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2) is the same as that in the 4th Example.
*6A), *7A) and *8A) show content wherein reproduced pellets of PET resin are added after crushing and pelletizing virgin material in content of *3), *4) and *5) in 4th Example.

TABLE 49

| test (examination) item | molding material; ABS resin paint; paint #10 (comparative example) fresh molding by virgin material*2) | molding material; ABS/PMMA resin paint; paint #10 | | |
|---|---|---|---|---|
| | | first recycle*6B) | second recycle*7B) | third recycle*8B) |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2) is the same as that in the 4th Example.
*6B), *7B) and *8B) show content wherein reproduced pellets of PMMA resin are added after crushing and pelletizing virgin material in content of *3), *4) and *5) in 4th Example.

TABLE 50

| | item molding material; ABS/PMMA resin paint; paint #10 | | |
|---|---|---|---|
| failure phenomena | first molding*15D) | second molding*21) | third molding*22) |
| total molding number | 427 | 386 | 243 |
| scorch failure | 5 | 3 | 3 |
| failure by contamination or foreign matter | 4 | 4 | 5 |
| silver streak | 12 | 3 | 4 |
| short shot | 9 | 2 | 4 |
| sink mark | 0 | 0 | 0 |
| jetting | 0 | 0 | 0 |
| cracks | 1 | 0 | 0 |

*15D) shows case of mixing resins with each other and molding.
*21) shows case of first-recycling material in *15D).
*22) shows case of second-recycling material in *15D).

TABLE 52

| | item molding material; ABS/PMMA resin paint; paint #30 | | |
|---|---|---|---|
| failure phenomena | first molding*15D) | second molding*21) | third molding*22) |
| total molding number | 538 | 419 | 334 |
| scorch failure | 2 | 3 | 0 |
| failure by contamination or foreign matter | 2 | 4 | 1 |
| silver streak | 7 | 0 | 0 |
| short shot | 2 | 5 | 7 |
| sink mark | 0 | 0 | 0 |
| jetting | 0 | 0 | 0 |
| cracks | 0 | 2 | 3 |

*15D) shows case of mixing resins with each other and molding.
*21) shows case of first-recycling material in *15D).
*22) shows case of second-recycling material in *15D).

TABLE 51

| | item | | | |
|---|---|---|---|---|
| | molding material; ABS resin paint; paint #30 (comparative example) | molding material; ABS/PMMA resin paint; paint #30 | | |
| test (examination) item | fresh molding by virgin material*2) | first recycle*6B) | second recycle*7B) | third recycle*8B) |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2) is the same as that in the 4th Example.
*6B), *7B) and *8B) show content wherein reproduced pellets of PMMA resin are added after crushing and pelletizing virgin material in content of *3), *4) and *5) in 4th Example.

TABLE 53

| test (examination) item | molding material; HIPS resin paint; paint #10 (comparative example) fresh molding by virgin material*2) | molding material; HIPS/formed PS resin paint; paint #10 | | |
|---|---|---|---|---|
| | | first recycle*6C) | second recycle*7C) | third recycle*8C) |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2) is the same as that in the 4th Example.
*6C), *7C) and *8C) show content wherein reproduced pellets of foamed PS resin are added after crushing and pelletizing virgin material in content of *3), *4) and *5) in 4th Example.

TABLE 54

| | item molding material; HIPS/foamed PS paint; paint #10 | | |
|---|---|---|---|
| failure phenomena | first molding*15D) | second molding*21) | third molding*22) |
| total molding number | 496 | 341 | 269 |
| scorch failure | 32 | 28 | 33 |
| failure by contamination or foreign matter | 212 | 147 | 122 |
| silver streak | 11 | 1 | 1 |
| short shot | 3 | 4 | 1 |
| sink mark | 0 | 0 | 0 |
| jetting | 0 | 0 | 0 |
| cracks | 0 | 2 | 6 |

*15D) shows case of mixing resins with each other and molding.
*21) shows case of first-recycling material in *15D).
*22) shows case of second-recycling material in *15D).

TABLE 56

| | item molding material; HIPS/foamed PS paint; paint #20 | | |
|---|---|---|---|
| failure phenomena | first molding*15D) | second molding*21) | third molding*22) |
| total molding number | 543 | 387 | 211 |
| scorch failure | 123 | 93 | 52 |
| failure by contamination or foreign matter | 261 | 205 | 113 |
| silver streak | 11 | 13 | 10 |
| short shot | 4 | 3 | 3 |
| sink mark | 0 | 0 | 0 |
| jetting | 0 | 0 | 0 |
| cracks | 1 | 0 | 3 |

*15D) shows case of mixing resins with each other and molding.
*21) shows case of first-recycling material in *15D).
*22) shows case of second-recycling material in *15D).

TABLE 55

| test (examination) item | molding material; HIPS resin paint; paint #20 (comparative example) fresh molding by virgin material*2) | molding material; HIPS/formed PS resin paint; paint #20 | | |
|---|---|---|---|---|
| | | first recycle*6C) | second recycle*7C) | third recycle*8C) |
| 1. Coatability | | | | |
| 1-1 appearance | | ○ | ○ | ○ | ○ |

TABLE 55-continued

| | item | | | |
|---|---|---|---|---|
| | molding material; HIPS resin paint; paint #20 (comparative example) | molding material; HIPS/formed PS resin paint; paint #20 | | |
| test (examination) item | fresh molding by virgin material*2) | first recycle*6C) | second recycle*7C) | third recycle*8C) |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2) is the same as that in the 4th Example.
*6C), *7C) and *8C) show content wherein reproduced pellets of foamed PS resin are added after crushing and pelletizing virgin material in content of *3), *4) and *5) in 4th Example.

TABLE 60

Table shows blending rate of thinner.

| (item) thinner No | rate (weight (kg)) S5 |
|---|---|
| raw stock (solvent) | |
| methanol | 30 |
| normal butanol | 20 |
| isopropyl alcohol | 30 |
| butylcellosolve | 20 |
| (total) | 100 |

TABLE 86

| test item | paint paint #30 |
|---|---|
| cross hatch test | 100/100 |

Test method and others depend on table 8.

TABLE 87

| test item | paint paint #10 |
|---|---|
| cross hatch test | 100/100 |

Test method and others depend on table 8.

TABLE 88

| test item | paint paint #30 |
|---|---|
| cross hatch test | 100/100 |

Test method and others depend on table 8.

TABLE 62

| | item | | |
|---|---|---|---|
| | molding material; modified PPO(E) paint; paint #20 | | |
| failure phenomena | first molding*15) | second molding*16) | third molding*17) |
| total molding number | 360 | 306 | 180 |
| scorch failure | 0 | 2 | 1 |
| failure by contamination or foreign matter | 6 | 4 | 2 |
| silver streak | 0 | 3 | 3 |
| short shot | 0 | 6 | 4 |
| sink mark | 0 | 0 | 0 |
| jetting | 0 | 0 | 0 |
| cracks | 1 | 2 | 2 |

*15), *16) and *17) are the same as those described in 12th Example.

TABLE 64

| | item | | |
|---|---|---|---|
| | molding material; ABS resin paint; paint #40 | | |
| failure phenomena | first molding*15) | second molding*16) | third molding*17) |
| total molding number | 471 | 401 | 330 |
| scorch failure | 2 | 2 | 1 |
| failure by contamination or foreign matter | 5 | 1 | 2 |
| silver streak | 4 | 1 | 0 |
| short shot | 0 | 2 | 0 |
| sink mark | 0 | 0 | 0 |
| jetting | 0 | 0 | 0 |
| cracks | 3 | 0 | 1 |

*15), *16) and *17) are the same as those described in 12th Example.

TABLE 61

| test (examination) item | molding material; modified PPO(E) resin paint; paint #40 (comparative example) fresh molding by virgin material*2) | molding material; modified PPO(E) resin paint; paint #40 | | |
|---|---|---|---|---|
| | | first recycle*3) | second recycle*4) | third recycle*5) |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 63

| test (examination) item | molding material; ABS resin paint; paint #40 (comparative example) fresh molding by virgin material*2) | molding material; ABS resin paint; paint #40 | | |
|---|---|---|---|---|
| | | first recycle*3) | second recycle*4) | third recycle*5) |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 65

| test (examination) item | molding material; HIPS resin paint; paint #40 (comparative example) fresh molding by virgin material*2) | molding material; HIPS resin paint; paint #40 | | |
|---|---|---|---|---|
| | | first recycle*3) | second recycle*4) | third recycle*5) |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |
| salt water dip test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 66

| failure phenomena | molding material; HIPS resin paint; paint #40 | | |
|---|---|---|---|
| | first molding*15) | second molding*16) | third molding*17) |
| total molding number | 411 | 391 | 323 |
| scorch failure | 3 | 3 | 1 |
| failure by contamination or foreign matter | 3 | 2 | 2 |
| silver streak | 3 | 1 | 1 |
| short shot | 0 | 2 | 0 |
| sink mark | 0 | 0 | 0 |
| jetting | 0 | 0 | 0 |
| cracks | 3 | 0 | 1 |

*15), *16) and *17) are the same as those described in 12th Example.

TABLE 67

| type | ABS | ASA | CA | EVA | PA6 | PA6-6 | PC | HDPE | LDPE | PMMA | POM | PP | modified PPO | GPPS |
|---|---|---|---|---|---|---|---|---|---|---|---|---|---|---|
| ABS | ○ | ○ | ○ | | | | ○ | x | x | ○ | | x | x | x |
| ASA | ○ | ○ | ○ | ○ | | | ○ | x | x | ○ | | x | x | x |
| CA | ○ | ○ | ○ | Δ | | | | x | x | | | x | x | x |
| EVA | | ○ | Δ | ○ | | | | ○ | ○ | | | ○ | | ○ |
| PA6 | | | | | ○ | ○ | | Δ | Δ | | | Δ | | x |
| PA6-6 | | | | | ○ | ○ | Δ | Δ | Δ | | | Δ | | x |
| PC | ○ | ○ | | | | Δ | ○ | x | x | | | x | | x |
| HDPE | x | x | x | ○ | Δ | Δ | x | ○ | ○ | Δ | Δ | x | | x |
| LDPE | x | x | x | ○ | Δ | Δ | x | ○ | ○ | Δ | Δ | ○ | | x |
| PMMA | ○ | ○ | | | | | | Δ | Δ | ○ | | Δ | | x |
| POM | | | | | | | | Δ | Δ | | | ○ | Δ | |
| PP | x | x | x | ○ | Δ | Δ | x | x | ○ | Δ | Δ | ○ | Δ | x |
| modified PPO | x | x | x | | | | | | | | | Δ | ○ | ○ |
| GPPS | x | x | x | ○ | x | x | x | x | x | x | x | x | ○ | ○ |
| HIPS | x | x | x | | x | x | x | x | x | x | x | x | ○ | ○ |
| PBT | ○ | ○ | ○ | | | | ○ | x | x | | | x | x | x |
| TPU | ○ | ○ | ○ | ○ | ○ | ○ | | x | x | | | x | x | x |
| PVC-W | ○ | ○ | ○ | x | | | ○ | Δ | | ○ | | Δ | x | Δ |

TABLE 67-continued

| type | HIPS | PBT | TPU | PVC-W | SAN | TPR | PET | PVAC | PPS | Blend PC/PBT | Blend PC/ABS |
|---|---|---|---|---|---|---|---|---|---|---|---|
| SAN | o | o | o | | | o | x | x | o | x | x |
| TPR | | | | | | | | | o | | |
| PET | o | | | | o | | | | | | |
| PVAC | Δ | Δ | | | | | | | | | |
| PPS | | | | | o | | | | | | |
| Blend PC/PBT | o | o | | | o | x | x | | x | x | x |
| Blend PC/ABS | o | o | | | o | x | x | | x | x | x |
| ABS | x | o | o | o | o | | o | Δ | | o | o |
| ASA | x | o | o | o | o | | | Δ | | o | o |
| CA | x | o | o | o | o | | | | | | |
| EVA | | | | x | | | | | | | |
| PA6 | x | | o | | | | | | | | |
| PA6-6 | x | | o | | | | | | | | |
| PC | x | o | o | o | o | | o | | o | o | o |
| HDPE | x | x | x | Δ | x | | | | | x | x |
| LDPE | x | x | x | | x | | | | | x | x |
| PMMA | x | | | o | o | | | | | | |
| POM | x | x | | | | | | | | | |
| PP | x | x | x | Δ | x | o | | | | x | x |
| modified PPO | o | x | x | x | x | | | | | x | x |
| GPPS | o | x | x | Δ | x | | | | | x | x |
| HIPS | o | x | x | Δ | x | | | | | x | x |
| PBT | x | o | o | o | o | | | | | | |
| TPU | x | o | o | o | o | | | | | | |
| PVC-W | Δ | o | o | o | o | | | | | | o |
| SAN | x | o | o | o | o | | o | Δ | | o | o |
| TPR | | | | | | o | | | | | |
| PET | | | | o | | | o | | | o | o |
| PVAC | | | | Δ | | | | o | | | |
| PPS | | | | | | | | | o | | |
| Blend PC/PBT | x | | | o | o | | | | | | o |
| Blend PC/ABS | x | | o | o | o | | | | | o | | o: good matching
Δ: inferior matching
x: no matching
(referred from document of Battenfeld Corp.)

TABLE 68

| | paint | |
|---|---|---|
| test item | paint #10 | paint #20 |
| cross hatch test | 38/100 | 29/100 |

Test method and others depend on table 8.

TABLE 69

| | paint | |
|---|---|---|
| test item | paint #10 | paint #20 |
| cross hatch test | 100/100 | 100/100 |

Test method and others depend on table 8.

TABLE 70

| | paint | |
|---|---|---|
| test item | paint #10 | paint #20 |
| cross hatch test | 100/100 | 100/100 |

Test method and others depend on table 8.

TABLE 71

| evaluation item | evaluation result |
|---|---|
| 1. paint film ability | |
| 1-1. Appearance | bloom, pinhole, blister are not confirmed |
| 2. paint film properties | |
| pencil hardness test | HB or over |
| cross hatch test | 100/100 |
| cross cut test | 1 mm or below |
| hot water dip test | no abnormality 100/100 |
| humidity test | no abnormality 100/100 |
| salt water dip test | no abnormality 100/100 |

Test method and others depend on table 8.

TABLE 72

| evaluation item | evaluation result |
|---|---|
| 1. paint film ability | |
| 1-1. Appearance | bloom, pinhole, blister are not confirmed |
| 2. paint film properties | |
| pencil hardness test | HB or over |
| cross hatch test | 100/100 |
| cross cut test | 1 mm or below |
| hot water dip test | no abnormality 100/100 |

TABLE 72-continued

| evaluation item | evaluation result |
|---|---|
| humidity test | no abnormality 100/100 |
| salt water dip test | no abnormality 100/100 |

Test method and others depend on table 8.

TABLE 74

| evaluation item | evaluation result |
|---|---|
| 1. moldability | moldability in molding process and molding failure phenomena have no difference t all to those in 5th Example using ABS resin and Paint #10 |

TABLE 73

| evaluation item | evaluation result |
|---|---|
| 1. paint film ability | |
| 1-1. Appearance | bloom, pinhole, blister are not confirmed |
| 2. paint film properties | |
| pencil hardness test | HB or over |
| cross hatch test | 100/100 |
| cross cut test | 1 mm or below |
| hot water dip test | no abnormality 100/100 |
| humidity test | no abnormality 100/100 |
| salt water dip test | no abnormality 100/100 |

Test method and others depend on table 8.

TABLE 75

| evaluation item | evaluation result |
|---|---|
| 1. paint film ability | |
| 1-1. Appearance | bloom, pinhole, blister are not confirmed |
| 2. paint film properties | |
| pencil hardness test | HB or over |
| cross hatch test | 100/100 |
| cross cut test | 1 mm or below |
| hot water dip test | no abnormality 100/100 |
| humidity test | no abnormality 100/100 |
| salt water dip test | no abnormality 100/100 |

Test method and others depend on table 8.

TABLE 77

| evaluation item | evaluation result |
|---|---|
| 1. paint film ability | |
| 1-1. Appearance | bloom, pinhole, blister are not confirmed |
| 2. paint film properties | |
| pencil hardness test | HB or over |
| cross hatch test | 100/100 |
| cross cut test | 1 mm or below |
| hot water dip test | no abnormality 100/100 |
| humidity test | no abnormality 100/100 |
| salt water dip test | no abnormality 100/100 |

Test method and others depend on table 8.

TABLE 76

| evaluation item | evaluation result | |
|---|---|---|
| 1. moldability | no difference in moldability is found by addition of refused toner | |
| 2. failure occurrences | added refused toner | no added refused toner |
| total molding number | 106 | 118 |
| scorch failure | 0 | 0 |
| silver streak | 2 | 3 |
| failure in gloss | 0 | 0 |
| color irregularity | 0 | 0 |
| short shot | 1 | 1 |
| sink mark | 0 | 0 |
| cracks failure | 1 | 2 |

TABLE 78

| | moldings | |
|---|---|---|
| positions of measuring density | case of mounting a rear cover obtained by a molding process | case of mounting a rear cover colored in black by used of a refused toner and coated with recyclable paint #10 |
| ① | 0.89 | 0.88 |
| ② | 0.78 | 0.78 |
| ③ | 0.79 | 0.84 |
| ④ | 0.71 | 0.74 |
| ⑤ | 0.89 | 0.88 |
| ⑥ | 0.77 | 0.85 |
| ⑦ | 0.87 | 0.96 |
| ⑧ | 0.82 | 0.89 |
| ⑨ | 0.91 | 0.90 |
| ⑩ | 0.76 | 0.92 |
| ⑪ | 0.80 | 0.82 |
| ⑫ | 0.82 | 0.81 |
| ⑬ | 0.68 | 0.93 |
| ⑭ | 0.74 | 0.99 |

TABLE 79

| evaluation item | evaluation result |
|---|---|
| 1. moldability | Swirl mark or silver streak was not found at time of molding. No difference in moldability is caused comparing with virgin ABS resin without addition of refused toner |
| 2. paint film ability | |
| 2-1. Appearance | bloom, pinhole, blister are not confirmed |
| 3. paint film properties | |
| pencil hardness test | HB or over |
| cross hatch test | 100/100 |
| cross cut test | 1 mm or below |
| hot water dip test | no abnormality 100/100 |
| humidity test | no abnormality 100/100 |
| salt water dip test | no abnormality 100/100 |

Test method and others depend on table 8.

TABLE 82

| evaluation item | evaluation result |
|---|---|
| 1. paint film ability | |
| 1-1. Appearance | bloom, pinhole, blister are not confirmed |

TABLE 82-continued

| evaluation item | evaluation result |
|---|---|
| 2. paint film properties | |
| pencil hardness test | HB or over |
| cross hatch test | 100/100 |
| cross cut test | 1 mm or below |
| hot water dip test | no abnormality 100/100 |
| humidity test | no abnormality 100/100 |
| salt water dip test | no abnormality 100/100 |

Test method and others depend on table 8.

TABLE 84

| evaluation item | evaluation result |
|---|---|
| 1. paint film ability | |
| 1-1. Appearance | bloom, pinhole, blister are not confirmed |
| 2. paint film properties | |
| pencil hardness test | HB or over |
| cross hatch test | 100/100 |
| cross cut test | 1 mm or below |
| hot water dip test | no abnormality 100/100 |
| humidity test | no abnormality 100/100 |
| salt water dip test | no abnormality 100/100 |

Test method and others depend on table 8.

TABLE 83

| evaluation item | evaluation result | |
|---|---|---|
| 1. moldability | difference in moldability and failure occurrences are not found in using ABS resin whether or not painted with paint #50. | |
| 2. failure occurrences | painted with paint #50 | no painted with paint #50 |
| total molding number | 166 | 139 |
| non-defective articles | 166 | 138 |

TABLE 83-continued

| evaluation item | evaluation result | |
|---|---|---|
| scorch failure | 0 | 0 |
| failure in contamination & foreign matter | 0 | 0 |
| silver streak | 0 | 0 |
| failure in gloss | 0 | 0 |
| color irregularity | 0 | 0 |
| clouding | 0 | 0 |
| short shot | 0 | 1 |
| sink mark | 0 | 0 |
| cracks failure | 0 | 0 |

TABLE 85

| evaluation item | evaluation result | |
|---|---|---|
| 1. moldability | difference in moldability and failure occurrences are not found in using ABS resin whether or not painted with paint #50. | |
| 2. failure occurrences | painted with paint #50 | no painted with paint #50 |
| total molding number | 111 | 128 |
| non-defective articles | 111 | 128 |
| scorch failure | 0 | 0 |
| failure in contamination & foreign matter | 0 | 0 |
| silver streak | 0 | 0 |
| failure in gloss | 0 | 0 |
| color irregularity | 0 | 0 |
| clouding | 0 | 0 |
| short shot | 0 | 0 |
| sink mark | 0 | 0 |
| cracks failure | 0 | 0 |

TABLE 89

| | item molding material; ABS resin paint; paint #10 | | | |
|---|---|---|---|---|
| test (examination) item | fresh molding by virgin material*2) | first recycle*3) | second recycle*4) | third recycle*5) |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 90

| | item | | | |
| | molding material; ABS resin | | | |
| | paint; paint #30 | | | |
| test (examination) item | fresh molding by virgin material*2) | first recycle*3) | second recycle*4) | third recycle*5) |
|---|---|---|---|---|
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 91

| | item | | | |
| | molding material; HIPS resin | | | |
| | paint; paint #10 | | | |
| test (examination) item | fresh molding by virgin material*2) | first recycle*3) | second recycle*4) | third recycle*5) |
|---|---|---|---|---|
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 92

| | item | | | |
| | molding material; HIPS resin | | | |
| | paint; paint #20 | | | |
| test (examination) item | fresh molding by virgin material*2) | first recycle*3) | second recycle*4) | third recycle*5) |
|---|---|---|---|---|
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 93

| | item |||| 
| | molding material; ABS resin |||| 
| | paint; paint #30 |||| 
| test (examination) item | fresh molding by virgin material*2) | first recycle*3) | second recycle*4) | third recycle*5) |
| --- | --- | --- | --- | --- |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 94

| | item |||| 
| | molding material; ABS resin |||| 
| | paint; paint #10 |||| 
| test (examination) item | fresh molding by virgin material*2) | first recycle*3) | second recycle*4) | third recycle*5) |
| --- | --- | --- | --- | --- |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 95

| | item |||| 
| | molding material; HIPS resin |||| 
| | paint; paint #10 |||| 
| test (examination) item | fresh molding by virgin material*2) | first recycle*3) | second recycle*4) | third recycle*5) |
| --- | --- | --- | --- | --- |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 96

| | item molding material; HIPS resin paint; paint #20 | | | |
|---|---|---|---|---|
| test (examination) item | fresh molding by virgin material*2) | first recycle*3) | second recycle*4) | third recycle*5) |
| 1. Coatability | | | | |
| 1-1 appearance | ○ | ○ | ○ | ○ |
| 1-2 paint film properties | | | | |
| pencil hardness test | HB or over | HB or over | HB or over | HB or over |
| cross hatch test | 100/100 | 100/100 | 100/100 | 100/100 |
| crosscut test | 1 mm or less | 1 mm or less | 1 mm or less | 1 mm or less |
| hot water dip test | no abnormality 100/100 | no abnormality 100/100 | no abnormality 100/100 | no abnormality 100/100 |
| humidity test | no abnormality 100/100 | no abnormality 100/100 | no abnormality 100/100 | no abnormality 100/100 |

Test method and others depend upon table 8.
*2), *3), *4) and *5) are the same as those described in 4th Example.

TABLE 97

| | item | |
|---|---|---|
| evaluation item failure phenomena | painted and printed molding material; ABS paint; paint #10 ink; ink #15 | neither painted nor printed |
| 1. moldability | no problem on molding operations is caused by incorporation of paint film and print film. | — |
| 2. failure occurrences | | |
| total molding number | 69 | 66 |
| scorch failure | 0 | 0 |
| failure in contamination or foreign matter | 0 | 0 |
| silver streak | 0 | 0 |
| short shot | 2 | 0 |
| sink mark | 0 | 0 |
| jetting | 0 | 0 |
| cracks failure | 0 | 0 |

TABLE 98-1

| molding resin No. of paint resin | TYPE OF RESIN | NAME OF MANUFACTURING MAKER | COMMERCIAL NAME AND GRADE |
|---|---|---|---|
| 101 | styrenated alkyd resin | Dainippon Ink And Chemicals, Inc. | Stysol 4250 |
| 102 | thermoplastic acrylic resin | Dainippon Ink And Chemicals, Inc. | Acrydic A-166 |
| 103 | chlorinated polypropylene resin | Dainippon Ink And Chemicals, Inc. | Acrydic CL-1000 |
| 104 | vinyl acetate modified acrylic resin | Dainippon Ink And Chemicals, Inc. | Acrydic CL-1712 |
| 105 | phenolic resin | Dainippon Ink And Chemicals, Inc. | Beckacite 1126HV |
| 106 | rosin modified maleic acid resin | Dainippon Ink And Chemicals, Inc. | Beckacite 1110 |
| 107 | phenolic resin | Dainippon Ink And Chemicals, Inc. | Phenolite 5010 |
| 108 | polyamide resin | Dainippon Ink And Chemicals, Inc. | Luckamide 500 |
| 111 | chlorinated polyethylene resin | Nippon Paper Industries Co., Ltd. | Superchlon HE-905 |
| 113 | chlorinated polypropylene resin | Nippon Paper Industries Co., Ltd. | Superchlon 224H |
| 116 | vinyl choloride resin | BASF AG | Laroflex MP45 |
| 121 | styrene modified acrylic resin | Mitsubishi Rayon Co., Ltd. | Dianal BR-52 |
| 127 | styrene acrylic resin emulsion | Tohpe Corporation | XA-4408 |
| 128 | acrylic emulsion | Tohpe Corporation | XA-2409 |
| 129 | polyamide resin | Henkel Hakusui Corporation | Versamid 725 |
| 130 | urethane emulsion | Tohpe Corporation | GL-Top-U |
| 132 | chlorinated polypropylene resin | Mitsubishi Rayon Co., Ltd. | Dianal JR1487 |
| 133 | chlorinated polypropylene resin | Mitsubishi Rayon Co., Ltd. | Dianal JR1409 |

TABLE 98-1-continued

| molding resin | TYPE OF RESIN | NAME OF MANUFACTURING MAKER | COMMERCIAL NAME AND GRADE |
|---|---|---|---|
| 10 | styrene modified acrylic resin | Dainippon Ink And Chemicals, Inc. | Acrydic A-157 |
| 149 | styrene modified acrylic resin | Dainippon Ink And Chemicals, Inc. | Acrydic 56-1155 |
| molding resin | | | |
| 20 | PS resin | Asahi Chemical Ind., Ltd. | Styron 685 |
| 30 | AS resin | Denki kagaku kogyo k. k. | AS-EXB |
| 40 | alcoholsouluble nylon resin | Torsy Industries, Inc. | Amilan MC8000 |
| PE | PE resin | Japan Polyolefine Co., Ltd. | J-Rex HDPF F6200V |
| PP | PP resin | Japan Polyolefine Co., Ltd. | J-Allomer MK541 |
| PA | PA resin | Asahi Chemical Ind., Ltd. | Leona 1300S |
| PET | PET resin | NOF Corporation | ModiperA1100 |
| compatibilizing or miscibilizing agent | | | |
| A1100 | LDPE/PSt = 7/3 | NOF Corporation | ModiperA1100 |
| A1400 | LDPE/P(St-r-AN) = 7/3 | NOF Corporation | ModiperA1400 |
| CT121 | PC/AS = 50/50 | NOF Corporation | ModiperCT121 |
| CT134 | PC/AS = 70/30 | NOF Corporation | ModiperCT134 |
| CT120 | PC/AS = 70/30 | NOF Corporation | ModiperCT120 |
| CT430 | PC/AS = 70/30 | NOF Corporation | ModiperCT430 |

TABLE 98-2

Evaluation result of affinity of paint resin and thermoplastic molding resin

| paint resin | molding resin (resin which is a constituent of molding) | | | | | | |
|---|---|---|---|---|---|---|---|
| | HIPS resin | ABS resin | PC resin | rigid vinyl chloride resin(S) | nylon resin | PP resin | PE resin |
| (No. of paint resin) | | | | | | | |
| 101 | 100 | 100 | 100 | 100 | | | |
| 102 | 100 | 100 | 100 | 100 | | | |
| 103 | | | | | 100 | | |
| 104 | 100 | | | | | | |
| 105 | 100 | | | | | | |
| 106 | 100 | | | | | | |
| 107 | 100 | | | | | | |
| 108 | | | | 100 | | | |
| 111 | | | | | | | 100 |
| 113 | | | | | | 100 | |
| 116 | | | | 100 | | | |
| 121 | 100 | 100 | 100 | 100 | | 100 | |
| 127 | 100 | 100 | 100 | | | 100 | |
| 128 | 100 | 100 | | | | 100 | 100 |
| 129 | | | | | 100 | | |
| 130 | 100 | 100 | 100 | 100 | | | |
| 132 | | | | | | 100 | |
| 133 | | | | | | 100 | |
| 10 | 100 | 100 | 100 | | | | |
| 149 | 100 | 100 | 100 | | | | |
| (molding resin) | | | | | | | |
| 20 | 100 | 90 | | | | 20 | 50 |
| 30 | 50 | | 100 | | 40 | 30 | |
| 40 | | 100 | | | 100 | | |
| PE | 50 | 50 | | | | 100 | 100 |
| PP | 20 | 30 | | | | 100 | 100 |
| PA | | 50 | | | 100 | | |
| PET | | 100 | | | | | |

TABLE 98-2-continued

Evaluation result of affinity of paint resin and thermoplastic molding resin

| paint resin | molding resin (resin which is a constituent of molding) | | | | | | |
|---|---|---|---|---|---|---|---|
| | HIPS resin | ABS resin | PC resin | rigid vinyl chloride resin(S) | nylon resin | PP resin | PE resin |
| (compatibilizing or miscibilizing agent) | | | | | | | |
| A1100 | | 100 | | | | | |
| A1400 | | 20 | | | | | |
| CT121 | | 90 | | | | | |
| CT134 | | 90 | | | | | |
| CT120 | | 100 | | | | | |
| CT430 | | 80 | | | | | | note)
*HIPS resin; high-impact polystyrene resin by Asahi Chemical Industry Co., Ltd. commercial name and grade; Stylac 495
*ABS resin; ABS resin by Asahi Chemical Industry Co., Ltd. commercial name and grade; Stylac 120
*PC resin; polycarbonate resin by Tejin Chemicals Ltd. commercial name and grade; Panlite L-1225Ⓡ
*rigid vinyl chloride resin; hard vinyl chloride resin by Riken Vinyl Industry Co., Ltd. (for injection molding), commercial name and grade; VBV0006F
*nylon resin; nylon 6 resin by Unitika Ltd., commercial name and grade; A1030JR
*PP resin; polypropylene resin (homopolymer) by Chisso Petrochemical Co., Ltd. commercial name and grade; Chisso Polypro K-1008
*PE resin; polyethylene resin by Japan Polyolefine Co., Ltd. commercial name and grade; Jayrex HDPE F6200V
note on numerical sign)
100, 50 and others show results of cross hatch test based on JIS standard K5400 8.4.2 (a denominator of 100 is omitted)

TABLE 99-1

Table shows thermoplastic resins subjected on cross hatch test to evaluate affinities of thermoplastic resins constituting paints and thermoplastic resins mainly constituting moldings

| NO. OF PAINT RESIN | TYPE OF RESIN | NAME OF MANUFACTURING MAKER | COMMERCIAL NAME AND GRADE |
|---|---|---|---|
| 101 | styrenated alkyd resin | Dainippon Ink And Chemicals, Inc. | Stysol 4250 |
| 102 | thermoplastic acrylic resin | Dainippon Ink And Chemicals, Inc. | Acrydic A-166 |
| 103 | chlorinated polypropylene resin | Dainippon Ink And Chemicals, Inc. | Acrydic CL-1000 |
| 104 | vinyl acetate modified acrylic resin | Dainippon Ink And Chemicals, Inc. | Acrydic CL-1712 |
| 105 | phenolic resin | Dainippon Ink And Chemicals, Inc. | Beckacite 1126HV |
| 106 | rosin modified maleic resin | Dainippon Ink And Chemicals, Inc. | Beckacite 1110 |
| 107 | phenolic resin | Dainippon Ink And Chemicals, Inc. | Phenolite 5010 |
| 110 | chlorinated polypropylene resin | Nippon Paper Industries Co., Ltd. | Superchlon HP-205 |
| 111 | chlorinated polyethylene resin | Nippon Paper Industries Co., Ltd. | Superchlon HE-905 |
| 112 | chlorinated polypropylene resin | Nippon Paper Industries Co., Ltd. | Superchlon 832L |
| 113 | chlorinated polypropylene resin | Nippon Paper Industries Co., Ltd. | Superchlon 224H |
| 114 | rosin ester | Arakawa Chemical Industries, Ltd. | Ester Gum AAL |
| 115 | rosin modified phenol | Arakawa Chemical Industries, Ltd. | Tamanol 135 |
| 116 | vinyl chloride resin | BASF AG | Laroflex MP45 |
| 117 | polyvinyl butyral | Sekisui Chemical Co., Ltd. | S-Lec BMS |
| 118 | polyvinyl alcohol | Sekisui Chemical Co., Ltd. | S-Lec A |
| 119 | vinyl chloride/vinyl acetate copolymerized resin | Sekisui Chemical Co., Ltd. | S-Lec C |
| 121 | styrene modified acrylic resin | Mitsubishi Rayon Co., Ltd. | Dianal BR-52 |
| 122 | thermoplastic acrylic resin | Mitsubishi Rayon Co., Ltd. | Dianal BR-64 |
| 123 | thermoplastic acrylic resin | Mitsubishi Rayon Co., Ltd. | Dianal BR-83 |
| 124 | thermoplastic acrylic resin | Mitsubishi Rayon Co., Ltd. | Dianal BR-93 |
| 125 | thermoplastic acrylic resin | Mitsubishi Rayon Co., Ltd. | Dianal BR-105 |
| 126 | thermoplastic acrylic resin | Mitsubishi Rayon Co., Ltd. | Dianal BR-107 |
| 127 | styrene acrylic resin emulsion | Tohpe Corporation | XA-4408 |
| 128 | acrylic emulsion | Tohpe Corporation | XA-2409 |
| 129 | polyamide resin | Henkel Hakusui Corporation | Versamid 725 |
| 130 | urethane emulsion | Tohpe Corporation | GL-Top-U |
| 131 | epoxy resin | Arakawa Chemical Industries, Ltd. | Arakyd 920IN |
| 132 | chlorinated polypropylene resin | Mitsubishi Rayon Co., Ltd. | Dianal JR1487 |
| 133 | chlorinated polypropylene resin | Mitsubishi Rayon Co., Ltd. | Dianal JR1409 |
| 136 | alkyd resin/nitrocellulose | Dainippon Ink And Chemicals, Inc. | BS1323-60EL |
| 137 | thermoplastic acrylic resin/nitrocellulose | Taiseikakou Kabushikikaisha | Acryt 7541MA |
| 138 | vinyl chloride resin | Kaneka Corporation | Kanevilack L-ED |
| 139 | vinyl acetate modified acrylic resin | The Nippon Synthetic Chemical Industry Co., Ltd. | Coponyl 9503L |
| 140 | styrene modified acrylic resin | Japan U.Pica Company, Ltd. | Upicacoat AC3320 |
| 141 | alkyd resin | Dainippon Ink And Chemicals, Inc. | Acrydic A-1053 |
| 142 | urethane modified alkyd resin | Arakawa Chemical Industries, Ltd. | Arakyd 7502X |
| 143 | thermoplastic acrylic resin | Japan U.Pica Company, Ltd. | Upicacoat AC3260 |
| 144 | polyvinyl butyral | Sekisui Chemical Co., Ltd. | S-Lec BL-1-25BX |
| 145 | chlorinated polyethylene resin | Mitsui Petrochemical Indystries Ltd. | Unistol |
| 146 | chlorinated polyethylene resin | Nippon Paint Co., Ltd. | Nippe PP Primer |
| 10 | styrene modified acrylic resin | Dainippon Ink And Chemicals, Inc. | Acrydic A-157 |
| 149 | styrene modified acrylic resin | Dainippon Ink And Chemicals, Inc. | Acrydic 56-1155 |
| 151 | watersoluble acrylic resin | Dainippon Ink And Chemicals, Inc. | Watersol CD540 |

TABLE 99-2 evaluation result of affinity of paint thermoplastic resin and molding thermoplastic resin through cross hatch test

| resin No. for paint | HIPS resin | | styl n modified PPO(E) resin | | ABS resin | | flame-retardant ABS resin | | PC resin | | rigid vinyl chloride resin(S) | | plasticized polyvinyl chloride resin(T) | | nylon resin | | PP resin(P) | | PP resin(S) | |
|---|---|---|---|---|---|---|---|---|---|---|---|---|---|---|---|---|---|---|---|---|
| 101 | ◎ | 100 | ◎ | 100 | ◎ | 100 | ◎ | 100 | ◎ | 100 | ○ | 90 | x | 0 | ○ | 90 | x | 0 | x | 0 |
| 102 | ◎ | 100 | ◎ | 100 | ◎ | 100 | ◎ | 100 | ◎ | 100 | ◎ | 100 | x | 0 | x | 0 | x | 0 | x | 0 |
| 103 | ◎ | 100 | ◎ | 100 | ◎ | 100 | ◎ | 100 | ◎ | 100 | ◎ | 100 | x | 0 | ◎ | 100 | x | 0 | x | 0 |
| 104 | x | 0 | x | 0 | ◎ | 100 | ◎ | 100 | ◎ | 100 | ◎ | 100 | ◎ | 100 | x | 0 | x | 0 | x | 0 |
| 105 | x | 0 | x | 0 | x | 0 | x | 0 | x | 0 | x | 0 | x | 0 | x | 0 | x | 0 | x | 0 |
| 106 | x | 10 | x | 0 | x | 10 | x | 0 | x | 10 | x | 0 | x | 0 | x | 10 | x | 0 | x | 0 |
| 107 | x | 0 | x | 0 | x | 0 | x | 0 | x | 0 | x | 0 | x | 0 | ○ | 90 | x | 0 | x | 0 |
| 110 | Δ | 20 | Δ | 20 | Δ | 30 | ◎ | 100 | x | 0 | x | 0 | x | 0 | x | 0 | x | 0 | x | 0 |
| 111 | x | 0 | x | 0 | x | 0 | x | 0 | x | 0 | x | 0 | x | 0 | x | 0 | x | 0 | x | 0 |
| 112 | ◎ | 100 | ◎ | 100 | ◎ | 100 | Δ | 80 | ◎ | 100 | ◎ | 100 | x | 0 | ◎ | 100 | ◎ | 100 | ◎ | 100 |
| 113 | ◎ | 100 | ◎ | 100 | ◎ | 100 | ◎ | 100 | ◎ | 100 | ○ | 90 | ◎ | 100 | ○ | 80 | x | 0 | x | 0 |

TABLE 99-2-continued evaluation result of affinity of paint thermoplastic resin and molding thermoplastic resin through cross hatch test

| resin No. for paint | HIPS resin | | styl n modified PPO(E) resin | | ABS resin | | flame-retardant ABS resin | | PC resin | | rigid vinyl chloride resin(S) | | plasticized polyvinyl chloride resin(T) | | nylon resin | | PP resin(P) | | PP resin(S) | |
|---|---|---|---|---|---|---|---|---|---|---|---|---|---|---|---|---|---|---|---|---|
| 114 | Δ | 70 | x | 0 | x | 0 | x | 0 | x | 0 | x | 0 | x | 0 | x | 0 | x | 0 | x | 0 |
| 115 | Δ | 70 | x | 0 | x | 0 | x | 0 | x | 0 | x | 0 | x | 0 | x | 0 | x | 0 | x | 0 |
| 116 | x | 0 | x | 0 | ⊙ | 100 | ⊙ | 100 | ⊙ | 100 | ⊙ | 100 | x | 0 | x | 0 | x | 0 | x | 0 |
| 117 | x | 0 | x | 0 | x | 0 | x | 0 | x | 0 | x | 0 | x | 0 | x | 0 | x | 0 | x | 0 |
| 118 | x | 0 | x | 0 | ⊙ | 100 | ⊙ | 100 | ⊙ | 100 | ⊙ | 100 | ⊙ | 100 | x | 0 | x | 0 | x | 0 |
| 119 | ⊙ | 100 | x | 0 | ⊙ | 100 | ⊙ | 100 | ⊙ | 100 | ⊙ | 100 | ⊙ | 100 | x | 0 | x | 0 | x | 0 |
| 121 | ⊙ | 100 | ⊙ | 100 | ⊙ | 100 | ⊙ | 100 | ⊙ | 100 | ○ | 90 | ⊙ | 100 | x | 0 | x | 0 | x | 0 |
| 122 | ⊙ | 100 | ⊙ | 100 | ⊙ | 100 | ⊙ | 100 | ⊙ | 100 | ⊙ | 100 | ⊙ | 100 | x | 0 | x | 0 | x | 0 |
| 123 | ⊙ | 100 | ○ | 90 | ⊙ | 100 | ⊙ | 100 | x | 10 | ○ | 90 | ⊙ | 100 | x | 0 | x | 0 | x | 0 |
| 124 | ⊙ | 100 | ⊙ | 100 | ⊙ | 100 | ⊙ | 100 | ⊙ | 100 | ⊙ | 100 | x | 0 | x | 0 | x | 0 | x | 0 |
| 125 | ○ | 90 | x | 0 | x | 10 | x | 20 | x | 10 | x | 10 | x | 0 | x | 0 | x | 0 | x | 0 |
| 126 | ⊙ | 100 | ⊙ | 100 | ⊙ | 100 | ⊙ | 100 | ⊙ | 100 | ⊙ | 100 | x | 0 | x | 0 | x | 0 | x | 0 |
| 127 | ⊙ | 100 | ⊙ | 100 | ⊙ | 100 | ⊙ | 100 | ⊙ | 100 | x | 0 | x | 0 | x | 0 | x | 0 | x | 0 |
| 128 | ⊙ | 100 | ⊙ | 100 | ⊙ | 100 | ⊙ | 100 | ⊙ | 100 | x | 0 | x | 0 | x | 0 | x | 0 | x | 0 |
| 129 | x | 0 | ○ | 90 | Δ | 30 | ⊙ | 100 | ○ | 90 | x | 0 | x | 0 | ⊙ | 100 | x | 0 | x | 0 |
| 130 | x | 0 | x | 0 | x | 0 | x | 0 | x | 0 | x | 0 | x | 0 | x | 0 | x | 0 | x | 0 |
| 131 | x | 0 | x | 0 | x | 0 | x | 0 | ⊙ | 100 | x | 0 | x | 0 | x | 0 | x | 0 | x | 0 |
| 132 | ○ | 90 | ○ | 90 | x | 0 | ○ | 90 | ○ | 90 | ○ | 90 | x | 0 | x | 0 | x | 0 | x | 0 |
| 133 | ○ | 90 | ○ | 90 | ○ | 90 | ○ | 90 | Δ | 50 | ○ | 90 | x | 0 | ○ | 90 | ○ | 90 | ○ | 90 |
| 136 | x | 0 | x | 0 | ⊙ | 100 | ⊙ | 100 | ⊙ | 100 | x | 0 | x | 0 | ○ | 80 | x | 0 | x | 0 |
| 137 | x | 0 | x | 0 | ⊙ | 100 | ⊙ | 100 | x | 0 | x | 0 | x | 0 | ○ | 90 | x | 0 | x | 0 |
| 138 | x | 0 | x | 0 | ⊙ | 100 | ⊙ | 100 | ⊙ | 100 | ⊙ | 100 | ⊙ | 100 | ⊙ | 100 | x | 0 | x | 0 |
| 139 | Δ | 30 | Δ | 70 | ⊙ | 100 | ⊙ | 100 | ⊙ | 100 | ⊙ | 100 | ⊙ | 100 | x | 0 | x | 0 | x | 0 |
| 140 | ⊙ | 100 | ⊙ | 100 | Δ | 70 | ⊙ | 100 | ⊙ | 100 | ⊙ | 100 | x | 0 | x | 0 | x | 0 | x | 0 |
| 141 | x | 0 | x | 0 | ⊙ | 100 | ⊙ | 100 | Δ | 60 | Δ | 60 | x | 0 | ⊙ | 100 | x | 0 | x | 0 |
| 142 | ⊙ | 100 | ⊙ | 100 | ⊙ | 100 | ⊙ | 100 | ⊙ | 100 | ⊙ | 100 | ○ | 90 | ⊙ | 100 | x | 0 | x | 0 |
| 143 | Δ | 80 | Δ | 70 | x | 0 | Δ | 30 | x | 0 | Δ | 80 | x | 0 | Δ | 30 | x | 0 | x | 0 |
| 144 | Δ | 80 | ⊙ | 100 | Δ | 80 | ⊙ | 100 | ⊙ | 100 | Δ | 80 | x | 0 | x | 0 | x | 0 | x | 0 |
| 145 | ⊙ | 100 | ⊙ | 100 | ⊙ | 100 | ⊙ | 100 | ⊙ | 100 | ⊙ | 100 | x | 0 | ⊙ | 100 | ⊙ | 100 | ⊙ | 100 |
| 146 | ⊙ | 100 | ⊙ | 100 | ⊙ | 100 | ⊙ | 100 | ⊙ | 100 | ⊙ | 100 | x | 0 | ⊙ | 100 | ⊙ | 100 | ⊙ | 100 |
| 10 | ⊙ | 100 | ⊙ | 100 | ⊙ | 100 | ⊙ | 100 | ⊙ | 100 | ⊙ | 100 | ⊙ | 100 | x | 0 | x | 0 | x | 0 |
| 149 | ⊙ | 100 | ⊙ | 100 | ⊙ | 100 | ⊙ | 100 | ⊙ | 100 | ⊙ | 100 | ⊙ | 100 | x | 0 | x | 0 | x | 0 |
| 151 | ⊙ | 100 | ⊙ | 100 | ⊙ | 100 | ⊙ | 100 | ⊙ | 100 | ⊙ | 100 | ⊙ | 100 | x | 0 | x | 0 | x | 0 |

TABLE 99-3

Note)
HIPS resin; high impact polystyrene resin made by Asahi Chemical Ind. Co., Ltd
commercial name and grade; Styrac 495
styrene modified PPO(E) resin; styrene modified PPO(E) resin made by Asahi Chemical Ind. Co Ltd
commercial name and grade; Xyron 100Z
ABS resin; ABS resin made by Asahi Chemical Ind. Co Ltd
commercial name and grade; Styrac 120
flame-retardant ABS resin; flame-retardant ABS resin made by Ube Cycon. Ltd.
commercial name and grade; CYCOLAC ZFJ12
PC resin; polycarbonate resin made by Teijin Chemical Co., Ltd.,
commercial name and grade; PANLITE L-1225Y
rigid vinyle chloride resin(S); rigid vinyle chloride resin for injection molding made by Riken Vinyle Co., Ltd.,
commercial name and grade; VBV0006F
plasticized polyvinyl chloride resin(T); plasticized polyvinyl chloride resin for injection molding made by Riken Vinyle Co., Ltd.,
commercial name and grade; TG-8928S
nylon resin nylon resin made by Unitika Ltd.,
commercial name and grade; A1030JR
PP resin(P); polypropylene resin (homo polymer) made by CHISSO Petrochemical Co., Ltd.,
commercial name and grade; CHISSO POLYPRO K-1008
PP resin(S); polypropylene resin (block copolymer, high crystal polypropylene resin) made by Chisso Petrochemical Co., Ltd.,
commercial name and grade; CHISSO POLYPRO K-5230
Notes of Sign)
100.90 show results in adhesion property test of paint film accordance with JIS standard K 5400 8. 4. 2 (denominator of 100 is omitted)
⊙: adhesion property is 100/100
○: adhesion property is 90/100 or over
Δ: adhesion property is 20/100 or over and 90/100 or below
x: adhesion property is 20/100 or over

TABLE 100-1

Test item, test method, required value and unit of Coating film

| test item | test method | required value (reference) | unit | sign |
|---|---|---|---|---|
| 1. coatability (appearance), luster, surface irregularity, wrinkle and so on | accordance with JIS K 5400 7.1 | nothing | | B-1 |
| 2. Paint film property | | | | |
| (1) dry thickness of paint film | | 10 μm or over | μm | B-2 |
| (2) pencil hardness test | accordance with JIS K 5400 8.4.2 | | | B-3 |
| (3) relative specular glossiness at 60 degree | accordance with JIS K 5400 6.7 | | | B-4 |
| (4) cross hatch test at 90 degree | accordance with JIS K 5400 8.5.2 | adhesion 100/100 | | B-5 |
| (7) hot water dip test | accordance with JIS K 5400 8.19 (40° C., 48 hr. dipping) | no abnormality in gloss, discoloration, bulging and so on | | B-6 |
| | cross hatch test after hot water dip test | adhesion 100/100 | | B-7 |
| | cross cut test after hot water dip test | peeling width 1 mm or below | mm | B-8 |
| (8) humidity test | accordance with JIS K 5400 9.2.2 (98% RH 50° C., 72 hr.) | no abnormality in gloss, discoloration, bulging and so on | | B-9 |
| | cross hatch test after humidity test | adhesion 100/100 | | B-10 |
| | cross cut test after humidity test | peeling width 1 mm or below | mm | B-11 |
| (9) salt water dip test | accordance with JIS K 5400 9.23 (3% NaCl water solution 40° C., 72 hr. Dipping) | no abnormality in gloss, discoloration, bulging and so on | | B-12 |
| | cross hatch test after salt water test | adhesion 100/100 | | B-13 |
| | cross cut test after salt water test | peeling width 1 mm or below | mm | B-14 |
| (10) impact resistance test | ½ inch φ × 300 g × 50 cm | nothing of crack, peeling and so on | | B-15 |
| (11) abrasion resistance test | CS10/500 g/1000 rpm | 150 mgf or below | mg | B-16 |
| (12) weather resistance test | JIS K 5400 9.7.2 100 hr. | ΔE = 3 or below | | B-17 |
| 3. fundamental properties of material | | | | |
| (1) density | JIS K 6911 5.2 | | g/ml | C-1 |
| 4. Thermal properties of material | | | | |
| (1) heat deformation temperature(*27) | ATEM-D648 | | ° C. | C-2 |
| (2) vicat softening point temperature | ATEM-D1525 | | ° C. | C-3 |
| (3-1) melt flow rate | JIS K 7210 | | g/10 min | C-4 |
| (3-3) melt flow rate | ISO-R1133 | | g/10 min | C-5 |
| (3-3) melt flow rate | 250° C. 10 kg | | g/10 min | C-6 |
| (memo) measurements of melt flow rate vary in response to varieties of resin | | | | |
| 5. Mechanical properties of material | | | | |
| (1) tensile break strength | ATEM-D638 | | kg/cm² | C-7 |
| (2) elongation at break | ATEM-D638 | | % | C-8 |
| (3) bending strength | ATEM-D790 | | kg/cm² | C-9 |
| (4) modulus in flexure | ATEM-D790 | | kg/cm² | C-10 |
| (5) Izod impact strength(*28) | ATEM-D256 | | kg-cm/cm | C-11 |
| (6) Rockwell hardness(*29) | R scale | | | C-12 |
| (memo) measurements of Rockwell hardness vary in response to varieties of resin | L scale | | | C-13 |
| 7. The others | | | | |
| (1) water absorption(*30) | JIS K 7209 | | % | C-14 |

(memo)
(*27)load-deflection temperature 18. .6 kg load
(*28)notched
(*29)Rockwell hardness; ¼" strip (without surfice finish) transversed measuring section at gate side, R scale or L scale
(*30)measurement of variation in weight of dumb-bell specimen after leaving it 24 hours under water of 23° C.

TABLE 100-2 molding material; ABS resin (ABS resin by Asahi Chemical Industry Co., Ltd.; Commercial name and grade; Stylac 191)
coating; paint #149

| | | times of recycle | | |
|---|---|---|---|---|
| test item | 0 turn (V material)*2) | 1 turn*3) | 2 turn*4) | 3 turn*5) |
| B-1 | | ○ no abnormality | ○ no abnormality | ○ no abnormality |
| B-2 | | 17 μm | 17 μm | 17 μm |
| B-3 | | HB | HB | HB |
| B-4 | 75.6 | 6.3 | 5.9 | 6.6 |
| B-5 | | 100/100 | 100/100 | 100/100 |
| B-6 | | no abnormality | no abnormality | no abnormality |
| B-7 | | 100/100 | 100/100 | 100/100 |

TABLE 100-2-continued molding material; ABS resin (ABS resin by Asahi Chemical Industry Co., Ltd.; Commercial name and grade; Stylac 191)
coating; paint #149

| | | times of recycle | | |
|---|---|---|---|---|
| test item | 0 turn (V material)*2) | 1 turn*3) | 2 turn*4) | 3 turn*5) |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |
| B-12 | | no abnormality | no abnormality | no abnormality |
| B-13 | | 100/100 | 100/100 | 100/100 |
| B-14 | | 1 mm or below | 1 mm or below | 1 mm or below |
| B-15 | | no abnormality | no abnormality | no abnormality |
| B-16 | | success | success | success |
| B-17 | $\Delta E = 0.86$ | $\Delta E = 0.21$ | $\Delta E = 0.29$ | $\Delta E = 0.24$ |
| C-1 | 1.067 | 1.071 | 1.074 | 1.072 |
| C-2 | 82.9 | 83.6 | 82.6 | 86.3 |
| C-3 | 106.4 | 106.2 | 106.6 | 107.3 |
| C-4 | 24.9 | 26.3 | 27.3 | 27.3 |
| C-7 | 433 | 430 | 432 | 431 |
| C-8 | 16 | 17 | 18 | 17 |
| C-9 | 714 | 720 | 733 | 734 |
| C-10 | 26400 | 26400 | 26700 | 25700 |
| C-11 | 14.9 | 12.8 | 12.6 | 10.9 |
| C-12 | 113 | 113 | 113 | 113 |
| C-14 | 0.19 | 0.22 | 0.19 | 0.17 | note)
(molding conditions; molding temperature and molding machine are those of Nikko J100EP)
Physical properties; 240° C.-240° C.-220° C.-200° C.

TABLE 101 molding material; ABS resin (ABS resin by Asahi Chemical Industry Co., Ltd.; Commercial name and grade; Stylac 191)
coating; paint #151

| | | times of recycle | | |
|---|---|---|---|---|
| test item | 0 turn (V material)*2) | 1 turn*3) | 2 turn*4) | 3 turn*5) |
| B-1 | | ○ no abnormality | ○ no abnormality | ○ no abnormality |
| B-2 | | 17 $\mu$m | 17 $\mu$m | 17 $\mu$m |
| B-3 | | HB | HB | HB |
| B-4 | 77.8 | 5 | 4.8 | 5.2 |
| B-5 | | 100/100 | 100/100 | 100/100 |
| B-6 | | no abnormality | no abnormality | no abnormality |
| B-7 | | 100/100 | 100/100 | 100/100 |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |
| B-12 | | no abnormality | no abnormality | no abnormality |
| B-13 | | 100/100 | 100/100 | 100/100 |
| B-14 | | 1 mm or below | 1 mm or below | 1 mm or below |
| B-15 | | no abnormality | no abnormality | no abnormality |
| B-16 | | success | success | success |
| B-17 | $\Delta E = 0.88$ | $\Delta E = 0.98$ | $\Delta E = 1.02$ | $\Delta E = 1.01$ |
| C-1 | 1.067 | 1.071 | 1.074 | 1.075 |
| C-2 | 82.9 | 83 | 83.9 | 85.2 |
| C-3 | 106.4 | 106.1 | 106.7 | 106.8 |
| C-4 | 24.9 | 25.8 | 26.7 | 26.1 |
| C-7 | 433 | 434 | 435 | 437 |
| C-8 | 16 | 18 | 18 | 18 |
| C-9 | 714 | 721 | 735 | 737 |
| C-10 | 26400 | 26600 | 26900 | 26200 |
| C-11 | 14.9 | 13.6 | 12.9 | 10.3 |
| C-12 | 113 | 112 | 112 | 114 |
| C-14 | 0.19 | 0.19 | 0.21 | 0.15 | note)
(molding conditions; molding temperature and molding machine are those of Nikko J100EP)
Physical properties; 240° C.-240° C.-220° C.-200° C.

TABLE 102 molding material; ABS resin (ABS resin by Asahi Chemical Industry Co., Ltd.; Commercial name and grade; Stylac 191)
coating; paint #149

| | times of recycle | | | |
|---|---|---|---|---|
| test item | 0 turn (V material)*2) | 1 turn*3) | 2 turn*4) | 3 turn*5) |
| B-1 | | ○ no abnormality | ○ no abnormality | ○ no abnormality |
| B-2 | | 17 μm | 17 μm | 17 μm |
| B-3 | | HB | HB | HB |
| B-4 | 81.2 | 27.5 | 27 | 28.8 |
| B-5 | | 100/100 | 100/100 | 100/100 |
| B-6 | | no abnormality | no abnormality | no abnormality |
| B-7 | | 100/100 | 100/100 | 100/100 |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |
| B-12 | | no abnormality | no abnormality | no abnormality |
| B-13 | | 100/100 | 100/100 | 100/100 |
| B-14 | | 1 mm or below | 1 mm or below | 1 mm or below |
| B-15 | | no abnormality | no abnormality | no abnormality |
| B-16 | | success | success | success |
| B-17 | ΔE = 0.81 | ΔE = 0.91 | ΔE = 0.88 | ΔE = 0.93 |
| C-1 | 1.067 | 1.069 | 1.07 | 1.07 |
| C-2 | 82.9 | 85.9 | 87.1 | 85.8 |
| C-3 | 106.4 | 105.6 | 106 | 106.6 |
| C-4 | 24.9 | 27.3 | 27.8 | 27.3 |
| C-7 | 433 | 433 | 435 | 443 |
| C-8 | 16 | 16 | 17 | 17 |
| C-9 | 714 | 731 | 735 | 740 |
| C-10 | 26400 | 26300 | 26800 | 25200 |
| C-11 | 14.9 | 11.9 | 11.3 | 10.6 |
| C-12 | 113 | 114 | 114 | 114 |
| C-14 | 0.19 | 0.22 | 0.19 | 0.14 | note)
(molding conditions; molding temperature and molding machine are those of Nikko J100EP)
Physical properties; 240° C.-240° C.-220° C.-200° C.

TABLE 103 molding material; ABS resin (ABS resin by Asahi Chemical Industry Co., Ltd.; Commercial name and grade; Stylac 191)
no coating

| | times of recycle | | | |
|---|---|---|---|---|
| test item | 0 turn (V material)*2) | 1 turn*3) | 2 turn*4) | 3 turn*5) |
| C-1 | 1.067 | 1.068 | 1.069 | 1.069 |
| C-2 | 82.9 | 84.4 | 84.4 | 86.6 |
| C-3 | 106.4 | 106.7 | 106.6 | 106.9 |
| C-4 | 24.9 | 26.3 | 27 | 25.8 |
| C-7 | 433 | 432 | 431 | 427 |
| C-8 | 16 | 19 | 18 | 19 |
| C-9 | 714 | 710 | 725 | 730 |
| C-10 | 26400 | 26400 | 26500 | 25200 |
| C-11 | 14.9 | 13.9 | 13.1 | 11.4 |
| C-12 | 113 | 114 | 112 | 114 |
| C-14 | 0.19 | 0.17 | 0.19 | 0.14 | note)
(molding conditions; molding temperature and molding machine are those of Nikko J100EP)
Physical properties; 240° C.-240° C.-220° C.-200° C.

TABLE 108 molding material; HIPS resin (HIPS resin by Asahi Chemical Industry Co., Ltd.; Commercial name and grade; Styron 492)
no coating

| | times of recycle | | | |
|---|---|---|---|---|
| test item | 0 turn (V material)*2) | 1 turn*3) | 2 turn*4) | 3 turn*5) |
| C-1 | 1.06 | 1.059 | 1.059 | 1.059 |
| C-2 | 83.7 | 83.9 | 82.9 | 83.4 |
| C-3 | 104.4 | 104.6 | 104.4 | 104.7 |
| C-4 | 3.2 | 3.3 | 3.4 | 3.3 |
| C-7 | 302 | 309 | 326 | 328 |
| C-8 | 46 | 43 | 41 | 37 |
| C-9 | 538 | 553 | 569 | 563 |
| C-10 | 24900 | 25100 | 24200 | 22600 |
| C-11 | 6.5 | 5.7 | 5.1 | 4.5 |
| C-12 | 80 | 81 | 82 | 82 |
| C-14 | 0.05 | 0.03 | 0.04 | 0.02 | note)
(molding conditions; molding temperature and molding machine are those of Nikko J100EP)
Physical properties; 220° C.-220° C.-200° C.-180° C.

TABLE 104 molding material: ABS resin (ABS resin by Asahi Chemical Industry Co., Ltd.;
Commercial name and grade: Stylac 191) coating; (10:1) urethane paint

| test item | 0 turn (V material) *2) | 1 turn *3) | 2 turn *4) | 3 turn *5) |
|---|---|---|---|---|
| | | times of recycle | | |
| B-1 | | ○ no abnormality | ○ no abnormality | ○ no abnormality |
| B-2 | | 17 μm | 17 μm | 17 μm |
| B-3 | | HB | HB | HB |
| B-4 | 77.1 | 38.2 | 39.6 | 38 |
| B-5 | | 100/100 | 100/100 | 100/100 |
| B-6 | | no abnormality | no abnormality | no abnormality |
| B-7 | | 100/100 | 100/100 | 100/100 |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |
| B-12 | | no abnormality | no abnormality | no abnormality |
| B-13 | | 100/100 | 100/100 | 100/100 |
| B-14 | | 1 mm or below | 1 mm or below | 1 mm or below |
| B-15 | | no abnormality | no abnormality | no abnormality |
| B-16 | | success | success | success |
| B-17 | ΔE = 0.87 | ΔE = 1.22 | ΔE = 1.21 | ΔE = 1.08 |
| C-1 | 1.067 | 1.069 | 1.069 | 1.069 |
| C-2 | 82.9 | 87.3 | 87.1 | 85.3 |
| C-3 | 106.4 | 105.7 | 105.5 | 105.8 |
| C-4 | 24.9 | 26.4 | 27.7 | 27.2 |
| C-7 | 433 | 431 | 431 | 447 |
| C-8 | 16 | 12 | 13 | 13 |
| C-9 | 714 | 732 | 726 | 735 |
| C-10 | 26400 | 26900 | 26700 | 24500 |
| C-11 | 14.9 | 11.3 | 9.7 | 7.8 |
| C-12 | 113 | 114 | 114 | 113 |
| C-14 | 0.19 | 0.2 | 0.21 | 0.14 | note)
(molding conditions: molding temperature and moldii machine are those of Nikko J100EP)
Physical properties; 240° C. - 240° C. - 220° C. - 200° C.

TABLE 105 molding material: ABS resin (ABS resin by Asahi Chemical Industry Co., Ltd.;
Commercial name and grade: Stylac 191) coating; (4:1) urethane paint

| test item | 0 turn (V material) *2) | 1 turn *3) | 2 turn *4) | 3 turn *5) |
|---|---|---|---|---|
| | | times of recycle | | |
| B-1 | | ○ no abnormality | ○ no abnormality | ○ no abnormality |
| B-2 | | 17 μm | 17 μm | 17 μm |
| B-3 | | HB | HB | HB |
| B-4 | 78.2 | 20.3 | 21.2 | 20.3 |
| B-5 | | 100/100 | 100/100 | 100/100 |
| B-6 | | no abnormality | no abnormality | no abnormality |
| B-7 | | 100/100 | 100/100 | 100/100 |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |
| B-12 | | no abnormality | no abnormality | no abnormality |
| B-13 | | 100/100 | 100/100 | 100/100 |
| B-14 | | 1 mm or below | 1 mm or below | 1 mm or below |
| B-15 | | no abnormality | no abnormality | no abnormality |
| B-16 | | success | success | success |
| B-17 | ΔE = 0.91 | ΔE = 1.43 | ΔE = 1.38 | ΔE = 1.42 |
| C-1 | 1.067 | 1.07 | 1.072 | 1.071 |
| C-2 | 82.9 | 86.8 | 87.3 | 83.7 |
| C-3 | 106.4 | 105.2 | 105.1 | 106.5 |
| C-4 | 24.9 | 25.5 | 27.3 | 25.5 |
| C-7 | 433 | 436 | 433 | 453 |
| C-8 | 16 | 12 | 12 | 13 |
| C-9 | 714 | 732 | 740 | 747 |
| C-10 | 26400 | 26600 | 26900 | 24800 |
| C-11 | 14.9 | 10.3 | 9.4 | 7.8 |

TABLE 105-continued molding material: ABS resin (ABS resin by Asahi Chemical Industry Co., Ltd.; Commercial name and grade: Stylac 191) coating; (4:1) urethane paint

| test item | 0 turn (V material) *2) | times of recycle | | |
|---|---|---|---|---|
| | | 1 turn *3) | 2 turn *4) | 3 turn *5) |
| C-12 | 113 | 114 | 114 | 115 |
| C-14 | 0.19 | 0.22 | 0.16 | | note)
(molding conditions: molding temperature and moldii machine are those of Nikko J100EP)
Physical properties: 240° C. - 240° C. - 220° C. - 200° C.

TABLE 106 molding material: HIPS resin (HIPS resin by Asahi Chemical Industry Co., Ltd.; Commercial name and grade: Styron 492) coating; paint #149

| test item | 0 turn (V material) *2) | times of recycle | | |
|---|---|---|---|---|
| | | 1 turn *3) | 2 turn *4) | 3 turn *5) |
| B-1 | | ○ no abnormality | ○ no abnormality | ○ no abnormality |
| B-2 | | 17 μm | 17 μm | 17 μm |
| B-3 | | HB | HB | HB |
| B-4 | 52.4 | 5.9 | 5.8 | 6.1 |
| B-5 | | 100/100 | 100/100 | 100/100 |
| B-6 | | no abnormality | no abnormality | no abnormality |
| B-7 | | 100/100 | 100/100 | 100/100 |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |
| B-12 | | no abnormality | no abnormality | no abnormality |
| B-13 | | 100/100 | 100/100 | 100/100 |
| B-14 | | 1 mm or below | 1 mm or below | 1 mm or below |
| B-15 | | no abnormality | no abnormality | no abnormality |
| B-16 | | success | success | success |
| B-17 | ΔE = 0.98 | ΔE = 0.20 | ΔE = 0.22 | ΔE = 0.19 |
| C-1 | 1.06 | 1.06 | 1.063 | 1.066 |
| C-2 | 83.7 | 82.9 | 82.8 | 82.5 |
| C-3 | 104.4 | 104.8 | 104.2 | 104.1 |
| C-4 | 3.2 | 3.5 | 3.7 | 3.9 |
| C-7 | 302 | 313 | 313 | 314 |
| C-8 | 46 | 47 | 42 | 35 |
| C-9 | 538 | 543 | 558 | 585 |
| C-10 | 24900 | 23600 | 23800 | 23000 |
| C-11 | 6.5 | 5.7 | 4.9 | 4.6 |
| C-12 | 80 | 80 | 81 | 83 |
| C-14 | 0.05 | 0.06 | 0.06 | 0.02 | note)
(molding conditions; molding temperature and moldii machine are those of Nikko J100EP)
Physical properties; 220° C. - 220° C. - 200° C. - 180° C.

TABLE 107 molding material: HIPS resin (HIPS resin by Asahi Chemical Industry Co., Ltd.; Commercial name and grade: Styron 492) coating; paint #151

| test item | 0 turn (V material) *2) | times of recycle | | |
|---|---|---|---|---|
| | | 1 turn *3) | 2 turn *4) | 3 turn *5) |
| B-1 | | ○ no abnormality | ○ no abnormality | ○ no abnormality |
| B-2 | | 17 μm | 17 μm | 17 μm |
| B-3 | | HB | HB | HB |
| B-4 | 52.1 | 4.9 | 4.8 | 5.7 |
| B-5 | | 100/100 | 100/100 | 100/100 |
| B-6 | | no abnormality | no abnormality | no abnormality |
| B-7 | | 100/100 | 100/100 | 100/100 |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |

TABLE 107-continued molding material: HIPS resin (HIPS resin by Asahi Chemical Industry Co., Ltd.;
Commercial name and grade: Styron 492) coating; paint #151

| | times of recycle | | | |
|---|---|---|---|---|
| test item | 0 turn (V material) *2) | 1 turn *3) | 2 turn *4) | 3 turn *5) |
| B-12 | | no abnormality | no abnormality | no abnormality |
| B-13 | | 100/100 | 100/100 | 100/100 |
| B-14 | | 1 mm or below | 1 mm or below | 1 mm or below |
| B-15 | | no abnormality | no abnormality | no abnormality |
| B-16 | | success | success | success |
| B-17 | ΔE = 0.89 | ΔE = 0.99 | ΔE = 1.11 | ΔE = 1.09 |
| C-1 | 1.06 | 1.06 | 1.062 | 1.065 |
| C-2 | 83.7 | 83 | 84.4 | 83 |
| C-3 | 104.4 | 104.8 | 104.1 | 103.6 |
| C-4 | 3.2 | 3.4 | 3.6 | 3.9 |
| C-7 | 302 | 316 | 314 | 324 |
| C-8 | 46 | 44 | 40 | 36 |
| C-9 | 538 | 547 | 553 | 567 |
| C-10 | 24900 | 23600 | 23400 | 23200 |
| C-11 | 6.5 | 5.6 | 4.9 | 4.7 |
| C-12 | 80 | 80 | 81 | 79 |
| C-14 | 0.05 | 0.04 | 0.04 | 0.02 | note)
(molding conditions; molding temperature and moldii machine are those of Nikko J100EP)
Physical properties; 220° C. - 220° C. - 200° C. - 180° C.

TABLE 109 molding material: HIPS resin (HIPS resin by Asahi Chemical Industry Co., Ltd.;
Commercial name and grade; Styron 492) coating; (10:1) urethane paint

| | times of recycle | | | |
|---|---|---|---|---|
| test item | 0 turn (V material) *2) | 1 turn *3) | 2 turn *4) | 3 turn *5) |
| B-1 | | ○ no abnormality | ○ no abnormality | ○ no abnormality |
| B-2 | | 17 μm | 17 μm | 17 μm |
| B-3 | | HB | HB | HB |
| B-4 | 52 | 35.6 | 34.2 | 35 |
| B-5 | | 1 mm or below | 1 mm or below | 1 mm or below |
| B-6 | | no abnormality | no abnormality | no abnormality |
| B-7 | | 100/100 | 100/100 | 100/100 |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |
| B-12 | | no abnormality | no abnormality | no abnormality |
| B-13 | | 100/100 | 100/100 | 100/100 |
| B-14 | | 1 mm or below | 1 mm or below | 1 mm or below |
| B-15 | | no abnormality | no abnormality | no abnormality |
| B-16 | | success | success | success |
| B-17 | ΔE = 0.89 | ΔE = 1.05 | ΔE = 1.22 | ΔE = 1.11 |
| C-1 | 1.06 | 1.059 | 1.06 | 1.062 |
| C-2 | 83.7 | 83.8 | 83.9 | 80 |
| C-3 | 104.4 | 103.4 | 101.9 | 100.9 |
| C-4 | 3.2 | 3.8 | 4.2 | 4.6 |
| C-7 | 302 | 316 | 319 | 325 |
| C-8 | 46 | 25 | 21 | 18 |
| C-9 | 538 | 563 | 581 | 585 |
| C-10 | 24900 | 23500 | 23900 | 23200 |
| C-11 | 6.5 | 5.2 | 4.3 | 3.7 |
| C-12 | 80 | 81 | 82 | 84 |
| C-14 | 0.05 | 0.05 | 0.05 | 0.02 | note)
(molding conditions; molding temperature and moldii machine are those of Nikko J100EP)
Physical properties; 220° C. - 220° C. - 200° C. - 180° C.

TABLE 110 molding material: HIPS resin (HIPS resin by Asahi Chemical Industry Co., Ltd.; Commercial name and grade: Styron 492) coating; (4:1) urethane paint

| test item | 0 turn (V material) *2) | times of recycle | | |
|---|---|---|---|---|
| | | 1 turn *3) | 2 turn *4) | 3 turn *5) |
| B-1 | | ○ no abnormality | ○ no abnormality | ○ no abnormality |
| B-2 | | 17 μm | 17 μm | 17 μm |
| B-3 | | HB | HB | HB |
| B-4 | 55.6 | 21.5 | 22 | 23.8 |
| B-5 | | 100/100 | 100/100 | 100/100 |
| B-6 | | no abnormality | no abnormality | no abnormality |
| B-7 | | 100/100 | 100/100 | 100/100 |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |
| B-12 | | no abnormality | no abnormality | no abnormality |
| B-13 | | 100/100 | 100/100 | 100/100 |
| B-14 | | 1 mm or below | 1 mm or below | 1 mm or below |
| B-15 | | no abnormality | no abnormality | no abnormality |
| B-16 | | success | success | success |
| B-17 | ΔE = 0.95 | ΔE = 1.44 | ΔE = 1.45 | ΔE = 1.39 |
| C-1 | 1.06 | 1.061 | 1.063 | 1.065 |
| C-2 | 83.7 | 84.2 | 82.2 | 79.5 |
| C-3 | 104.4 | 101.8 | 100.8 | 99.2 |
| C-4 | 3.2 | 3.8 | 4.3 | 4.8 |
| C-7 | 302 | 312 | 318 | 317 |
| C-8 | 46 | 23 | 20 | 18 |
| C-9 | 538 | 565 | 564 | 574 |
| C-10 | 24900 | 23100 | 23100 | 22300 |
| C-11 | 6.5 | 5.3 | 4.3 | 3.8 |
| C-12 | 80 | 81 | 83 | 85 |
| C-14 | 0.05 | 0.04 | 0.02 | 0.03 | note)
(molding conditions; molding temperature and moldii machine are those of Nikko J100EP)
Physical properties; 220° C. - 220° C. - 200° C. - 180° C.

TABLE 111 molding material: resin (styrene modified PPO(E) resin by Asahi Chemical Industry Co., Ltd.; Commercial name and grade; Xyron 100Z) coating; paint #149

| test item | 0 turn (V material) *2) | times of recycle | | |
|---|---|---|---|---|
| | | 1 turn *3) | 2 turn *4) | 3 turn *5) |
| B-1 | | ○ no abnormality | ○ no abnormality | ○ no abnormality |
| B-2 | | 17 μm | 17 μm | 17 μm |
| B-3 | | HB | HB | HB |
| B-4 | 16.7 | 6.1 | 5.2 | 5.5 |
| B-5 | | 100/100 | 100/100 | 100/100 |
| B-6 | | no abnormality | no abnormality | no abnormality |
| B-7 | | 100/100 | 100/100 | 100/100 |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |
| B-12 | | no abnormality | no abnormality | no abnormality |
| B-13 | | 100/100 | 100/100 | 100/100 |
| B-14 | | 1 mm or below | 1 mm or below | 1 mm or below |
| B-15 | | no abnormality | no abnormality | no abnormality |
| B-16 | | success | success | success |
| B-17 | ΔE = 7.55 | ΔE = 0.25 | ΔE = 0.31 | ΔE = 0.29 |
| C-1 | 1.11 | 1.119 | 1.121 | 1.123 |
| C-2 | 83.6 | 84.7 | 85.2 | 82.2 |
| C-3 | 104.2 | 103.6 | 103.9 | 104.3 |
| C-6 | 53.8 | 60.4 | 66.1 | 66.2 |
| C-7 | 334 | 339 | 343 | 377 |
| C-8 | 50 | 54 | 41 | 41 |
| C-9 | 609 | 627 | 629 | 656 |
| C-10 | 25600 | 26100 | 26300 | 24500 |
| C-11 | 12.2 | 10.9 | 10.5 | 10.2 |

TABLE 111-continued molding material: resin (styrene modified PPO(E) resin by Asahi Chemical Industry Co., Ltd.; Commercial name and grade; Xyron 100Z) coating; paint #149

| | times of recycle | | | |
|---|---|---|---|---|
| test item | 0 turn (V material) *2) | 1 turn *3) | 2 turn *4) | 3 turn *5) |
| C-12 | 117 | 116 | 117 | 117 |
| C-14 | 0.08 | 0.08 | 0.06 | 0.07 | note)
(molding conditions; molding temperature and moldii machine are those of Nikko J100EP)
Physical properties; 220° C. - 220° C. - 200° C. - 180° C.

TABLE 112 molding material; resin (styrene modified PPO(E) resin by Asahi Chemical Industry Co., Ltd.; Commercial name and grade; Xyron 100Z) no coating

| | times of recycle | | | |
|---|---|---|---|---|
| test item | 0 turn (V material) *2) | 1 turn *3) | 2 turn *4) | 3 turn *5) |
| C-1 | 1.11 | 1.114 | 1.115 | 1.114 |
| C-2 | 83.6 | 83.4 | 82.7 | 82.6 |
| C-3 | 104.2 | 104.1 | 103.7 | 104.5 |
| C-6 | 53.8 | 60.1 | 63.7 | 62.3 |
| C-7 | 334 | 341 | 340 | 375 |
| C-8 | 50 | 49 | 42 | 36 |
| C-9 | 609 | 641 | 629 | 655 |
| C-10 | 25600 | 27000 | 26100 | 24500 |
| C-11 | 12.2 | 11.1 | 10.5 | 10.4 |
| C-12 | 117 | 119 | 118 | 117 |
| C-14 | 0.08 | 0.14 | 0.08 | 0.12 | note)
(molding conditions; molding temperature and moldii machine are those of Nikko J100EP)
Physical properties; 220° C. - 220° C. - 200° C. - 180° C.

TABLE 114 molding material; resin (flame-retardant HIPS resin by Asahi Chemical Industry; Commercial name and grade; Styron VS741) no coating

| | times of recycle | | | |
|---|---|---|---|---|
| test item | 0 turn (V material) *2) | 1 turn *3) | 2 turn *4) | 3 turn *5) |
| C-1 | 1.17 | 1.171 | 1.17 | 1.17 |
| C-2 | 79.2 | 79.7 | 80.8 | 78.6 |
| C-3 | 100.5 | 100.5 | 100.8 | 99.7 |
| C-5 | 9.1 | 10.2 | 10.1 | 10 |
| C-7 | 213 | 210 | 225 | 224 |
| C-8 | 41 | 41 | 39 | 36 |
| C-9 | 389 | 385 | 368 | 387 |
| C-10 | 23900 | 23900 | 22300 | 22000 |
| C-11 | 7.5 | 7.5 | 6.7 | 6.7 |
| C-13 | 60 | 61 | 64 | 63 |
| C-14 | 0.15 | 0.13 | 0.02 | 0.03 | note)
(molding conditions; molding temperature and moldii machine are those of Nikko J100EP)
Physical properties; 200° C. - 200° C. - 180° C. - 160° C.

TABLE 113 molding material: resin flame-retardant HIPS resin by Asahi Chemical Industry Co., Ltd.; Commercial name and grade: Styron VS741) coating; paint #149

| | | times of recycle | | |
|---|---|---|---|---|
| test item | 0 turn (V material) *2) | 1 turn *3) | 2 turn *4) | 3 turn *5) |
| B-1 | | ○ no abnormality | ○ no abnormality | ○ no abnormality |
| B-2 | | 17 μm | 17 μm | 17 μm |
| B-3 | | HB | HB | HB |
| B-4 | 58 | 5.1 | 5.8 | 5.8 |
| B-5 | | 100/100 | 100/100 | 100/100 |
| B-6 | | no abnormality | no abnormality | no abnormality |
| B-7 | | 100/100 | 100/100 | 100/100 |
| B-8 | | 1 mm or below | 1 mm or below | 1 mm or below |
| B-9 | | no abnormality | no abnormality | no abnormality |
| B-10 | | 100/100 | 100/100 | 100/100 |
| B-11 | | 1 mm or below | 1 mm or below | 1 mm or below |
| B-12 | | no abnormality | no abnormality | no abnormality |

TABLE 113-continued molding material: resin flame-retardant HIPS resin by Asahi Chemical Industry Co., Ltd.; Commercial name and grade: Styron VS741) coating; paint #149

| test item | 0 turn (V material) *2) | 1 turn *3) | 2 turn *4) | 3 turn *5) |
|---|---|---|---|---|
| B-13 |  | 100/100 | 100/100 | 100/100 |
| B-14 |  | 1 mm or below | 1 mm or below | 1 mm or below |
| B-15 |  | no abnormality | no abnormality | no abnormality |
| B-16 |  | success | success | success |
| B-17 | ΔE = 6.89 | ΔE = 0.21 | ΔE = 0.28 | ΔE = 0.22 |
| C-1 | 1.17 | 1.172 | 1.173 | 1.175 |
| C-2 | 79.2 | 79.4 | 79.5 | 78.6 |
| C-3 | 100.5 | 100.1 | 99.7 | 100 |
| C-5 | 9.1 | 9.8 | 10.5 | 10.2 |
| C-7 | 213 | 222 | 227 | 225 |
| C-8 | 41 | 44 | 46 | 38 |
| C-9 | 389 | 387 | 378 | 383 |
| C-10 | 23900 | 22900 | 22400 | 22300 |
| C-11 | 7.5 | 7.3 | 6.8 | 6.7 |
| C-13 | 60 | 60 | 64 | 63 |
| C-14 | 0.15 | 0.16 | 0.02 | 0.03 | note)
(molding conditions: molding temperature and moldii machine are those of Nikko J100EP)
Physical properties, 200° C. - 200° C. - 180° C. - 160° C.

TABLE 115 molding material: resin (flame-retardant ABS resin by Asahi Chemical Industry Co., Ltd.; Commercial name and grade; Stylac VA58) coating; paint #149

| test item | 0 turn (V material) *2) | 1 turn *3) | 2 turn *4) |
|---|---|---|---|
| B-1 |  | ○ no abnormality | ○ no abnormality |
| B-2 |  | 17 μm | 17 μm |
| B-3 |  | HB | HB |
| B-4 | 82.1 | 5.1 | 6.1 |
| B-5 |  | 100/100 | 100/100 |
| B-6 |  | no abnormality | no abnormality |
| B-7 |  | 100/100 | 100/100 |
| B-8 |  | 1 mm or below | 1 mm or below |
| B-9 |  | no abnormality | no abnormality |
| B-10 |  | 100/100 | 100/100 |
| B-11 |  | 1 mm or below | 1 mm or below |
| B-12 |  | no abnormality | no abnormality |
| B-13 |  | 100/100 | 100/100 |
| B-14 |  | 1 mm or below | 1 mm or below |
| B-15 |  | no abnormality | no abnormality |
| B-16 |  | success | success |
| B-17 | ΔE = 6.31 | ΔE = 0.22 | ΔE = 0.21 |
| C-1 | 1.119 | 1.201 | 1.202 |
| C-2 | 82.7 | 82.4 | 82.3 |
| C-3 | 103.5 | 103.1 | 103.1 |
| C-5 | 2.8 | 3.3 | 3.3 |
| C-7 | 438 | 438 | 444 |
| C-8 | 9 | 8 | 8 |
| C-9 | 738 | 747 | 743 |
| C-10 | 26200 | 25100 | 25000 |
| C-11 | 9.5 | 8.6 | 7.4 |
| C-12 | 110 | 111 | 110 |
| C-14 | 0.13 | 0.17 | 0.07 | note)
(molding conditions; molding temperature and moldii machine are those of Nikko J100EP)
Physical properties; 220° C. - 220° C. - 200° C. - 180° C.

TABLE 116 molding material: resin (flame-retardant ABS resin by Asahi Chemical Industry Co., Ltd; Commercial name and grade: Stylac VA58) no coating

| test item | 0 turn (V material) *2) | 1 turn *3) | 2 turn *4) | 3 turn *5) |
|---|---|---|---|---|
| C-1 | 1.119 | 1.119 | 1.197 |  |
| C-2 | 82.7 | 83.2 | 82.4 |  |
| C-3 | 103.5 | 103.5 | 103.9 |  |
| C-4 | 2.8 | 3.3 | 3.4 |  |
| C-7 | 438 | 434 | 445 |  |
| C-8 | 9 | 9 | 8 |  |
| C-9 | 738 | 740 | 734 |  |
| C-10 | 26200 | 25200 | 24600 |  |
| C-11 | 9.5 | 8.6 | 7.6 |  |
| C-12 | 110 | 111 | 110 |  |
| C-14 | 0.13 | 0.16 | 0.08 |  | note)
(molding conditions; molding temperature and moldii machine are those of Nikko J100EP)
Physical properties: 220° C. - 220° C. - 200° C. - 180° C.

TABLE 128

| raw material (commercial name and grade) | rate (weight(kg)) |
|---|---|
| styrene modified acrylic resin by Mitsubishi Rayon Co., Ltd. (commercial name and grade; DIANAL BR-52) | 100 |
| titanium oxide by FURUKAWA CO., LTD. (commercial name and grade; FR-41) | 24 |
| carbon black by Mitsubishi chemical Corporation (commercial name and grade; MA-100) | 0.03 |
| iron oxide yellow by Titan Kogyo K.K. (commercial name and grade; TAROX LL-XL0) | 0.15 |
| calcium carbonate by Maruo Calcium Co., Ltd. (commercial name and grade; MC-T) | 25 |
| surface conditioner by Monsanto Co., Ltd. (commercial name and grade; MODEFLOW POWDER | 1 |

TABLE 117 molding material; resin (flame-retardant ABS resin by Ube Cycon, Ltd; Commercial name and grade; Cycolac ZFJ12)
coating; paint #149 times of recycle

| test item | 0 turn (V material) *2) | 1 turn *3) | 2 turn *4) |
|---|---|---|---|
| B-1 | | ○ no abnormality | ○ no abnormality |
| B-2 | | 17 μm | 17 μm |
| B-3 | | HB | HB |
| B-4 | 88.6 | 7 | 6.8 |
| B-5 | | 100/100 | 100/100 |
| B-6 | | no abnormality | no abnormality |
| B-7 | | 100/100 | 100/100 |
| B-8 | | 1 mm or below | 1 mm or below |
| B-9 | | no abnormality | no abnormality |
| B-10 | | 100/100 | 100/100 |
| B-11 | | 1 mm or below | 1 mm or below |
| B-12 | | no abnormality | no abnormality |
| B-13 | | 100/100 | 100/100 |
| B-14 | | 1 mm or below | 1 mm or below |
| B-15 | | no abnormality | no abnormality |
| B-16 | | success | success |
| B-17 | ΔE = 6.01 | ΔE = 0.19 | ΔE = 0.29 |
| C-1 | 1.162 | 1.165 | 1.166 |
| C-2 | 80 | 81 | 80.7 |
| C-3 | 102.2 | 103.3 | 103.1 |
| C-5 | 3 | 3.3 | 3.3 |
| C-7 | 381 | 401 | 407 |
| C-8 | 18 | 17 | 19 |
| C-9 | 659 | 690 | 697 |
| C-10 | 26000 | 24700 | 24600 |
| C-11 | 11.9 | 11.2 | 10.9 |
| C-12 | 110 | 109 | 110 |
| C-14 | 0.11 | 0.21 | 0.08 | note)
(molding conditions; molding temperature and moldii machine are those of Nikko J100EP)
Physical properties: 220° C. - 220° C. - 200° C. - 180° C.

TABLE 118 molding material; resin (flame-retardant ABS resin by Ube Cycon, Ltd; Commercial name and grade; Cycolac ZFJ12)
no coating times of recycle

| test item | 0 turn (V material)*2) | 1 turn*3) | 2 turn *4) |
|---|---|---|---|
| C-1 | 1.162 | 1.164 | 1.163 |
| C-1 | | | |
| C-2 | 80.0 | 80.6 | 80.3 |
| C-3 | 102.2 | 102.4 | 103.4 |
| C-5 | 3 | 3.2 | 3.2 |
| C-7 | 381 | 391 | 403 |
| C-8 | 18 | 19 | 19 |
| C-9 | 659 | 683 | 693 |
| C-10 | 26000 | 26700 | 24300 |
| C-11 | 11.9 | 11.5 | 11.6 |
| C-12 | 110 | 111 | 110 |
| C-14 | 0.11 | 0.12 | 0.08 | note)
(molding conditions; molding temperature and molding machine are those of Nikko J100EP)
Physical properties; 220° C.-220° C.-200° C.-180° C.

TABLE 122 molding material; resin (PP resin by Japan Polyolefins Co., Ltd.; Commercial name and grade; MK454B)
no coating times of recycle

| test item | 0 turn (V material)*2) | 1 turn*3) | 2 turn*4) |
|---|---|---|---|
| C-1 | 0.953 | 0.951 | 0.95 |
| C-2 | 75.5 | 72.2 | 70.8 |
| C-3 | 151.8 | 151.4 | 153.2 |
| C-5 | 21.9 | 22.2 | 25.2 |
| C-7 | 292 | 291 | 305 |
| C-8 | 147 | 116 | 37 |
| C-9 | 452 | 449 | 462 |
| C-10 | 22200 | 22100 | 23600 |
| C-11 | 7 | 7.2 | 6.1 |
| C-12 | 97 | 97 | 96 |
| C-14 | 0.01 | 0.02 | 0.01 | note)
(molding conditions; molding temperature and molding machine are those of Nikko J100EP)
Physical properties; 200° C.-200° C.-180° C.-160° C.

TABLE 121 molding material; resin (PP resin by Japan Polyolefin Co., Ltd.; Commercial name and grade; MK454B)
coating; paint #132 times of recycle

| test item | 0 turn (V material)*2) | 1 turn*3) | 2 turn*4) |
|---|---|---|---|
| B-1 | | ○ no abnormality | ○ no abnormality |
| B-2 | | 17 μm | 17 μm |
| B-3 | | HB | HB |
| B-4 | 20.7 | 25.8 | 26.7 |
| B-5 | | 100/100 | 100/100 |
| B-6 | | no abnormality | no abnormality |
| B-7 | | 100/100 | 100/100 |
| B-8 | | 1 mm or below | 1 mm or below |
| B-9 | | no abnormality | no abnormality |
| B-10 | | 100/100 | 100/100 |
| B-11 | | 1 mm or below | 1 mm or below |
| B-12 | | no abnormality | no abnormality |
| B-13 | | 100/100 | 100/100 |
| B-14 | | 1 mm or below | 1 mm or below |
| B-15 | | no abnormality | no abnormality |
| B-16 | | success | success |
| B-17 | ΔE = 2.80 | ΔE = 0.89 | ΔE = 0.88 |
| C-1 | 0.953 | 0.953 | 0.953 |
| C-2 | 75.5 | 72.2 | 72.2 |
| C-3 | 151.8 | 151.8 | 151.9 |
| C-5 | 21.9 | 21.1 | 23.9 |
| C-7 | 292 | 294 | 304 |
| C-8 | 147 | 68 | 51 |
| C-9 | 452 | 444 | 459 |
| C-10 | 22200 | 21800 | 22000 |
| C-11 | 7 | 6.7 | 5.6 |
| C-12 | 97 | 98 | 98 |
| C-14 | 0.01 | 0.01 | 0.01 | note)
(molding conditions; molding temperature and molding machine are those of Nikko J100EP)
Physical properties; 200° C.-200° C.-180° C.-160° C.

TABLE 119 molding material; resin (PC/ABS resin by GE Japan Ltd;
Commercial name and grade; Cycoroy C6200)
coating; paint #149

| test item | times of recycle | |
|---|---|---|
| | 0 turn (V material)*2 | 1 turn*3 |
| B-1 | | ○ no abnormality |
| B-2 | | 17 μm |
| B-3 | | HB |
| B-4 | 95.6 | 6 |
| B-5 | | 100/100 |
| B-6 | | no abnormality |
| B-7 | | 100/100 |
| B-8 | | 1 mm or below |
| B-9 | | no abnormality |
| B-10 | | 100/100 |
| B-11 | | 1 mm or below |
| B-12 | | no abnormality |
| B-13 | | 100/100 |
| B-14 | | 1 mm or below |
| B-15 | | no abnormality |
| B-16 | | success |
| B-17 | ΔE = 2.80 | ΔE = 0.28 |
| C-1 | 1.196 | 1.198 |
| C-2 | 89.7 | 90.5 |
| C-3 | 111.9 | 112.6 |
| C-5 | 79.4 | 96.8 |
| C-7 | 606 | 611 |
| C-8 | 141 | 126 |
| C-9 | 1033 | 1056 |
| C-10 | 29400 | 30000 |
| C-12 | 13.9 | 11.4 |
| C-12 | 123 | 123 |
| C-14 | 0.07 | 0.05 | note)
(molding conditions; molding temperature and molding machine are those of Nikko J100EP)
Physical properties; 240° C.-240° C.-220° C.-200° C.

TABLE 120 molding material; resin (PC/ABS resin by GE Japan Ltd;
Commercial name and grade; Cycoroy C6200)
no coating

| test item | times of recycle | |
|---|---|---|
| | 0 turn (V material)*2 | 1 turn*3 |
| C-1 | 1.196 | 1.125 |
| C-2 | 89.7 | 89.4 |
| C-3 | 111.9 | 112.5 |
| C-5 | 79.4 | 99.7 |
| C-7 | 606 | 608 |
| C-8 | 141 | 105 |
| C-9 | 1033 | 1058 |
| C-10 | 29400 | 29000 |
| C-11 | 13.9 | 10.8 |
| C-12 | 123 | 124 |
| C-14 | 0.07 | 0.04 | note)
(molding conditions; molding temperature and molding machine are those of Nikko J100EP)
Physical properties; 240° C.-240° C.-220° C.-200° C.

TABLE 131

| materials item | compatibilizing (or miscibilizing) agent; MODIPER A4410 is added at the ratio of 5 wt % | no compatibilizing (or miscibilizing) agent |
|---|---|---|
| Izod impact strength (kg cm/cm) | 17.7 | 13.6 |

TABLE 132

| materials item | compatibilizing (or miscibilizing) agent; MODIPER A4410 is added at the ratio of 5 wt % | no compatibilizing (or miscibilizing) agent |
|---|---|---|
| Izod impact strength (kg cm/cm) | 6.6 | 3.1 |

TABLE 123-1

Table showing blend ratio (proportion) and recyclability of paint.

| sign | paint | | | | | | | | | | | |
|---|---|---|---|---|---|---|---|---|---|---|---|---|
| | #101 | #102 | #104 | #122 | #116 | #118 | #119 | #121 | #122 | #123 | #124 | #126 |
| A-1 | 101 | 102 | 104 | 112 | 116 | 118 | 119 | 121 | 122 | 123 | 124 | 126 |
| A-2 | 54 | 60 | 50 | 90 | 68 | 68 | 68 | 68 | 68 | 68 | 68 | 68 |
| A-3 | 8 | 8 | 8 | 8 | 8 | 8 | 8 | 8 | 8 | 8 | 8 | 8 |
| A-4 | 0.05 | 0.05 | 0.05 | 0.05 | 0.05 | 0.05 | 0.05 | 0.05 | 0.05 | 0.05 | 0.05 | 0.05 |
| A-5 | 0.01 | 0.01 | 0.01 | 0.01 | 0.01 | 0.01 | 0.01 | 0.01 | 0.01 | 0.01 | 0.01 | 0.01 |
| A-6 | 6 | 6 | 6 | 6 | 6 | 6 | 6 | 6 | 6 | 6 | 6 | 6 |
| A-7 | 3 | 3 | 3 | 3 | 3 | 3 | 3 | 3 | 3 | 3 | 3 | 3 |
| A-8 | 15 | 15 | 20 | 20 | 20 | 20 | 20 | 20 | 20 | 20 | 20 | 20 |
| A-9 | 11 | 5 | 15 | 11 | 11 | 11 | 11 | 11 | 11 | 11 | 11 | 11 |
| A-10 | — | — | — | — | — | — | — | — | — | — | — | — |

TABLE 123-1-continued

Table showing blend ratio (proportion) and recyclability of paint.

| sign | #101 | #102 | #104 | #122 | #116 | #118 | #119 | #121 | #122 | #123 | #124 | #126 |
|---|---|---|---|---|---|---|---|---|---|---|---|---|
| A-11 | 3 | 3 | 3 | — | 3 | 3 | 3 | 3 | 3 | 3 | 3 | 3 |
| A-12 | 0.3 | 0.3 | 0.3 | 0.3 | 0.3 | 0.3 | 0.3 | 0.3 | 0.3 | 0.3 | 0.3 | 0.3 |
| A-13 | 100.3 | 100.3 | 88.3 | 121.3 | 102.3 | 102.3 | 102.3 | 102.3 | 102.3 | 102.3 | 102.3 | 102.3 |
| A-14 | S1 | S1 | S3 | S3 | S1 | S3 | S3 | S1 | S1 | S1 | S1 | S1 |
| A-15 | ○ | ○ | ○ | — | ○ | ○ | ○ | ○ | ○ | ○ | ○ | ○ |
| A-16 | ○ | ○ | ○ | — | ○ | ○ | ○ | ○ | ○ | ○ | ○ | ○ |
| A-17 | ○ | ○ | ○ | — | ○ | ○ | ○ | ○ | ○ | ○ | ○ | ○ |
| A-18 | ○ | ○ | ○ | — | ○ | ○ | ○ | ○ | ○ | ○ | ○ | ○ |
| A-19 | x | x | — | — | ○ | ○ | ○ | x | x | x | x | x |
| A-20 | — | — | — | ○ | — | — | — | x | — | x | x | x |
| A-21 | — | — | — | — | — | — | — | — | — | — | — | — | note)
Signs are referred to notes described in tables 98-1, 99-1 and 123.

TABLE 123-2

Table showing blend ratio (proportion) and recyclability of paint.

| sign | #129 | #132 | #133 | #138 | #140 | #142 | #144 | #10 | #149 | #20 | #30 |
|---|---|---|---|---|---|---|---|---|---|---|---|
| A-1 | 129 | 132 | 133 | 138 | 140 | 142 | 144 | 10 | 149 | 20 | 30 |
| A-2 | 68 | 54 | 54 | 54 | 54 | 54 | 68 | 60 | 60 | 17.1 | 17.1 |
| A-3 | 8 | 8 | 8 | 8 | 8 | 8 | 8 | 8 | 8 | 8 | 8 |
| A-4 | 0.05 | 0.05 | 0.05 | 0.05 | 0.05 | 0.05 | 0.05 | 0.05 | 0.05 | 0.05 | 0.05 |
| A-5 | 0.01 | 0.01 | 0.01 | 0.01 | 0.01 | 0.01 | 0.01 | 0.01 | 0.01 | 0.01 | 0.01 |
| A-6 | 6 | 6 | 6 | 6 | 6 | 6 | 6 | 6 | 6 | 6 | 6 |
| A-7 | 3 | 3 | 3 | 3 | 3 | 3 | 3 | 3 | 3 | 3 | 3 |
| A-8 | 10 | 15 | 15 | 15 | 15 | 15 | 20 | 15 | 15 | 38.95 | 32.95 |
| A-9 | 10 | 11 | 11 | 11 | 11 | 11 | — | 5 | 5 | 41.95 | 41.95 |
| A-10 | — | — | — | — | — | — | — | — | — | 10 | 10 |
| A-11 | 30 | 3 | 3 | 3 | 3 | 3 | 20 | 3 | 3 | — | — |
| A-12 | 0.3 | 0.3 | 0.3 | 0.3 | 0.3 | 0.3 | 0.3 | 0.3 | 0.3 | 0.3 | 0.3 |
| A-13 | 118.3 | 100.3 | 100.3 | 100.3 | 100.3 | 100.3 | 108.3 | 100.3 | 100.3 | 125.36 | 119.36 |
| A-14 | S4 | S3 | S3 | S3 | S3 | S3 | S2 | S2 | S1 | S1 | S1 |
| A-15 | — | — | — | — | ○ | ○ | — | ○ | ○ | ○ | x |
| A-16 | — | — | — | — | ○ | ○ | — | ○ | ○ | ○ | x |
| A-17 | — | — | — | ○ | ○ | — | — | ○ | ○ | x | ○ |
| A-18 | — | — | — | ○ | ○ | — | ○ | ○ | ○ | — | — |
| A-19 | — | — | — | — | x | — | — | x | x | — | — |
| A-20 | — | ○ | ○ | — | x | — | — | x | x | — | — |
| A-21 | ○ | — | — | — | — | — | — | — | — | — | — | note)
Signs are referred to notes described in tables 98-1, 99-1 and 123.

TABLE 123-3

Table showing blend ratio (proportion) and recyclability of paint.

| item | | paint #40 | paint #50 | paint #127 | paint #128 | paint #151 | paint #10 Mt | paint #149 Mt | paint #121 Pw | ink #15 | ink #25 | ink #35 | ink #113 | ink #132 |
|---|---|---|---|---|---|---|---|---|---|---|---|---|---|---|
| rate | A-1 | 40 | 149 | 127 | 128 | 151 | 10 | 149 | 121 | 10 | 20 | 30 | 113 | 132 |
| (mount) | A-2 | 18.9 | 54 | 100 | 100 | 100 | 60 | 60 | 100 | 35 | 10.5 | 10.5 | 50 | 50 |
| wt % | A-3 | 10 | — | — | — | — | — | — | 24 | — | — | — | — | — |
| | A-4 | 0.06 | — | — | — | — | — | — | 0.15 | — | — | — | — | — |
| | A-5 | 0.01 | — | — | — | — | — | — | 0.03 | — | — | — | 1 | 1 |
| | A-6 | 6 | — | — | — | — | — | — | 25 | 10 | 10 | 10 | 20 | 20 |
| | A-7 | 3.5 | 10 | — | — | — | — | — | — | 4 | 4 | 4 | 14 | 14 |
| | waste toner | — | 10 | — | — | — | — | — | — | — | — | — | — | — |
| | D-1 | — | — | 2 | 2 | 2 | — | — | — | — | — | — | — | — |
| | D-2 | — | — | 15 | 15 | 15 | — | — | — | — | — | — | — | — |
| | D-3 | — | — | — | — | — | 6 | 6 | — | — | — | — | — | — |

TABLE 123-3-continued

Table showing blend ratio (proportion) and recyclability of paint.

| | | | | | | | paint, ink | | | | | | | |
|---|---|---|---|---|---|---|---|---|---|---|---|---|---|---|
| item | | paint #40 | paint #50 | paint #127 | paint #128 | paint #151 | paint #10 Mt | paint #149 Mt | paint #121 Pw | ink #15 | ink #25 | ink #35 | ink #113 | ink #132 |
| | D-4 | — | — | — | — | — | 1 | 1 | — | — | — | — | — | — |
| | D-5 | — | — | — | — | — | — | — | 1 | — | — | — | — | — |
| | D-6 | — | — | — | — | — | — | — | — | 12 | 12 | 12 | — | — |
| | D-7 | — | — | — | — | — | — | — | — | 0.3 | 0.3 | 0.3 | — | — |
| | D-8 | — | — | — | — | — | — | — | — | — | — | — | 5 | 5 |
| solvent | A-8 | — | 15 | — | — | — | 12 | 12 | — | 0 | 12.3 | 12.3 | — | — |
| dt al | A-9 | — | 11 | — | — | — | — | — | — | 10 | 10 | 10 | 10 | 10 |
| wt % | A-12 | — | 0.3 | — | — | — | — | — | — | — | — | — | 0.3 | 0.3 |
| | D-9 | 44.4 | — | — | — | — | — | — | — | — | — | — | — | — |
| | D-10 | 9.1 | — | — | — | — | — | — | — | — | — | — | — | — |
| | purified water | 2.8 | — | — | — | — | — | — | — | — | — | — | — | — |
| | D-11 | 5 | — | 0 | 0 | 5 | — | — | — | — | — | — | — | — |
| | D-12 | 0.2 | — | — | — | — | 0.2 | 0.2 | — | — | — | — | — | — |
| | xylene | — | — | 5 | 5 | 0 | — | — | — | — | — | — | — | — |
| | D-13 | — | — | 7 | 7 | 7 | — | — | — | — | — | — | — | — |
| | D-14 | — | — | — | — | — | 21 | 21 | — | — | — | — | — | — |
| | A-13 | 100 | 100 | 129 | 129 | 129 | 100 | 100 | 150 | 71.3 | 71.3 | 71.3 | 100 | 100 |
| | A-14 | S1 | S1 | de-ionized water | de-ionized water | de-ionized water | S1 | S1 | — | S2 | S1 | S1 | S1 | S1 |
| aptitude | A-15 | — | ○ | ○ | ○ | ○ | ○ | ○ | ○ | ○ | ○ | x | — | — |
| for | A-16 | — | ○ | ○ | ○ | ○ | ○ | ○ | ○ | ○ | ○ | x | — | — |
| recycle | A-17 | — | ○ | ○ | ○ | ○ | ○ | ○ | ○ | ○ | x | ○ | — | — |
| | A-18 | — | ○ | ○ | ○ | ○ | ○ | ○ | ○ | ○ | ○ | ○ | — | — |
| | A-19 | — | — | x | x | — | — | — | — | x | — | — | — | — |
| | A-20 | — | — | x | x | — | — | — | — | x | — | — | ○ | ○ |
| | A-21 | ○ | — | — | ○ | — | — | — | — | — | — | — | — | — | note)
From D-1 to D-10 in table 123-3,
D-1; CS-2 by Chisso Corp.,
D-2; LIOCONC BLACK by Toyo Ink Manufacturing Co., Ltd.,
D-3; ALUMIPASTE 66NL-B by Toyo Aluminum K.K.,
D-4; DISPALON 6900-10X by Kusumoto Kasei K.K.,
D-5; MODEFLOW POWDER III by by Monsanto Corp.,
D-6; red oxide commercial name and grad TODA COLOR 100ED, D-7 by Toda Kogyo KK.,
D-7; BENTONE SD-1 by RHEOX Inc.,
D-8; iron oxide yellow commercial name and grade TAROX LL-LXO by Titan Kogyo K.K.,
D-9; methanol,
D-10; normal butanol,
D-11; butylcellosolv,
D-12; homogenol L-100 by Kao Corp.,
D-13; deionic water,
D-14; butanol, respectively show.
The other signs are referred to notes in table 98-1 and 123.

TABLE 123-4

Sign table for showing raw materials of paint and combinations for recycle.

| raw materials, names of makers, grades and so on | sign |
|---|---|
| resin for paint No*34) rate (mount) wt % | A-1 |
| resin for paint | A-2 |
| titanium oxide by FURUKAWA CO., LTD. (commercial name and grade; FR-41) | A-3 |
| iron oxide yellow by Titan Kogyo K. K. (commercial name and grade; TAROX LL-XLO) | A-4 |
| carbon black by Mitsubishi Chemical Co., Ltd. (commercial name and grade; MA-100) | A-5 |
| calcium carbonate by MARUO CALCIUM CO., LTD. (commercial name and grade; MC-T) | A-6 |
| talc by TAKEHARA KAGAKU KOGYO CO., LTD. (commercial name and grade; TT talc) | A-7 |
| solvent and so on wt % | |
| toluene | A-8 |
| butyl acetate | A-9 |
| cyclohexanone | A-10 |
| isopropyl alcohol | A-11 |
| surface conditioner by MONSANTO CO., LTD. (commercial name and grade; MODEFLOW) | A-12 |
| total | A-13 |
| thinner No for dilution | A-14 |
| property for recycle | |
| HIPS resin | A-15 |
| styrene modified PPO(E) resin | A-16 |

TABLE 123-4-continued

Sign table for showing raw materials of paint and combinations for recycle.

| raw materials, names of makers, grades and so on | sign |
|---|---|
| ABS resin | A-17 |
| PC resin | A-18 |
| PVC resin | A-19 |
| PP resin | A-20 |
| nylon resin | A-21 |

TABLE 123-4-continued

Sign table for showing raw materials of paint and combinations for recycle.

| raw materials, names of makers, grades and so on | sign |
|---|---| note)
*34) details of resin for paint
(sorts, makers, commercial name and grades are the same as table 103.)
In each table belong to table 123, "○" is recyclable combination, "x" is not recyclable combination, "—" is not clear combination in recyclability, respectively show.
ABS resin includes blend polymer comprising base resin of AS resin, AES resin, AAS resin including AS resin.
HIPS resin includes blend polymer comprising base resin of PS resin as ABS resin.

TABLE 124-1 result of evaluation on coatability and film property

| | #101 | #102 | #104 | #112 | #116 | #118 | #119 | #121 | #122 | #123 | #124 | #126 | #128 | #129 | #132 |
|---|---|---|---|---|---|---|---|---|---|---|---|---|---|---|---|
| 1. coatability (appearance: luster, surface irregularity, wrinkle, clouding, pin-holl, and so on) | Luster, surface irregularity, wrinkle, clouding, pin-holl, and so on are not found. | ← | ← | ← | ← | ← | ← | ← | ← | ← | ← | ← | ← | ← | ← |
| 2. Film property | | | | | | | | | | | | | | | |
| 2-1. Pencil hardness test | HB or over | ← | ← | ← | ← | ← | ← | ← | ← | ← | ← | ← | ← | ← | ← |
| 2-2. Cross-hatch test | no abnormality 100/100 | ← | ← | ← | ← | ← | ← | ← | ← | ← | ← | ← | ← | ← | ← |
| 2-3. Hot water dip test | no abnormality 100/100 | ← | ← | ← | ← | ← | ← | ← | ← | ← | ← | ← | ← | ← | ← |
| 2-4. Humidity test | no abnormality 100/100 | ← | ← | ← | ← | ← | ← | ← | ← | ← | ← | ← | ← | ← | ← |
| 3. Molding material used in evaluating coatability and | ABS resin moldings | ← | ← | PP resin moldings | ABS resin moldings | ← | ← | ← | ← | ← | ← | ← | ← | PA6 resin moldings | PP resin moldings | note)
← means the same as left.

TABLE 124-2 result of evaluation on coatability and film property

| paint | #127 | #133 | #138 | #140 | #142 | #144 | #149 | #10 | #20 | #30 | #40 | #50 | #10 Mt | #151 |
|---|---|---|---|---|---|---|---|---|---|---|---|---|---|---|
| 1. coatability (appearance: luster, surface irregularity, wrinkle, clouding, pin-holl, and so on) | Luster, surface irregularity, wrinkle, clouding, pin-holl, and so on are not found. | ← | ← | ← | ← | ← | ← | ← | ← | ← | ← | ← | ← | ← |
| 2. Film property | | | | | | | | | | | | | | |
| 2-1. Pencil hardness test | HB or over | ← | ← | ← | ← | ← | ← | ← | ← | ← | ← | ← | ← | ← |
| 2-2. Cross-hatch test | no abnormality 100/100 | ← | ← | ← | ← | ← | ← | ← | ← | ← | ← | ← | ← | ← |
| 2-3. Hot water dip test | no abnormality 100/100 | ← | ← | ← | ← | ← | ← | ← | ← | ← | ← | ← | ← | ← |
| 2-4. Humidity test | no abnormality 100/100 | ← | ← | ← | ← | ← | ← | ← | ← | ← | ← | ← | ← | ← |
| 3. Molding material used in | ABS resin moldings | PP resin | ABS resin | ← | HIPS resin | PC resin | ABS resin | ← | HIPS resin | ABS resin | PA6 resin | ABS resin | ← | ← |

TABLE 124-2-continued result of evaluation on coatability and film property

| paint | #127 | #133 | #138 | #140 | #142 | #144 | #149 | #10 | #20 | #30 | #40 | #50 | #10 Mt | #151 |
|---|---|---|---|---|---|---|---|---|---|---|---|---|---|---|
| evaluating coatability and | | moldings | moldings | | moldings | moldings | moldings | | moldings | moldings | moldings | moldings | | | note)
← means the same as left.

TABLE 125-1 result of evaluation on moldability

| item | #101 | #102 | #104 | #112 | #116 | #118 | #119 | #121 | #122 | #123 | #124 | #126 | #127 | #128 | #129 |
|---|---|---|---|---|---|---|---|---|---|---|---|---|---|---|---|
| 1. Problem on molding | nothing particularly | ← | ← | ← | ← | ← | ← | ← | ← | ← | ← | ← | ← | ← | ← |
| 2. Silver streak failure incidence rate (%) | 0.5 | 0.35 | 0.3 | 0 | 0.8 | 1.3 | 0.6 | 0.8 | 0.6 | 0.9 | 0.5 | 0.9 | 0.2 | 0.5 | 0 |
| 3. Scorch failure | no occurance | ← | ← | ← | ← | ← | ← | ← | ← | ← | ← | ← | ← | ← | ← |
| 4. Mottle | no occurance | ← | ← | ← | ← | ← | ← | ← | ← | ← | ← | ← | ← | ← | ← |
| 5. Incidence rate of failure by contamination or foreign matter (%) | 1 | 1 | 1.3 | 0.4 | 1 | 1.2 | 1.1 | 1.3 | 1.5 | 1 | 1 | 1.2 | 1.3 | 0.9 | 1.6 |
| 6. Cracks incidence rate | 0 | 0 | 0 | 0 | 0 | 0 | 0 | 0 | 0 | 0 | 0 | 0 | 0 | 0 | 0 |
| 7. Short failure occurance | no occurance | ← | ← | ← | ← | ← | ← | ← | ← | ← | ← | ← | ← | ← | ← |
| 8. Fluidity of resin melt | no occurance | ← | ← | ← | ← | ← | ← | ← | ← | ← | ← | ← | ← | ← | ← |
| 9. Molding materials used in testing moldability | ABS resin | ABS resin | ABS resin | PP resin | ABS resin | ABS resin | ABS resin | ABS resin | ABS resin | ABS resin | ABS resin | ABS resin | ABS resin | ABS resin | PA6 resin |

TABLE 125-2 result of evaluation on moldability

| item | #132 | #133 | #138 | #140 | #142 | #144 | #149 | #10 | #20 | #30 | #40 | #50 | #10 Mt | #149 Mt | #151 |
|---|---|---|---|---|---|---|---|---|---|---|---|---|---|---|---|
| 1. Problem on molding | nothing particularly | ← | ← | ← | ← | ← | ← | ← | ← | ← | ← | ← | ← | ← | ← |
| 2. Silver streak failure incidence rate (%) | 0 | 0.5 | 0.8 | 0.3 | 0.2 | 1.2 | 0 | 0.8 | 0.6 | 0.3 | 0.9 | 0.7 | 0.4 | 0.2 | 0.5 |
| 3. Scorch failure | no occurance | ← | ← | ← | ← | ← | ← | ← | ← | ← | ← | ← | ← | ← | ← |
| 4. Mottle | no occurance | ← | ← | ← | ← | ← | ← | ← | ← | ← | ← | ← | ← | ← | ← |
| 5. Incidence rate of failure by contamination or foreign matter (%) | 0.7 | 0.6 | 0.9 | 1.1 | 0.4 | 2.6 | 0.8 | 0.6 | 1.3 | 0.8 | 0.5 | 0.4 | 10.6 | 1.5 | 0.9 |
| 6. Cracks incidence rate | 0 | 0 | 0 | 0 | 0 | 0 | 0 | 0 | 0 | 0 | 0 | 0 | 0 | 0 | 0 |
| 7. Short failure occurance | no occurance | ← | ← | ← | ← | ← | ← | ← | ← | ← | ← | ← | ← | ← | ← |
| 8. Fluidity of resin melt | no occurance | ← | ← | ← | ← | ← | ← | ← | ← | ← | ← | ← | ← | ← | ← |
| 9. Molding materials used in testing moldability | PP resin | PP resin | ABS resin | ABS resin | HIPS resin | PC resin | ABS resin | ABS resin | HIPS resin | ABS resin | PA6 resin | ABS resin | ABS resin | ABS resin | ABS resin | note)
"failure by contamination or foreign matter" occurs, on molding obtained by molding repelletized molding which is molding made of virgin material and which is coated by recyclable coating, at step of recycle test.
"silver streak failure" is molding product having so predetermined level as to cover (decorate) mark thereof by re-coating.

TABLE 126

| evaluation item | evaluation result |
|---|---|
| 1. paint film ability | |
| 1-1. appearance | bloom, pinhole, blister are not confirmed |
| 2. paint film properties | |
| pencil hardness test | HB or over |
| cross hatch test | 100/100 |
| cross cut test | 1 mm or below |
| hot water dip test | no abnormality 100/100 |
| humidity test | no abnormality 100/100 |
| salt water dip test | no abnormality 100/100 |

Test method and others depend on table 8.

TABLE 127

| evaluation item | evaluation result |
|---|---|
| 1. paint film ability | |
| 1-1. appearance | bloom, pinhole, blister are not confirmed |
| 2. paint film properties | |
| pencil hardness test | HB or over |
| cross hatch test | 100/100 |
| cross cut test | 1 mm or below |
| hot water dip test | no abnormality 100/100 |
| humidity test | no abnormality 100/100 |
| salt water dip test | no abnormality 100/100 |

Test method and others depend on table 8.

TABLE 129

| evaluation item | evaluation result |
|---|---|
| 1. paint film ability | |
| 1-1. appearance | bloom, pinhole, blister are not confirmed |
| 2. paint film properties | |
| pencil hardness test | HB or over |
| cross hatch test | 100/100 |
| cross cut test | 1 mm or below |
| hot water dip test | no abnormality 100/100 |
| humidity test | no abnormality 100/100 |
| salt water dip test | no abnormality 100/100 |

Test method and others depend on table 8.

TABLE 130

| | item | | | | | |
|---|---|---|---|---|---|---|
| time (hr.) | styrene modified PPO(E) resin + paint #149 | styrene modified PPO(E) resin + urethane resin (10:1) paint | styrene modified PPO(E) resin + no coating | ABS resin + no coating | flame retardant ABS resin + no coating | PC/ABS resin + no coating |
| 24 hr. | 0.28 | 0.34 | 1.7 | 0.3 | 1.05 | 0.33 |
| 48 hr. | 0.38 | 0.61 | 4.73 | 0.25 | 2.94 | 0.95 |
| 72 hr. | 0.26 | 0.96 | 7.89 | 1.73 | 4.57 | 0.93 |
| 96 hr. | 0.4 | 1.23 | 11.88 | 1.66 | 6.04 | 2.61 |
| 192 hr. | 0.34 | 1.46 | 19.75 | 2.02 | 14.33 | 5.63 |

TABLE 133

| test item | test method | unit | 75th example | 76th example | 77th example | 78th example |
|---|---|---|---|---|---|---|
| tensile yield point strength | JIS K 7113 | kgf/mm² | 1.5 | 3.6 | 4.2 | 3.6 |
| elongation at tensile break | JIS K 7113 | % | 4 | 4 | 4 | 4 |
| maximum bending strength | JIS K 7203 | kgf/mm² | 2.1*31) | 5.2*31) | 6.9*32) | 5.4*31) |
| modulus in flexure | JIS K 7113 | kgf/mm² | 257 | 189 | 226 | 190 |
| Izod impact strength (notched, ¼ inch thickness, room temperature) | JIS K 7110 | kg · cm/cm | 1 | 1.3 | 1.7 | 1.1 |

*31) break before the displacement in test piece reaching to 1.5 times of thickness therein
*32) specified deflection bending strength (no break before the displacement in test piece reaching to 1.5 times of thickness therein)

TABLE 134

| | item molding material; ABS resin paint; paint #149 | | | |
|---|---|---|---|---|
| test (examination) item | fresh molding by virgin material*2) | first recycle*3) | second recycle*4) | third recycle*5) |
| 1-2 mechanical properties | | | | |
| tensile strength kg/cm$^2$ | 440 | 430 | 426 | 420 |
| bending strength kg/cm$^2$ | 670 | 665 | 667 | 671 |
| elongation % | 20 | 19 | 19 | 18 |
| modulus in flexure kg/cm$^2$ | 24000 | 24000 | 23800 | 24100 |
| Izod impact strength kg-cm/cm | 16 | 14.6 | 14.9 | 15.1 |

*2), *3), *4) and *5) correspond to items described in 4th example.

TABLE 135

| | item molding material; ABS resin paint; paint #149 | | | |
|---|---|---|---|---|
| test (examination) item | fresh molding by virgin material*2) | first recycle*3) | second recycle*4) | third recycle*5) |
| 1-2 mechanical properties | | | | |
| tensile strength kg/cm$^2$ | 340 | 332 | 326 | 320 |
| bending strength kg/cm$^2$ | 550 | 540 | 525 | 516 |
| elongation % | 50 | 46 | 44 | 43 |
| modulus in flexure kg/cm$^2$ | 22500 | 22600 | 22800 | 22900 |
| Izod impact strength kg-cm/cm | 7 | 6.8 | 7.1 | 6.9 |

*2), *3), *4) and *5) correspond to items described in 4th example.

TABLE 136

| | item molding material; styrene modified PPO(E) resin paint; paint #149 | | | |
|---|---|---|---|---|
| test (examination) item | fresh molding by virgin material *2) | first recycle *3) | second recycle *4) | third recycle *5) |
| 1-2 mechanical properties | | | | |
| tensile strength kg/cm$^2$ | 370 | 381 | 388 | 391 |
| bonding strength kg/cm$^2$ | 600 | 614 | 642 | 630 |
| elongation % | 40 | 35 | 41 | 42 |
| modulus in flexure kg/cm$^2$ | 23000 | 22800 | 23200 | 23300 |
| Izod impact strength kg-cm/cm | 15 | 13.5 | 12.6 | 11.9 |

*2), *3), *4) and *5) correspond to items described in 4th example.

TABLE 137

| | | paint | | |
|---|---|---|---|---|
| company name | commercial name | paint #10 | paint #149 | thermosetting urethane coating (10:1) *33) |
| LION CORPORATION | Mama Lemon original liquid | ○ | ○ | ○ |
| LION CORPORATION | Mama Lemon (10% solution | ○ | ○ | ○ |
| Kao Corporation | Liquid Glass Mypet | ○ | ○ | ○ |
| Kao Corporation | KANTAN MAIPETTO | ○ | ○ | ○ |
| Taiho Industries Co., Ltd. | DIATEN CLEAN | Δ | Δ | Δ |
| Sanwa Kogyo Co., Ltd. | CLEAN MASTER | ○ | ○ | ○ |
| Sanwa Kogyo Co., Ltd. | CLEAN ACE M 148D | ○ | ○ | ○ |
| Sanwa Kogyo Co., Ltd. | SOYCUT P 172D | x | x | Δ |
| Sanwa Kogyo Co., Ltd. | FUSER CLEANER 177D | x | Δ | Δ |

TABLE 137-continued

|  |  | paint | | |
|---|---|---|---|---|
| company name | commercial name | paint #10 | paint #149 | thermosetting urethane coating (10:1) *33) |
| FUJI XEROX CO., LTD. | DRUM CLEANER V512 | x | Δ | Δ |
| FUJI XEROX CO., LTD. | DRUM CLEANER V506 | x | Δ | Δ | symbols)
o : no change in the film
Δ: the film was lustered
x: the film was attacked with a chemical to expose a molding surface
*33) thermosetting urethane paint, by Cashoo K.K. (commercial name and grade: Stron #100)

TABLE 138 matrix of recycling properties of thermoplastic resins for constituents of paint and thermoplastic resins for main constituent of moldings

| resins for the main constituents of moldings resins for the constituents of paint films | HIPS resin | styrene modified PPO(E) resin | ABS resin | PC resin | vinyl chloride resin | nylon resin | PP resin | PE resin |
|---|---|---|---|---|---|---|---|---|
| styreneted alkyd | o | o | o | o | x | x | x | x |
| acrylic resin | o | o | ⊚ | o | x | x | x | x |
| chlorinated PP | x | x | x | x | x | x | ⊚ | ⊚ |
| vinyl acetate modified acrylic resin | x | x | o | x | x | x | x | x |
| phenolic resin | x | x | x | x | x | x | x | x |
| rosin modified maleic resin | x | x | x | x | x | x | x | x |
| rosin ester | x | x | x | x | x | x | x | x |
| rosin modified phenole resin | x | x | x | x | x | x | x | x |
| vinyl chloride resin | x | x | Δ | Δ | ⊚ | x | x | x |
| polyvinyl butyral | x | x | x | x | x | x | x | x |
| vinyl chloride/vinyl acetate copolymer | Δ | x | o | o | o | x | x | x |
| styrene modified acrylic resin | ⊚ | ⊚ | ⊚ | ⊚ | x | x | x | x |
| styreneacrylic emulsion | ⊚ | ⊚ | ⊚ | ⊚ | x | x | x | x |
| acrylic emulsion | o | o | ⊚ | ⊚ | x | x | x | x |
| poryamide resin | x | Δ | Δ | x | x | ⊚ | x | x |
| urethane emulsion | x | x | x | x | x | x | x | x |
| epoxy resin | x | x | x | Δ | x | x | x | x |
| alkyd resin/nitrocellulose | x | x | o | o | x | x | x | x |
| thermoplastic acrylic resin/nitrocellulose | x | x | o | x | x | x | x | x |
| vinyl acetate modified acrylic resin | x | x | o | o | x | x | x | x |
| alkyd resin | x | x | o | x | x | x | x | x |
| urethane modified alkyd resin | o | o | o | o | x | x | x | x |
| chlorinated polyethylene | x | x | x | x | x | x | x | x |
| water-soluble acrylic resin | o | ⊚ | ⊚ | o | x | x | x | x | symbols)
⊚: thermoplastic resins constituent of paint film and thermoplastic resin for main constituents of moldings have sufficient to have affinity, and are recyclable combinations
o: thermoplastic resins constituent of paint film and thermoplastic resin for main constituents of moldings have affinity, and are recyclable combinations
Δ: thermoplastic resins constituent of paint film and thermoplastic resin for main constituents of moldings are combinations which have affinity depending on special conditions of recycle.
x: thermoplastic resins constituent of paint film and thermoplastic resin for main constituents of moldings are combinations which have no affinity.

TABLE 139

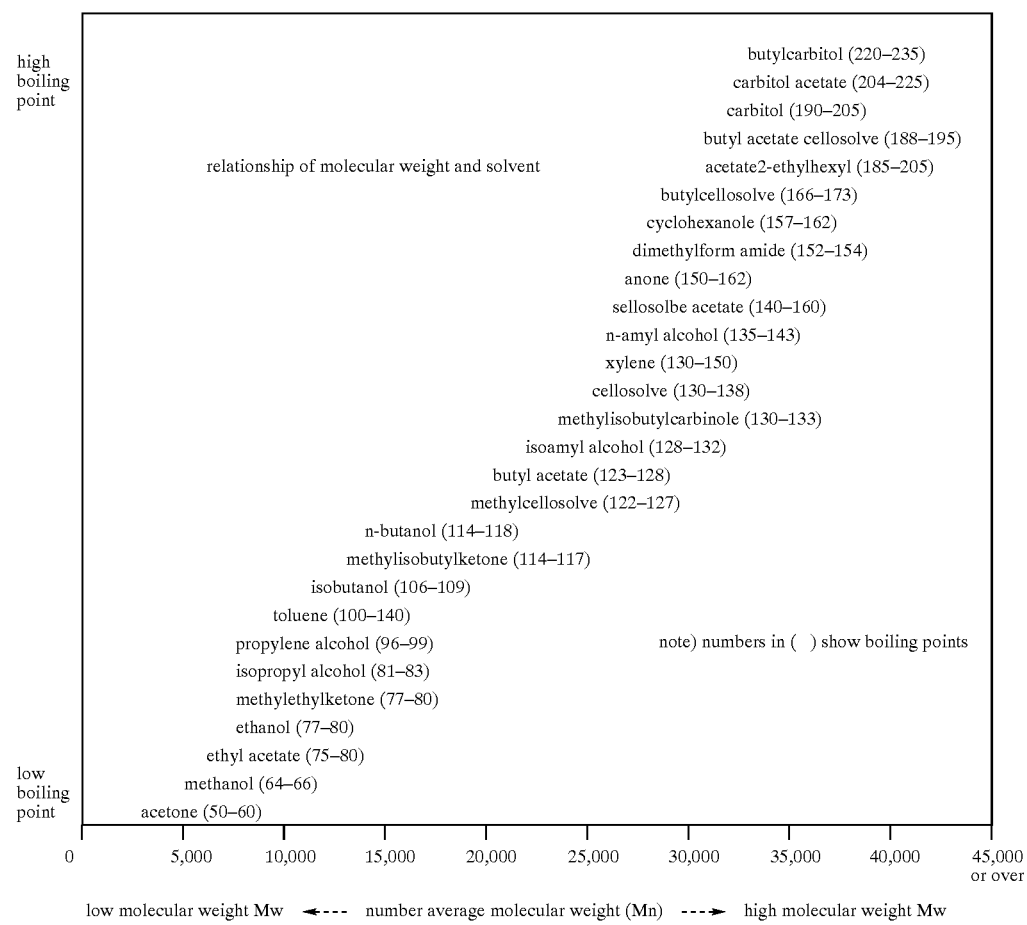

What is claimed is:

1. A coated molding, comprising:
a molding mainly comprising a thermoplastic resin; and
a coating film coated on at least a surface of said molding;
wherein a resin constituting said coating film and said resin constituting said molding have an affinity for each other at least at interfaces therebetween or in a boundary region; and
wherein said resin constituting said coating film comprises a thermoplastic resin capable of repeatedly molding by heating and melting after mixing with said thermoplastic resin used as a main constituent of said molding.

2. The coated molding according to claim 1, wherein said thermoplastic resin constituting said coating film is dispersed in the main constituent of said molding and said thermoplastic resin constituting said coating film has the same nature as or a nature different from said thermoplastic resin used as the main constituent of said molding and both thermoplastic resins mutually exhibit a nature of heat fusion, heat adhesion, heat stickiness, heat bonding, heat attachment, heat adherence, heat affinity, heat wetness or heat melting.

3. The coated molding according to claim 1, wherein said thermoplastic resin of said coating film has the same nature as or a nature different from said thermoplastic resin used as the main constituent of said molding and exhibits compatibility or miscibility with said thermoplastic resin used as the main constituent of said molding.

4. The coated molding according to claim 3, wherein said thermoplastic resin used as the main constituent of said molding and said thermoplastic resin of said coating film comprise the same resin, or resins having the same skeleton or same branch, or different resins having similar properties.

5. The coated molding according to claim 3, wherein thermoplastic resin used as the main constituent of said molding comprises at least one member selected from the group consisting of styrene resins, vinyl resins, amino resins, olefin resins, allied resins and similar resins, and
wherein said thermoplastic resin used as a main constituent of said coating film comprises at least one member selected from the group consisting of acrylic resins, styrene resins, vinyl resins, amino resins, olefin resins, allied resins and similar resins.

6. The coated molding according to claim 3, wherein thermoplastic resin used as the main constituent of said molding comprises an ABS resin, and
said thermoplastic resin used as a main constituent of said coating film comprises an acrylonitrile-styrene copolymer resin, a styrene-modified acrylic resin or a thermoplastic acrylic resin.

7. The coated molding according to claim 3, wherein said thermoplastic resin used as the main constituent of said molding comprises a high impact polystyrene resin, and said thermoplastic resin used as a main constituent of said coating film comprises a polystyrene resin or a styrene-modified acrylic resin.

8. The coated molding according to claim 3, wherein said thermoplastic resin used as the main constituent of said molding comprises a modified polyphenylene oxide (ether) resin, and wherein said thermoplastic resin of said coating film comprises polystyrene resin or a styrene-modified acrylic resin.

9. The coated molding according to claim 3, wherein said thermoplastic resin used as the main constituent of said molding comprises polypropylene resin or polyethylene resin, and wherein said thermoplastic resin of said coating film comprises a chlorinated polypropylene resin or a halogenated polyolefin resin.

10. The coated molding according to claim 1, wherein said thermoplastic resin constituting said coating film has the same nature as or a nature different from said thermoplastic resin used as the main constituent of said molding, and is dispersed in said thermoplastic resin used as the main constituent of said molding so as to be able to be stabilized as having a sea-island structure or other structure.

11. The coated molding according to claim 10, wherein said thermoplastic resin of said coating film is dispersed in the form of islands in said thermoplastic resin used as the main constituent of said molding so as to have a sea-island structure or other structure, and wherein said thermoplastic resin of said coating film dispersed in the form of islands has an aspect ratio of from 0.2 to 1.

12. The coated molding according to claim 1, wherein said thermoplastic resin of said coating film has the same nature as or a nature different from said thermoplastic resin used as the main constituent of said molding and is capable of being mixed at a molecular level with said thermoplastic resin used as the main constituent of said molding.

13. A coated molding, comprising:

a molding, coated on a surface thereof with a paint comprising a thermoplastic resin capable of repeatedly molding by heating and melting after mixing with a thermoplastic resin used as a constituent of said molding, said molding being molded by heating and melting, said thermoplastic resin as the main constituent of the paint is dispersed in the form of island within said thermoplastic resin as the constituent of the molding, and wherein said paint, mainly comprising a thermoplastic resin capable of repeatedly molding by heating and melting after mixing with the thermoplastic resin as the constituent of the molding, is painted on the molding molded by heating and melting.

14. The coated molding according to claim 13, wherein an aspect ratio of the thermoplastic resin as the main constituent of the paint dispersed in the form of islands is from 0.1 to 1.

15. The coated molding according to claim 13, wherein an aspect ratio of the thermoplastic resin as the main constituent of the paint dispersed in the form of islands is from 0.2 to 1.

16. A method for recycling a coated moldings comprising:

crushing or pelletizing a molding, coated on a surface thereof with a paint comprising a thermoplastic resin, to obtain a crushed or palletized molding;

molding said crushed or pelletized molding by heating and melting, so that said thermoplastic resin of said paint is dispersed in said thermoplastic resin of said molding;

wherein said thermoplastic resin of said paint has the same nature as or a nature different from a thermoplastic resin of said molding or wherein said thermoplastic resin is capable of repeatedly molding by heating and melting after mixing with said thermoplastic resin of said molding.

17. A coated molding, comprising:

a molding mainly comprising a thermoplastic resin; and a coating film directly attached on a surface of said molding;

wherein a resin constituting said coating film and said resin constituting said molding have an affinity for each other at least at interfaces therebetween or in a boundary region, and said coating film comprises a thermoplastic resin capable of repeatedly molding by heating and melting after mixing with said thermoplastic resin used as a main constituent of said molding, and said coating film is directly coated to an entire outer surface of said molding, or said coating film is directly coated to a part of an outer or inner surface of said molding.

18. A method for manufacturing of a coated molding, comprising:

molding molded articles from a thermoplastic resin, and coating a paint on a surface of said molded articles, wherein said paint comprises as a main constituent thereof a thermoplastic resin capable of repeatedly molding by heating and melting after mixing with said thermoplastic resin used as a main constituent of said molded article.

19. A method for recycling of a coated molding, comprising:

crushing a molding coated with a paint comprising a thermoplastic resin which is capable of repeatedly molding by heating and melting after mixing with a thermoplastic resin of said molding and which has the same nature as or a nature different from the thermoplastic resin of said molding, thereby obtaining a crushed and coated molding or pelletized coated molding;

remolding a molded article from said crushed and coated molding or pelletized coated molding; and coating said re-molded article with a paint comprising a thermoplastic resin which has the same nature as or a nature different from said thermoplastic resin comprising said molding and is capable of repeatedly molding by heating and melting after mixing with said thermoplastic resin comprising said molding.

20. The method for recycling of a coated molding according to claim 19, comprising:

providing a crushed molding as it is, or mixing and melting the crushed molding to extrude the melted mixture in the form of pellets; and re-molding a molded article from the crushed molding or said pellets.

21. The method for recycling of a coated molding according to claim 20, comprising:

mixing at a given ratio crushed pieces or pellets of plural types of coated moldings, which each comprise a thermoplastic resin as a main constituent of moldings and a paint comprising a thermoplastic resin coated on the moldings, said thermoplastic resin of the paint having affinity for the thermoplastic resin of the moldings at least at interfaces or in a boundary region established on extrusion and capable of repeatedly molding after mixing with said first-mentioned thermoplastic resin, to obtain a mixture; and re-molding said mixture.

22. The method for recycling of a coated molding according to claim 21, wherein
at least one of said coated moldings is a foamed product, and said at least one and the other of coated moldings are melt mixed in such a state as to exert a given back pressure thereon so that a generated gas is dissolved under pressure in a resin melt.

23. The method for recycling of a coated molding according to claim 22, wherein a hermetically sealed mold whose mating faces are sealed is pressurized to a level higher than an atmospheric pressure, and
a resin melt is injected into the sealed mold through a switching mechanism.

24. The method for recycling of a coated molding according to claim 21, comprising:
crushing, melt mixing and extruding into pellets first coated moldings each including an ABS resin molding coated with a paint based on a varnish comprising a styrene-modified acrylic resin; and
crushing, melt mixing and extruding into pellets second moldings of a PET resin.

25. The method for recycling of a coated molding according to claim 21, comprising:
crushing first coated moldings each including an ABS resin molding coated with a paint based on a varnish comprising a styrene-modified acrylic resin, to obtain crushed first moldings; melt mixing and extruding said crushed first moldings into pellets; and
crushing second coated moldings comprising a PMMA resin, melt mixing and extruding into pellets.

26. The method for recycling of a coated molding according to claim 25, wherein both pellets are mixed and molded to obtain moldings, and
said moldings are coated with a first paint based on a varnish comprising an acrylic acid nitrile-styrene copolymer resin.

27. The method for recycling of a coated molding according to claim 21, comprising
crushing first coated moldings comprising a HIPS resin, melt mixing and extruding into pellets;
crushing second coated moldings comprising a foamed PS resin material, melt mixing and extruding into pellets; and
mixing the pellets of the first and second moldings and molding the mixed pellets.

28. The method for recycling of a coated molding according to claim 27, wherein the resultant moldings are coated with a second paint based on a polystyrene resin varnish.

29. The method for recycling of a coated molding according to claim 20, comprising:
crushing, melt mixing and extruding into pellets first coated moldings each comprising an ABS resin molding coated with a paint based on a varnish comprising a styrene-modified acrylic resin; and
crushing, melt mixing and extruding into pellets second coated moldings each comprising a PC resin molding coated with a paint based on a varnish comprising a styrene-modified acrylic resin.

30. The method for recycling of a coated molding according to claim 20, further comprising adding a compatibilizing agent at a given ratio by weight to said pellets.

31. The method for recycling of a coated molding according to claim 30 wherein a ratio of said compatibilizing agent is 1 to 15% by weight.

32. The method for recycling of a coated molding according to claim 30, further comprising mixing at a given ratio and heating the pellets of the first and second moldings for a given time, and
molding the thus heated mixed pellets.

33. The method for recycling of a coated molding according to claim 32, further comprising:
coating moldings obtained by molding the heated mixed pellets with paint based on a varnish comprising a styrene-modified acrylic resin.

34. The method for recycling of a coated molding according to claim 19, wherein the pellets obtained by melt mixing the crushed molding and extruding are mixed with a given amount of a virgin resin or a component of said virgin resin, serving as a recycle aid, for said coated molding, and the mixture is molded in order to obtain a molding.

35. The method for recycling of a coated molding according to claim 34, wherein a given amount of at least one addition agent selected from the group consisting of reinforcing materials, fillers and other kinds of addition agents are added to the recycle aid, and the mixture is molded in order to obtain a molding.

36. The method for recycling of a coated molding according to claim 19, wherein a refused toner is added to crushed pieces or pellets of a molding of a thermoplastic resin exhibiting at least affinity for a thermoplastic resin constituting said refused toner at a given ratio.

37. A paint for resin moldings, comprising:
a thermoplastic resin which has the same nature as or a nature different from a thermoplastic resin of a coated resin molding and is capable of repeatedly molding after mixing with the thermoplastic resin of the coated resin molding.

38. The paint for resin moldings according to claim 37, wherein said thermoplastic resin used as a main constituent of said paint comprises the same resin, a resin having the same skeleton or branch as the thermoplastic resin, or a different type of resin having similar properties.

39. The paint for resin moldings according to claim 38, wherein said thermoplastic resin comprising said paint comprises a styrene-modified acrylic resin having a weight average molecular weight ranging from 10,000 to 60,000.

40. The paint for resin moldings according to claim 39, wherein said paint further comprises a solvent which has a boiling point determined in response to a molecular weight of said thermoplastic resin mainly comprising said paint.

41. The paint for resin moldings according to claim 37, wherein said thermoplastic resin used as a main constituent of said paint comprises a resin selected from the group consisting of acrylic acid nitrile-styrene copolymer resin, polystyrene resin, styrene-modified acrylic resins, thermoplastic acrylic resins and halogenated polyolefins.

42. The paint for resin moldings according to claim 37, wherein said thermoplastic resin comprising said paint is a single kind of thermoplastic resin.

43. The paint for resin moldings according to claim 37, wherein said thermoplastic resin comprising said paint comprises at least two kinds of thermoplastic resins.

44. The paint for resin moldings according to claim 37, comprising a thermoplastic resin, which has the same nature as or a different nature from a thermoplastic resin used as a constituent of a coated resin molding and is capable of repeatedly molding after mixing with the second-mentioned thermoplastic resin, a solvent, and a given amount of a refused toner serving as a pigment.

45. A method for preparing a paint for resin moldings, comprising:

dispersing or melting the following components
a thermoplastic resin, and
optionally, at least one member selected from the group consisting of a solvent, water a pigment, a dye, a surface conditioner and another addition agent, to obtain a paint;
wherein said thermoplastic resin has the same nature as or different nature from a thermoplastic resin for a resin molding to be coated and is capable of repeatedly molding after mixing with the thermoplastic resin for the molding.

46. The method for preparing a paint for resin moldings according to claim 45, comprising:

adding a solvent having a boiling point which is determined in response to a molecular weight of the thermoplastic resin used as the main constituent of the paint.

47. The method for preparing a paint for resin moldings according to claim 46, comprising:

adding a mixed solvent to said thermoplastic resin.

48. The method for preparing a paint for resin moldings according to claim 47, comprising:

charging an acrylonitrile-styrene resin in a mixed solvent of toluene and butyl acetate while agitating so as to obtain a given solid content and continuing agitation for a given time until the acrylonitrile-styrene resin is dissolved in the mixed solvent to obtain a varnish;
mixing butyl acetate, titanium oxide, calcium carbonate, talc iron oxide yellow and carbon black under agitation for a given time to provide a mill base and dispersing the mill base in the varnish until a given particle size is attained; and
adding toluene, butyl acetate, cyclohexanone and a surface conditioner to the resultant dispersion to obtain a first paint.

49. The method for preparing a paint for resin moldings according to claim 47, comprising:

charging polystyrene resin in a mixed solvent of toluene and butyl acetate while agitating so as to obtain a given solid content and continuing agitation for a given time until the polystyrene resin is dissolved in the mixed solvent to obtain a varnish;
mixing butyl acetate, titanium oxide, calcium carbonate, talc iron oxide yellow and carbon black under agitation for a given time to provide a mill base and dispersing the mill base in the varnish until a given particle size is attained; and
adding toluene, butyl acetate, cyclohexanone and a surface conditioner to the resultant dispersion to obtain a second paint.

50. The method for preparing a paint for resin moldings according to claim 47, comprising:

preparing a styrene-modified acrylic resin varnish;
mixing butyl acetate, toluene, titanium oxide, calcium carbonate, talc iron oxide yellow and carbon black under agitation for a given time to provide a mill base and dispersing the mill base in the varnish until a given particle size is attained; and
adding toluene, butyl acetate, and a surface conditioner to the resultant dispersion to obtain a third paint.

51. A method for evaluating recyclability of a reproduced coated molding, comprising:

providing molding of test piece obtained by crushing and molding coated moldings which include moldings and a film formed on surfaces of the moldings by coating a paint constituted mainly of a thermoplastic resin having the same nature as or different nature from a thermoplastic resin used as a main constituent of the moldings and capable of repeatedly molding after mixing with the thermoplastic resin for said last-mentioned moldings;
coating the said molded test piece with a paint, which is constituted mainly of a thermoplastic resin having the same nature as or different nature from a thermoplastic resin used as a main constituent of said molded test piece and capable of repeatedly molding after mixing with the thermoplastic resin for said molded test piece to provide the reproduced and coated test piece; and
subjecting said coated test piece or a cross hatch test to evaluate recyclability of the reproduced coated test piece based on the results of the test.

52. A method for evaluating recyclability of a reproduced coated molding, comprising:

providing a mixed resin of a thermoplastic resin of a molding and a thermoplastic resin of a paint at a given ratio,
molding the mixed resin into a test piece molding, and
subjecting the test piece molding to a cross hatch test to evaluate recyclability of the reproduced coated molding based on the results of the test
wherein a state of dispersion of the thermoplastic resin used as a main constituent of said paint in a thermoplastic resin matrix used as a main constituent of the test piece which is a reproduced coated molding is evaluated by observation through a microphotograph.

53. The method for evaluating recyclability of a reproduced coated molding according to claim 52, comprising:

repeating recycling of a reproduced-coated molding, and conducting a test for film properties in every repetition to evaluate recyclability of the reproduced-coated molding in every repetition from the transition in the results of the test.

54. The method for evaluating recyclability of a reproduced coated molding according to claim 53, comprising:

repeating recycling of a reproduced coated molding, and measuring mechanical strength, thermal properties and other physical properties in every repetition to evaluate recyclability of the reproduced coated molding in every repetition from the transition in the results of the measured physical properties.

* * * * *

UNITED STATES PATENT AND TRADEMARK OFFICE
CERTIFICATE OF CORRECTION

PATENT NO. : 6,958,127 B1
DATED : October 25, 2005
INVENTOR(S) : Suzuki et al.

It is certified that error appears in the above-identified patent and that said Letters Patent is hereby corrected as shown below:

Title page,
Item [73], Assignee, should read -- Suzuka Fuji Xerox Co., Ltd., Suzuka (JP); Tohpe Corporation, Sakai (JP); Kowa Toryo Co., Ltd., Tokyo (JP) --.

Signed and Sealed this

Thirty-first Day of January, 2006

JON W. DUDAS
*Director of the United States Patent and Trademark Office*